(12) United States Patent
Scott

(10) Patent No.: US 12,420,696 B2
(45) Date of Patent: Sep. 23, 2025

(54) LOAD BINDER APPARATUS AND METHOD OF USING

(71) Applicant: Peerless Chain Company, Winona, MN (US)

(72) Inventor: Kenton G. Scott, Portland, OR (US)

(73) Assignee: Peerless Chain Company, Winona, MN (US)

( * ) Notice: Subject to any disclaimer, the term of this patent is extended or adjusted under 35 U.S.C. 154(b) by 172 days.

(21) Appl. No.: 18/030,870

(22) PCT Filed: Oct. 8, 2021

(86) PCT No.: PCT/US2021/054207
§ 371 (c)(1),
(2) Date: Apr. 7, 2023

(87) PCT Pub. No.: WO2022/076842
PCT Pub. Date: Apr. 14, 2022

(65) Prior Publication Data
US 2023/0373379 A1    Nov. 23, 2023

Related U.S. Application Data

(63) Continuation-in-part of application No. 17/066,486, filed on Oct. 9, 2020, now Pat. No. 11,787,328.

(51) Int. Cl.
*B60P 7/08*    (2006.01)
*F16G 3/00*    (2006.01)

(52) U.S. Cl.
CPC .............. *B60P 7/083* (2013.01); *F16G 3/006* (2013.01)

(58) Field of Classification Search
CPC ........ B60P 7/083; F16G 11/143; F16G 11/12; F16G 3/006; B66D 3/14; B66D 3/02; B66D 3/16; B66D 3/04; B66D 3/043; B66D 3/06
USPC ......................................................... 254/233
See application file for complete search history.

(56) References Cited

U.S. PATENT DOCUMENTS

| | | | |
|---|---|---|---|
| 5,931,062 A * | 8/1999 | Marcovici | B25B 15/00 81/58 |
| 6,945,516 B1 * | 9/2005 | Scott | B60P 7/083 254/237 |
| 7,229,065 B2 * | 6/2007 | Scott | B61D 45/00 254/237 |

(Continued)

*Primary Examiner* — Jason W San
*Assistant Examiner* — Louis A Mercado
(74) *Attorney, Agent, or Firm* — Faegre Drinker Biddle & Reath LLP

(57) ABSTRACT

A load binding tool for securing a load, the load binder including an elongated threaded contraction expansion assembly including an elongated threaded member having opposing ends with opposite screw threading, and having opposing engaging ends, and enabling common contraction or extension of the respective opposing engaging ends when the elongated threaded member is rotated one direction or another, and a driven sheave, a drive shaft, a primary drive sheave, and a closed loop of chain or other flexible coupler movably engaged with the driven sheave and the primary drive sheave, wherein the drive shaft can be rotated to turn the primary drive sheave and move the opposing engaging ends closer together or further apart. The drive shaft can be coupled with an external drive coupling that can be engaged with a separate drive tool to rotate the drive shaft and operate the load binding tool.

25 Claims, 72 Drawing Sheets

(56) References Cited

U.S. PATENT DOCUMENTS

| | | | |
|---|---|---|---|
| 10,464,467 B2* | 11/2019 | Robins | B60P 7/0853 |
| 10,752,156 B2* | 8/2020 | Ruan | B60P 7/083 |
| 10,814,773 B1* | 10/2020 | Rainone | B60P 7/083 |
| 11,110,849 B1* | 9/2021 | Alterie | B60P 3/079 |
| 11,208,027 B1* | 12/2021 | Rainone | B60P 7/083 |
| 11,440,458 B2* | 9/2022 | Mollick | F16G 11/12 |
| 11,634,063 B2* | 4/2023 | Loraine | B60P 7/083 |
| | | | 24/68 CD |
| 2019/0351808 A1* | 11/2019 | Liu | F16G 11/12 |
| 2019/0351809 A1* | 11/2019 | Liu | B60P 7/0823 |
| 2021/0101518 A1* | 4/2021 | Helline | F16G 11/12 |
| 2022/0389988 A1* | 12/2022 | Mollick | F16H 31/005 |
| 2023/0049274 A1* | 2/2023 | Conner, Jr. | F16G 11/12 |

* cited by examiner

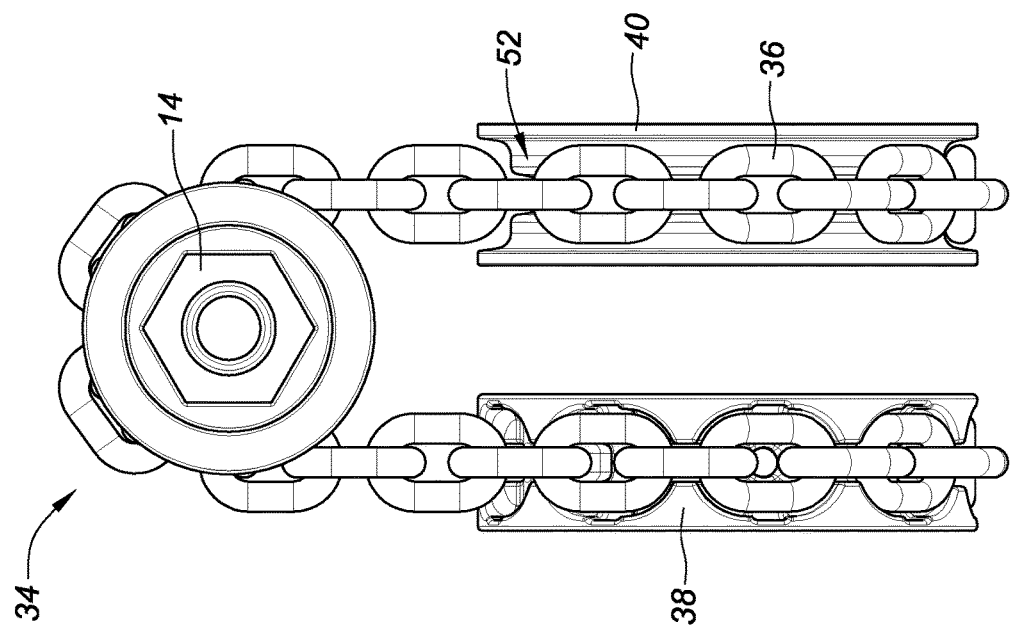
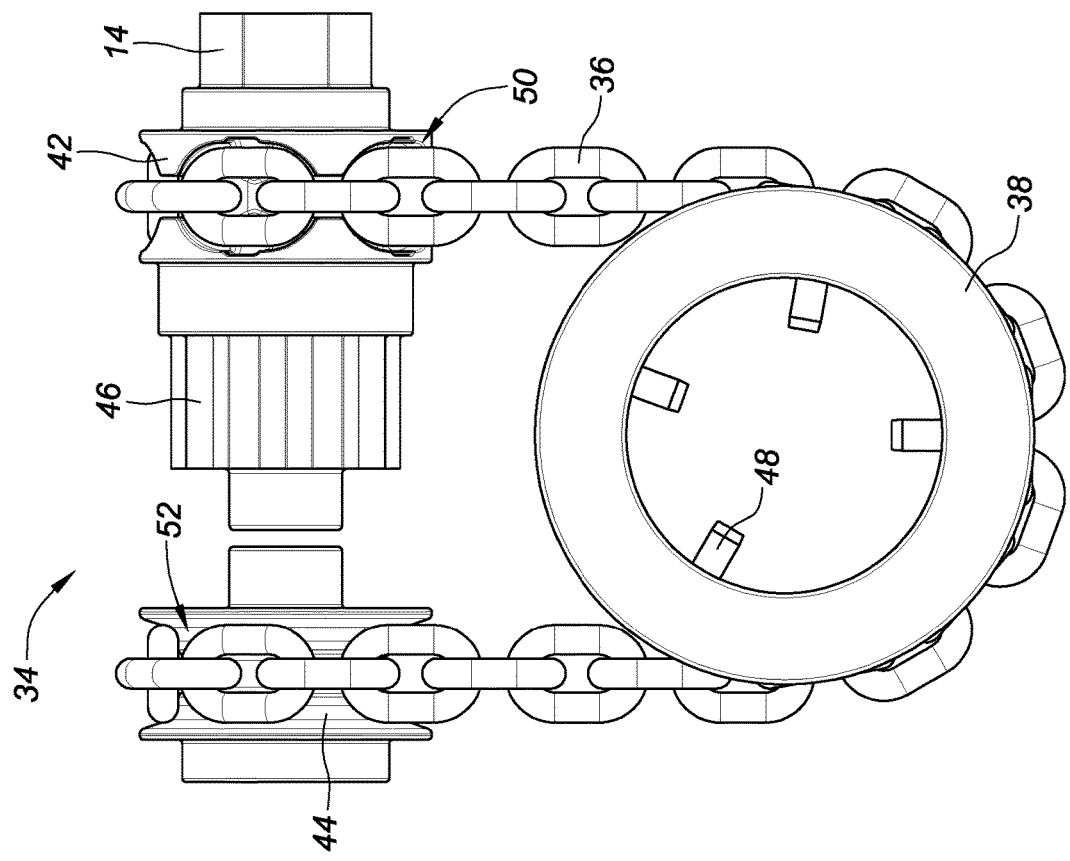
FIG. 3D
FIG. 3C

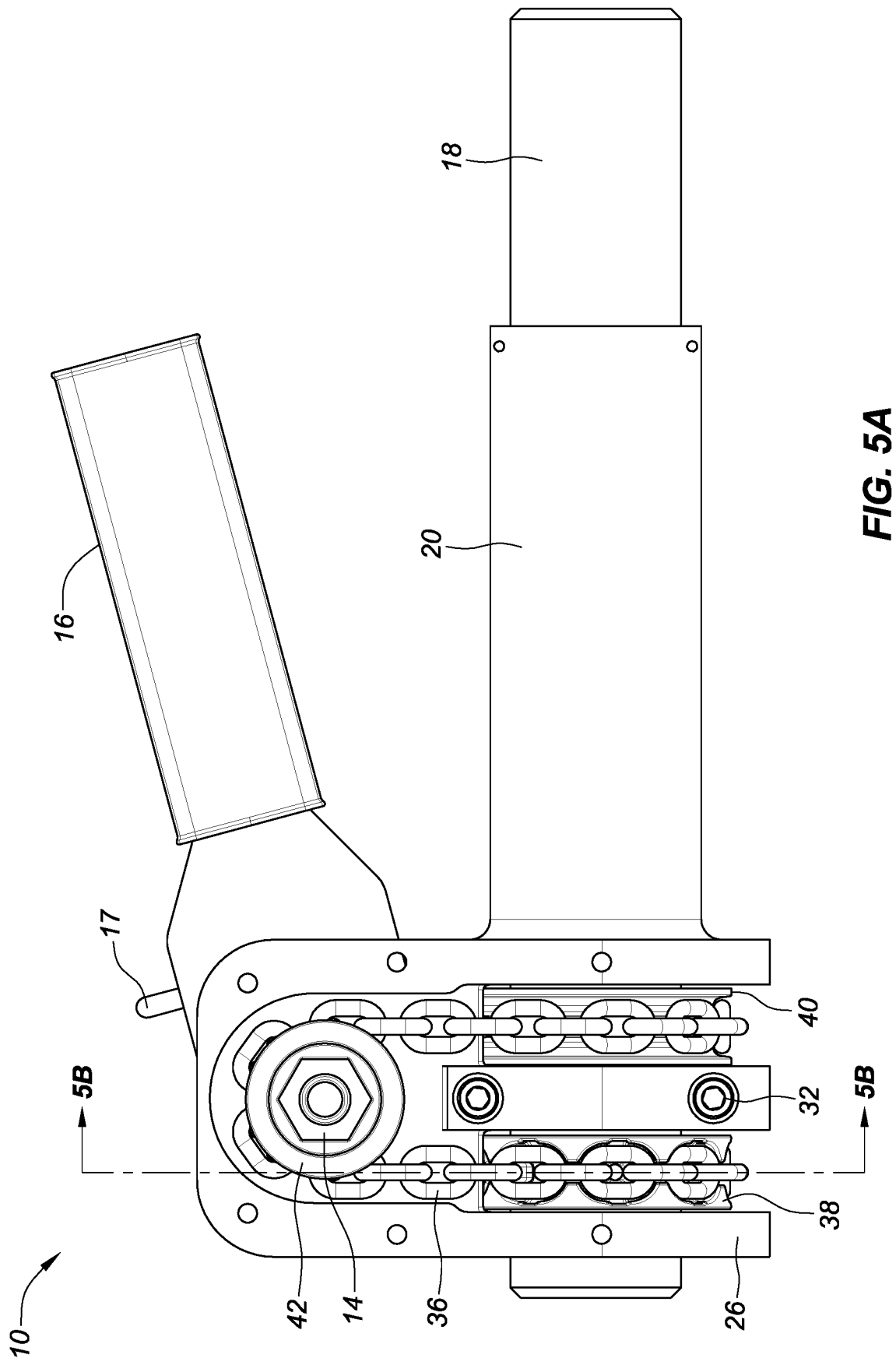

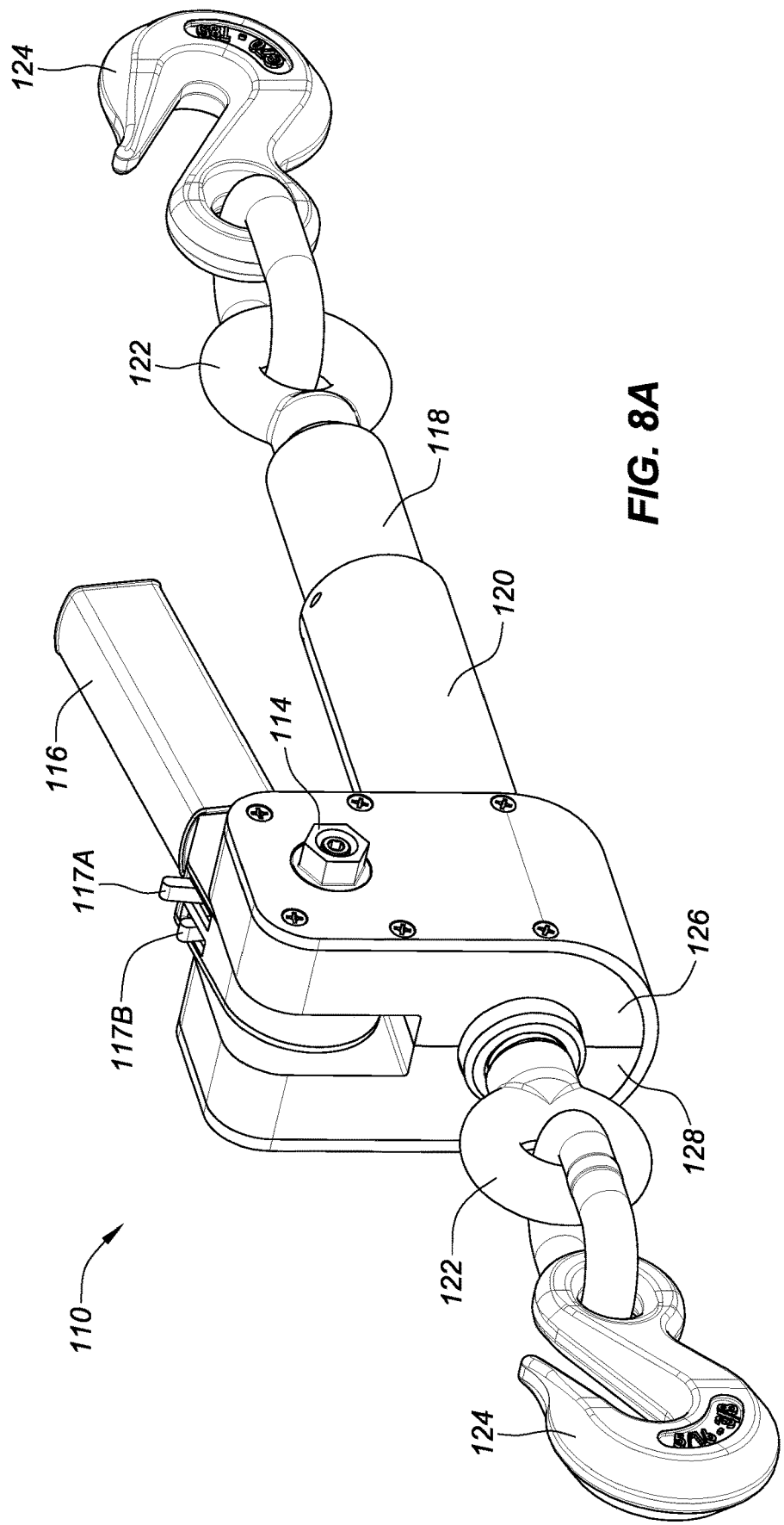

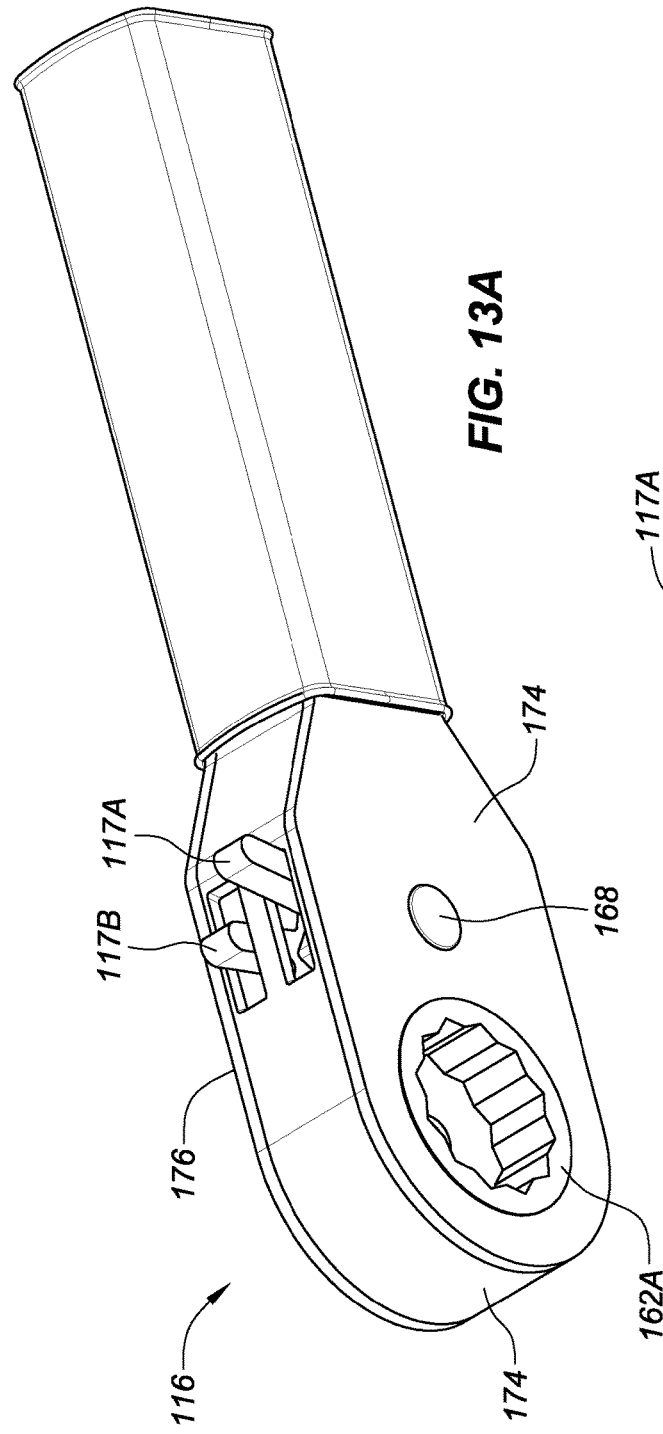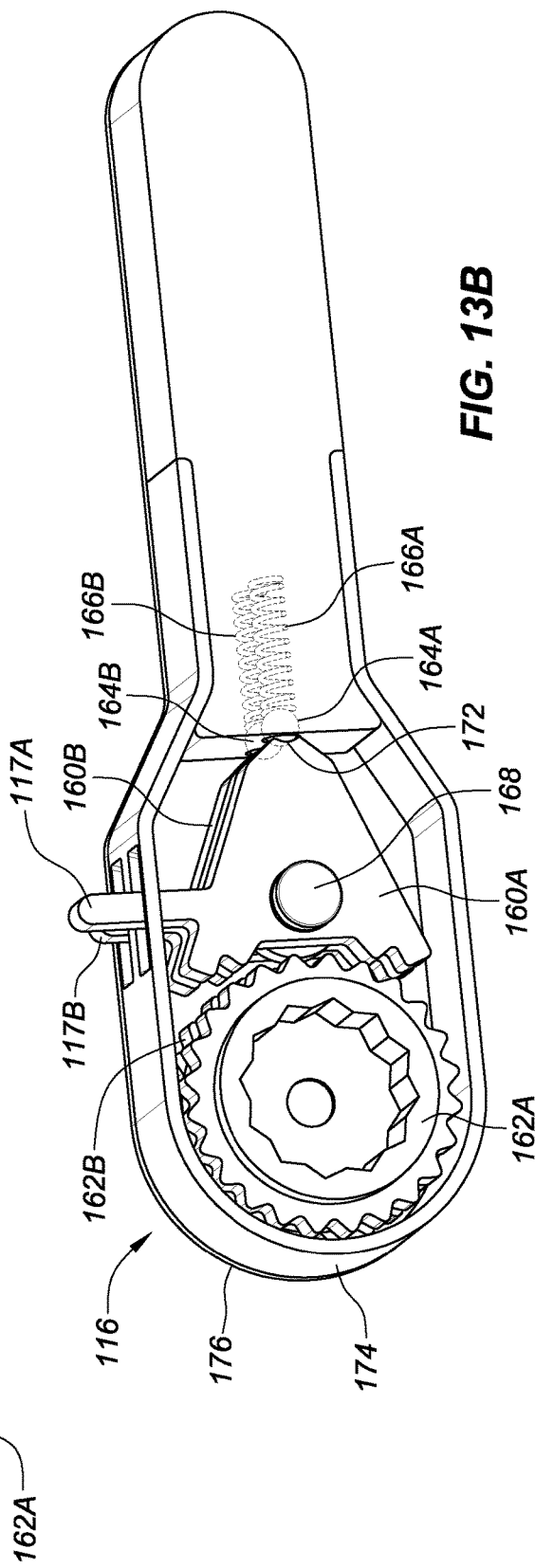
FIG. 13A
FIG. 13B

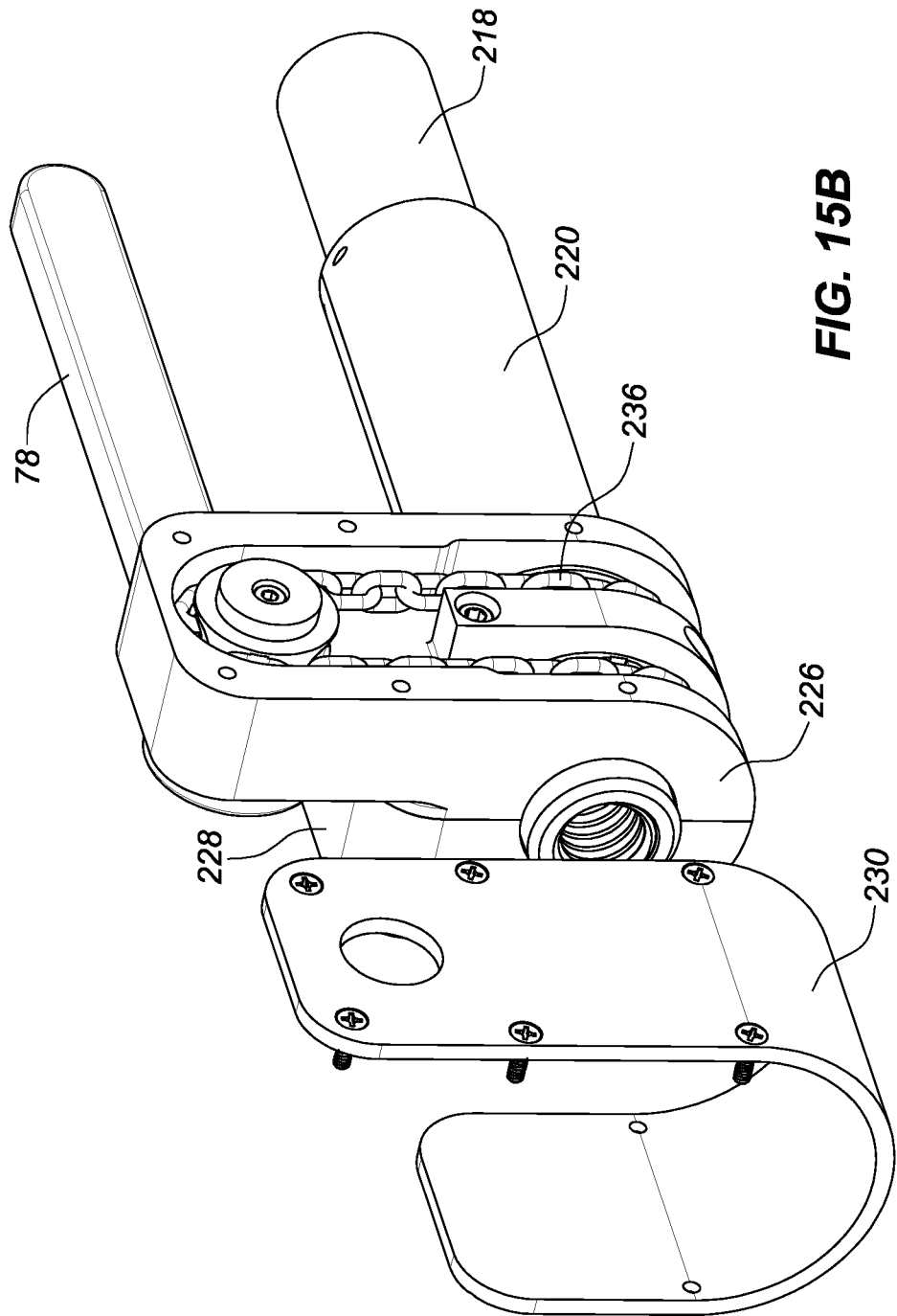

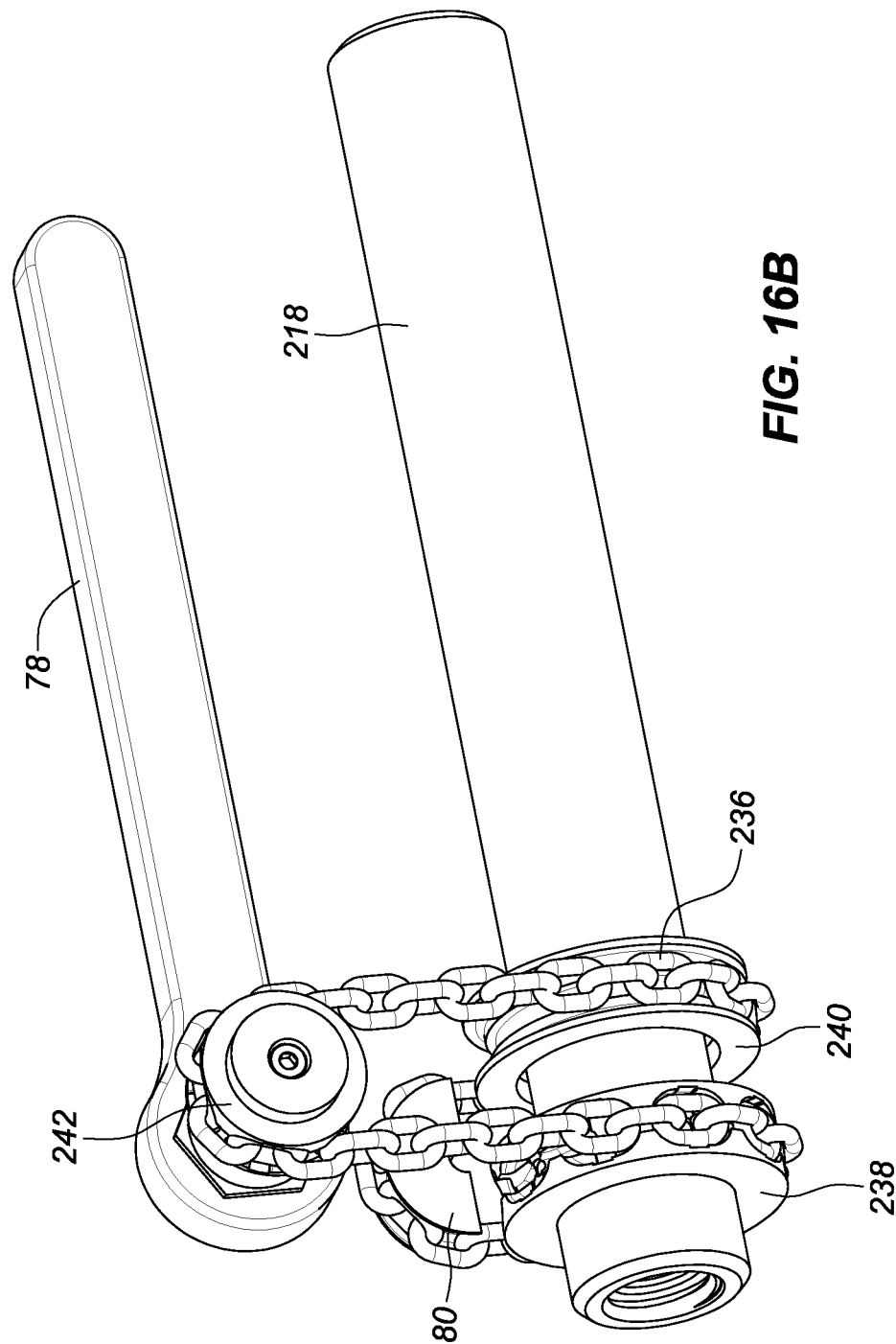

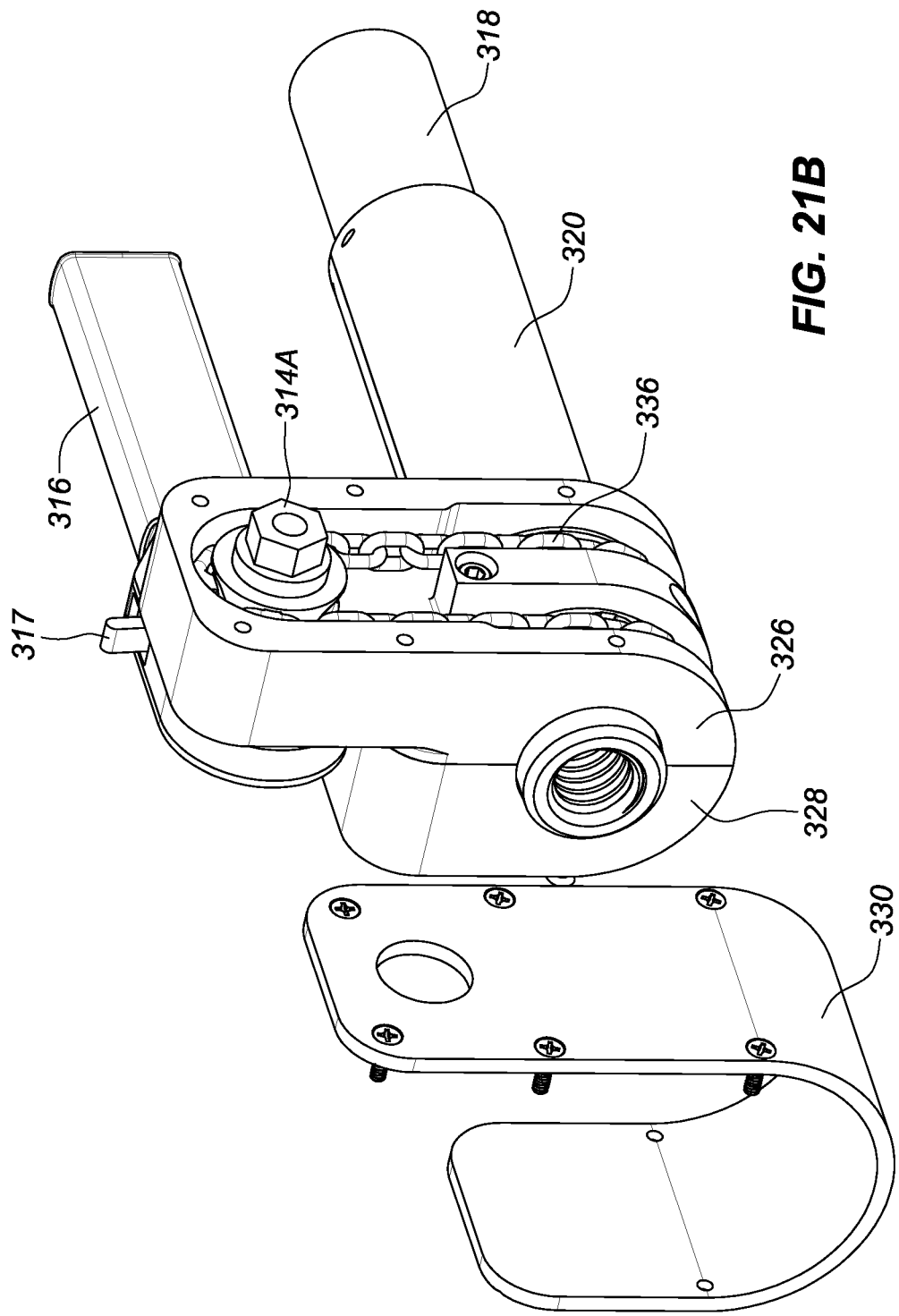

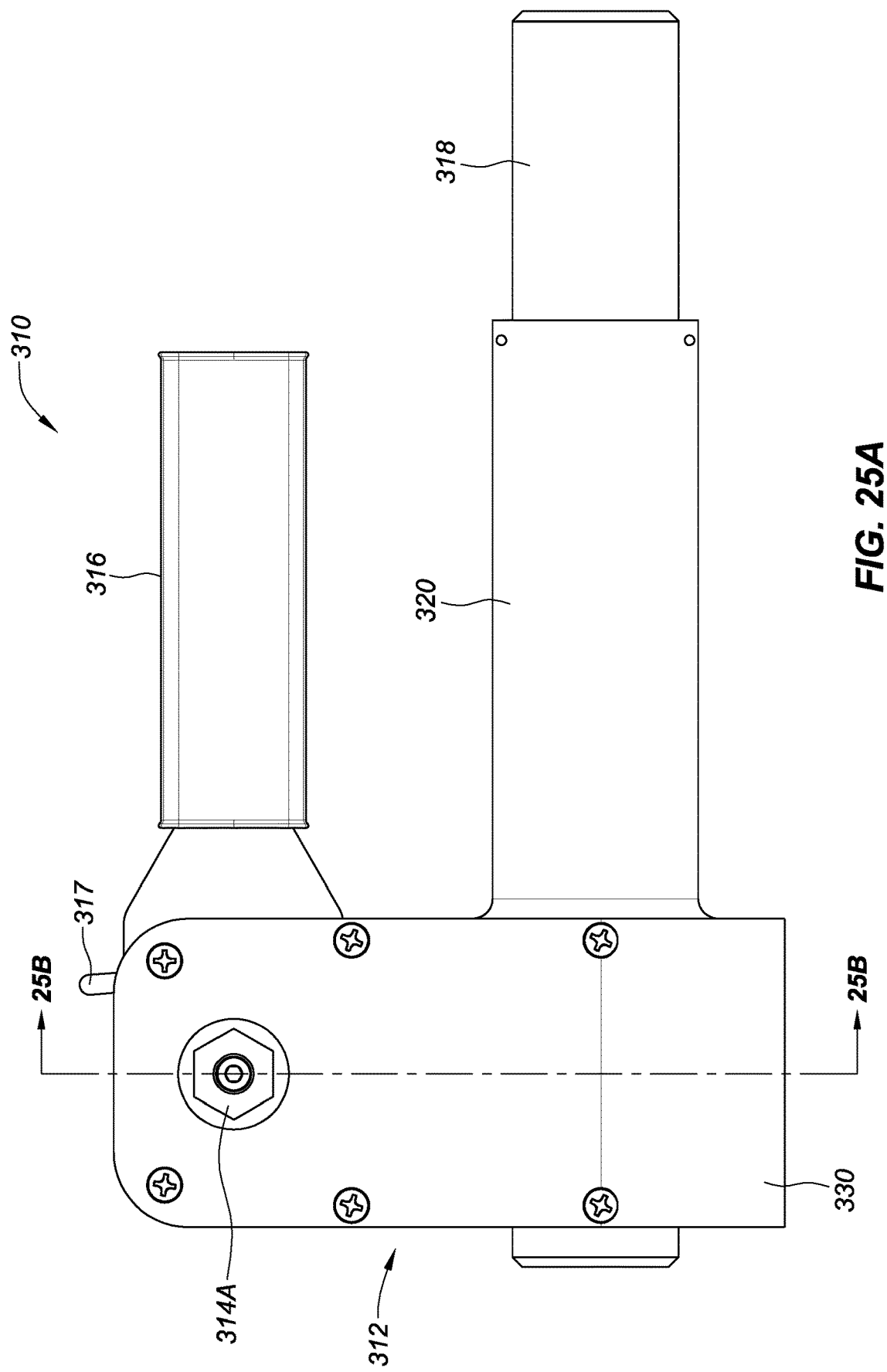

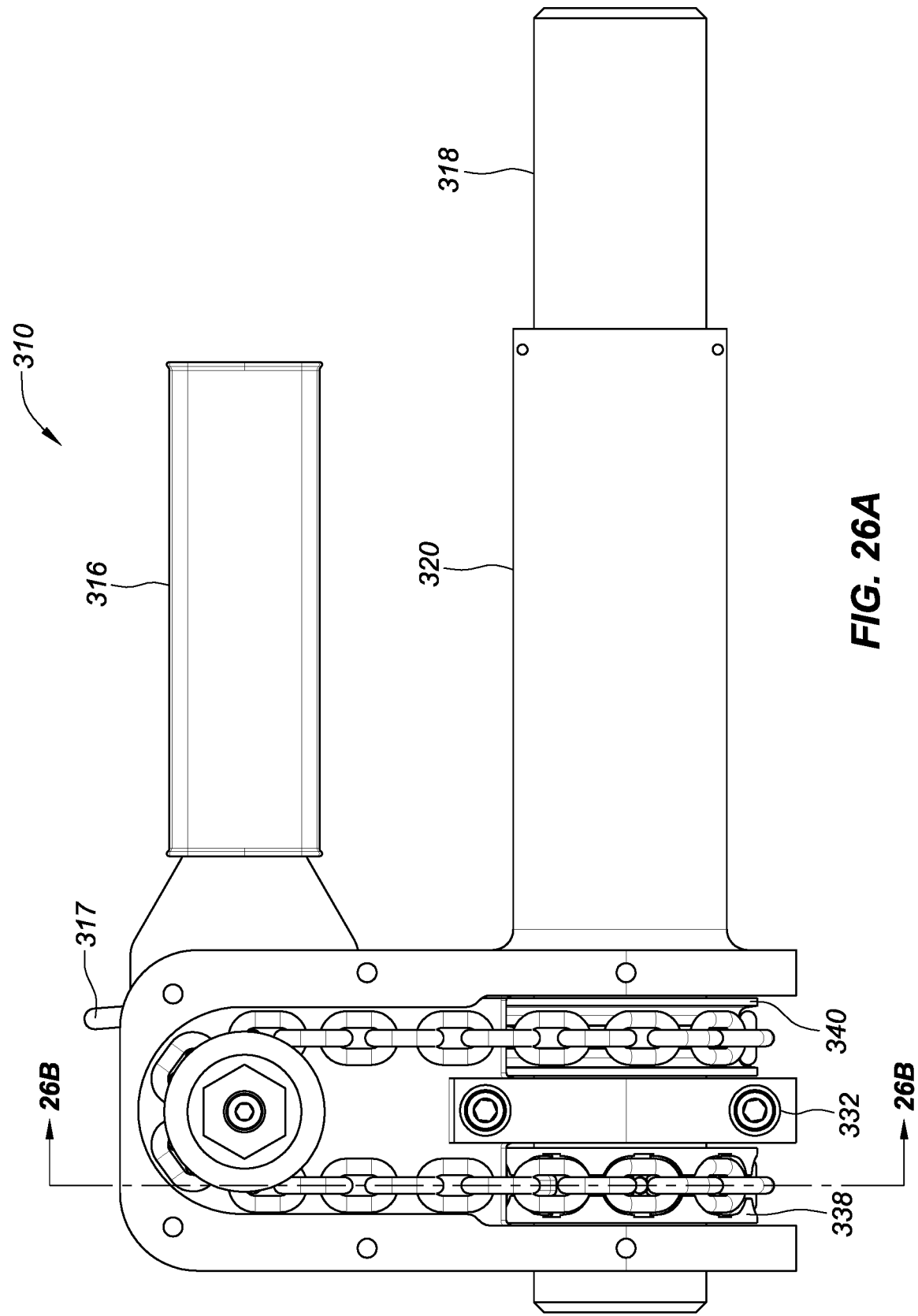

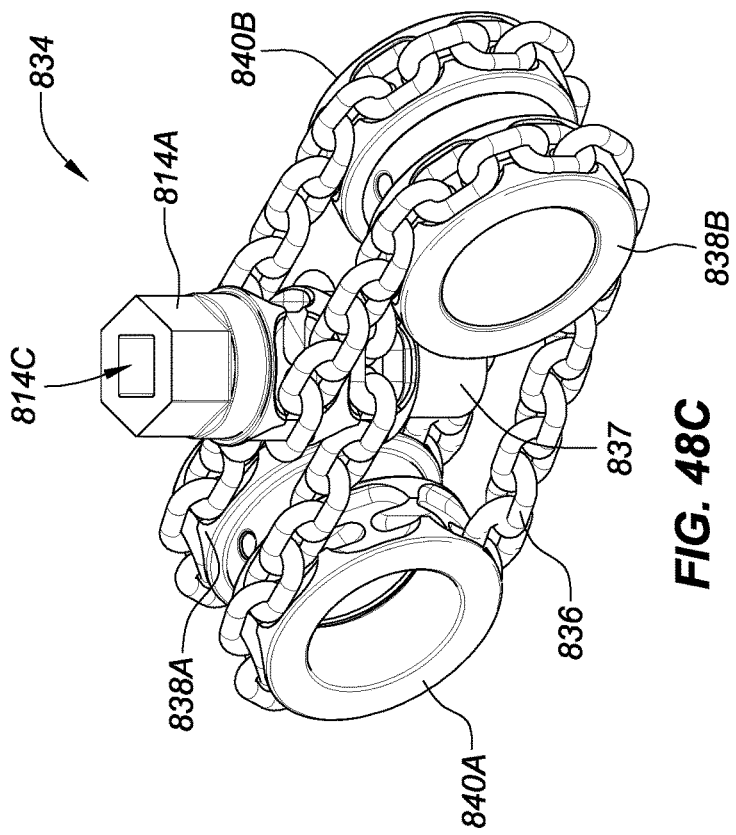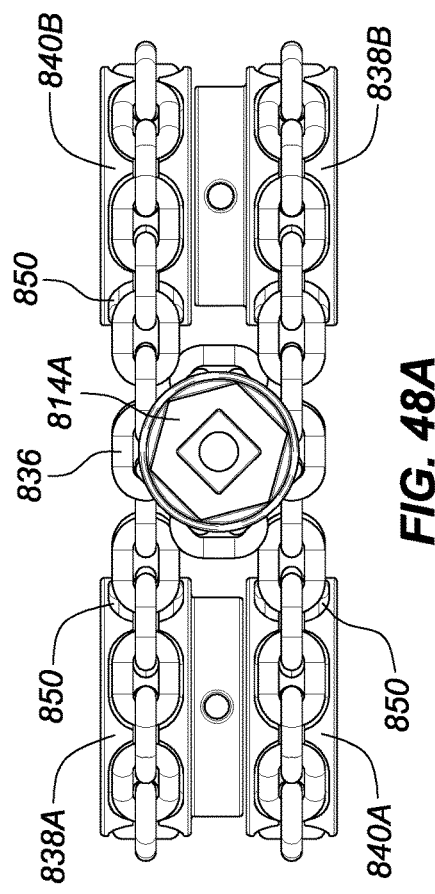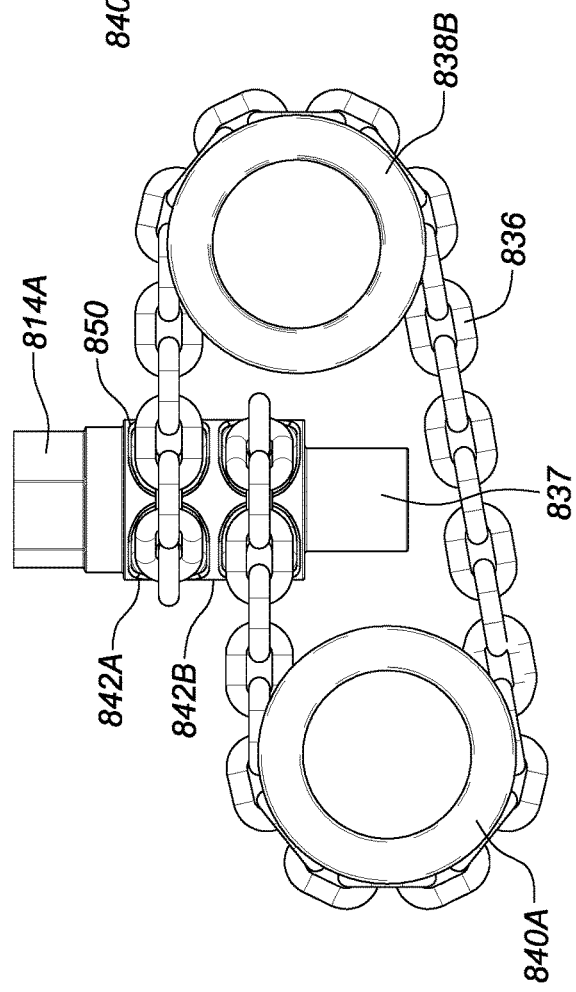

LOAD BINDER APPARATUS AND METHOD OF USING

RELATED APPLICATIONS

This application claims priority to U.S. patent application Ser. No. 17/066,486, filed on Oct. 9, 2020, now U.S. Pat. No. 11,787,328, issued on Oct. 17, 2023, entitled "Load Binder Apparatus and Method of Using", which is incorporated herein by reference in its entirety.

FIELD OF THE INVENTION

The instant disclosure relates to a mechanical device used to tighten and secure bindings such as a link chain being used to stabilize and secure heavy cargo or equipment on a cargo carrying vehicle or vessel including trucks, trains, planes, and ships. In one embodiment, the instant disclosure relates to a load binder capable of adjustment using a power tool or by hand.

DESCRIPTION OF THE RELATED ART

Load binders have been used to secure loads to prevent movement during transit (e.g., to tie down loads on flatbed trailers; rail cars and the like). Examples of load binders can be found in U.S. Pat. Nos. 6,945,516 and 7,229,065, both of which are hereby incorporated by reference as if set forth fully herein.

The foregoing discussion is intended only to illustrate the present field and should not be taken as a disavowal of claim scope.

SUMMARY OF THE INVENTION

In one embodiment of the present invention, a load binding tool is provided for securing a load, the load binding tool comprises an internally threaded tube and two opposing threaded shafts having opposing screw threading, and the internally threaded tube having opposing open ends each of which is internally threaded for receiving one of the respected opposing threaded shafts, wherein the threading in the internally threaded tube and on the respective opposing threaded shafts is constructed and arranged to provide common contraction or extension of the respective opposing threaded shafts when the respective opposing threaded shafts are engaged within the respective opposing open ends of the internally threaded tube and when the internally threaded tube is rotated one direction or another and the opposing threaded shafts are not rotated, a driven link chain sheave coupled with the internally threaded tube, wherein the driven link chain sheave is secured to the internally threaded tube so that the internally threaded tube rotated when the driven link chain sheave rotated, a drive shaft proximate the internally threaded tube oriented in a generally perpendicular orientation to the internally threaded tube, a primary link chain drive sheave coupled with the drive shaft, an external hex drive coupled to the primary link chain drive sheave, a shaft idler sheave coupled with the drive shaft, and a link chain movably engaged with the driven link chain sheave and the primary link chain drive sheave, wherein the external hex drive can be rotated to turn the primary link chain drive sheave in such a way so as to draw the ends of the respective opposing threaded shafts closer together or further apart.

In another embodiment, a load binding tool for securing an elongated binding member for at least partially securing a load; the load binding tool comprises an internally threaded tube and opposing open ends, threaded shafts threadably inserted into the opposing open ends and the threading in the internally threaded tube and on the threaded shafts adapted to provide common contraction and extension of the threaded shafts relative to the internally threaded tube interior with the shafts not turning and the internally threaded tube turning, a driven link chain sheave coupled with the internally threaded tube, an internally threaded tube idler sheave coupled with the internally threaded tube, wherein the internally threaded tube idler sheave is proximate the driven link chain sheave and coaxial with the internally threaded tube, a drive shaft proximate the internally threaded tube and perpendicular to the internally threaded tube, a primary link chain drive sheave coupled with the shaft, wherein the primary link chain drive sheave includes a primary ratchet handle attachment, a handle, a ratchet mechanism, wherein the ratchet mechanism engages the handle with the drive shaft, an external hex drive coupled to the primary link chain drive sheave, a shaft idler sheave coupled with the shaft, and a link chain movably engaged with the driven link chain sheave, the primary link chain drive sheave, the internally threaded tube idler sheave, and the shaft idler sheave.

In yet another embodiment, a load binding tool for securing a binding strap such as a chain around a load comprises an internally threaded tube and opposing open ends, threaded shafts threadably inserted into the opposing open ends and the threading in the tube and on the shafts adapted to provide common contraction and extension of the shafts relative to the tube interior with the shafts not turning and the tube turning, a driven link chain sheave coupled with the internally threaded tube, a tube idler sheave coupled with the internally threaded tube, wherein the tube idler sheave is proximate the driven link chain sheave and coaxial with the internally threaded tube, a drive shaft proximate the internally threaded tube and perpendicular to the internally threaded tube, a primary link chain drive sheave coupled with the shaft, wherein the primary link chain drive sheave comprises a primary ratchet handle attachment, a handle, a ratchet mechanism coupled with the handle, wherein the ratchet mechanism engages the handle with the drive shaft, a first external hex drive coupled to the primary link chain drive sheave, a secondary link chain drive sheave coupled with the shaft, wherein the secondary link chain drive sheave, a second external hex drive coupled with the secondary link chain drive sheave, and a link chain movably engaged with the driven link chain sheave, the primary link chain drive sheave, the tube idler sheave, and the secondary link chain drive sheave.

In still another embodiment, a load binding tool for securing an elongated binding member at least partially around a load; the load binding tool comprises an internally threaded tube and opposing open ends, threaded shafts threadably inserted into the opposing open ends and the threading in the tube and on the shafts adapted to provide common contraction and extension of the shafts relative to the tube interior with the shafts not turning and the tube turning, a driven belt sheave coupled with the internally threaded tube, a tube idler sheave coupled with the internally threaded tube, wherein the tube idler sheave is proximate the driven belt sheave and coaxial with the internally threaded tube, a drive shaft proximate the internally threaded tube and perpendicular to the internally threaded tube, a primary belt drive sheave coupled with the drive shaft, wherein the primary belt drive sheave includes a primary ratchet handle attachment, a handle, a ratchet mechanism coupled with the handle, an external hex drive coupled to the primary belt drive sheave, a shaft idler sheave coupled with the shaft, and a belt movably engaged with the driven belt sheave, the primary belt drive sheave, the tube idler sheave, and the shaft idler sheave.

In still another embodiment, a load binding tool for securing an elongated binding member at least partially around a load; the load binding tool comprises an internally threaded tube having opposing open ends, threaded shafts threadably inserted into the opposing open ends; wherein the internal threading in the tube and on the respective threaded shafts is adapted to provide common contraction and extension of the shafts relative to the tube when the threaded shafts are not turning and the internal tube is turning, a driven link chain sheave coupled with the internally threaded tube, a tube idler sheave coupled with the internally threaded tube, wherein the tube idler sheave is proximate the driven link chain sheave and coaxial with the internally threaded tube, a drive shaft proximate the internally threaded tube and perpendicular to the internally threaded tube, a primary link chain drive sheave coupled with the drive shaft, wherein the primary link chain drive sheave comprises a primary ratchet attachment, a ratchet mechanism, wherein the ratchet mechanism engages the handle with the drive shaft, an external hex drive coupled to the primary link chain drive sheave, a shaft idler sheave coupled with the drive shaft, and a link chain movably engaged with the driven link chain sheave, the primary link chain drive sheave, the tube idler sheave, and the shaft idler sheave.

In yet another embodiment, a method of using a load binding tool for securing an elongated binding member at least partially around a load, the method comprises providing a load binding tool for securing a load, the load binding tool including an internally threaded tube and two opposing threaded shafts having opposing screw threading; the internally threaded tube having opposing open ends each of which is internally threaded for receiving one of the respective opposing threaded shafts; wherein the threading in the internally threaded tube and on the respective opposing threaded shafts is constructed and arranged to provide common contraction or common extension of the respective opposing threaded shafts when the respective opposing threaded shafts are engaged within the respective opposing open ends of the internally threaded tube and when the internally threaded tube is rotated in one direction or another and the opposing threaded shafts are not rotated; the load binding tool further including a driven link chain sheave coupled with the internally threaded tube; a drive shaft proximate the internally threaded tube and oriented in a generally perpendicular orientation to the internally threaded tube; a primary link chain drive sheave coupled with the drive shaft; and an external hex drive coupled to the primary link chain drive sheave; and a link chain movably engaged with the driven link chain sheave and the primary link chain drive sheave; wherein the driven link chain sheave is secured to the internally threaded tube so that the internally threaded tube rotates when the driven link chain sheave rotates; and wherein the external hex drive can be rotated to rotate the primary link chain drive sheave and move the link chain in such a way so as to rotate the internally threaded tube and draw ends of the respective opposing threaded shafts closer together, providing a hex drive tool, and engaging the hex drive tool with the external hex drive on the load binding tool; and rotating the external hex drive.

In yet another embodiment, a load binding tool for securing an elongated binding member at least partially around a load; the load binding tool comprises a dual threaded shaft and two extension nuts which threadably screw onto opposing ends of the dual threaded shaft; wherein the internal threading in the nuts and on the respective ends of the dual threaded shaft is adapted to provide common contraction and extension of the extension nuts relative to the dual threaded shaft when the extension nuts are not turning and the dual threaded shaft is turning, a driven link chain sheave coupled with the dual threaded shaft, a secondary driven link chain sheave coupled with the dual threaded shaft, a drive shaft proximate the dual threaded shaft and perpendicular to the dual threaded shaft, a primary link chain drive sheave coupled with the drive shaft, a secondary link chain drive sheave coupled with the drive shaft; a handle, a ratchet mechanism, wherein the ratchet mechanism engages the handle with the drive shaft, an external hex drive coupled to the primary link chain drive sheave, a secondary driven link chain sheave coupled with the dual threaded shaft, and a link chain movably engaged with the driven link chain sheave, the primary link chain drive sheave, the secondary driven link chain sheave, and the secondary link chain drive sheave.

In still another embodiment, a load binding tool for securing a load, comprising a first internally threaded tube and two opposing threaded shafts having opposing screw threading, and the internally threaded tube having opposing open ends each of which is internally threaded for receiving one of the respected opposing threaded shafts, wherein the threading in the internally threaded tube and on the respective opposing threaded shafts is constructed and arranged to provide common contraction or extension of the respective opposing threaded shafts when the respective opposing threaded shafts are engaged within the respective opposing open ends of the internally threaded tube and when the internally threaded tube is rotated one direction or another and the opposing threaded shafts are not rotated, a second internally threaded tube and two opposing threaded shafts having opposing screw threading and oriented adjacent and parallel to the first internally threaded tube, wherein the threading on the second internally threaded tube is opposite that of the threading on the first internally threaded tube, a driven link chain sheave coupled with the first internally threaded tube, wherein the driven link chain sheave is secured to the first internally threaded tube so that the first internally threaded tube rotates when the driven link chain sheave is rotated, a drive shaft proximate the internally threaded tube oriented in a generally perpendicular orientation to the internally threaded tube, a primary link chain drive sheave coupled with the drive shaft, an external hex drive coupled to the primary link chain drive sheave, a secondary link chain drive sheave coupled with the drive shaft, a secondary driven link chain sheave, and a link chain movably engaged with the driven link chain sheave and the primary link chain drive sheave and the secondary link chain drive sheave and the secondary driven link chain sheave, a gear set coupling the first and second internally threaded tubes so that when the first internally threaded tube rotates, the second internally threaded tube rotates in the opposite direction, an second external hex drive coupled to the gear set, wherein turning of the primary link chain drive sheave in one direction or the other counter-rotates the two internally threaded tubes to move the respective opposing threaded shafts closer together or further apart.

The present invention provides a load binder for securing a load to a surface by drawing respective portions of an elongated binding member closer together around the load when the load is proximate the surface so as to secure the load to the surface. The load binder preferably includes a primary link chain drive sheave coupled with a drive shaft; an external drive coupling securely engaged with the drive shaft and the primary link chain drive sheave; a driven link chain sheave; an elongated threaded contraction expansion assembly including an elongated threaded member; wherein the driven link chain sheave is secured to the elongated threaded member so that the elongated threaded member rotates with the driven link chain sheave when the driven link chain sheave rotates; and a link chain moveably engaged with the driven link chain sheave and the primary link chain drive sheave such that the driven link chain sheave rotates when the primary link chain drive sheave rotates. In further preferred embodiments the drive shaft is oriented in a generally perpendicular orientation to the elongated threaded member when the link chain is engaged with the primary link chain drive sheave and the driven link chain sheave; and the elongated threaded contraction expansion assembly includes first and second opposing end screws positioned at opposite ends of the elongated threaded contraction expansion assembly; wherein each of the end screws have a threaded end and an engaging end; and wherein the elongated threaded contraction expansion assembly is constructed and arranged to provide common contraction or extension of the engaging ends of the opposing end screws such that when the respective engaging ends of the end screws are interconnected with separate portions of the elongated binding member, the separate portions of the elongated binding member can be drawn closer together when the elongated threaded member is rotated.

One of the design goals for embodiments of the ratchet load binder described herein was to create a more ergonomic fore-aft handle operating direction while maintaining the proven twin eyebolt power screw and threaded barrel retraction and extension system currently used on all ratchet binders. However, doing so requires a 90 degree rotational direction change. Another design goal for the embodiments of this disclosure includes providing accommodations for driving the load binder drive mechanism externally with an electric wrench which could greatly reduce binder length adjustment times. We found that the best way of implementing these requirements was to utilize a bevel gear 90 degree drive system. However, cost and other producibility considerations make bevel gears less desirable for this application.

After further consideration, we came to believe that a looping drive mechanism with a flexible coupler (e.g., link chains or other examples included in this specification) as described herein has many advantages/benefits over the more commonly used 90 degree bevel gear systems including:

Link chains have a natural advantage for use in a 90 degree drive system in that each link is positioned at a 90 degree angle to the adjoining link. Adjacent drive sheave sprockets can utilize this link chain feature to easily create the desired 90 degree drive system.

Because of their use for heavy lifting applications, the design parameters for maximizing link chain tensile strengths is well understood.

The automation of link chain production has existed for more than half a century and the production machines allow the precise control and calibration of chain pitch lengths and other dimensions. Tooling is already available for a wide range of chain link sizes and shapes at a large number of manufacturers around the world allowing link selection to be made that both meets the design requirements and is cost effective, especially in comparison to bevel gears.

Link chain drive systems using pocketed sheave sprockets have existed for centuries for use in ship anchor windless systems and hoist lifting devices and the design requirements are well understood.

A link chain drive system distributes the tensile loads across multiple pockets in the sheave sprockets which negates the need for secondary surface case hardening heat treat operations. In contrast, bevel gears carry the full load across thin lines between a single set of gear teeth producing extremely high contact stresses and typically requiring surface case hardening in conjunction with larger gear sizes than would be desired for this application. Again, this is a further cost reduction factor.

Link chains can easily be welded into a circular loop which provides the continuous drive system required to enable operation via an external electric wrench.

Load binders are typically operated in unclean outdoor and even off-road environments which can infiltrate the drive system with dirt and other foreign debris. The open design of a link chain loop and the looser fitting drive sheave pockets is much more tolerant to this type of contamination than are bevel gears which can be easily damaged by foreign matter that may penetrate the high contact stress areas of the meshing teeth. The closed cavity design embodiments of the load binder embodiments described herein limit the size of debris that can infiltrate and the ability to disassemble the drive system frames allows ease of cleaning, lubrication and other maintenance operations.

The looping link chain drive of the load binder embodiments described herein can be adjusted for tension with a simple external device to accommodate system wear or other modalities that may cause excessive chain slack. Bevel gears are required to be positioned adjacent to each other with a high degree of precision which requires extremely tight size and positional tolerance control which greatly increases the cost of a mounting frame. Also, a bevel gear positioning adjustment system would be very complex and expensive.

A link chain drive system can operate for this application with little or no lubrication required. Since the link drive embodiments described herein operates only intermittently and at limited speeds, external lubrication can be less than what is required for bevel gear configurations. Bevel gears do require continuous lubrication to maintain their efficiency (e.g., differentials in automotive applications).

The foregoing and other aspects, features, details, utilities, and advantages of the present disclosure will be apparent from reading the following description and claims, and from reviewing the accompanying drawings.

BRIEF DESCRIPTION OF THE DRAWINGS

In the drawings, in which corresponding reference numbers and letters indicate corresponding parts of the various embodiments throughout the several views, and in which the various embodiments generally differ only in the manner described and/or shown, but otherwise include corresponding parts;

FIG. 3C is an end view of the drive mechanism of FIG. 3B, consistent with other embodiments of the present invention;

FIG. 3D is a side view of the drive mechanism of the load binder of FIGS. 3B-C, consistent with other embodiments of the present invention;

FIG. 5A is a side view of the load binder of FIG. 4A partially disassembled, consistent with other embodiments of the present invention;

FIG. 8A is a perspective view of a load binder with a single action handle mechanism, consistent with other embodiments of the present invention;

FIG. 13A is a perspective view of the handle of the load binder of FIGS. 8A-12B, consistent with other embodiments of the present invention;

FIG. 13B is a cutaway perspective view of the handle of FIG. 11A, consistent with other embodiments of the present invention;

FIG. 15B is a partial perspective view showing elements of the load binder of FIG. 15A partially disassembled, consistent with other embodiments of the present invention;

FIG. 16B is a perspective detail view showing elements of the load binder of FIGS. 15A-16A still further disassembled, consistent with other embodiments of the present invention;

FIG. 21B is a partial perspective view showing elements of the load binder of FIG. 21A partially disassembled, consistent with other embodiments of the present invention;

FIG. 25A is a side view of the load binder of FIGS. 21A-22B without the eye bolts and hooks, consistent with other embodiments of the present invention;

FIG. 26A is a side view of the load binder of FIG. 25A partially disassembled, consistent with other embodiments of the present invention;

FIG. 48A is a partial top view showing elements of the load binder of FIG. 44 illustrating further details of the drive mechanism, consistent with other embodiments of the present invention;

FIG. 48B is a partial end view showing elements of the load binder of FIG. 44 illustrating further details of the drive mechanism, consistent with other embodiments of the present invention; and FIG. 48C is a partial perspective view showing elements of the load binder of FIG. 44 illustrating further details of the drive mechanism, consistent with other embodiments of the present invention.

DETAILED DESCRIPTION OF THE PREFERRED EMBODIMENTS

Figure 1A:
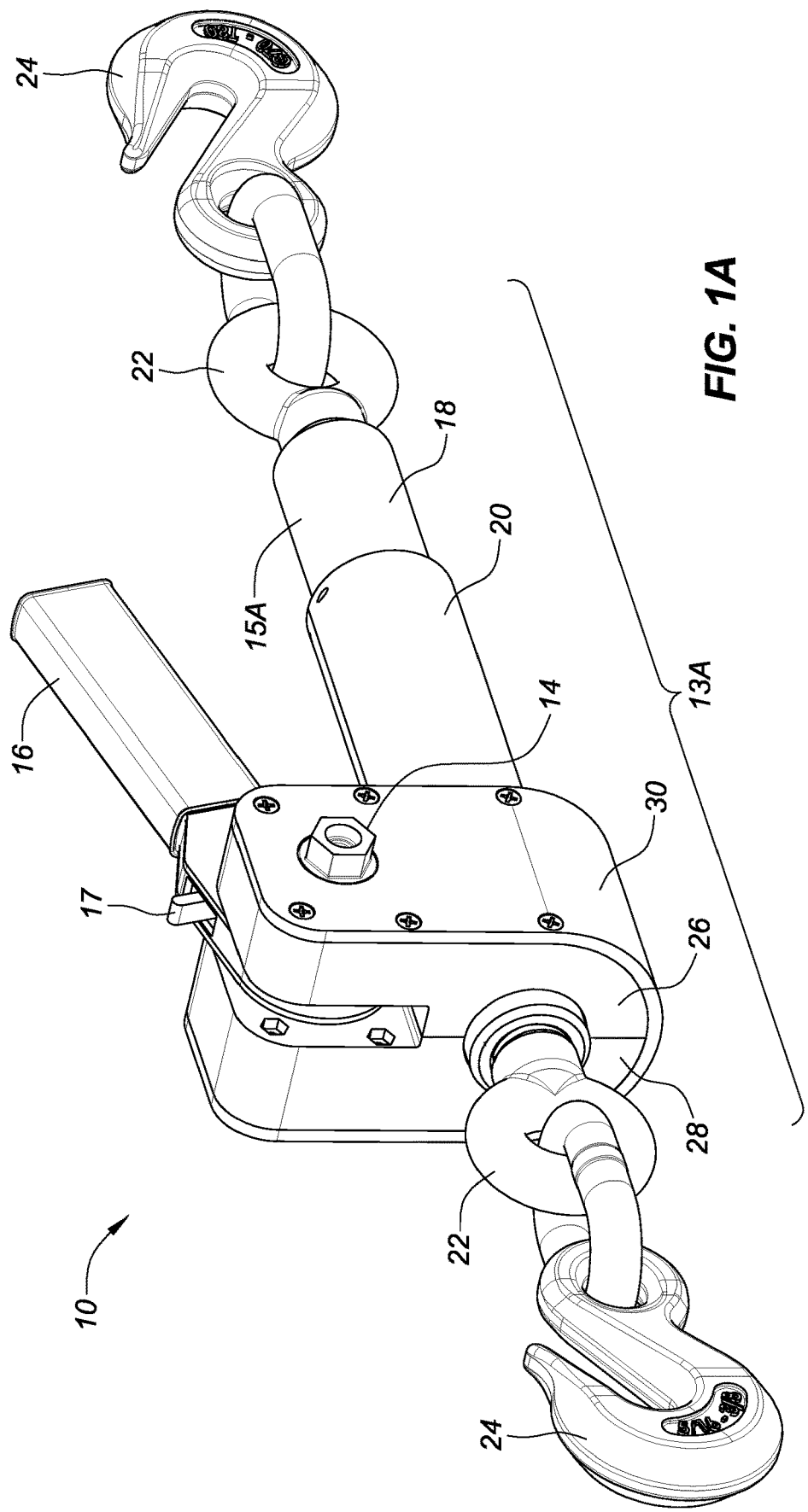
FIG. 1A is a perspective view of a load binder with a single action handle mechanism, consistent with other embodiments of the present invention.

Several embodiments of load binders are disclosed herein. In general, the load binders are capable of being operated by a power tool, by hand, or by a combination of by a power tool and by hand. Details of the various embodiments of the present invention are disclosed and described below with specific reference to the drawing figures.

FIG. 1A is a perspective view of a load binder with a single action handle mechanism, consistent with embodiments of the present disclosure. A load binder 10 (i.e., load binding tool) can include a frame body 12, an external hex drive 14, a handle 16, and a ratchet direction lever 17. The load binder 10 preferably includes an elongated threaded contraction expansion assembly 13A having an elongated threaded member 15A, preferably a dual threaded tube or internally threaded barrel 18 (i.e., internally threaded tube) with opposing open ends and with an external frame grip 20, where each end of the internally threaded barrel 18 is coupled with an end screw or eye bolt 22 including a threaded shaft (i.e., threaded eye bolt; threaded shaft) and a grab hook 24. The elongated threaded contraction expansion assembly 13A also includes the end screws 22, which preferably are eyebolts as illustrated. The grab hook 24 can couple with a binding member (e.g., a chain, a rope, a cable, a strap, etc.; not shown in FIG. 1A) for securing the load. The binding member can be one continuous element with each end coupling with one of the grab hooks 24, or each grab hook 24 can couple with a separate binding element. The frame body 12 can, in some embodiments comprise a left hand side (LHS) frame body 26 and a right hand side (RHS) frame body 28. The LHS frame body 26 can be coupled to the RHS frame body 28 with one or more frame fasteners (not visible in FIG. 1A; see FIG. 1B).

The load binder 10 shown in FIG. 1A can be adjusted using different methods. For example, the external hex drive 14 can be coupled with a drive mechanism (not visible in FIG. 1, see FIGS. 2A-B and related discussion for more information). As the external hex drive 14 is rotated (e.g., using a hand tool or a power tool) clockwise or counterclockwise, the internally threaded barrel 18 can rotate in a corresponding manner. The rotation of the internally threaded barrel 18 can, in turn, cause the threaded eye bolts 22 coupled with the internally threaded barrel 18, to move into the internally threaded barrel 18 (e.g., tightening the load binder; the distance between the two threaded eye bolts 22 decreases) or out of the internally threaded barrel 18 (e.g., loosening the load binder 10; the distance between the two threaded eye bolts 22 increases). The threaded eye bolts 22 (each with threads in opposing direction (i.e., opposing threaded shafts); e.g., one threaded eye bolt 22 has right-handed thread and the other threaded eye bolt 22 has left-handed threads) can be threadably coupled with the internally threaded barrel 18. The internally threaded barrel 18 can have internal threads (not shown in FIG. 1A) on each end that are opposite in direction (e.g., left-handed threads and right-handed threads; similar to a turnbuckle or other like device) that facilitate the threaded eye bolts 22 moving in opposite directions (e.g., coming together/decreasing distance between them/contracting or moving apart/increasing distance/expanding between them) as the internally threaded barrel 18 is rotated one direction or the other direction and the threaded eye bolts 22 are not rotating.

A reversible ratchet mechanism (not shown in FIG. 1A; see FIGS. 6A-B and related discussion for more information) can be used to limit movement to a single direction. For example, in a first ratchet mechanism setting, the load binder 10 can be tightened (e.g., the internally threaded barrel 18 moves in a first barrel direction) and in a second ratchet mechanism setting, the load binder can be loosened (e.g., the internally threaded barrel 18 moves in a second barrel direction).

Instead of or in addition to using the external hex drive 14, the handle 16 can be used to tighten or loosen the threaded eye bolts 22. The handle 16 can be used to engage a ratchet mechanism (not shown in FIG. 1A, see FIGS. 6A-D and related discussion) used to rotate the internally threaded barrel 18 via the drive mechanism 34 and, in turn, tighten or loosen the load binder 10. A ratchet mechanism (see ratchet mechanism 58 in FIGS. 6A-7D and related discussion) can allow the handle to move the internally threaded barrel 18 (via the drive mechanism 34; not shown in FIG. 1A) on one stroke of the handle 16. For example, when the handle 16 is moved in a first handle direction (e.g., pulled downward; moving toward to internally threaded barrel 18) the internally threaded barrel 18 may not move (i.e., no change in the tightness of the load binder 10; no change in the distance between the two threaded eye bolts 22). Then, when the handle 16 is moved in a second handle direction (e.g., pushed upward; moving away from the internally threaded barrel 18) the threaded barrel 18 can move in a first barrel direction (i.e., tighten the load binder 10; decrease the distance between the two threaded eye bolts 22).

When a setting for the ratchet mechanism is changed using the ratchet direction lever 17, movement of the handle 16 in the first handle direction can change the barrel movement direction to a second barrel direction (i.e., loosen the load binder 10; increase the distance between the two threaded eye bolts 22) and movement of the handle 16 in the second handle direction can have no effect on the threaded barrel direction (i.e., no change in the tightness of the load binder 10; no change in the distance between the two threaded eye bolts 22). See FIGS. 7A-D and related discussion for more information.

Figure 1B:
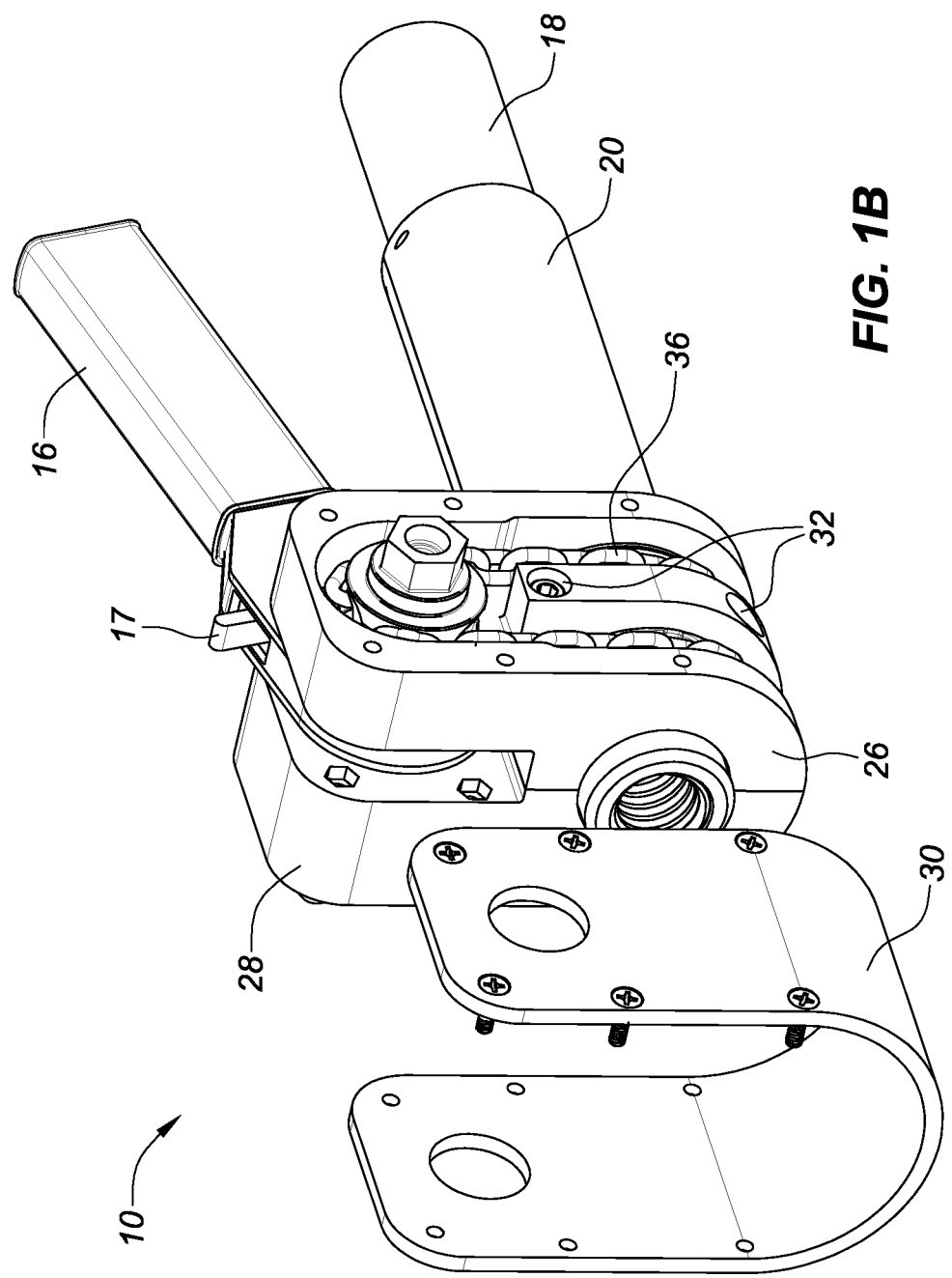
FIG. 1B is a partial perspective view showing elements of the load binder of FIG. 1A partially disassembled, consistent with other embodiments of the present invention.

FIG. 1B is a perspective view of the load binder of FIG. 1A partially disassembled, consistent with embodiments of the present disclosure. The frame body 12 of FIG. 1A can include an outer access cover 30 that is removably coupled with a portion of the frame body 12. One or more frame body fasteners 32 that can secure the LHS frame body 26 with the RHS frame body 28 together as in FIGS. 1A-B. This outer access cover 30 can allow a user to access internal components of a drive mechanism 34 for maintenance and service (e.g., lubrication and/or inspection of the drive mechanism 34). Removing the outer access cover 30 provides access to a drive chain 36, portions of a driven link chain sheave, and portions of a threaded barrel idler sheave (see FIG. 2A-3D for more details about the drive mechanism 34). With the outer access cover 30 removed, visual inspection of the various components described above can be done and lubrication and/or cleaning of the drive mechanism can be performed.

Figure 2A:
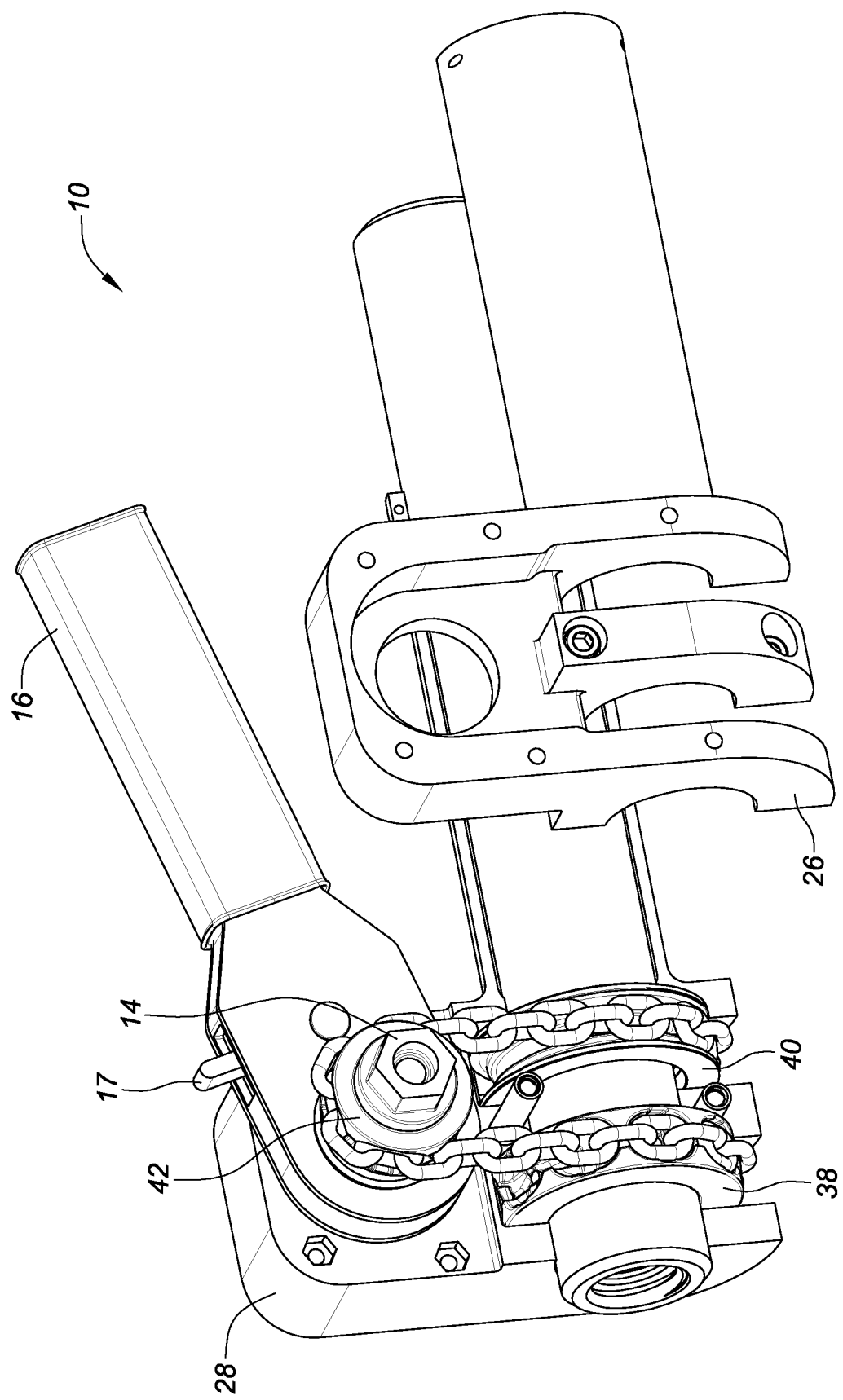
FIG. 2A is a partial perspective view showing elements of the load binder of FIG. 1A further disassembled, consistent with other embodiments of the present invention.

FIG. 2A is a perspective view of the load binder of FIGS. 1A-B further disassembled, consistent with embodiments of the present disclosure. After removal of the outer access cover 30 shown in FIG. 1B, the LHS frame body 26 can removed (i.e., separated from the RHS frame body 28) for additional access to portions of the load binder 10. With the LHS frame body 26 removed, portions of the drive mechanism 34 are further accessible, including a driven link chain sheave 38, an internally threaded barrel idler sheave 40 (i.e., a tube idler sheave; an internally threaded tube idler sheave, etc.), and a primary link chain drive sheave 42 are possible (e.g., half of the driven link chain sheave 38 is accessible, half of the internally threaded barrel idler sheave 40 is accessible, all of the primary link chain drive sheave 42 is accessible, etc.). The internally threaded barrel idler sheave 40 can be proximate the driven link chain sheave 38 and coaxial with the internally threaded barrel 18. The drive chain 36 can be movably engaged with the driven link chain sheave 38 and the primary link chain drive sheave.

Figure 2B:
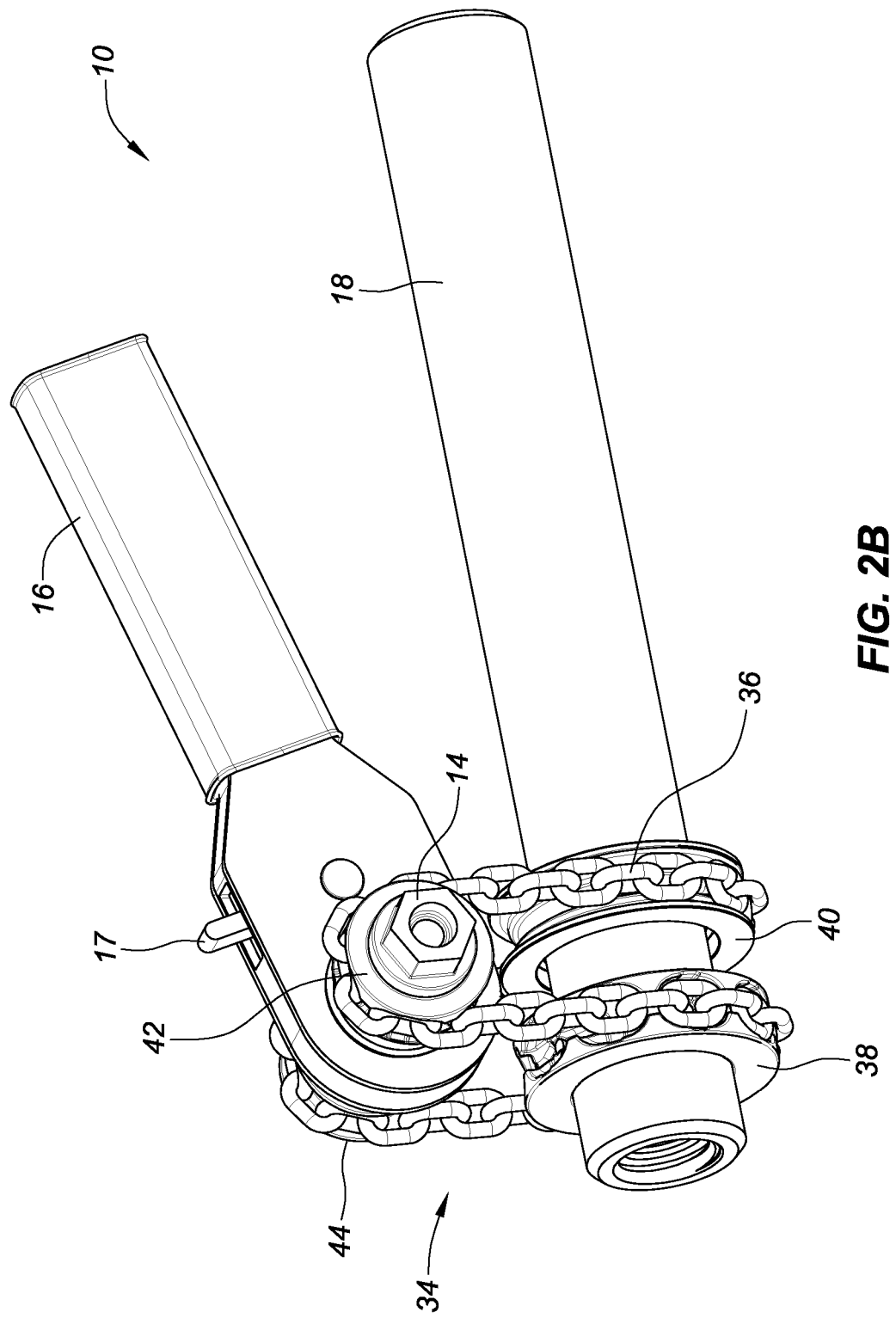
FIG. 2B is a perspective detail view showing elements of the load binder of FIGS. 1A-2A still further disassembled, consistent with other embodiments of the present invention.

FIG. 2B is a perspective view of the load binder of FIGS. 1A-2A omitting the frame body, consistent with embodiments of the present disclosure. FIG. 2B shows the load binder 10, the handle 16, and the internally threaded barrel 18, with the frame body 12 omitted (no outer access cover 30, no LHS frame body 26, no RHS frame body 28). As shown in FIG. 2B, the load binder includes the driven link chain sheave 38, the internally threaded barrel idler sheave 40, and the primary link chain drive sheave 42, the drive chain 36, and the secondary link idler sheave 44. The primary link chain drive sheave 42, the secondary link idler sheave 44, and the external nut 14 can all be coaxially coupled with a drive shaft 137 (hidden from view in FIG. 2B, see FIG. 11B).

Figure 3A:
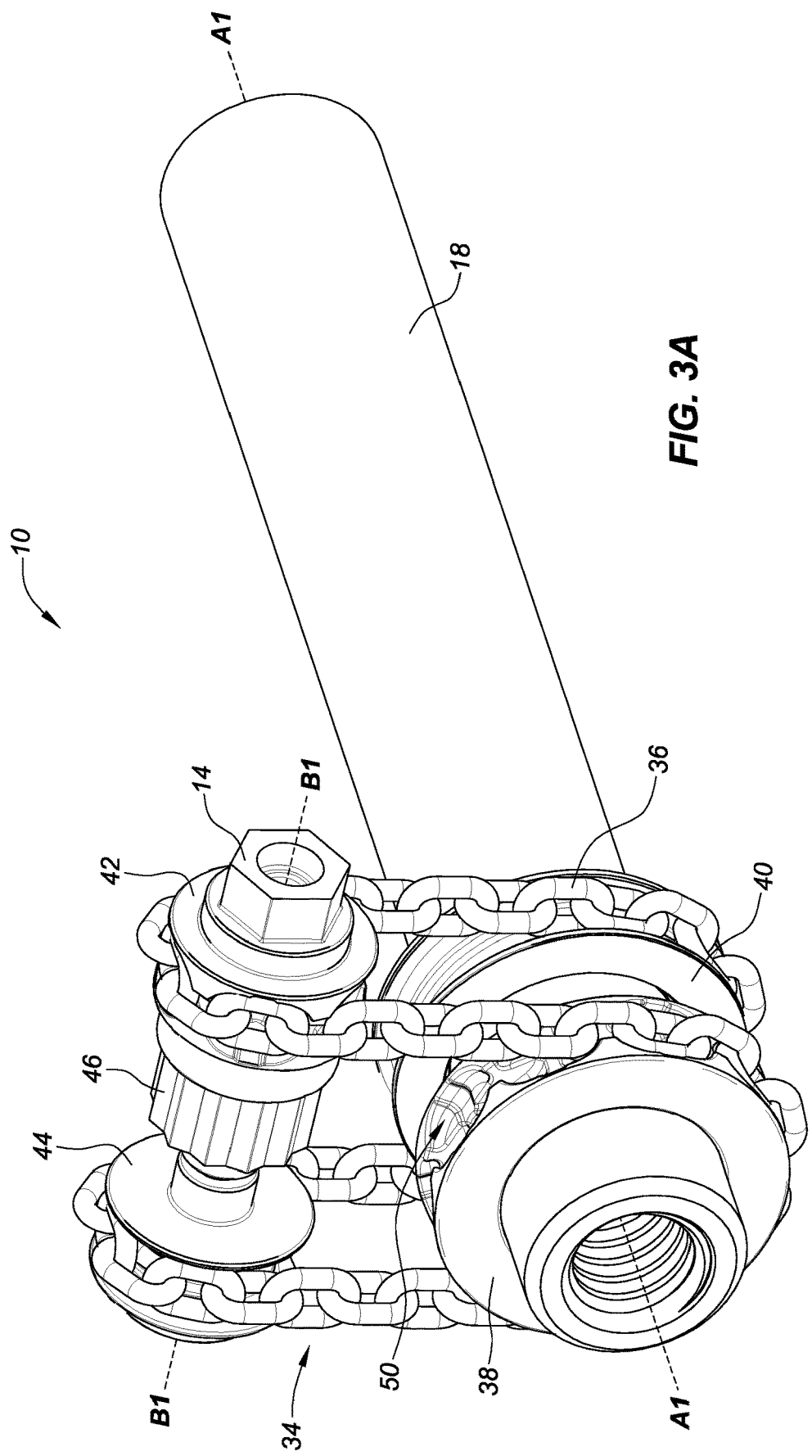
FIG. 3A is a perspective detail view of a drive mechanism and a threaded barrel of the load binder of FIGS. 1A-2B, consistent with other embodiments of the present invention.

FIG. 3A is a perspective view of a drive mechanism and a threaded barrel of the load binder of FIGS. 1A-2B, consistent with embodiments of the present disclosure. A drive mechanism 34 can utilize a closed loop of a flexible coupler (i.e., the drive chain 36, a link chain, a ball chain, a cable with swaged balls, a u-joint chain, a continuous bushing chain, a belt, or other similar item) arranged in a double saddle, or double U-configuration around portions of the threaded barrel (e.g., the internally threaded barrel sheave 40), a primary drive sheave (e.g., a driven link chain sheave 38), (e.g., primary link chain drive sheave 42), a threaded barrel idler sheave (e.g., internally threaded barrel idler sheave 40), and a secondary idler sheave (e.g., secondary idler sheave 44). The internally threaded barrel 18 can have be aligned with axis represented by the line A1-A1 and the primary link chain drive sheave and the secondary idler sheave can be aligned with an axis represented by the line B1-B1 where A1-A1 and B1-B1 are approximately perpendicular (e.g., approximately 90° off in alignment). The drive mechanism 34 rotates the torque application direction 90 degrees by having the driven sheave pockets contact and load the chain links of the chain drive 36 that are adjacent to the chain links that are in and loaded by the pockets 50 of the primary link chain drive sheave 42.

In some embodiments the internally threaded barrel idler sheave 40 could be replaced with a secondary drive sheave (not shown in FIG. 3A; similar to the primary drive sheave 38) and the primary link chain drive sheave 42 could be replaced with a secondary link chain drive sheave (not shown in FIG. 3A; similar to primary link chain drive sheave 42).

As shown in FIG. 3A, the external hex drive 14 can be coupled with the primary link chain drive sheave 42. As the external hex drive 14 is rotated clockwise or counterclockwise and/or a primary ratchet handle attachment gear 46 is moved by a handle 16, the internally threaded barrel 18 can spin in a corresponding manner. The primary ratchet handle attachment gear 46 can be coupled with the drive shaft (like the primary link chain drive sheave 42, the secondary link idler sheave 44, and the external nut 14) and can all be coaxially coupled with a drive shaft (hidden from view in FIG. 3A, see FIG. 11B). The rotation of the internally threaded barrel 18 can, in turn, cause threaded eye bolts 22 coupled with the internally threaded barrel 18, to move into the internally threaded barrel 18 (e.g., tightening the load binder 10; the distance between the two threaded eye bolts 22 decreases) or out of the internally threaded barrel 18 (e.g., loosening the load binder 10; the distance between the two threaded eye bolts 22 increases).

FIG. 3A shows how the drive chain 36 couples with the various parts of the drive mechanism 34. Both the driven link chain sheave 38 and the primary link chain drive sheave 42 can include a plurality of sheave pockets 50 (i.e., recesses, openings, holes, etc.) that couples with an individual portion (e.g., one chain link) of the drive chain 36. Each of the pockets can contact an outer portion of one of the chain links to transfer force between the drive chain 36 and the pockets. The coupling of chain links and the plurality of sheave pockets can minimize slippage of the drive chain 36 when the load binder is adjusted by a user via the handle (not shown in FIG. 3C) or the external hex drive 14. The pockets can be shaped to accommodate a weld joint or other feature of the chain links of the drive chain 36. The primary link chain drive sheave 42 drives the drive chain 36 (i.e., force applied to the primary link chain drive sheave 42 is transferred to the drive chain 36) that, in turn, drives the driven link chain sheave 38 that rotates the internally threaded barrel.

In contrast, the internally threaded barrel idler sheave 40 and the secondary link idler sheave 44 do not have a plurality of pockets to couple with individual chain links of the drive chain 36. Instead, internally threaded barrel idler sheave 40 and the secondary link idler sheave 44 can each have a groove (i.e., channel, slot, etc.) configured to couple with a portion of the drive chain 36, but not couple with individual chain links. The internally threaded barrel idler sheave 40 is driven by the drive chain 36.

Figure 3B:
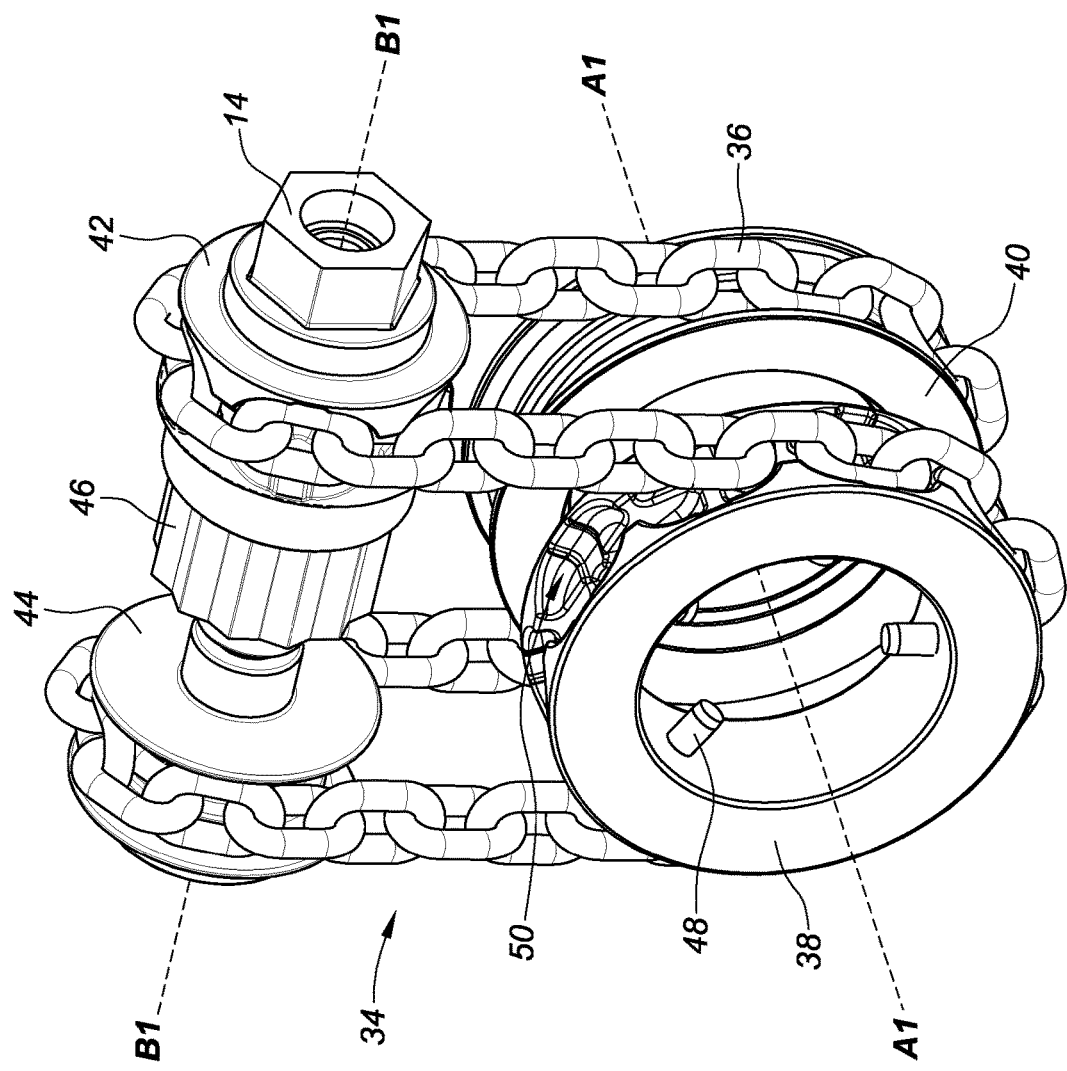
FIG. 3B is a perspective detail view of the drive mechanism of the load binder of FIGS. 1A-3A, consistent with other embodiments of the present invention.

FIG. 3B is a perspective view of the drive mechanism of the load binder of FIGS. 1A-3A, consistent with embodiments of the present disclosure. FIG. 3B shows the drive mechanism 34 of the load binder 10 with the handle 16, and the internally threaded barrel 18, with the frame body 12 omitted (no handle 16, no internally threaded barrel 18, no outer access cover 30, no LHS frame body 26, no RHS frame body 28).

As shown in FIG. 3B, the drive mechanism 34 includes the driven link chain sheave 38, the internally threaded barrel idler sheave 40, and the primary link chain drive sheave 42, the drive chain 36, and the secondary link idler sheave 44. The driven link chain sheave 38 can be coupled with the threaded barrel (omitted in FIG. 3B) using a pin 48 or other fastener (e.g., a screw, a bolt, a rivet, etc.). Multiple pins 48 can be used to ensure that the driven link chain sheave 38 does not slip on the internally threaded barrel 18 when the drive mechanism 34 is engaged by a user via the handle (not shown in FIG. 3B) or the external hex drive 14.

FIG. 3C is an end view of the drive mechanism of FIG. 3B, consistent with embodiments of the present disclosure. As seen in FIG. 3B, the drive mechanism 34 can include the driven link chain sheave 38, the internally threaded barrel idler sheave 40, and the primary link chain drive sheave 42, the drive chain 36, and the secondary link idler sheave 44. The driven link chain sheave 38 can be coupled with the threaded barrel (omitted in FIG. 3C) using a pin 48 or other fastener (e.g., a screw, a bolt, a rivet, etc.). Multiple pins 48 can be used to ensure that the driven link chain sheave 38 does not slip on the internally threaded barrel 18 when the drive mechanism 34 is engaged by a user via the handle (not shown in FIG. 3B) or the external hex drive 14. The pin 48 can be placed at any suitable location of the driven link chain sheave 38/internally threaded barrel 18. Any suitable number of pins 48 can be used (e.g., 1 pin, 2 pins, 3 pins, 4 pins, 5 pins, etc.).

FIG. 3C shows additional views (see also, FIGS. 3A-B) of the drive chain 36 coupling with the various parts of the drive mechanism 34. As discussed above, the driven link chain sheave 38 and the primary link chain drive sheave 42 can each include a plurality of sheave pockets 50 (i.e., recesses, openings, holes, etc.) that each couple with an individual portion (e.g., one chain link) of the drive chain 36. The internally threaded barrel idler sheave 40 and the secondary link idler sheave 44 do not have a plurality of pockets (i.e., pocketless) to couple with individual chain links of the drive chain 36. Instead, internally threaded barrel idler sheave 40 and the secondary link idler sheave 44 can each have a groove (i.e., channel, slot, etc.) configured to couple with the drive chain 36, but not couple with individual chain links. The internally threaded barrel idler sheave 140 is driven by the drive chain 136.

FIG. 3D is a side view of the drive mechanism of the load binder of FIGS. 3A-C, consistent with embodiments of the present disclosure. As shown in FIG. 3D, the drive mechanism 34 can include the driven link chain sheave 38, the threaded barrel idler sheave 40, and the primary link chain drive sheave 42, the drive chain 36, and the secondary link idler sheave 44. The driven link chain sheave 38 can be coupled with the threaded barrel (omitted in FIG. 3D) using a pin 48 or other fastener (e.g., a screw, a bolt, a rivet, etc.). The pockets 50 of the driven link chain sheave 38 (the pockets 50 of the primary link chain drive sheave 42 are hidden from view in FIG. 3D) and the groove 52 threaded barrel idler sheave 40 (the groove of the secondary link idler sheave 44 is hidden from view in FIG. 3D) are visible in FIG. 3D.

Figure 4A:
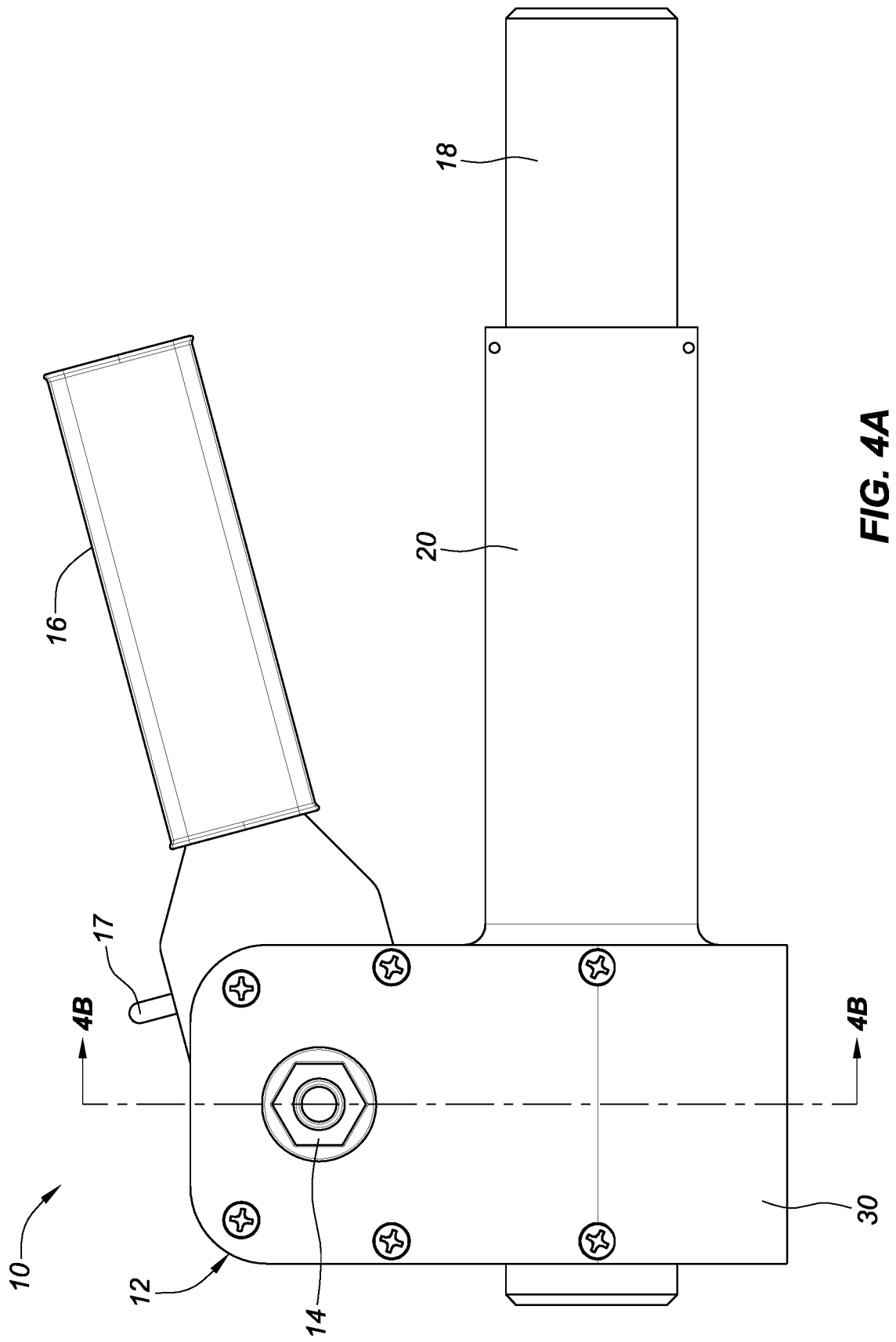
FIG. 4A is a side view of the load binder of FIGS. 1A-4B without the eye bolts and hooks, consistent with other embodiments of the present invention.

FIG. 4A is a side view of the load binder of FIGS. 1A-B without the eye bolts and grab hooks, consistent with embodiments of the present disclosure. The load binder 10 can include the frame body 12, the external hex drive 14, the handle 16, the ratchet direction lever 17, the internally threaded barrel 18 with the external frame grip 20 and the outer access cover 30. The LHS frame body 26 is hidden from view behind the outer access cover 30 in FIG. 4A, and the RHS frame body 28 is hidden from view. Line 4B-4B indicates a location of a cross-sectional view of the load binder 10 (see FIG. 4B and related discussion).

Figure 4B:
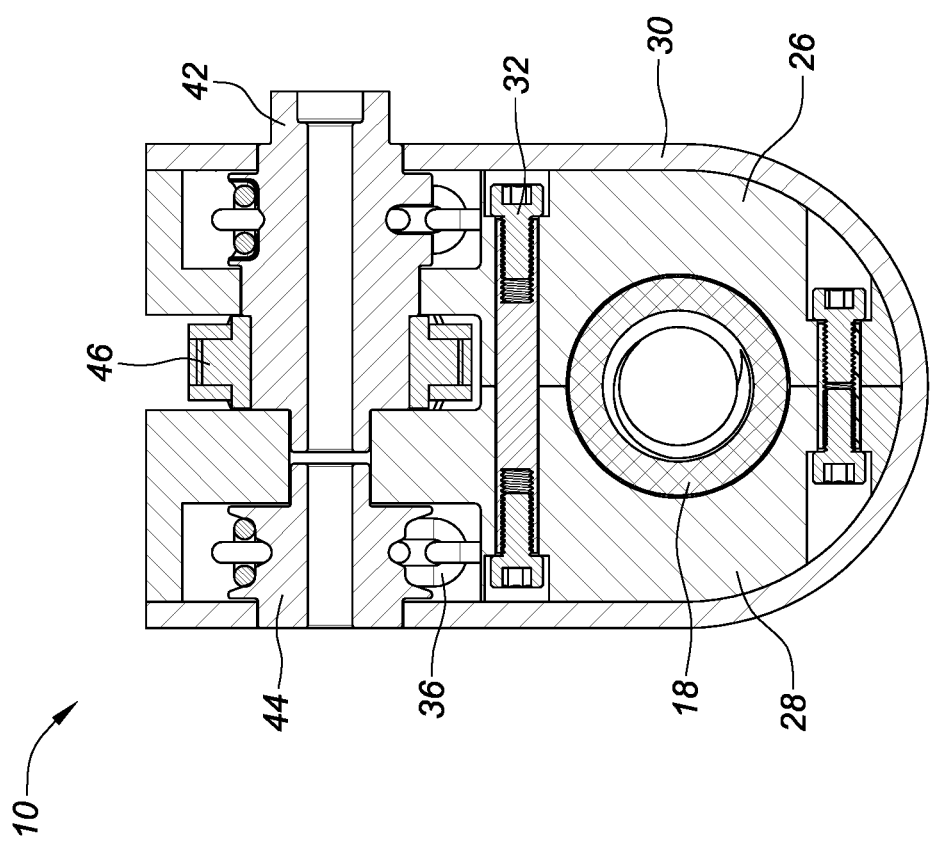
FIG. 4B is a cross-sectional view of the load binder of FIG. 4A along the line 4B-4B shown in FIG. 4A, consistent with other embodiments of the present invention.

FIG. 4B is a cross-sectional view of the load binder of FIG. 4A along the line 4B-4B shown in FIG. 4A, consistent with embodiments of the present disclosure. The cross-sectional view of load binder 10 includes the internally threaded barrel 18, the LHS frame body 26, the RHS frame body 28, frame fasteners 32, the link chain 36, the primary link chain drive sheave 42, the secondary link idler sheave 44, and the primary ratchet handle attachment gear 46.

Figure 5B:
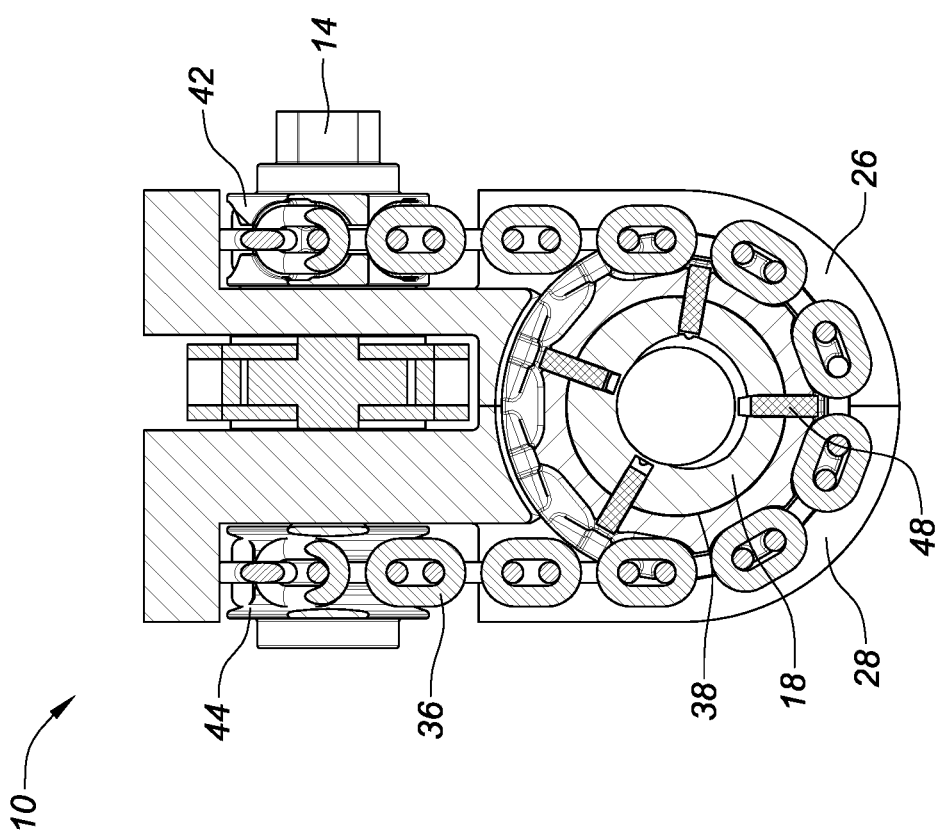
FIG. 5B is a cross-sectional view of the load binder of FIG. 5A along the line 5A-5A shown in FIG. 5A, consistent with other embodiments of the present invention.

FIG. 5A is a side view of the load binder of FIGS. 1A-4B partially disassembled, consistent with embodiments of the present disclosure. The load binder 10 can include the frame body 12, the external hex drive 14, the handle 16, the ratchet direction lever 17, the internally threaded barrel 18 with the external frame grip 20 and the outer access cover 30. The LHS frame body 26 is hidden from view behind the outer access cover 30 in FIG. 4A, and the RHS frame body 28 is hidden from view. Line 5B-5B indicates a location of a cross-sectional view of the load binder 10 (see FIG. 5B and related discussion).

FIG. 5B is a cross-sectional view of the load binder of FIG. 5A along the line 5A-5A shown in FIG. 5A, consistent with embodiments of the present disclosure. The cross-sectional view of load binder 10 includes the external hex drive, the internally threaded barrel 18, the LHS frame body 26, the RHS frame body 28, the link chain 36, the driven link chain sheave 38, the primary link chain drive sheave 42, the secondary link idler sheave 44, and the pin 48.

Figure 6A:
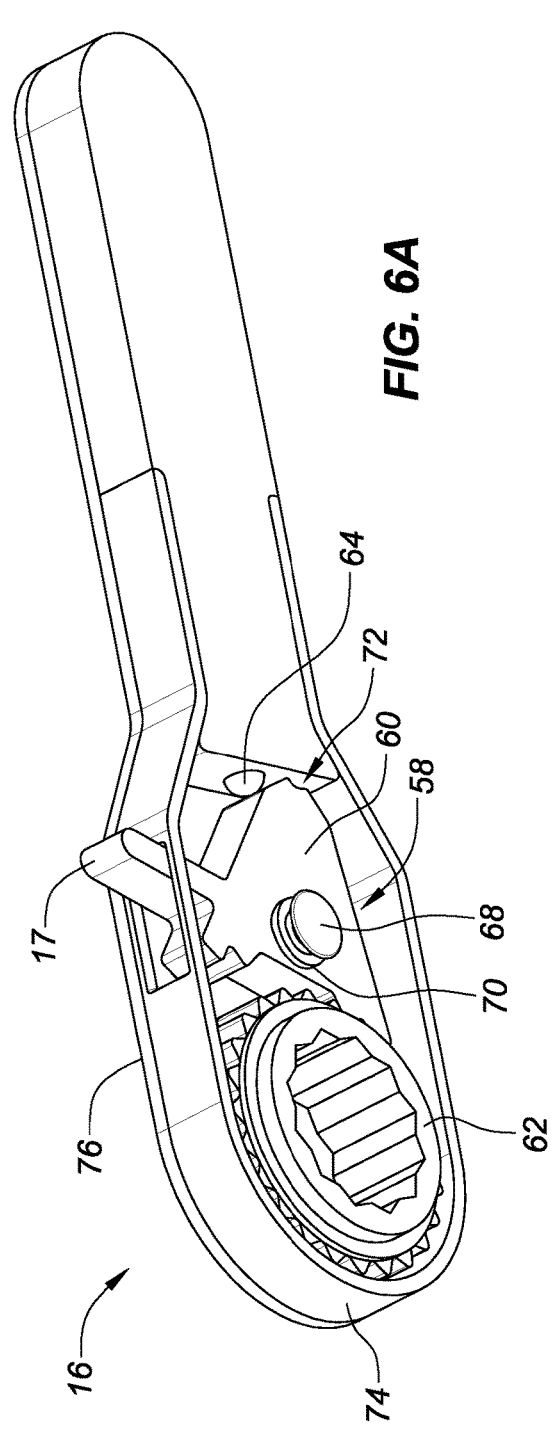
FIG. 6A is a cutaway perspective view of the ratchet mechanism and handle of the load binder of FIGS. 1A-5B, consistent with other embodiments of the present invention.

FIG. 6A is a cutaway perspective view of the ratchet mechanism and handle of the load binder of FIGS. 1A-5B, consistent with embodiments of the present disclosure. The handle 16 can include the ratchet mechanism 58 that can include a ratchet pawl 60, a ratchet wheel 62, a ball bearing 64, and a spring 66 (hidden from view in FIG. 6A; see FIG. 6B). The ratchet pawl 60 can be pivotally coupled with a pawl pivot element 68 (e.g., a rivet, pin, fastener, etc.) with a pawl pivot spacer 70 between a portion of the ratchet pawl 60 and each end of the pawl pivot element 68. The handle 16 can comprise a handle body 74 with a handle body side cover 76 coupled with each side of the handle body 74 (one of the body side covers 76 is omitted in FIG. 6A). In some embodiments, the handle body side cover 76 may be removably coupled with the handle body 74.

The ratchet pawl 60 can include an indent 72 configured to movably couple with the ball bearing 64. This indent can assist with holding the ratchet pawl in a neutral position (e.g., the ratchet pawl 60 is not engaged with the ratchet wheel 62; see FIG. 6B and related discussion). The ratchet pawl 60 can also be shaped to allow the ball bearing 64 to engage with a portion of the ratchet pawl 60 when the ratchet pawl is in a first position or a second position (i.e., non-neutral positions; a tightening position or a loosening position) as directed by movement of the ratchet direction lever 17. FIG. 6A shows the ratchet direction lever 17 in a tightening position, where pulling on a handle 16 by a user results in the load binder tightening (e.g., the eye bolts are pulled together; see discussion above related to FIG. 3A).

Figure 6B:
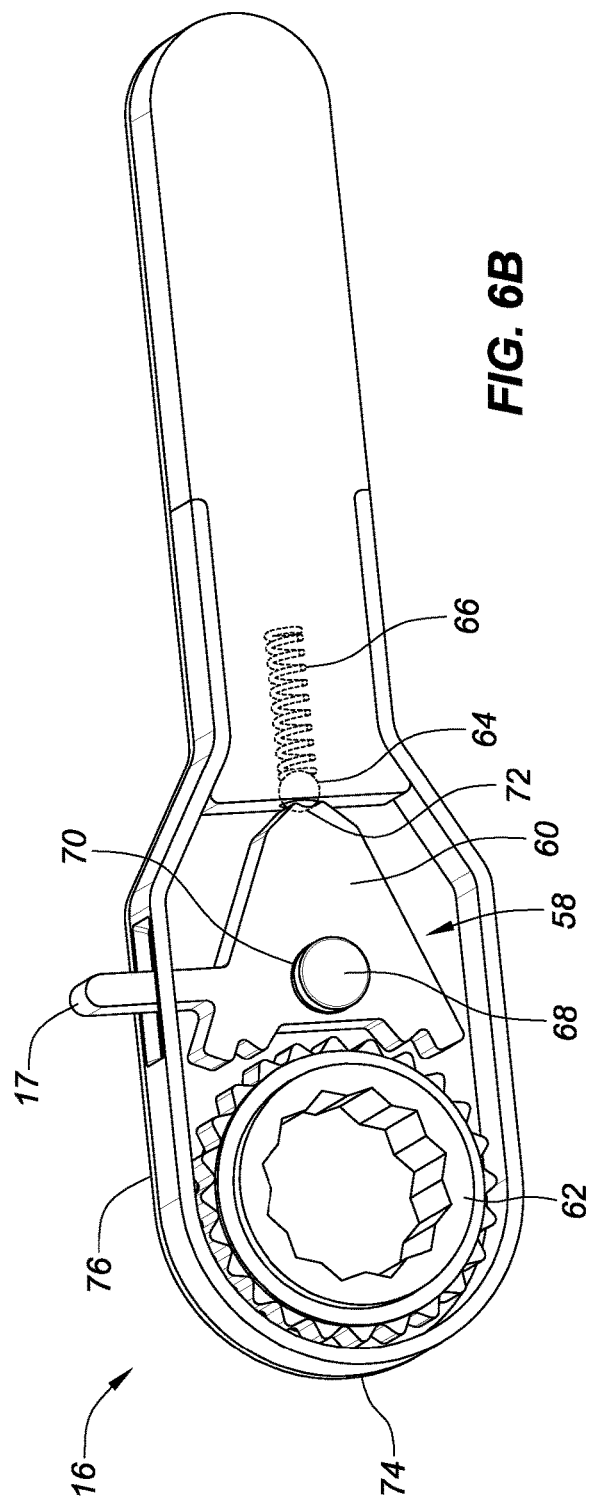
FIG. 6B is a cutaway perspective view ratchet mechanism and handle of FIG. 6A, consistent with other embodiments of the present invention.

FIG. 6B is a cutaway perspective view ratchet mechanism and handle FIG. 6A, consistent with embodiments of the present disclosure. The handle 16 can include the ratchet mechanism 58 that can include the ratchet pawl 60, the ratchet wheel 62, the ball bearing 64, and the spring 66. The spring 66 can bias the ball bearing 164 to be in contact with a portion of the ratchet pawl 60. The ratchet pawl 60 can be pivotally coupled with the pawl pivot element 68 (e.g., a rivet, pin, fastener, etc.) with the pawl pivot spacer 70 between the portion of the ratchet pawl and the end of the pawl pivot element 68. The handle 16 can comprise the handle body 74 with a handle body side cover 76 coupled with each side of the handle body 74 (one of the body side covers 74 is omitted in FIG. 6B). In some embodiments, the handle body side cover 76 may be removably coupled with the handle body 74.

As described above with respect to FIG. 6A, the ratchet pawl 60 can include an indent 72 configured to movably couple with the ball bearing 64. The indent 72 can assist with holding the ratchet pawl 60 in a neutral position as shown in FIG. 6B where the ratchet pawl 60 is not contacting the ratchet wheel 62. The ratchet pawl 60 can also be shaped to allow the ball bearing 64 to engage with a portion of the ratchet pawl 60 when the pawl is in a first position or a second position (i.e., non-neutral positions; a tightening position or a loosening position) as directed by movement of the ratchet direction lever 17. FIG. 6A shows the ratchet direction lever 17 in a tightening position (e.g., tilted away from the ratchet wheel), where pulling on a handle by a user results in the load binder tightening (e.g., the eye bolts are pulled together; see discussion above related to FIG. 3A).

Figure 7A:
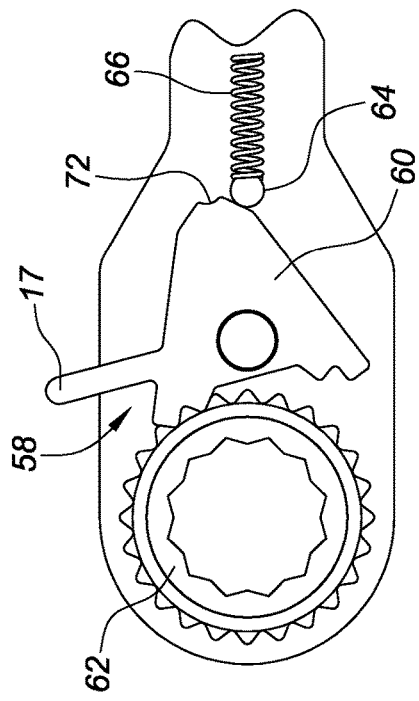
FIG. 7A is a partial side view of the ratchet mechanism of FIGS. 6A-B in a tightening configuration, consistent with other embodiments of the present invention.

FIG. 7A is a partial side view of the ratchet mechanism of FIGS. 6A-B in a tightening configuration, consistent with embodiments of the present disclosure. FIG. 7A shows the ratchet mechanism 58 that can include the ratchet pawl 60, the ratchet wheel 62, the ball bearing 64, and the spring 66. The spring 66 can bias the ball bearing to be in contact with a portion of the ratchet pawl 60. The ratchet pawl 60 can be pivotally coupled with the pawl pivot element 68 (e.g., a rivet, pin, fastener, etc.) with the pawl pivot spacer 70 (hidden from view in FIG. 7A; see FIGS. 6A-B) between the portion of the ratchet pawl and the end of the pawl pivot element 68.

As described above with respect to FIG. 6A, the ratchet pawl 60 can include an indent 72 configured to movably couple with the ball bearing 64. The indent 72 can assist with holding the ratchet pawl 60 in a neutral position as shown in FIG. 6B where the ratchet pawl 60 is not contacting the ratchet wheel 62. The ratchet pawl 60 can also be shaped to allow the ball bearing 64 to engage with a portion of the ratchet pawl 60 when the pawl is in a first position or a second position (i.e., non-neutral positions; a tightening position or a loosening position) as directed by movement of the ratchet direction lever 17. FIG. 7A shows the ratchet direction lever 17 in a tightening position (e.g., tilted away from the ratchet wheel 62), where pulling on a handle 16 by a user results in the load binder 10 tightening (e.g., the eye bolts are pulled together; see discussion above related to FIG. 3A) as the ratchet wheel 62 moves a portion of the drive mechanism 34 (e.g., primary ratchet handle gear 46; see FIG. 3A and related discussion).

Figure 7B:
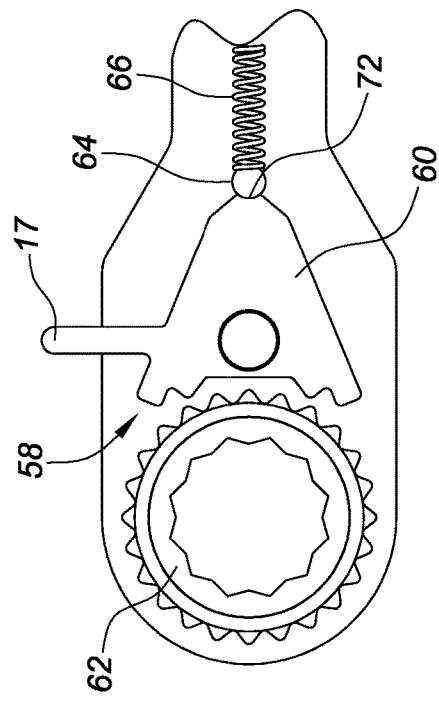
FIG. 7B is a partial side view of the ratchet mechanism of FIGS. 6A-B in a loosening configuration, consistent with other embodiments of the present invention.

FIG. 7B is a partial side view of the ratchet mechanism of FIGS. 6A-B in a loosening configuration, consistent with embodiments of the present disclosure. FIG. 7B shows the ratchet mechanism 58 that can include the ratchet pawl 60, the ratchet wheel 62, the ball bearing 64, and the spring 66. The spring 66 can bias the ball bearing to be in contact with a portion of the ratchet pawl 60. The ratchet pawl 60 can be pivotally coupled with the pawl pivot element 68 (e.g., a rivet, pin, fastener, etc.) with the pawl pivot spacer 70 (hidden from view in FIG. 7B; see FIGS. 6A-B) between the portion of the ratchet pawl and the end of the pawl pivot element 68.

As described above with respect to FIG. 6A, the ratchet pawl 60 can include an indent 72 configured to movably couple with the ball bearing 64. The indent 72 can assist with holding the ratchet pawl 60 in a neutral position as shown in FIG. 6B where the ratchet pawl 60 is not contacting the ratchet wheel 62. The ratchet pawl 60 can also be shaped to allow the ball bearing 64 to engage with a portion of the ratchet pawl 60 when the pawl is in a first position or a second position (i.e., non-neutral positions; a tightening position or a loosening position) as directed by movement of the ratchet direction lever 17. FIG. 7B shows the ratchet direction lever 17 in a loosening position (e.g., tilted towards from the ratchet wheel 62), where pushing on a handle 16 by a user results in the load binder 10 loosening (e.g., the eye bolts are pushed apart; see discussion above related to FIG. 3A) as the ratchet wheel 62 moves a portion of the drive mechanism 34 (e.g., primary ratchet handle gear 46; see FIG. 3A and related discussion).

Figure 7C:
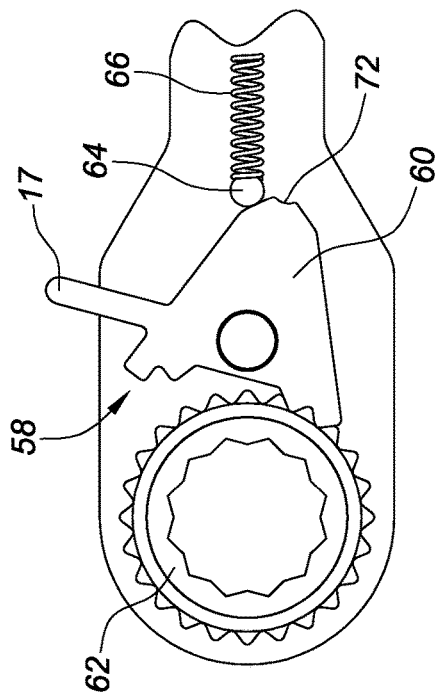
FIG. 7C is a partial side view of the ratchet mechanism of FIGS. 6A-B in a freewheeling configuration, consistent with other embodiments of the present invention.

FIG. 7C is a partial side view of the ratchet mechanism of FIGS. 6A-B in a freewheeling configuration, consistent with embodiments of the present disclosure. FIG. 7C shows the ratchet mechanism 58 that can include the ratchet pawl 60, the ratchet wheel 62, the ball bearing 64, and the spring 66. The spring 66 can bias the ball bearing to be in contact with a portion of the ratchet pawl 60. The ratchet pawl 60 can be pivotally coupled with the pawl pivot element 68 (e.g., a rivet, pin, fastener, etc.) with the pawl pivot spacer 70 (hidden from view in FIG. 7C, see FIGS. 6A-B) between the portion of the ratchet pawl and the end of the pawl pivot element 68.

As described above with respect to FIG. 6A, the ratchet pawl 60 can include an indent 72 configured to movably couple with the ball bearing 64. The indent 72 can assist with holding the ratchet pawl 60 in a neutral position as shown in FIG. 6B where the ratchet pawl 60 is not contacting the ratchet wheel 62. The ratchet pawl 60 can also be shaped to allow the ball bearing 64 to engage with a portion of the ratchet pawl 60 when the pawl is in a first position or a second position (i.e., non-neutral positions; a tightening position or a loosening position) as directed by movement of the ratchet direction lever 17. FIG. 7B shows the ratchet direction lever 17 in a freewheeling position (e.g., in between a neutral and the up position and the tilted position towards the ratchet wheel 62), where external drive (e.g., using a tool/power tool on the external hex nut 14; see FIG. 1) by a user allows the ratchet wheel 62 to move with respect to the ratchet pawl 60; see discussion above related to FIG. 3A) in between strokes where the ratchet wheel 62 moves a portion of the drive mechanism 34 (e.g., primary ratchet handle gear 46; see FIG. 3A and related discussion).

Figure 7D:
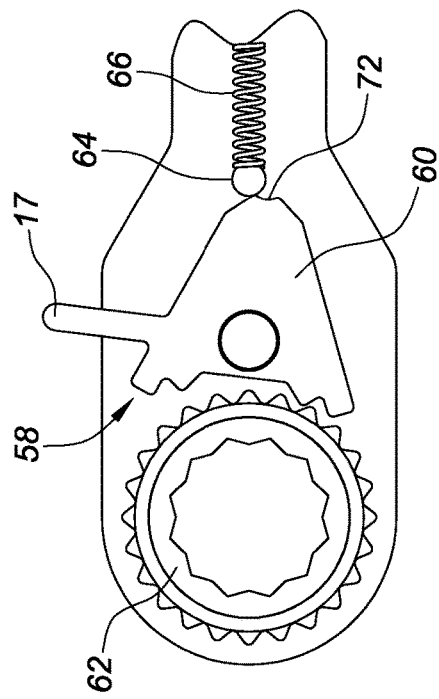
FIG. 7D is a partial side view of the ratchet mechanism of FIGS. 6A-B in a neutral configuration, consistent with other embodiments of the present invention.

FIG. 7D is a partial side view of the ratchet mechanism of FIGS. 6A-B in a neutral configuration, consistent with embodiments of the present disclosure. FIG. 7D shows the ratchet mechanism 58 that can include the ratchet pawl 60, the ratchet wheel 62, the ball bearing 64, and the spring 66. The spring 66 can bias the ball bearing to be in contact with a portion of the ratchet pawl 60. The ratchet pawl 60 can be pivotally coupled with the pawl pivot element 68 (e.g., a rivet, pin, fastener, etc.) with the pawl pivot spacer 70 (hidden from view in FIG. 7D; see FIGS. 6A-B) between the portion of the ratchet pawl and the end of the pawl pivot element 68.

As described above with respect to FIG. 6A, the ratchet pawl 60 can include an indent 72 configured to movably couple with the ball bearing 64. The indent 72 can assist with holding the ratchet pawl 60 in a neutral position as shown in FIG. 6B where the ratchet pawl 60 is not contacting the ratchet wheel 62. The ratchet pawl 60 can also be shaped to allow the ball bearing 64 to engage with a portion of the ratchet pawl 60 when the pawl is in a first position or a second position (i.e., non-neutral positions; a tightening position or a loosening position) as directed by movement of the ratchet direction lever 17. FIG. 7B shows the ratchet direction lever 17 in a neutral position (e.g., straight up and not tilted towards or away from the ratchet wheel 62), where pushing on a handle 16 by a user has no effect on the tightness/looseness of the load binder 10 (e.g., the eye bolts are not pushed apart or pulled together) as the ratchet wheel 62 does not move a portion of the drive mechanism 34.

Figure 8B:
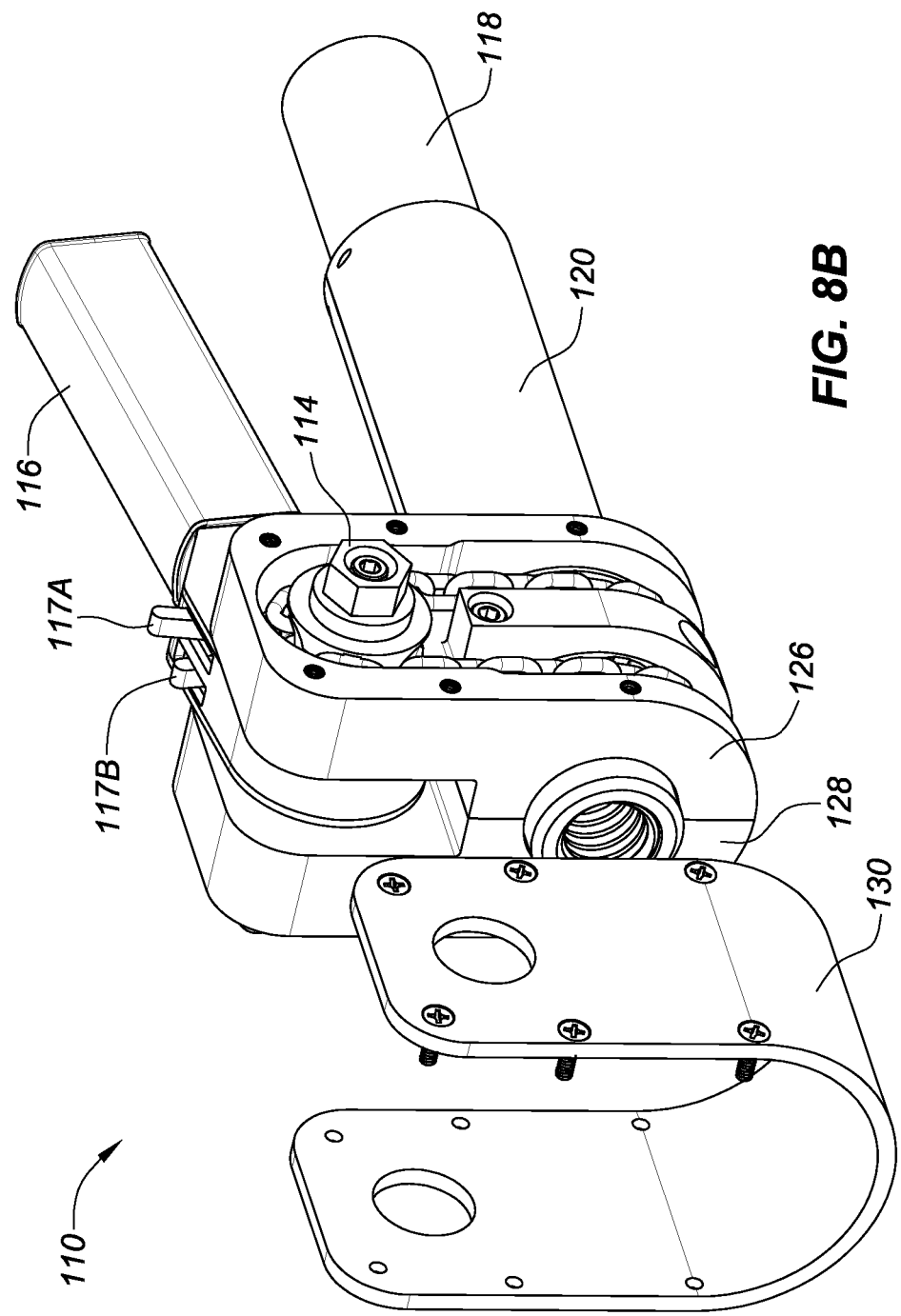
FIG. 8B is a partial perspective view showing elements of the load binder of FIG. 8A partially disassembled, consistent with other embodiments of the present invention.

FIG. 8A is a perspective view of a load binder with a double action handle mechanism, consistent with embodiments of the present disclosure. A load binder 110 can include a frame body 112, an external hex drive 114, a handle 116 with ratchet direction levers 117A and 117B, an internally threaded barrel 118 opposing open ends and with an external frame grip 120, where each end of the internally threaded barrel 118 is coupled with an eye bolt 122 and a grab hook 124. The grab hook 124 can couple with a binding member (e.g., a chain, a rope, a cable, a strap, etc.; not shown in FIG. 8A) for securing the load. The binding member can be one continuous element with each end coupling with one of the grab hooks 124, or each grab hook 124 can couple with a separate binding element. The frame body 112 can, in some embodiments comprise a left hand side (LHS) frame body 126 and a right hand side (RHS) frame body 128. The LHS frame body 126 can be secured to the RHS frame body 128 with one or more frame fasteners (not visible in FIG. 8A; see FIG. 8B).

The load binder 110 shown in FIG. 8A can be adjusted using different methods. For example, the external hex drive 114 can be coupled with a drive mechanism (not visible in FIG. 1, see FIGS. 2A-B and related discussion for more information). As the external hex drive 114 is rotated using a hex drive tool (e.g., using a hand tool (i.e., a socket wrench, etc.) or a power tool (e.g., a cordless drill, etc.)) clockwise or counterclockwise, the internally threaded barrel 118 can rotate in a corresponding manner. The rotation of the internally threaded barrel 118 can, in turn, cause the threaded eye bolts 122 coupled with the internally threaded barrel 118, to move into the internally threaded barrel 118 (e.g., tightening the load binder 110; the distance between the two threaded eye bolts 122 decreases) or out of the internally threaded barrel 118 (e.g., loosening the load binder 110; the distance between the two threaded eye bolts 122 increases). The threaded eye bolts 122 (each with threads in opposing direction (i.e., opposing threaded shafts); e.g., one threaded eye bolt 122 has right-handed thread and the other threaded eye bolt 122 has left-handed threads) can be threadably coupled with the internally threaded barrel 118. The internally threaded barrel 118 can have internal threads (not shown in FIG. 8A) on each end that are opposite in direction (e.g., left-handed threads and right-handed threads; similar to a turnbuckle or other like device) corresponding to the thread direction of one of the threaded eye bolts 122 that facilitate the threaded eye bolts 122 moving in opposite directions (e.g., coming together/decreasing distance between them/contracting or moving apart/increasing distance/expanding between them) as the internally threaded barrel 118 is rotated one direction or the other direction and the threaded eye bolts 122 are not rotating.

Instead of or in addition to using the external hex drive 114, the handle 116 can be used to tighten or loosen the threaded eye bolts 122. The handle 116 can be used to engage a ratchet mechanism 158 (not visible in FIG. 8A; see FIGS. 13A-14D and related discussion) used to rotate the internally threaded barrel 118 via the drive mechanism 134 and, in turn, tighten or loosen the load binder 110. The ratchet mechanism 158 can allow the handle 116 to move the internally threaded barrel 118 in the same direction on each stroke of the handle. For example, when the handle 116 is moved in a first handle direction (e.g., downward; moving toward to internally threaded barrel 118) the internally threaded barrel 118 can move in a first barrel direction (i.e., tighten the load binder 110; decrease the distance between the two threaded eye bolts 122). Then, when the handle 116 is moved in a second handle direction (e.g., upward; moving away from the internally threaded barrel 118) the internally threaded barrel 118 can move in the first barrel direction (i.e., tighten the load binder 110; decrease the distance between the two threaded eye bolts 122).

When a setting for the ratchet mechanism is changed using the ratchet direction levers 117A and/or 117B, movement of the handle 116 in the first direction can cause a different movement direction of the internally threaded barrel 118—a second barrel movement direction (i.e., loosen the load binder 110; increase the distance between the two threaded eye bolts 122) and movement of the handle 116 in the second direction can also move the internally threaded barrel 118 in the second barrel direction (i.e., loosen the load binder 110; increase the distance between the two threaded eye bolts 122). See FIGS. 14A-D and related discussion for more information.

FIG. 8B is a partial perspective view of the load binder of FIG. 1A partially disassembled, consistent with embodiments of the present disclosure. The frame body 112 of FIGS. 8A-B can include an outer access cover 130 that is removably coupled with a portion of the frame body 112. One or more frame fasteners 130 can couple the LHS frame body with the RHS frame body together as shown in FIGS. 8A-B. This outer access cover 130 can allow a user to access the internal components of a drive mechanism 134 (i.e., double action mechanism; double action drive mechanism, dual action mechanism, etc.) for maintenance and service (e.g., lubrication and/or inspection of the drive mechanism). Removing the outer access cover 130 can provide access to a drive chain 136, portions of a driven link chain sheave, portions of a threaded barrel idler sheave (see FIGS. 9A-10D for more details about the drive mechanism 134). With the outer access cover 130 removed, visual inspection of the various components described above can be done and lubrication and/or cleaning of the drive mechanism 134 can be performed.

Figure 9A:
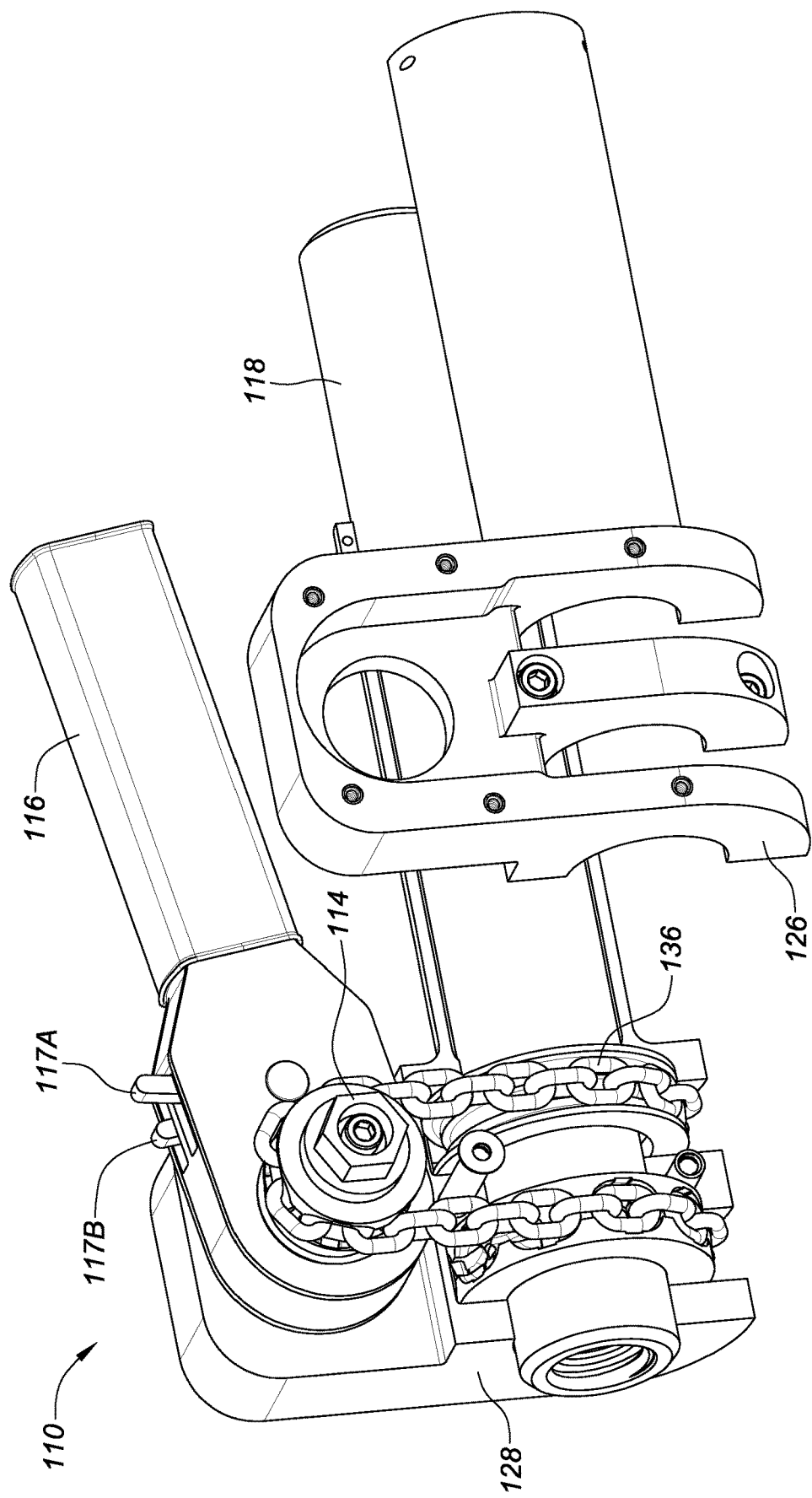
FIG. 9A is a partial perspective view showing elements of the load binder of FIG. 8A further disassembled, consistent with other embodiments of the present invention.

FIG. 9A is a partial perspective view of the load binder of FIGS. 8A-B further disassembled, consistent with embodiments of the present disclosure. After removal of the outer access cover 130 shown in FIG. 8B, the LHS frame body 126 can removed for additional access to portions of the load binder 110. With the LHS frame body 126 removed, additional access to portions of the driven link chain sheave, the threaded barrel idler sheave, and the primary link chain drive sheave are possible (see FIG. 9B and related discussion for more information). For example, half of the driven link chain sheave is accessible, half of the threaded barrel idler sheave is accessible, all of the primary link chain drive sheave is accessible, etc.).

Figure 9B:
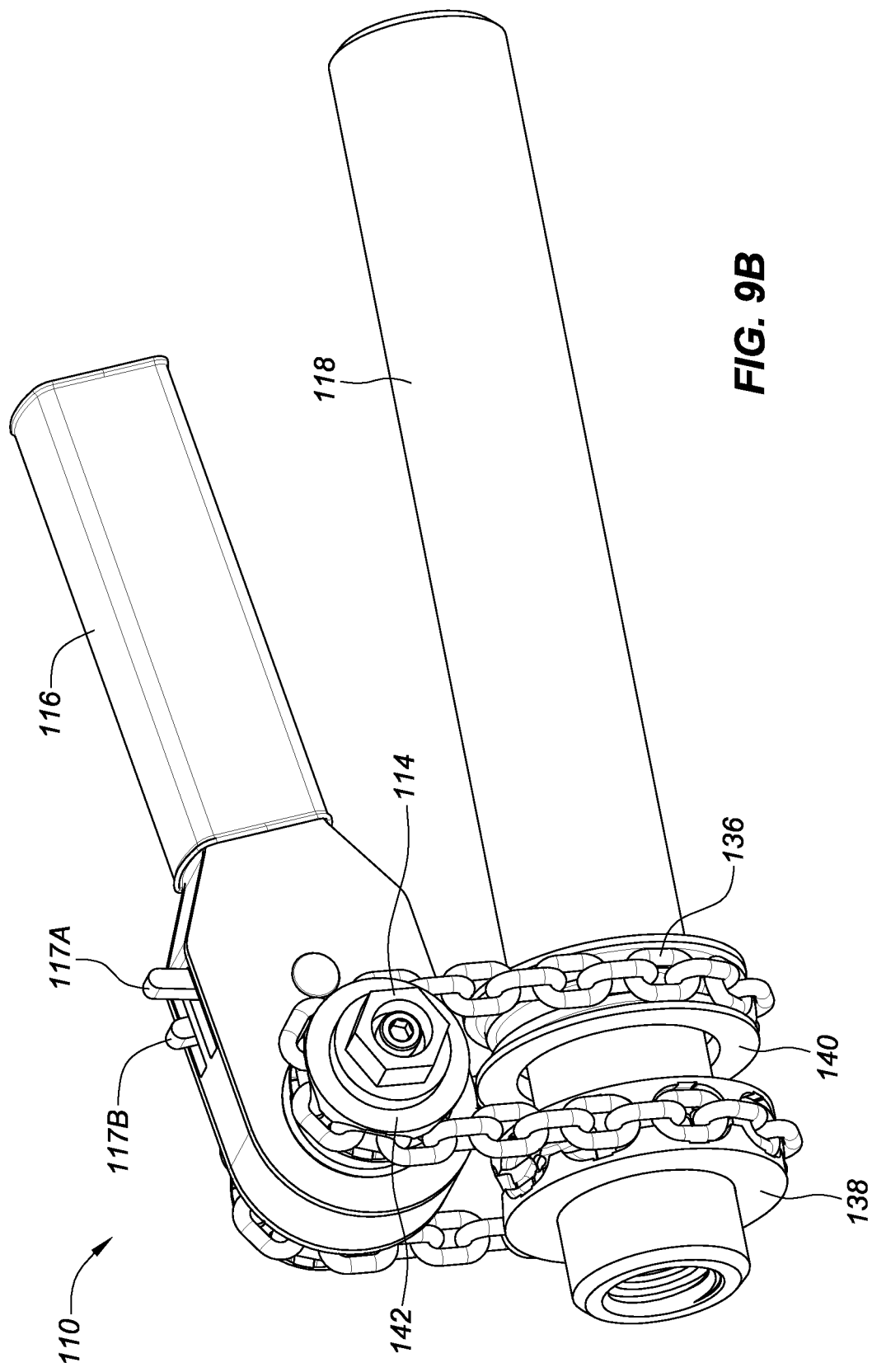
FIG. 9B is a perspective detail view showing elements of the load binder of FIGS. 8A-9A still further disassembled, consistent with other embodiments of the present invention.

FIG. 9B is a perspective detail view of the load binder of FIGS. 8A-9A omitting the frame body, consistent with embodiments of the present disclosure. FIG. 9B shows the load binder 110, the handle 116, the ratchet direction levers 117A and 117B, and the internally threaded barrel 118, with the frame body 112 omitted (no outer access cover 130, no LHS frame body 126, no RHS frame body 128). As shown in FIG. 9B, the load binder 110 includes the driven link chain sheave 138, the internally threaded barrel idler sheave 140, and the primary link chain drive sheave 142, the drive chain 136, and a secondary link drive sheave 154.

Figure 10A:
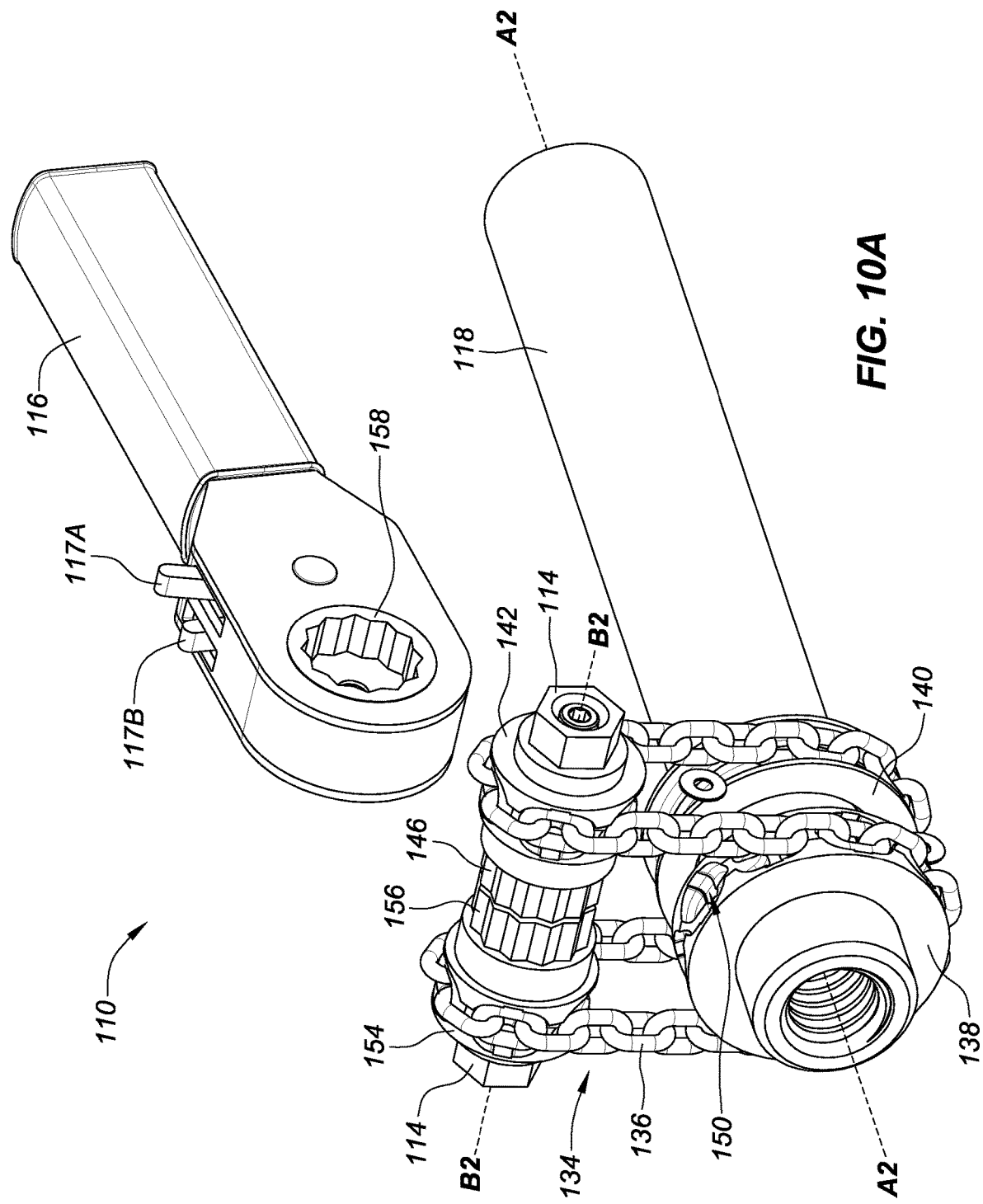
FIG. 10A is a perspective detail view of a drive mechanism and a threaded barrel and a handle of the load binder of FIGS. 8A-9B, consistent with other embodiments of the present invention.

FIG. 10A is a perspective detail view of the drive mechanism and the threaded barrel of the load binder of FIGS. 8A-9B, consistent with embodiments of the present disclosure. The load binder 110 includes the internally threaded barrel 118, and the drive mechanism 134 that includes the drive chain 136, the driven link chain sheave 138, the internally threaded barrel idler sheave 140, the primary link chain drive sheave 142, the primary ratchet handle attachment gear 146, the secondary ratchet handle attachment gear 156, and the secondary link chain drive sheave 154. The primary ratchet handle attachment gear 146 and the secondary ratchet handle attachment gear 156 can be coupled with the drive shaft (like the primary link chain drive sheave 142, the secondary link idler sheave 144, and the external nut 114) and can all be coaxially coupled with a drive shaft (hidden from view in FIG. 10A). FIG. 10A shows the handle 116 separated from the rest of the load binder 110 for viewing purposes. The handle 116 includes ratchet direction levers 117A and 117B and ratchet mechanism 158 (partially hidden from view; see FIGS. 13A-14D and related discussion for more information) where portions of the ratchet mechanism 158 couple with the primary ratchet handle attachment gear 146, the secondary ratchet handle attachment gear 156.

The double action drive mechanism 134 utilizes a closed loop of a flexible coupler (i.e., the drive chain 136, a link chain, a belt, or other similar item) arranged in a double saddle, or U-configuration around portions of the internally threaded barrel 118 and a primary link drive sheave 142, a internally threaded barrel idler sheave 140, and the secondary link drive sheave 154. The internally threaded barrel 118 can be aligned with axis represented by the line A2-A2 and the primary link chain drive sheave and the secondary idler sheave can be aligned with an axis represented by the line B2-B2 where A2-A2 and B2-B2 are approximately perpendicular (e.g., approximately 90° off in alignment).

In some embodiments the internally threaded barrel idler sheave 140 could be replaced with a secondary drive sheave (not shown in FIG. 10A; similar to the primary drive sheave 138).

As shown in FIG. 10A, an external hex drive 114 can be coupled with the primary link drive sheave 142. As the external hex drive 114 is rotated clockwise or counterclockwise, the internally threaded barrel 118 can spin in a corresponding manner. The rotation of the threaded barrel can, in turn, cause the threaded eye bolts 122 coupled with the internally threaded barrel 118, to move into the internally threaded barrel 118 (e.g., tightening the load binder 110; the distance between the two threaded eye bolts 122 decreases) or out of the internally threaded barrel 118 (e.g., loosening the load binder 110; the distance between the two threaded eye bolts 122 increases).

FIG. 10A shows how the drive chain 136 couples with the various parts of the drive mechanism 134. Both the driven link chain sheave 138 and the primary link chain drive sheave 142 can include a plurality of sheave pockets 150 (i.e., recesses, openings, holes, etc. that couples with an individual portion (e.g., one chain link) of the drive chain 136. Each of the pockets can contact an outer portion of one of the chain links to transfer force between the drive chain 36 and the pockets. The coupling of chain links and the plurality of sheave pockets can minimize slippage of the drive chain 136 when the load binder 110 is adjusted by a user via the handle (not shown in FIG. 3C) or the external hex drive 114. The pockets can be shaped to accommodate a weld joint or other feature of the chain links of the drive chain 36. The primary link chain drive sheave 142 drives the drive chain 136 (i.e., force applied to the primary link chain drive sheave 142 is transferred to the drive chain 36) that, in turn, drives the driven link chain sheave 138 that rotates the internally threaded barrel.

In contrast, the internally threaded barrel idler sheave 140 does not have a plurality of pockets to couple with individual chain links of the drive chain 136. Instead, internally threaded barrel idler sheave 140 can have a groove (i.e., channel, slot, etc.) configured to couple with portions of the drive chain 136, but not couple with individual chain links.

Figure 10B:
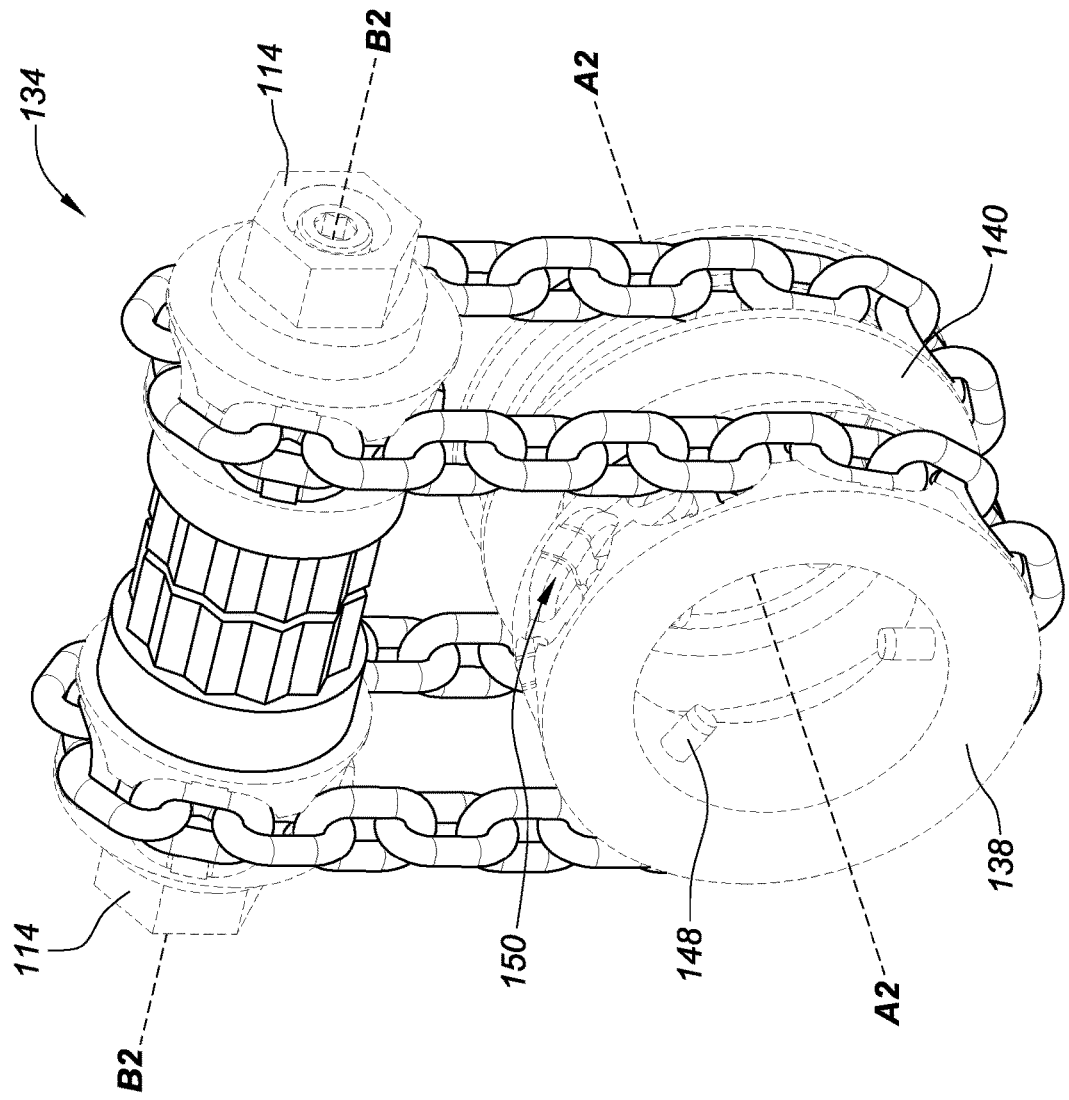
FIG. 10B is a perspective detail view of the drive mechanism of the load binder of FIGS. 8A-10A, consistent with other embodiments of the present invention.

FIG. 10B is a perspective detail view of the drive mechanism of the load binder of FIGS. 8A-10A, consistent with embodiments of the present disclosure. FIG. 10B shows the drive mechanism 134 of the load binder 110 with the handle 116, and the internally threaded barrel 118, with the frame body 112 omitted (no handle 116, no internally threaded barrel 118, no outer access cover 130, no LHS frame body 126, no RHS frame body 128).

As shown in FIG. 10B, the drive mechanism 134 includes the driven link chain sheave 138, the internally threaded barrel idler sheave 140, and the primary link chain drive sheave 142, the drive chain 136, and the secondary link drive sheave 154. The driven link chain sheave 138 can be coupled with the threaded barrel (omitted in FIG. 10B) using a pin 148 or other fastener (e.g., a screw, a bolt, a rivet, etc.). Multiple pins 148 can be used to ensure that the driven link chain sheave 138 does not slip on the internally threaded barrel 118 when the drive mechanism 134 is engaged by a user via the handle (not shown in FIG. 10B) or the external hex drive 114.

Figure 10D:
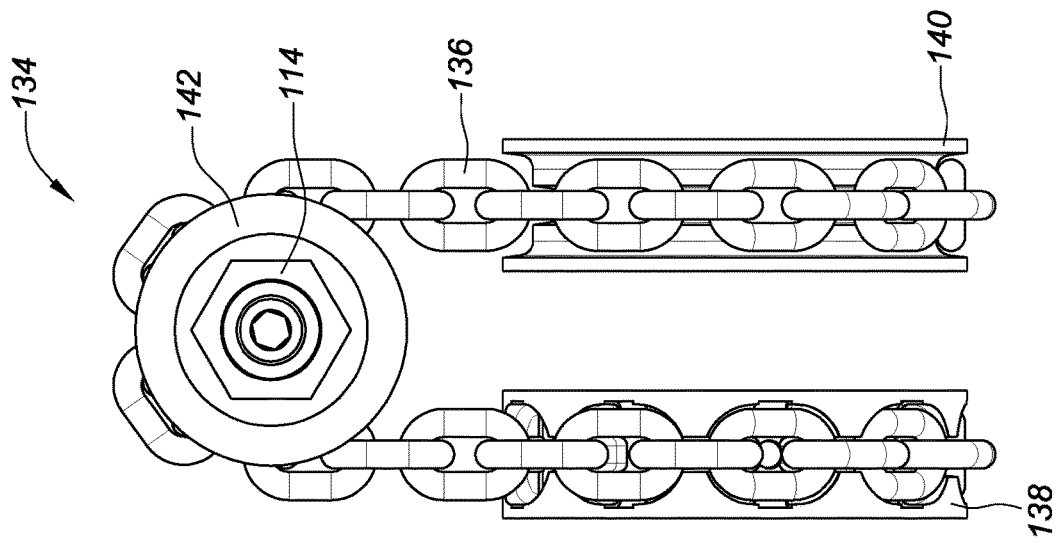
FIG. 10D is a side view of the drive mechanism of the load binder of FIGS. 10B-C, consistent with other embodiments of the present invention.
Figure 10C:
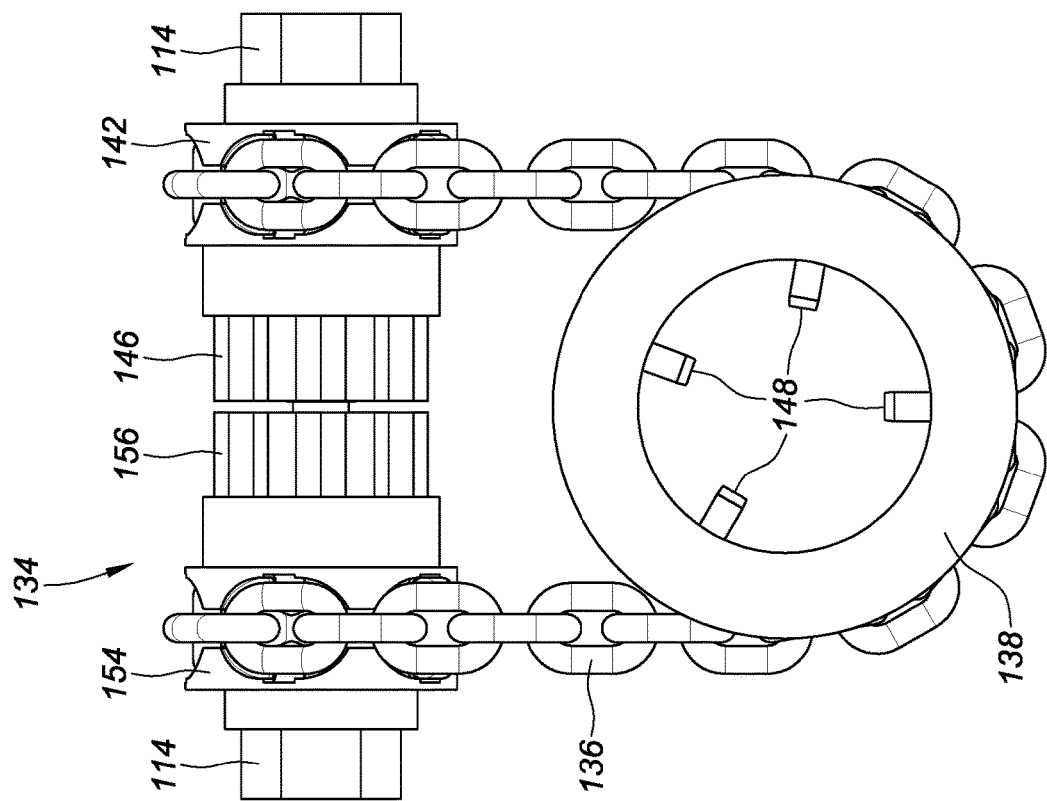
FIG. 10C is an end view of the drive mechanism of FIG. 10B, consistent with other embodiments of the present invention.

FIG. 10C is an end view of the drive mechanism of FIG. 10B, consistent with embodiments of the present disclosure. As seen in FIG. 10B, the drive mechanism 134 can include the driven link chain sheave 138, the internally threaded barrel idler sheave 140, and the primary link chain drive sheave 142, the drive chain 136, and the secondary link drive sheave 154. The driven link chain sheave 138 can be coupled with the threaded barrel (omitted in FIG. 10C) using a pin 148 or other fastener (e.g., a screw, a bolt, a rivet, etc.). Multiple pins 148 can be used to ensure that the driven link chain sheave 138 does not slip on the internally threaded barrel 118 when the drive mechanism 134 is engaged by a user via the handle (not shown in FIG. 10C) or the external hex drive 114. The pin 148 can be placed at any suitable location of the driven link chain sheave 138/internally threaded barrel 118. Any suitable number of pins 148 can be used (e.g., 1 pin, 2 pins, 3 pins, 4 pins, 5 pins, etc.).

FIG. 10C shows additional views (see also, FIGS. 10A-B) of the drive chain 136 coupling with the various parts of the drive mechanism 134. As discussed above, the driven link chain sheave 138, the primary link chain drive sheave 142, and the secondary link drive sheave 154 can each include a plurality of sheave pockets 150 (i.e., recesses, openings, holes, etc.) that each couple with an individual portion (e.g., one chain link) of the drive chain 136. The internally threaded barrel idler sheave 140 does not have a plurality of pockets (i.e., pocketless) to couple with individual chain links of the drive chain 136. Instead, internally threaded barrel idler sheave 140 can each have a groove (i.e., channel, slot, etc.) configured to couple with the drive chain 136, but not couple with individual chain links. FIG. 10D is a side view of the drive mechanism of the load binder of FIGS. 10B-C, consistent with embodiments of the present disclosure.

FIG. 10D is a side view of the drive mechanism of the load binder of FIGS. 10A-C, consistent with embodiments of the present disclosure. As shown in FIG. 10D, the drive mechanism 134 can include the driven link chain sheave 138, the internally threaded barrel idler sheave 140, and the primary link chain drive sheave 142, the drive chain 136, and the secondary link drive sheave 154. The driven link chain sheave 138 can be coupled with the threaded barrel (omitted in FIG. 10D) using a pin 148 or other fastener (e.g., a screw, a bolt, a rivet, etc.). The pockets 150 of the driven link chain sheave 138 (the pockets 150 of the primary link chain drive sheave 142 and the secondary link drive sheave 154 are hidden from view in FIG. 10D) and the groove 152 and the internally threaded barrel idler sheave 140 are visible in FIG. 10D.

Figure 11A:
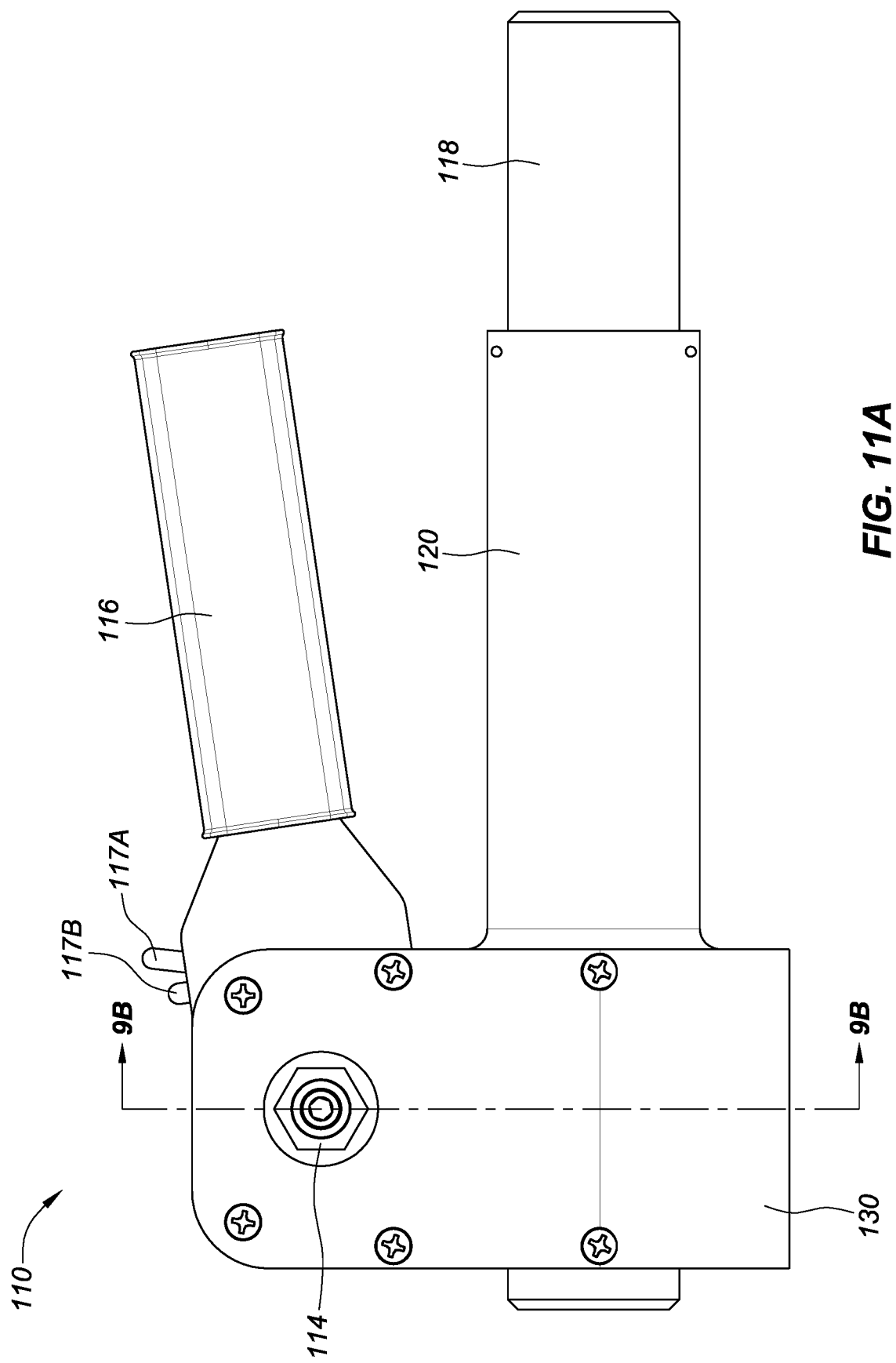
FIG. 11A is a side view of the load binder of FIGS. 8A-B without the eye bolts and hooks, consistent with other embodiments of the present invention.

FIG. 11A is a side view of the load binder of FIGS. 8A-B without the eye bolts and grab hooks, consistent with embodiments of the present disclosure. The load binder 10 can include the frame body 112, the external hex drive 114, the handle 116, ratchet direction levers 117A and 117B, the internally threaded barrel 118 with the external frame grip 120 and the outer access cover 130. The LHS frame body 126 is hidden from view behind the outer access cover 130 in FIG. 11A, and the RHS frame body 128 is hidden from view. Line 11B-11B indicates a location of a cross-sectional view of the load binder 110 (see FIG. 11B and related discussion).

Figure 11B:
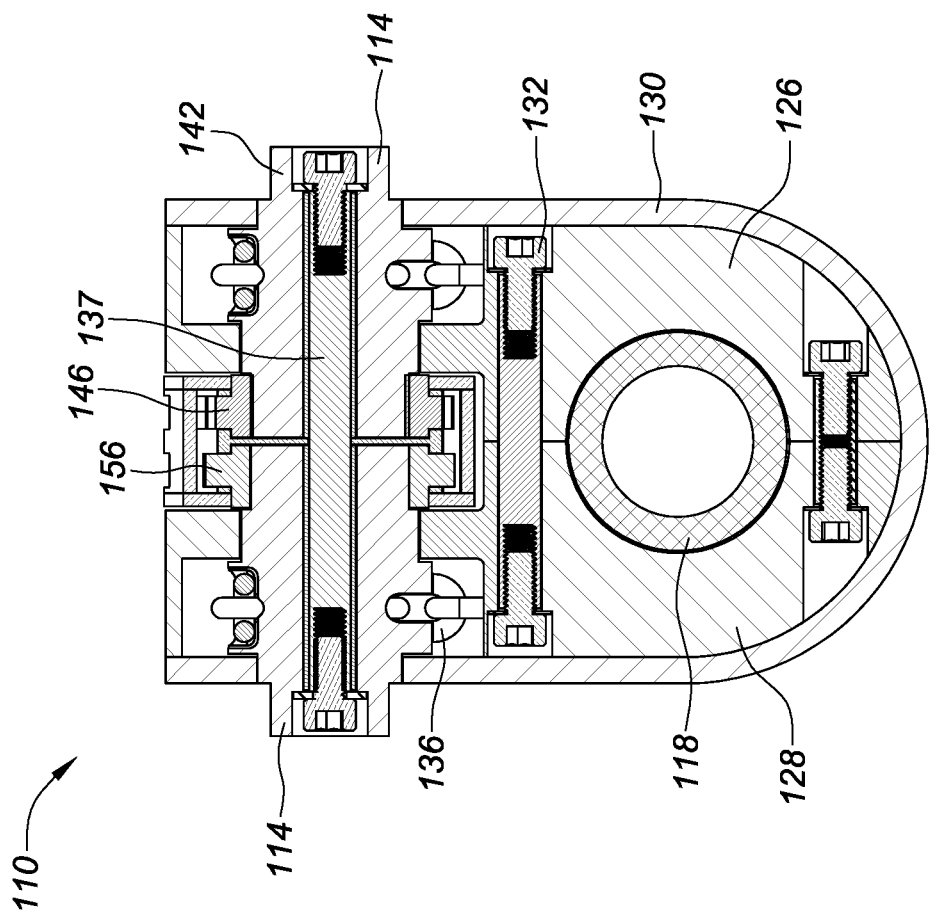
FIG. 11B is a cross-sectional view of the load binder of FIG. 11A along the line 11B-11B shown in FIG. 11A, consistent with other embodiments of the present invention.

FIG. 11B is a cross-sectional view of the load binder of FIG. 11A along the line 11B-11B shown in FIG. 11A, consistent with embodiments of the present disclosure. The cross-sectional view of load binder 110 includes the internally threaded barrel 118, the LHS frame body 126, the RHS frame body 128, frame fasteners 132, the link chain 136, the primary link chain drive sheave 142, the secondary link idler sheave 144, and the primary ratchet handle attachment gear 146. The primary link chain drive sheave 142, the secondary link idler sheave 144, and the external nut 114 are preferably coaxially coupled with a drive shaft 137.

Figure 12A:
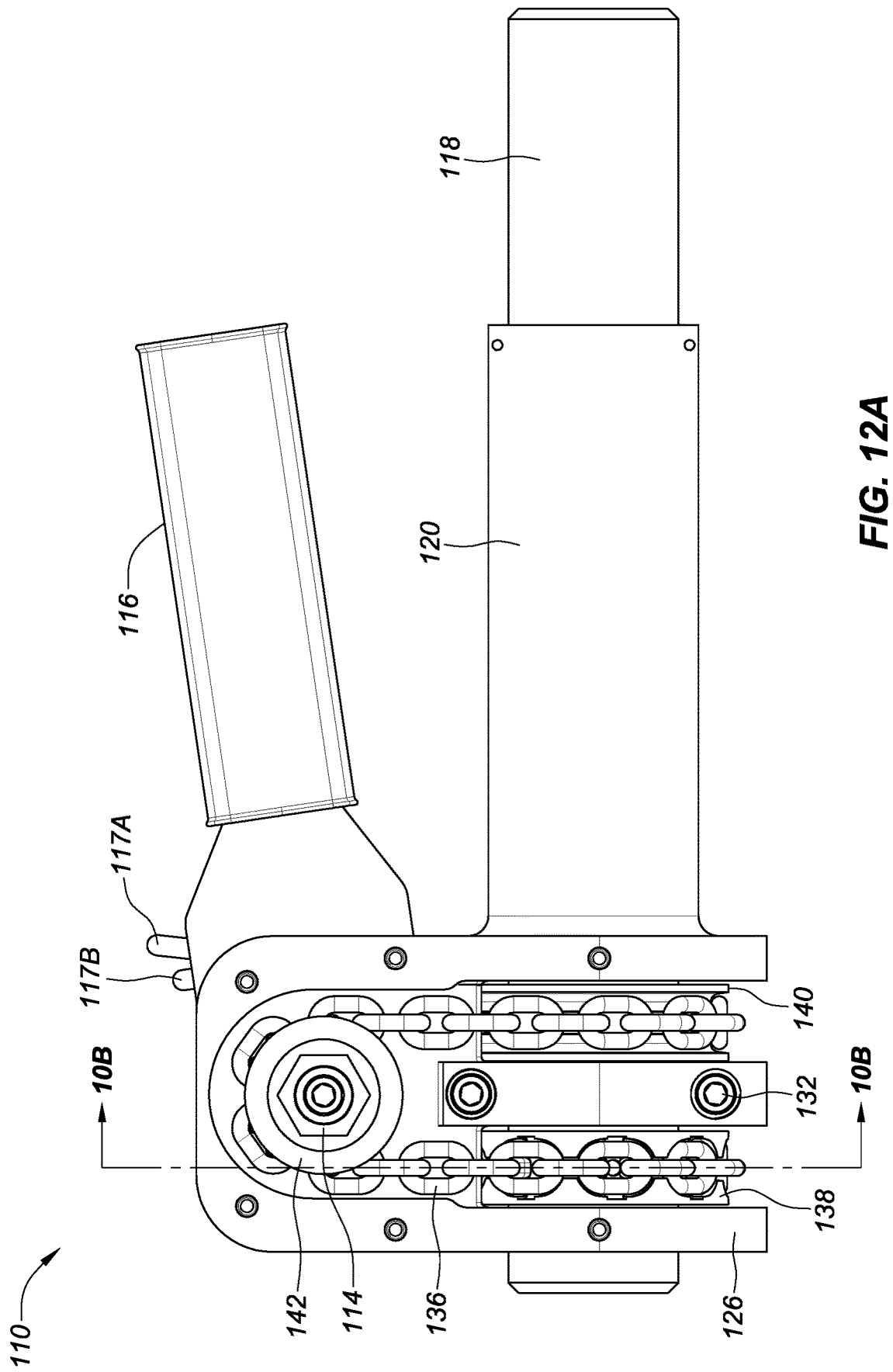
FIG. 12A is a side view of the load binder of FIG. 11A partially disassembled, consistent with other embodiments of the present invention.

FIG. 12A is a side view of the load binder of FIG. 11A partially disassembled, consistent with embodiments of the present disclosure. The load binder 110 can include the frame body 112, the external hex drive 114, the handle 16, the ratchet direction levers 117A and 117B, the internally threaded barrel 118 with the external frame grip 120 and the outer access cover 130. The LHS frame body 126 is hidden from view behind the outer access cover 130 in FIG. 4A, and the RHS frame body 128 is hidden from view. Line 12B-12B indicates a location of a cross-sectional view of the load binder 110 (see FIG. 12B and related discussion).

Figure 12B:
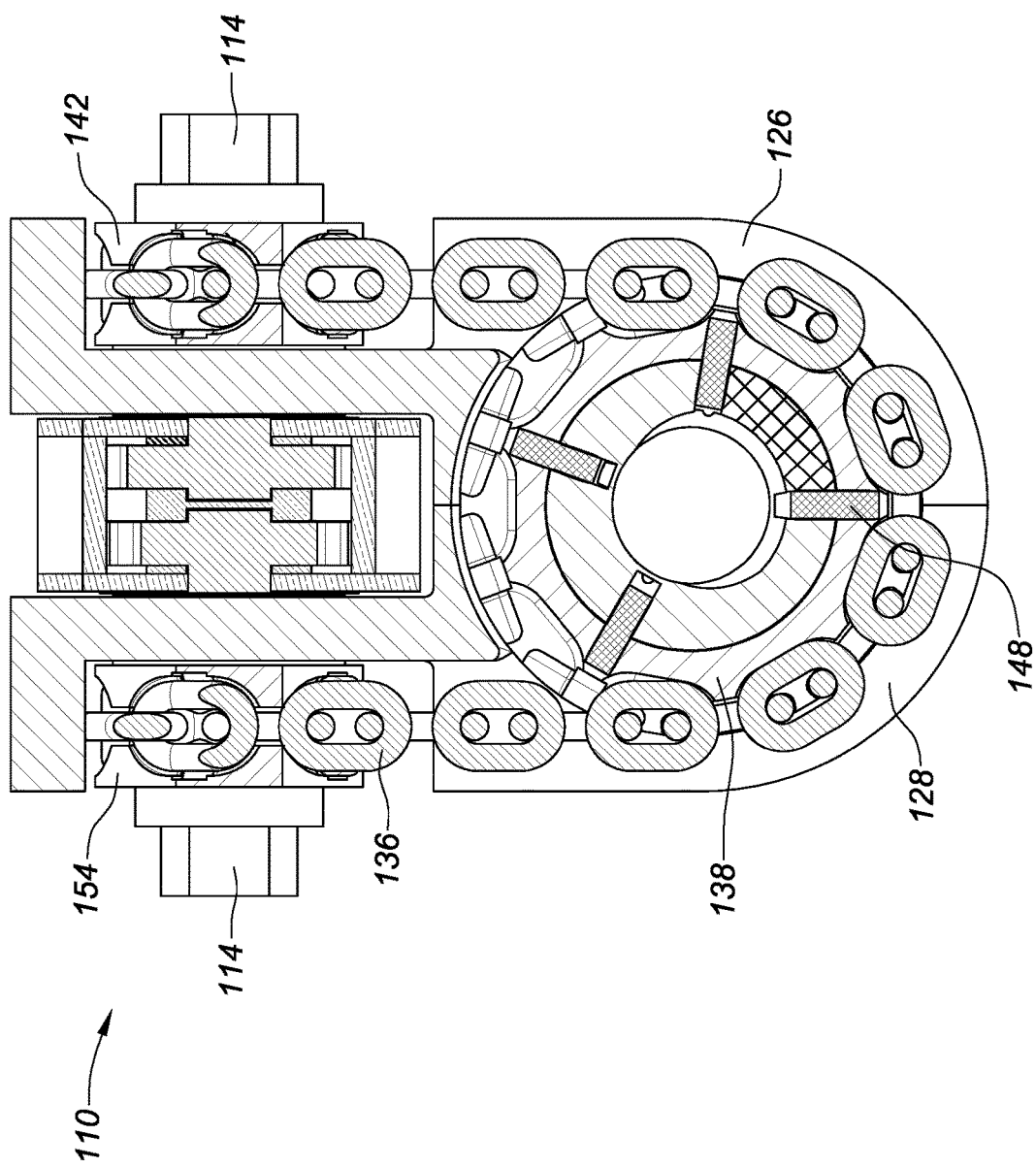
FIG. 12B is a cross-sectional view of the load binder of FIG. 12A along the line 12A-12A shown in FIG. 12A, consistent with other embodiments of the present invention.

FIG. 12B is a cross-sectional view of the load binder of FIG. 12A along the line 12A-12A shown in FIG. 12A, consistent with embodiments of the present disclosure. The cross-sectional view of load binder 110 includes the external hex drive 114, the internally threaded barrel 118, the LHS frame body 126, the RHS frame body 128, the link chain 136, the driven link chain sheave 138, the primary link chain drive sheave 142, the secondary link idler sheave 144, and the pin 148.

FIG. 13A is a perspective view of the handle of the load binder of FIGS. 8A-12B, consistent with embodiments of the present disclosure. The handle 116 can include the ratchet mechanism 158 that can include a ratchet pawls 160A and 160B (hidden from view in FIG. 13A; see FIG. 13B), ratchet wheels 162A and 162B (hidden from view in FIG. 13A; see FIG. 13B), ball bearings 164A and 164B (hidden from view in FIG. 13A; see FIG. 13B), and a springs 166A and 166B (hidden from view in FIG. 13A; see FIG. 13B). The ratchet pawls 160A and 160B can be pivotally coupled with a pawl pivot element 168 (e.g., a rivet, pin, fastener, etc.) with a pawl pivot spacer 170 between a portion of the ratchet pawls 160A and 160B and ends of the pawl pivot element 168. The handle 116 can comprise a handle body 174 with a handle body side cover 176 coupled with each side of the handle body 174. In some embodiments, the handle body side cover 176 may be removably coupled with the handle body 174.

The ratchet pawls 160A and 160B can each include an indent (hidden from view in FIG. 13A; see indents 172A and 172B in FIG. 14A-D) configured to movably couple with the ball bearings 164A and 164B. The indents can assist with holding the ratchet pawls 160A and 160B in a neutral position (e.g., the ratchet pawls 160A and 160B are not engaged with the ratchet wheels 162A and 162B, see FIG. 13B and related discussion). The ratchet pawl 160 can also be shaped to allow the ball bearing 164 to engage with a portion of the ratchet pawls 160A and 160B when the ratchet pawl is in a first position or a second position (i.e., non-neutral positions; a tightening position or a loosening position) as directed by movement of the ratchet direction levers 117A and/or 117B. FIG. 13A shows the ratchet direction levers 117A and 117B in a tightening position (see FIG. 14C and related discussion), where pulling on the handle 116 by a user results in the load binder tightening (e.g., the eye bolts are pulled together; see discussion above related to FIG. 10A).

FIG. 13B is a cutaway perspective view of the handle of FIG. 11A, consistent with embodiments of the present disclosure. The handle 116 can include the ratchet mechanism 158 that can include the ratchet pawls 160A and 160B, the ratchet wheels 162A and 162B, the ball bearings 164A and 164B, and the springs 166A and 166B. The springs 166A and 166B can bias the ball bearings 164A and 164B to be in contact with a portion of the ratchet pawls 160A and 160B. The ratchet pawls 160A and 160B can each be pivotally coupled with the pawl pivot element 168 (e.g., a rivet, pin, fastener, etc.) with the pawl pivot spacer 170 between the portion of the ratchet pawl and the ends of the pawl pivot element 168. The handle 116 can comprise the handle body 174 with a handle body side cover 176 coupled with each side of the handle body 174 (one of the body side covers 174 is omitted in FIG. 13B). In some embodiments, the handle body side cover 176 may be removably coupled with the handle body 174.

As described above with respect to FIG. 13A, the ratchet pawl 160 can include an indent 172 configured to movably couple with the ball bearing 164. The indent 172 can assist with holding the ratchet pawl 160 in a neutral position as shown in FIG. 13B where the ratchet pawl 160A nor ratchet pawl 160B is contacting the ratchet wheels 162A or 162B. The ratchet pawls 160A and 160B can also be shaped to allow the ball bearings 164A and 164B to engage with a portion of the ratchet pawls 160A and 160B when the ratchet pawl is in a first position or a second position (i.e., non-neutral positions; a tightening position or a loosening position) as directed by movement of the ratchet direction levers 117A and/or 117B. FIG. 13A shows the ratchet direction levers 117A and 117B in a single drive tightening position (e.g., ratchet direction lever 117A tilted away from the ratchet wheel 162A and ratchet direction lever pointed up, in a neutral position), where pulling on a handle by a user results in the load binder tightening (e.g., the eye bolts are pulled together; see discussion related to FIGS. 10A and 14C).

Figure 14A:
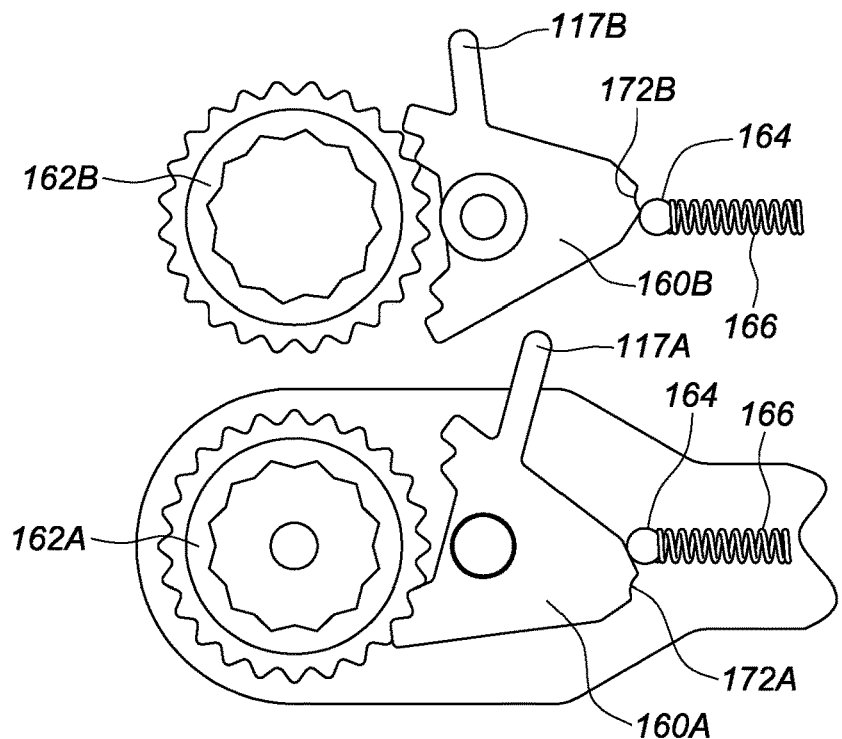
FIG. 14A is a partial side view of a ratchet mechanism of the handle of FIGS. 11A-B in a dual drive tightening configuration, consistent with other embodiments of the present invention.

FIG. 14A is a partial side view of a ratchet mechanism of the handle of FIGS. 11A-B in a dual drive tightening configuration, consistent with embodiments of the present disclosure. FIG. 14A shows the ratchet mechanism 158 in a dual drive tightening configuration (e.g., both the push and the pull strokes of the handle tighten the load binder as described herein). In this configuration, the ratchet pawl 160A is positioned with the ratchet direction lever tilted away from the ratchet wheel 162A, where the ball bearing 164A is above the indent 172A, allowing the handle to tighten the load binder on the pull stroke (towards the load binder threaded barrel). Also in this configuration, the ratchet pawl 160B is positioned with the ratchet direction lever 117B tilted toward the ratchet wheel 162B, where the ball bearing 164B is below the indent 172B, allowing the ratchet pawl 160B to freewheel over the ratchet wheel 162B on the pull stroke of the handle.

Figure 14B:
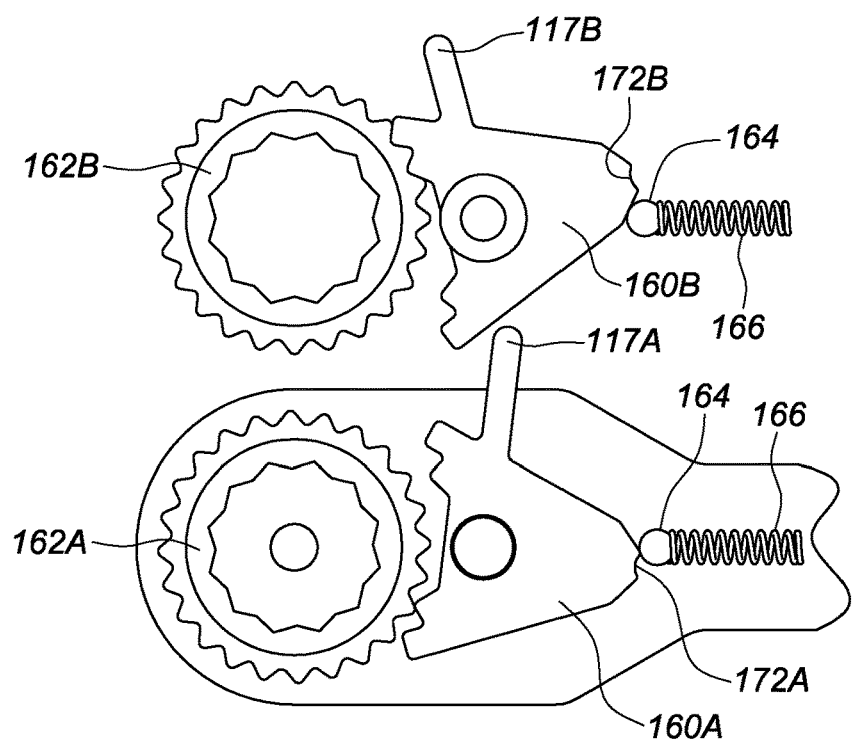
FIG. 14B is a partial side view of the ratchet mechanism of the handle of FIGS. 11A-B in a dual drive tightening configuration, consistent with other embodiments of the present invention.

FIG. 14B is a partial side view of the ratchet mechanism of the handle of FIGS. 11A-B in a dual drive tightening configuration, consistent with embodiments of the present disclosure. FIG. 14B shows the ratchet mechanism 158 in a dual drive tightening configuration (e.g., both the push and the pull strokes of the handle tighten the load binder as described herein). In this configuration, the ratchet pawl 160A is positioned with the ratchet direction lever tilted away from the ratchet wheel 162A, where the ball bearing 164A is above the indent 172A, allowing the ratchet pawl 160A to freewheel over the ratchet wheel 162A on push stroke of the handle (e.g., away from the threaded barrel). Also in this configuration, the ratchet pawl 160B is positioned with the ratchet direction lever 117B tilted toward the ratchet wheel 162B, where the ball bearing 164B is below the indent 172B, allowing the handle to tighten the load binder on the push stroke (towards the load binder threaded barrel.

Figure 14C:
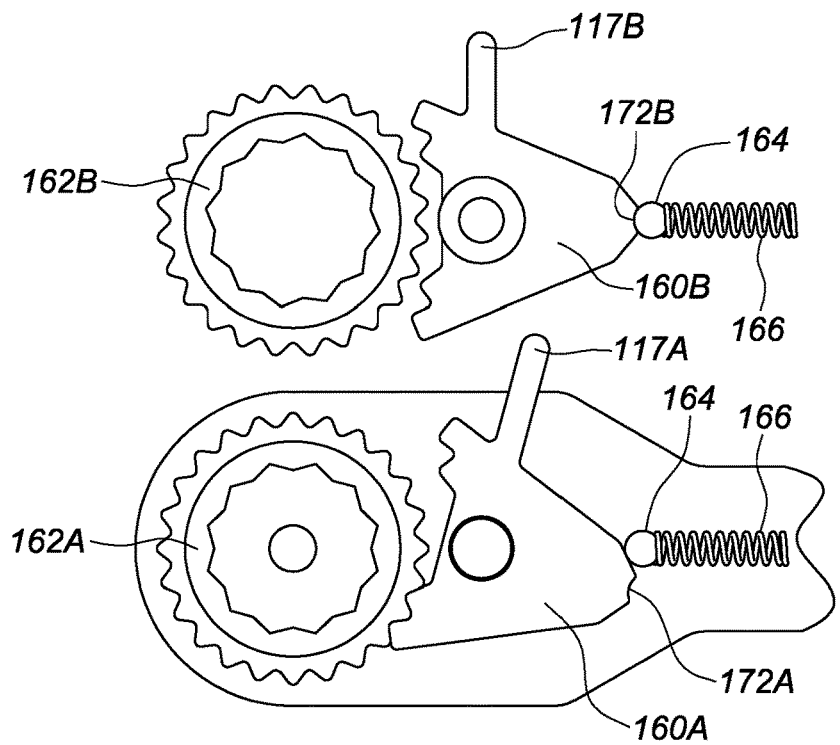
FIG. 14C is a partial side view of the ratchet mechanism of the handle of FIGS. 11A-B in a single drive tightening configuration, consistent with other embodiments of the present invention.

FIG. 14C is a partial side view of the ratchet mechanism of the handle of FIGS. 11A-B in a single drive tightening configuration, consistent with embodiments of the present disclosure. FIG. 14C shows the ratchet mechanism 158 in a single drive tightening configuration (e.g., only the pull strokes of the handle tighten the load binder as described herein). In this configuration, the ratchet pawl 160A is positioned with the ratchet direction lever tilted away from the ratchet wheel 162A, where the ball bearing 164A is above the indent 172A, allowing the handle to tighten the load binder on the pull stroke (towards the load binder threaded barrel). Also in this configuration, the ratchet pawl 160B is positioned with the ratchet direction lever 117B is a straight position (e.g., a neutral position; not tilted toward or away from the ratchet wheel 160B), where the ball bearing 164B is centered in the indent 172B, allowing the ratchet pawl 160B to not contact the ratchet wheel 162B on the pull or push strokes of the handle.

Figure 14D:
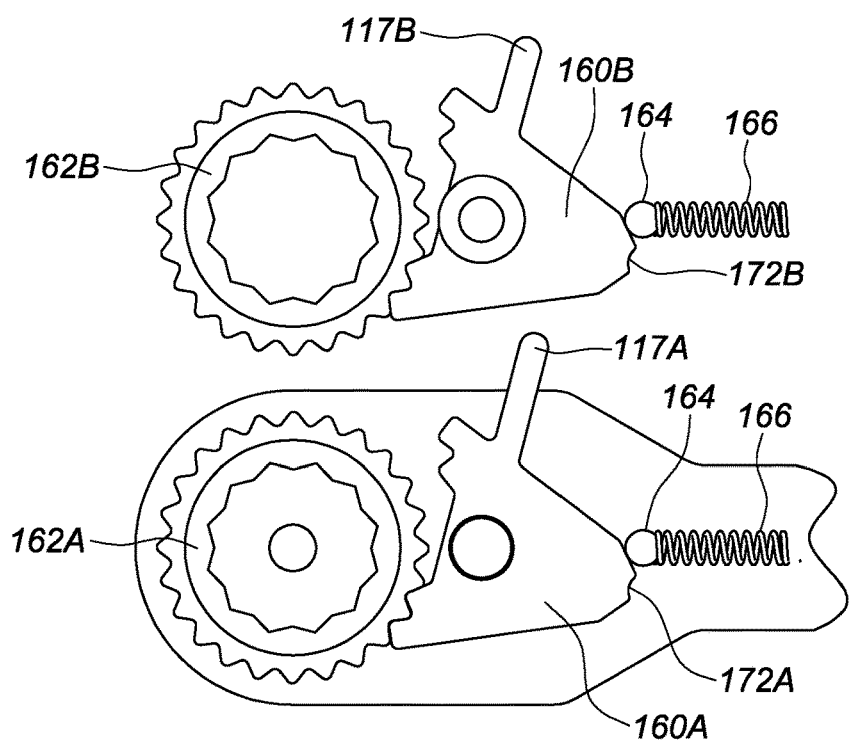
FIG. 14D is partial side view of the ratchet mechanism of the handle of FIGS. 11A-B in a dual drive locked configuration, consistent with other embodiments of the present invention.

FIG. 14D is partial side view of the ratchet mechanism of the handle of FIGS. 11A-B in a dual drive locked configuration, consistent with embodiments of the present disclosure. FIG. 14D shows the ratchet mechanism 158 in a dual drive locked configuration (e.g., the handle is held in place preventing a push or a pull stroke). In this configuration, the ratchet pawl 160A is positioned with the ratchet direction lever tilted away from the ratchet wheel 162A, where the ball bearing 164A is above the indent 172A. Also in this configuration, the ratchet pawl 160B is positioned with the ratchet direction lever 117B tilted away from the ratchet wheel 162B, where the ball bearing 164B is above the indent 172B, keeping the handle held in place and preventing a push or a pull of the handle.

Figure 15A:
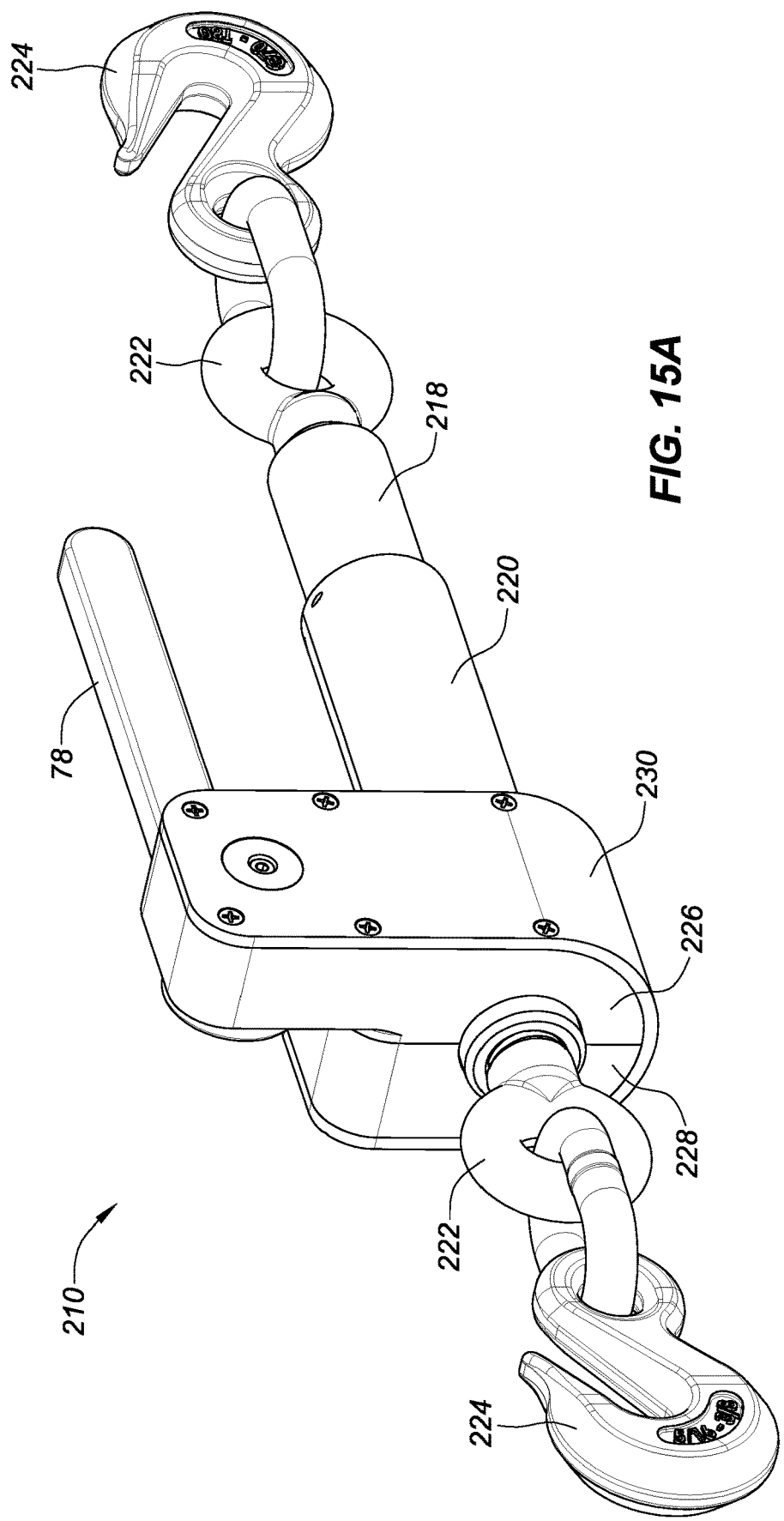
FIG. 15A is a perspective view of a load binder with an internal ratchet mechanism and a removable handle, consistent with other embodiments of the present invention.

FIG. 15A is a perspective view of a load binder with an internal ratchet mechanism and a removable handle, consistent with embodiments of the present disclosure. A load binder 210 can include a frame body 212, an external hex drive 214, a removable wrench handle 78, an internally threaded barrel 218 opposing open ends and with an external frame grip 220, where each end of the internally threaded barrel 218 is coupled with an eye bolt 222 and a grab hook 224. The grab hook 224 can couple with a binding member (e.g., a chain, a rope, a cable, a strap, etc.; not shown in FIG. 15A) for securing the load. The binding member can be one continuous element with each end coupling with one of the grab hooks 224, or each grab hook 224 can couple with a separate binding element. The frame body 212 can, in some embodiments comprise a left hand side (LHS) frame body 226 and a right hand side (RHS) frame body 228. The LHS frame body 226 can be secured to the RHS frame body 228 with one or more frame fasteners (not visible in FIG. 8A; see FIG. 8B).

The load binder 210 shown in FIG. 15A can be adjusted using different methods. For example, the external hex drive 214 can be coupled with a drive mechanism (not visible in FIG. 15A, see, e.g., FIGS. 16A-B and related discussion for more information). As the external hex drive 214 is rotated using the removable wrench handle 78, a hex drive tool (e.g., using a hand tool (i.e., a socket wrench, etc.) or a power tool (e.g., a cordless drill, etc.)) clockwise or counterclockwise, the internally threaded barrel 218 can rotate in a corresponding manner. The rotation of the internally threaded barrel 218 can, in turn, cause the threaded eye bolts 222 coupled with the internally threaded barrel 218, to move into the internally threaded barrel 218 (e.g., tightening the load binder 210; the distance between the two threaded eye bolts 222 decreases) or out of the internally threaded barrel 218 (e.g., loosening the load binder 210; the distance between the two threaded eye bolts 222 increases). The threaded eye bolts 222 (each with threads in opposing direction (i.e., opposing threaded shafts); e.g., one threaded eye bolt 222 has right-handed thread and the other threaded eye bolt 222 has left-handed threads) can be threadably coupled with the internally threaded barrel 218. The internally threaded barrel 218 can have internal threads (not shown in FIG. 15A) on each end that are opposite in direction (e.g., left-handed threads and right-handed threads; similar to a turnbuckle or other like device) corresponding to the thread direction of one of the threaded eye bolts 222 that facilitate the threaded eye bolts 222 moving in opposite directions (e.g., coming together/decreasing distance between them/contracting or moving apart/increasing distance/expanding between them) as the internally threaded barrel 218 is rotated one direction or the other direction and the threaded eye bolts 222 are not rotating.

A reversible ratchet mechanism (not shown in FIG. 15A; see FIGS. 17A-D, 18 and related discussion for more information) can be used to limit movement to a single direction. For example, in a first ratchet mechanism setting, the load binder 210 can be tightened (e.g., the internally threaded barrel 218 moves in a first barrel direction) and in a second ratchet mechanism setting, the load binder 210 can be loosened (e.g., the internally threaded barrel 218 moves in a second barrel direction).

Instead of or in addition to using the removable wrench handle 78, a tool (different hand or power tool) can be coupled with the external hex drive 214 and can be used to tighten or loosen the threaded eye bolts 222. The removable wrench handle 78 or the hand or the power tool can be used to engage a ratchet mechanism (not shown in FIG. 1A; see internal ratchet mechanism 82 in FIGS. 6A-D and related discussion) to rotate the internally threaded barrel 218 via the drive mechanism 234 and, in turn, tighten or loosen the load binder 210. The ratchet mechanism 82 can allow the handle to move the internally threaded barrel 218 (via the drive mechanism 234; not shown in FIG. 15A) on one stroke of the handle 78 (or the hand tool). For example, when the handle 78 is moved in a first handle direction (e.g., pulled downward; moving toward to internally threaded barrel 218) the internally threaded barrel 218 may not move (i.e., no change in the tightness of the load binder 210; no change in the distance between the two threaded eye bolts 22). Then, when the handle 78 is moved in a second handle direction (e.g., pushed upward; moving away from the internally threaded barrel 218) the threaded barrel 218 can move in a first barrel direction (i.e., tighten the load binder 210; decrease the distance between the two threaded eye bolts 222).

When a setting for the ratchet mechanism 82 is changed using the ratchet switch 84 (not shown in FIG. 15A; see FIGS. 17C-D, 18 and related discussion), movement of the handle 78 in the first handle direction can change the barrel movement direction to a second barrel direction (i.e., loosen the load binder 210; increase the distance between the two threaded eye bolts 222) and movement of the handle 78 in the second handle direction can have no effect on the threaded barrel direction (i.e., no change in the tightness of the load binder 210; no change in the distance between the two threaded eye bolts 222).

FIG. 15B is a partial perspective view of the load binder of FIG. 15A partially disassembled, consistent with embodiments of the present disclosure. The frame body 212 of FIGS. 15A-B can include an outer access cover 230 that is removably coupled with a portion of the frame body 212. One or more frame fasteners 230 can couple the LHS frame body with the RHS frame body together as shown in FIGS. 15A-B. This outer access cover 230 can allow a user to access the internal components of a drive mechanism 234 (i.e., single action mechanism; single action drive mechanism, etc.) for maintenance and service (e.g., lubrication and/or inspection of the drive mechanism). Removing the outer access cover 230 can provide access to a drive chain 236, portions of a driven link chain sheave, portions of a threaded barrel idler sheave (see FIGS. 16A-17D for more details about the drive mechanism 234). With the outer access cover 230 removed, visual inspection of the various components described above can be done and lubrication and/or cleaning of the drive mechanism 234 can be performed.

Figure 16A:
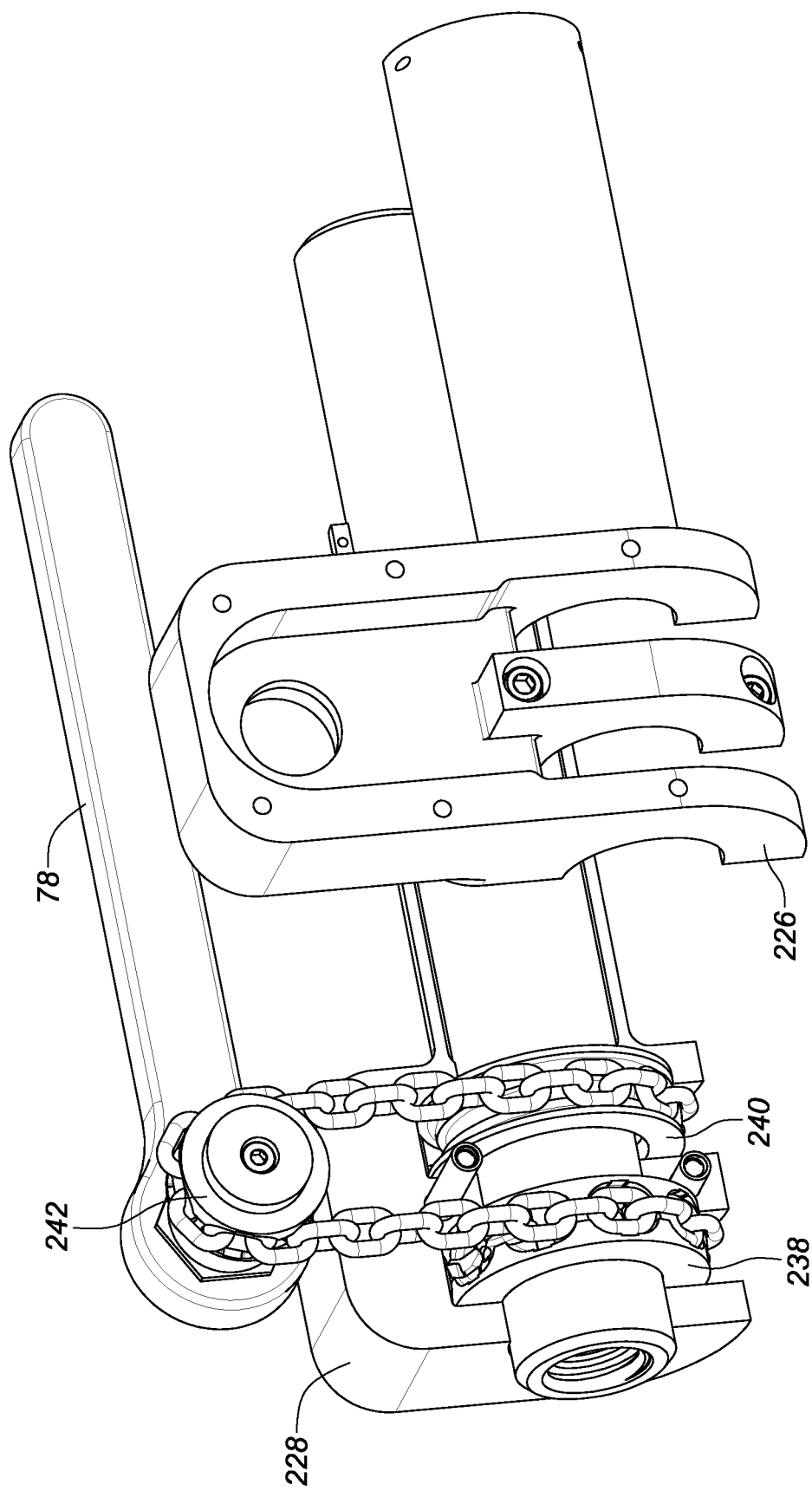
FIG. 16A is a partial perspective view showing elements of the load binder of FIG. 15A further disassembled, consistent with other embodiments of the present invention.

FIG. 16A is a partial perspective view of the load binder of FIGS. 15A-B further disassembled, consistent with embodiments of the present disclosure. After removal of the outer access cover 230 shown in FIG. 15B, the LHS frame body 226 can removed for additional access to portions of the load binder 210. With the LHS frame body 226 removed, additional access to portions of the driven link chain sheave, the threaded barrel idler sheave, and the primary link chain drive sheave are possible (see FIG. 16B and related discussion for more information). For example, half of the driven link chain sheave is accessible, half of the threaded barrel idler sheave is accessible, all of the primary link chain drive sheave is accessible, etc.).

FIG. 16B is a perspective detail view of the load binder of FIGS. 15A-16A omitting the frame body, consistent with embodiments of the present disclosure. FIG. 16B shows the load binder 210, the removable wrench handle 78, and the internally threaded barrel 218, without the frame body 212 (no outer access cover 230, no LHS frame body 226, no RHS frame body 228). As shown in FIG. 16B, the load binder 210 includes the driven link chain sheave 238, the internally threaded barrel idler sheave 240, and the primary link chain drive sheave 242, the drive chain 236, and a idler/slider 80.

Figure 17A:
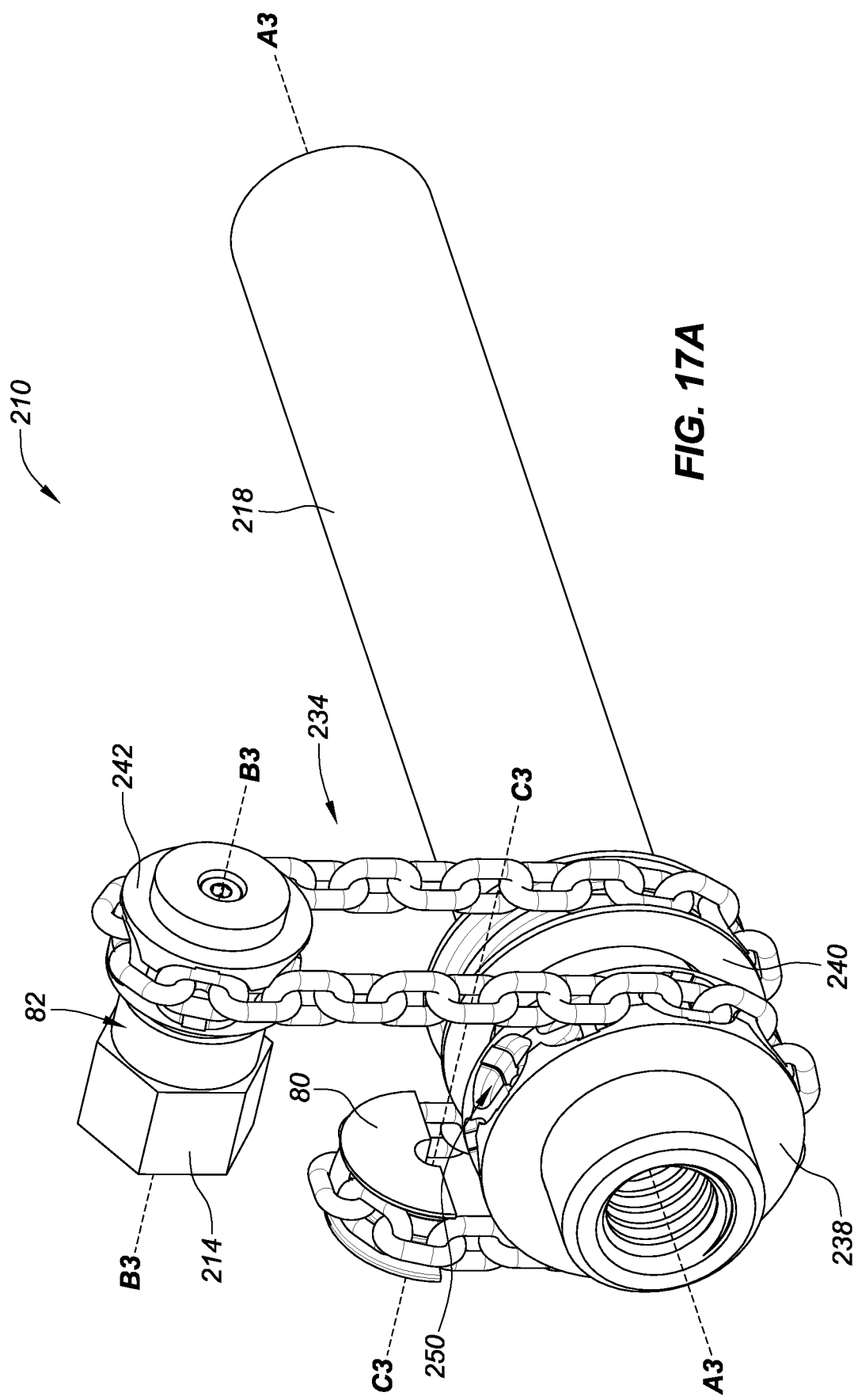
FIG. 17A is a perspective detail view of a drive mechanism and a threaded barrel of the load binder of FIGS. 15A-16B, consistent with other embodiments of the present invention.

FIG. 17A is a perspective detail view of the drive mechanism and the threaded barrel of the load binder of FIGS. 15A-16B, consistent with embodiments of the present disclosure. The load binder 210 includes the internally threaded barrel 218, and the drive mechanism 234 that includes the drive chain 236, the driven link chain sheave 238, the internally threaded barrel idler sheave 240, the primary link chain drive sheave 242, and the idler/slider 80. The primary link chain drive sheave 242, and the external nut 214) and can all be coaxially coupled with a drive shaft (hidden from view in FIG. 17A).

The single action drive mechanism 234 utilizes a closed loop of a flexible coupler (i.e., the drive chain 236, a link chain, a belt, or other similar item) arranged in a double saddle, or U-configuration around portions of the internally threaded barrel 218 and a primary link drive sheave 242, a internally threaded barrel idler sheave 240, and the idler/slider 80. The internally threaded barrel 218 can be aligned with axis represented by the line A3-A3, the primary link chain drive sheave 242 can be aligned with an axis represented by the line B3-B3, and the idler/slider 80 can be aligned with an axis represented by the line C3-C3 where A3-A3 and B3-B3 are approximately perpendicular, A3-A3 and C3-C3 are also approximately perpendicular (e.g., approximately 90° off in alignment) and B4-B4 and C4-C4 are approximately parallel, but offset by a distance.

In some embodiments the internally threaded barrel idler sheave 240 could be replaced with a secondary drive sheave (not shown in FIG. 17A; similar to the primary drive sheave 238).

As shown in FIG. 17A, an external hex drive 214 can be coupled with the primary link drive sheave 242. As the external hex drive 214 is rotated clockwise or counterclockwise, the internally threaded barrel 218 can spin in a corresponding manner. The rotation of the threaded barrel 218 can, in turn, cause the threaded eye bolts 222 coupled with the internally threaded barrel 218, to move into the internally threaded barrel 218 (e.g., tightening the load binder 210; the distance between the two threaded eye bolts 222 decreases) or out of the internally threaded barrel 218 (e.g., loosening the load binder 210; the distance between the two threaded eye bolts 222 increases).

FIG. 17A shows how the drive chain 236 couples with the various parts of the drive mechanism 234. Both the driven link chain sheave 238 and the primary link chain drive sheave 242 can include a plurality of sheave pockets 250 (i.e., recesses, openings, holes, etc.) that couples with an individual portion (e.g., one chain link) of the drive chain 236. Each of the pockets 250 can contact an outer portion of one of the chain links to transfer force between the drive chain 236 and the pockets 250. The coupling of chain links and the plurality of sheave pockets can minimize slippage of the drive chain 236 when the load binder 210 is adjusted by a user via the removable wrench handle (not shown in FIG. 17A) or the external hex drive 214. The pockets 250 can be shaped to accommodate a weld joint or other feature of the chain links of the drive chain 236. The primary link chain drive sheave 242 drives the drive chain 236 (i.e., force applied to the primary link chain drive sheave 242 is transferred to the drive chain) that, in turn, drives the driven link chain sheave 238 that rotates the internally threaded barrel.

In contrast, the internally threaded barrel idler sheave 240 does not have a plurality of pockets to couple with individual chain links of the drive chain 236. Instead, internally threaded barrel idler sheave 240 and the idler/slider 80 can each have a groove (i.e., channel, slot, etc.) configured to couple with portions of the drive chain 236, but not couple with individual chain links.

Figure 17B:
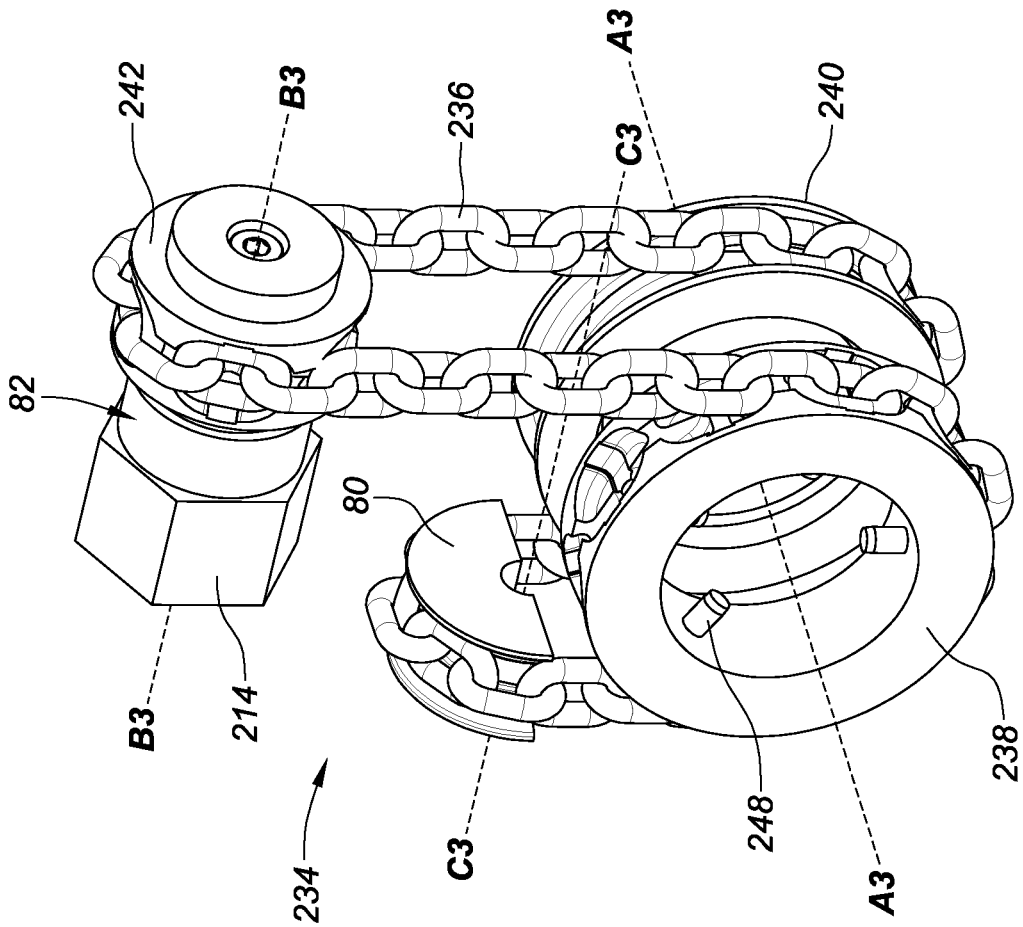
FIG. 17B is a perspective view of the drive mechanism of the load binder of FIGS. 15A-17A, consistent with other embodiments of the present invention.

FIG. 17B is a perspective view of the drive mechanism of the load binder of FIGS. 15A-17A, consistent with embodiments of the present disclosure. FIG. 17B shows the drive mechanism 234 of the load binder 210 without the removable wrench handle 78 and the internally threaded barrel 218, and without the frame body 212 (no outer access cover 230, no LHS frame body 226, no RHS frame body 228).

As shown in FIG. 17B, the drive mechanism 234 includes the driven link chain sheave 238, the internally threaded barrel idler sheave 240, and the primary link chain drive sheave 242, the drive chain 236, and the idler/slider 80. The driven link chain sheave 238 can be coupled with the threaded barrel (omitted in FIG. 17B) using a pin 248 or other fastener (e.g., a screw, a bolt, a rivet, etc.). Multiple pins 248 can be used to ensure that the driven link chain sheave 238 does not slip on the internally threaded barrel 218 when the drive mechanism 234 is engaged by a user via the removable wrench handle (not shown in FIG. 17B) or the external hex drive 214.

Figure 17D:
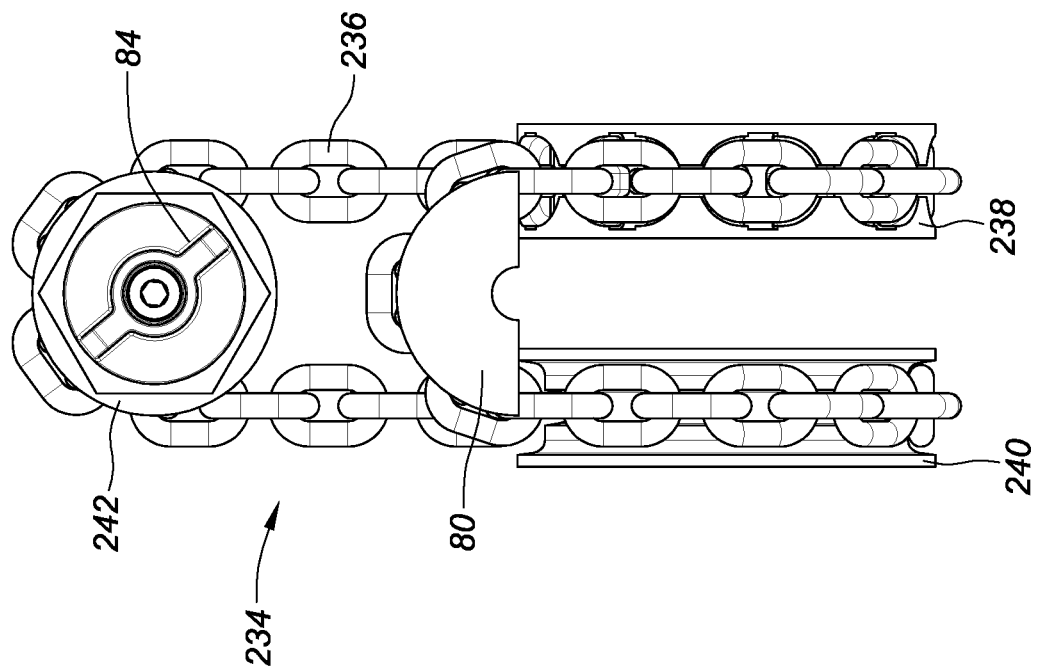
FIG. 17D is a side view of the drive mechanism of the load binder of FIGS. 17B-C, consistent with other embodiments of the present invention.
Figure 17C:
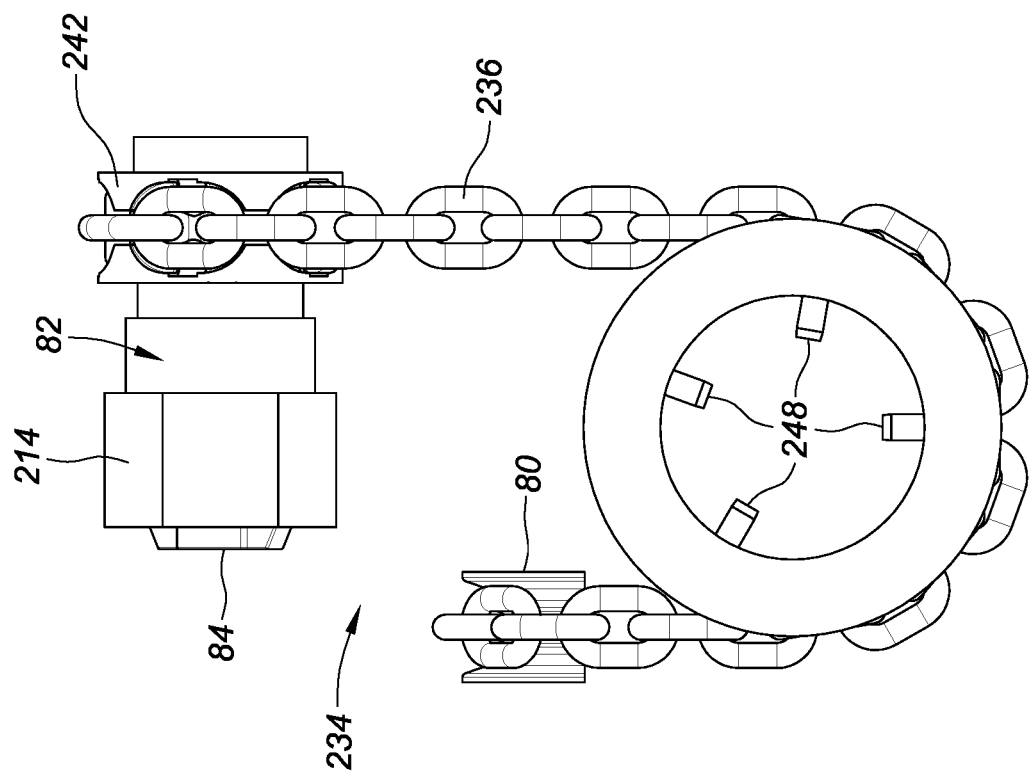
FIG. 17C is an end view of the drive mechanism of FIG. 17B, consistent with other embodiments of the present invention.

FIG. 17C is an end view of the drive mechanism of FIG. 17B, consistent with embodiments of the present disclosure. As seen in FIG. 17B, the drive mechanism 234 can include the driven link chain sheave 238, the internally threaded barrel idler sheave 240, and the primary link chain drive sheave 242, the drive chain 236, and the idler/slider 80. The driven link chain sheave 238 can be coupled with the threaded barrel (omitted in FIG. 17C) using a pin 248 or other fastener (e.g., a screw, a bolt, a rivet, etc.). Multiple pins 248 can be used to ensure that the driven link chain sheave 238 does not slip on the internally threaded barrel 218 when the drive mechanism 234 is engaged by a user via the handle (not shown in FIG. 17C) or the external hex drive 214. The pin 248 can be placed at any suitable location of the driven link chain sheave 238/internally threaded barrel 218. Any suitable number of pins 248 can be used (e.g., 1 pin, 2 pins, 3 pins, 4 pins, 5 pins, etc.).

FIG. 17C shows additional views (see also, FIGS. 17A-B) of the drive chain 236 coupling with the various parts of the drive mechanism 234. As discussed above, the driven link chain sheave 238, the primary link chain drive sheave 242 can each include a plurality of sheave pockets 250 (i.e., recesses, openings, holes, etc.) that each couple with an individual portion (e.g., one chain link) of the drive chain 236. The internally threaded barrel idler sheave 240 and the idler/slider 80 do not have a plurality of pockets (i.e., pocketless) to couple with individual chain links of the drive chain 236. Instead, internally threaded barrel idler sheave 240 and the idler/slider 80 can each have a groove (i.e., channel, slot, etc.) configured to couple with the drive chain 236, but not couple with individual chain links.

FIG. 17D is a side view of the drive mechanism of the load binder of FIGS. 17A-C, consistent with embodiments of the present disclosure. As shown in FIG. 17D, the drive mechanism 234 can include the driven link chain sheave 238, the internally threaded barrel idler sheave 240, and the primary link chain drive sheave 242, the drive chain 236, and the idler/slider 80. The driven link chain sheave 238 can be coupled with the threaded barrel (omitted in FIG. 17D) using a pin 248 or other fastener (e.g., a screw, a bolt, a rivet, etc.). The pockets 250 of the driven link chain sheave 238 (the pockets 250 of the primary link chain drive sheave 242 are hidden from view in FIG. 17D) and the groove 252 and the internally threaded barrel idler sheave 240 are visible in FIG. 17D.

Figure 18:
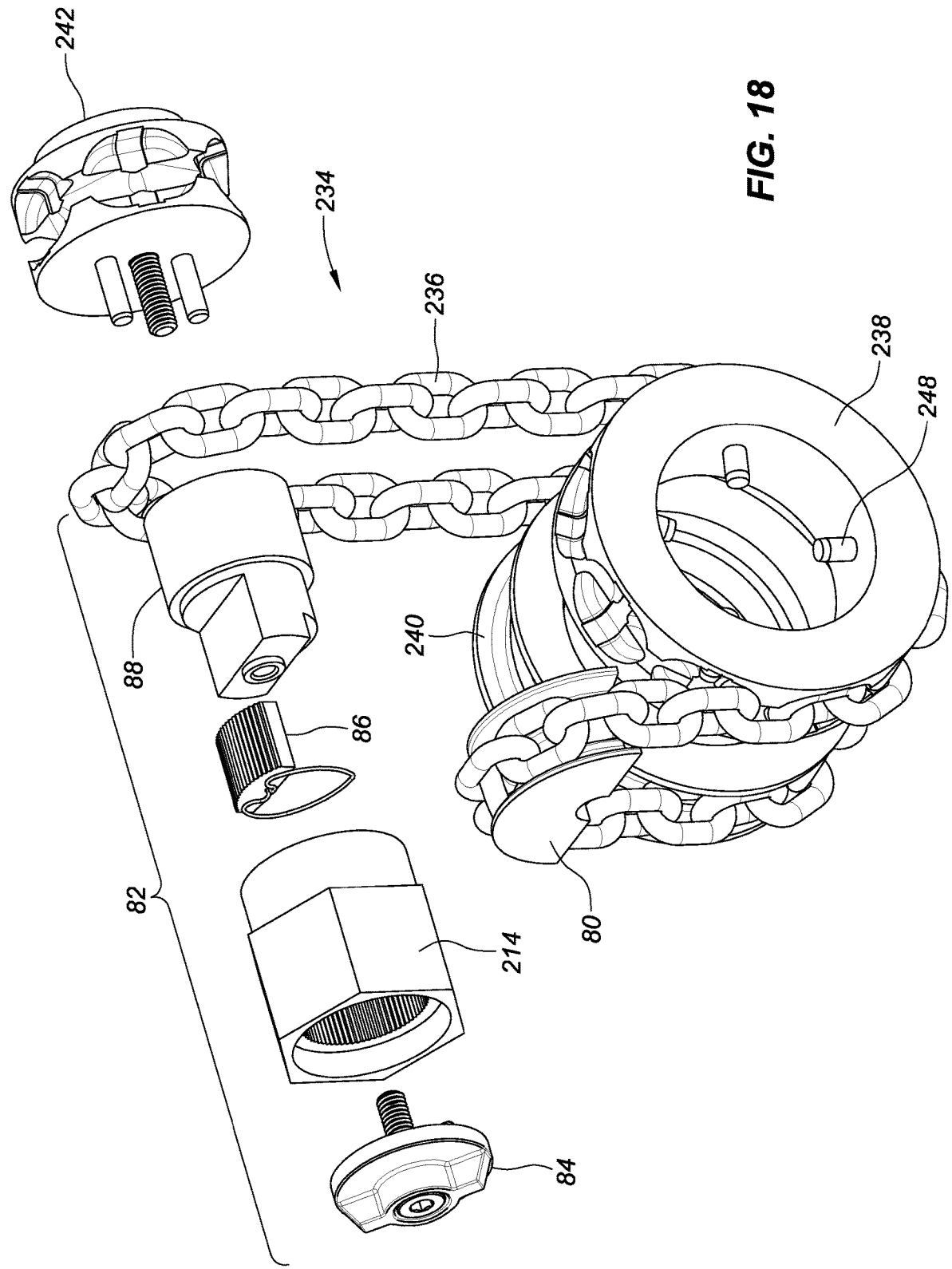
FIG. 18 is an exploded perspective view of the drive mechanism of FIGS. 17B-C, consistent with other embodiments of the present invention.

FIG. 18 is an exploded perspective view of the drive mechanism of FIGS. 17B-C, consistent with embodiments of the present disclosure. FIG. 18 shows the drive mechanism 234 that includes the an expanded view of drive mechanism 234 that includes the driven link chain sheave 238, the internally threaded barrel idler sheave 240, and the primary link chain drive sheave 242, the drive chain 236, and the idler/slider 80 and the internal ratchet mechanism 82 that includes the ratchet switch 84, the ratchet pawl and switch spring 86, the ratchet pawl support 88, and the external hex nut 214.

The ratchet switch 84 can be used to change the direction of the ratchet mechanism 82. For example, when the ratchet switch 84 is in a first ratchet switch position, the ratchet mechanism 82 can allow the externa hex nut 214 to drive the drive chain 236 (via the primary link chain drive sheave 242) in a first direction and when the ratchet switch 84 is in a second ratchet switch position, the ratchet mechanism 82 can allow the externa hex nut 214 to drive the drive chain 236 (via the primary link chain drive sheave 242) in a second direction. The ratchet switch 84 can have a third position that is a "neutral" position where the ratchet mechanism is not engaged.

Figure 19A:
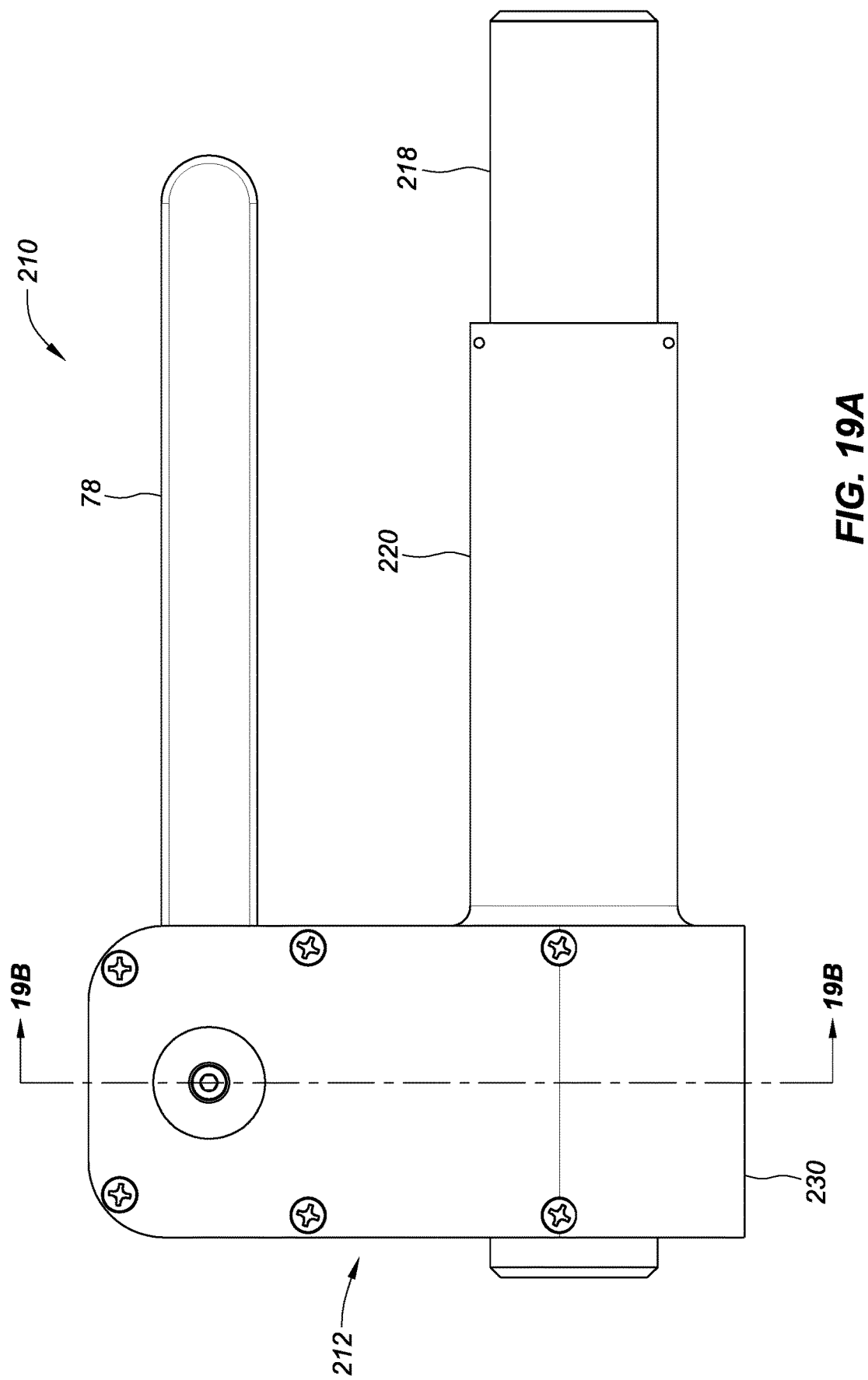
FIG. 19A is a side view of the load binder of FIGS. 15A-16B without the eye bolts and hooks, consistent with other embodiments of the present invention.

FIG. 19A is a side view of the load binder of FIGS. 15A-16B without the eye bolts and hooks, consistent with embodiments of the present disclosure. The load binder 210 can include the frame body 212, the external hex drive 214 (hidden from view in FIG. 19A; see FIG. 19B), the removable wrench handle 78, the internally threaded barrel 218 with the external frame grip 220 and the outer access cover 230. The LHS frame body 226 is hidden from view behind the outer access cover 230 in FIG. 19A, and the RHS frame body 228 is hidden from view behind the LHS frame body 226 (see FIG. 19B). Line 19B-19B indicates a location of a cross-sectional view of the load binder 210 (see FIG. 19B and related discussion).

Figure 19B:
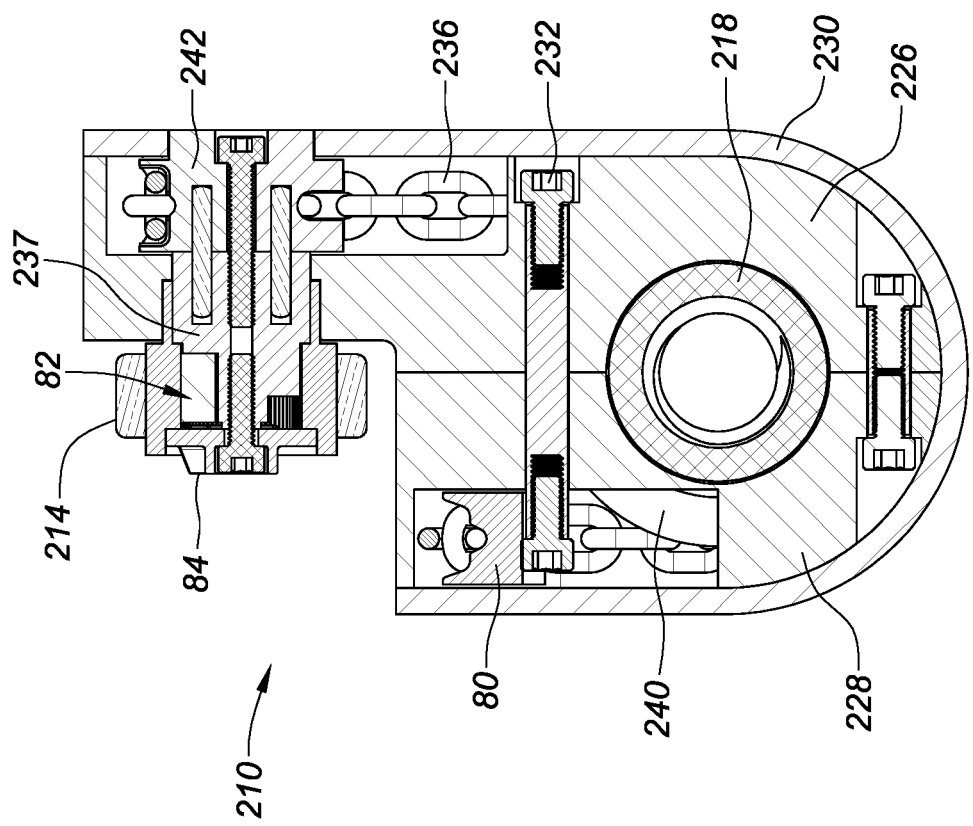
FIG. 19B is a cross-sectional view of the load binder of FIG. 19A along the line 19B-19B shown in FIG. 19A, consistent with other embodiments of the present invention.

FIG. 19B is a cross-sectional view of the load binder of FIG. 19A along the line 19B-19B shown in FIG. 19A, consistent with embodiments of the present disclosure. The cross-sectional view of load binder 210 includes the internally threaded barrel 218, the LHS frame body 226, the RHS frame body 228, the outer cover 230, frame fasteners 232, the link chain 236, the internally threaded barrel idler sheave 240, the idler/slider 80, the internal ratchet mechanism 82, ratchet switch 84, a drive shaft or drive sleeve 237, and the external hex nut 214. Preferably, the primary link chain drive sheave 242 is secured to the drive shaft or drive sleeve 237 which functions as a drive shaft which rotates to drive the primary link chain drive sheave 242 when rotated by the removable wrench handle 78 via the internal rachet mechanism 82.

Figure 20A:
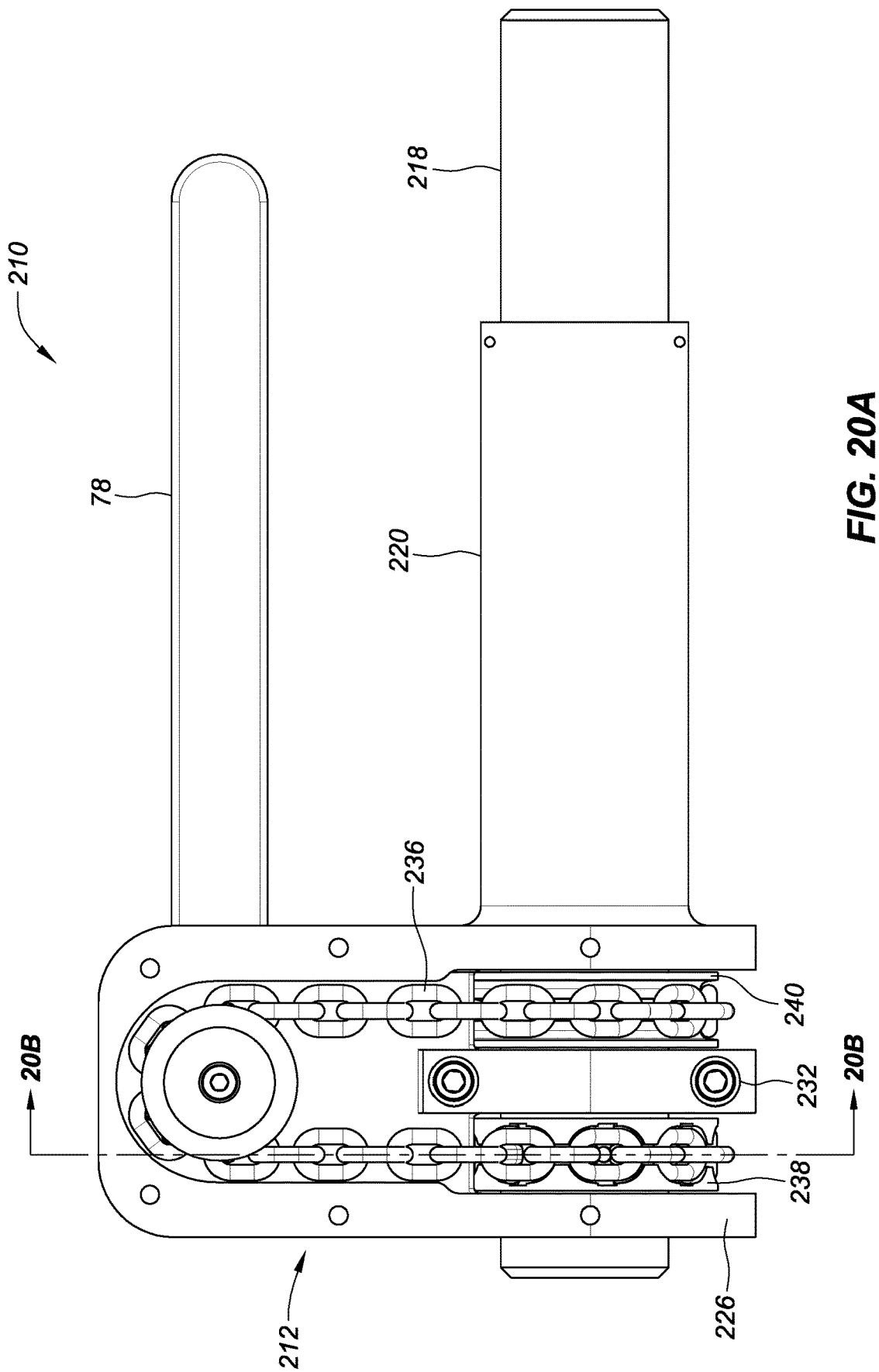
FIG. 20A is a side view of the load binder of FIG. 19A partially disassembled, consistent with other embodiments of the present invention.

FIG. 20A is a side view of the load binder of FIG. 19A partially disassembled, consistent with embodiments of the present disclosure. The load binder 210 can include the frame body 212, the external hex drive 214 (hidden from view in FIG. 20A; see FIG. 20B), the removable wrench handle 78, the internally threaded barrel 218 with the external frame grip 220, frame body fasteners 232, the drive chain 236, the driven link chain sheave 238, the internally threaded barrel idler sheave 240. The RHS frame body 228 is hidden from view behind the LHS frame body 226. Line 20B-20B indicates a location of a cross-sectional view of the load binder 210 (see FIG. 20B and related discussion).

Figure 20B:
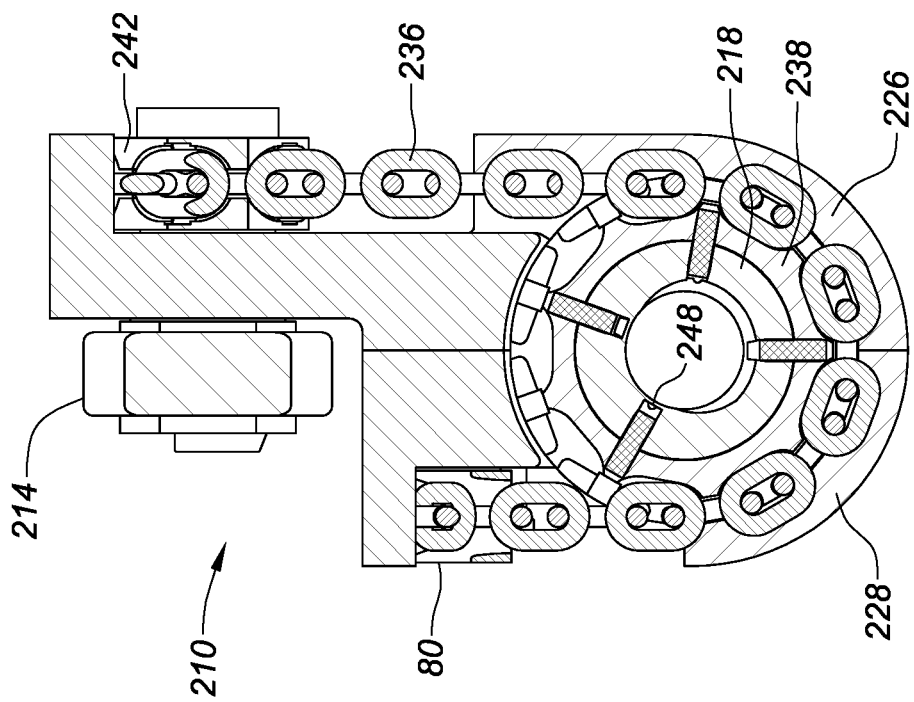
FIG. 20B is a cross-sectional view of the load binder of FIG. 19A along the line 20A-20A shown in FIG. 20A, consistent with other embodiments of the present invention.

FIG. 20B is a cross-sectional view of the load binder of FIG. 19A along the line 20A-20A shown in FIG. 20A, consistent with embodiments of the present disclosure. The cross-sectional view of load binder 210 includes the external hex drive 214, the internally threaded barrel 218, the LHS frame body 226, the RHS frame body 228, the drive chain 236, the driven link chain sheave 238, the primary link chain drive sheave 242, the idler/slider 80, and the pin 248.

Figure 21A:
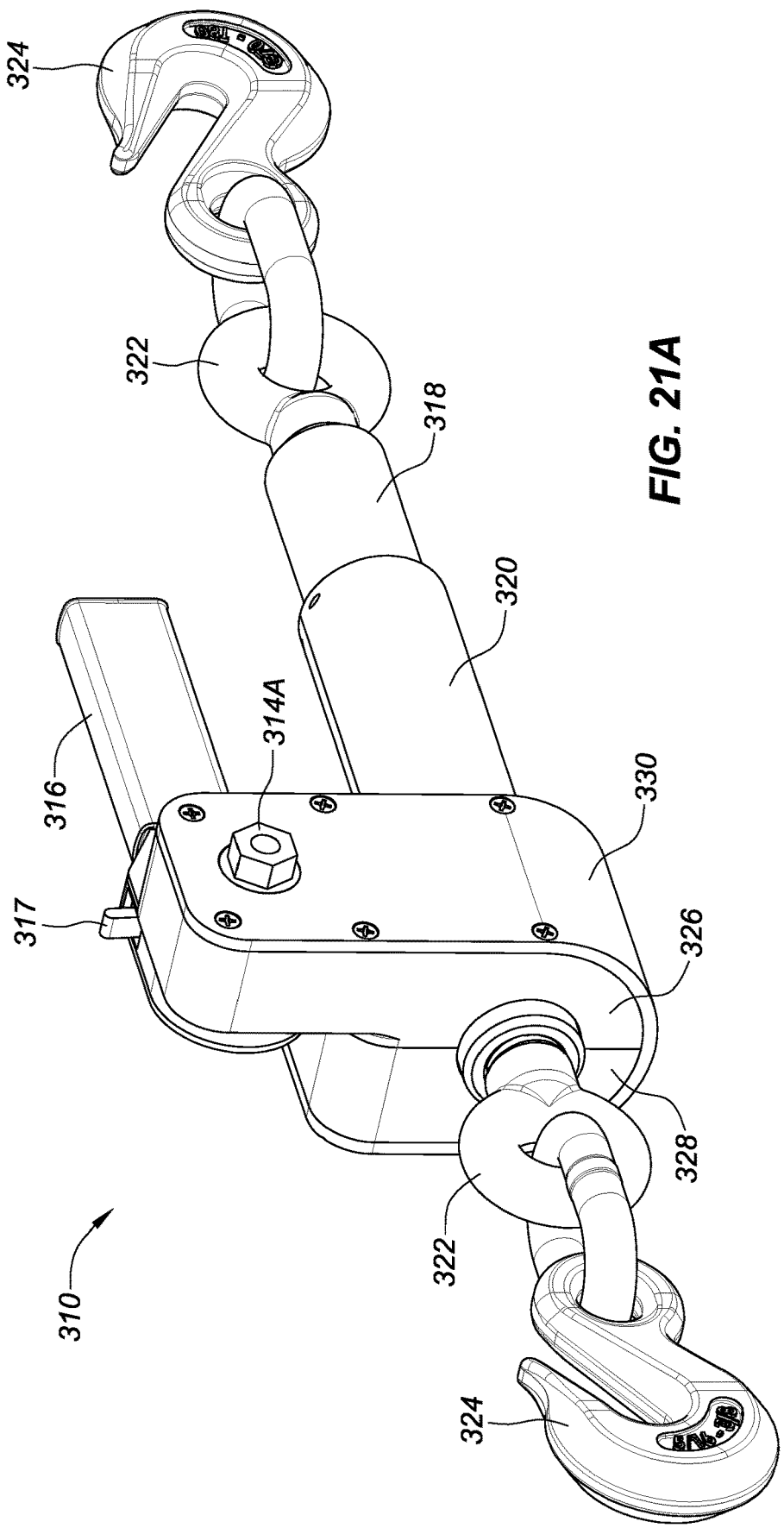
FIG. 21A is a perspective view of a load binder with an internal ratchet mechanism and a removable handle, consistent with other embodiments of the present invention.

FIG. 21A is a perspective view of a load binder with an internal ratchet mechanism and a removable handle, consistent with embodiments of the present disclosure. A load binder 310 can include a frame body 312, an external hex drive 314A, a removable ratchet handle or hex drive tool 316 with ratchet direction lever 317, an internally threaded barrel 318 opposing open ends and with an external frame grip 320, where each end of the internally threaded barrel 318 is coupled with an eye bolt 322 and a grab hook 324. The grab hook 324 can couple with a binding member (e.g., a chain, a rope, a cable, a strap, etc.; not shown in FIG. 21A) for securing the load. The binding member can be one continuous element with each end coupling with one of the grab hooks 324, or each grab hook 324 can couple with a separate binding element. The frame body 312 can, in some embodiments comprise a left hand side (LHS) frame body 326 and a right hand side (RHS) frame body 328. The LHS frame body 326 can be secured to the RHS frame body 328 with one or more frame fasteners (not visible in FIG. 21A; see FIG. 21B). In alternate embodiments, the hex drive tool can be a hand tool such as a socket wrench, ratcheting wrench or drive, or a power tool such as a cordless drill, electric drill, air wrench, and so forth.

The load binder 310 shown in FIG. 21A can be adjusted using different methods. For example, the external hex drive 94 can be coupled with a drive mechanism (not visible in FIG. 21A; see FIGS. 22A-B and related discussion for more information). As the external hex drive 94 is rotated using the ratchet handle 90, a hex drive tool (e.g., using a hand tool (i.e., a socket wrench, etc.) or a power tool (e.g., a cordless drill, etc.)) clockwise or counterclockwise, the internally threaded barrel 318 can rotate in a corresponding manner. The rotation of the internally threaded barrel 318 can, in turn, cause the threaded eye bolts 322 coupled with the internally threaded barrel 318, to move into the internally threaded barrel 318 (e.g., tightening the load binder 310; the distance between the two threaded eye bolts 322 decreases) or out of the internally threaded barrel 318 (e.g., loosening the load binder 310; the distance between the two threaded eye bolts 322 increases). The threaded eye bolts 322 (each with threads in opposing direction (i.e., opposing threaded shafts); e.g., one threaded eye bolt 322 has right-handed thread and the other threaded eye bolt 322 has left-handed threads) can be threadably coupled with the internally threaded barrel 318. The internally threaded barrel 318 can have internal threads (not shown in FIG. 21A) on each end that are opposite in direction (e.g., left-handed threads and right-handed threads; similar to a turnbuckle or other like device) corresponding to the thread direction of one of the threaded eye bolts 322 that facilitate the threaded eye bolts 322 moving in opposite directions (e.g., coming together/decreasing distance between them/contracting or moving apart/increasing distance/expanding between them) as the internally threaded barrel 318 is rotated one direction or the other direction and the threaded eye bolts 322 are not rotating.

The removable ratchet handle 316 can be used to tighten or loosen the threaded eye bolts 322. The removable ratchet handle 316 can be used to engage a ratchet mechanism (not visible in FIG. 21A; see FIGS. 6A-7D and related discussion) used to rotate the internally threaded barrel 318 via the drive mechanism 334 and, in turn, tighten or loosen the load binder 310. A ratchet mechanism (see ratchet mechanism 58 in FIGS. 6A-7D and related discussion) can allow the removable ratchet handle 316 to move the internally threaded barrel 318 (via the drive mechanism 334; not shown in FIG. 21A) on one stroke of the removable ratchet handle 316. For example, when the removable ratchet handle 316 is moved in a first handle direction (e.g., pulled downward; moving toward to internally threaded barrel 318) the internally threaded barrel 318 may not move (i.e., no change in the tightness of the load binder 310; no change in the distance between the two threaded eye bolts 322). Then, when the removable ratchet handle 316 is moved in a second handle direction (e.g., pushed upward; moving away from the internally threaded barrel 318) the threaded barrel 318 can move in a first barrel direction (i.e., tighten the load binder 310; decrease the distance between the two threaded eye bolts 322).

When a setting for the ratchet mechanism is changed using the ratchet direction levers 117, movement of the removable ratchet handle 316 in the first direction can cause a different movement direction of the internally threaded barrel 318—a second barrel movement direction (i.e., loosen the load binder 310; increase the distance between the two threaded eye bolts 322) and movement of the removable ratchet handle 316 in the second direction can also move the internally threaded barrel 318 in the second barrel direction (i.e., loosen the load binder 310; increase the distance between the two threaded eye bolts 322). See FIGS. 6A-7D and related discussion for more information.

FIG. 21B is a partial perspective view of the load binder of FIG. 21A partially disassembled, consistent with embodiments of the present disclosure. The frame body 312 of FIGS. 21A-B can include an outer access cover 330 that is removably coupled with a portion of the frame body 312. One or more frame fasteners 330 can couple the LHS frame body with the RHS frame body together as shown in FIGS. 21A-B. This outer access cover 330 can allow a user to access the internal components of a drive mechanism 334 (i.e., single action mechanism; single action drive mechanism, etc.) for maintenance and service (e.g., lubrication and/or inspection of the drive mechanism). Removing the outer access cover 330 can provide access to a drive chain 336, portions of a driven link chain sheave, portions of a threaded barrel idler sheave (see FIGS. 22A-23C for more details about the drive mechanism 334). With the outer access cover 330 removed, visual inspection of the various components described above can be done and lubrication and/or cleaning of the drive mechanism 334 can be performed.

Figure 22A:
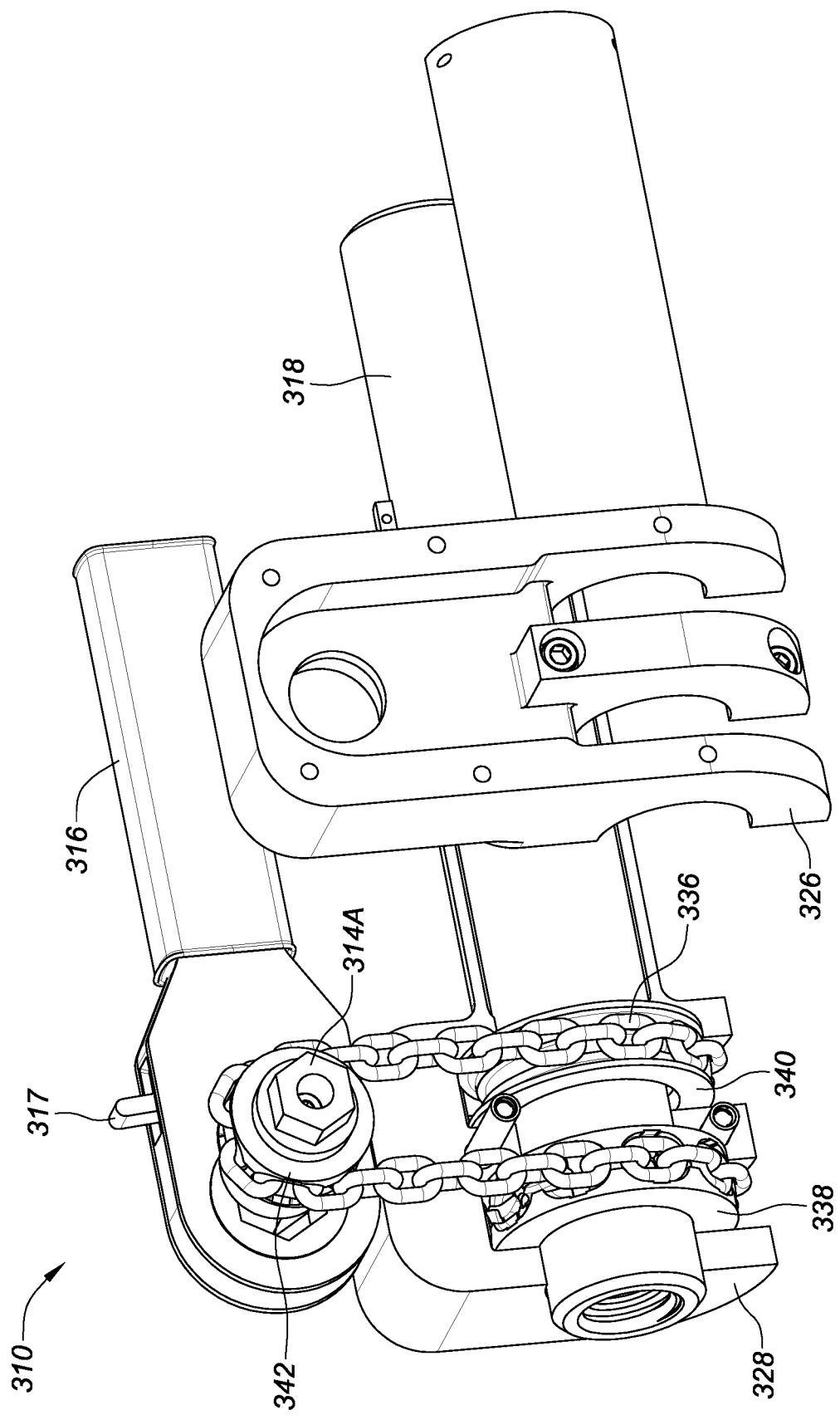
FIG. 22A is a partial perspective view showing elements of the load binder of FIGS. 21A-B further disassembled, consistent with other embodiments of the present invention.

FIG. 22A is a partial perspective view of the load binder of FIGS. 21A-B further disassembled, consistent with embodiments of the present disclosure. After removal of the outer access cover 330 shown in FIG. 21B, the LHS frame body 326 can removed for additional access to portions of the load binder 310. With the LHS frame body 326 removed, additional access to portions of the driven link chain sheave, the threaded barrel idler sheave, and the primary link chain drive sheave are possible (see FIG. 22B and related discussion for more information). For example, half of the driven link chain sheave is accessible, half of the threaded barrel idler sheave is accessible, all of the primary link chain drive sheave is accessible, etc.).

Figure 22B:
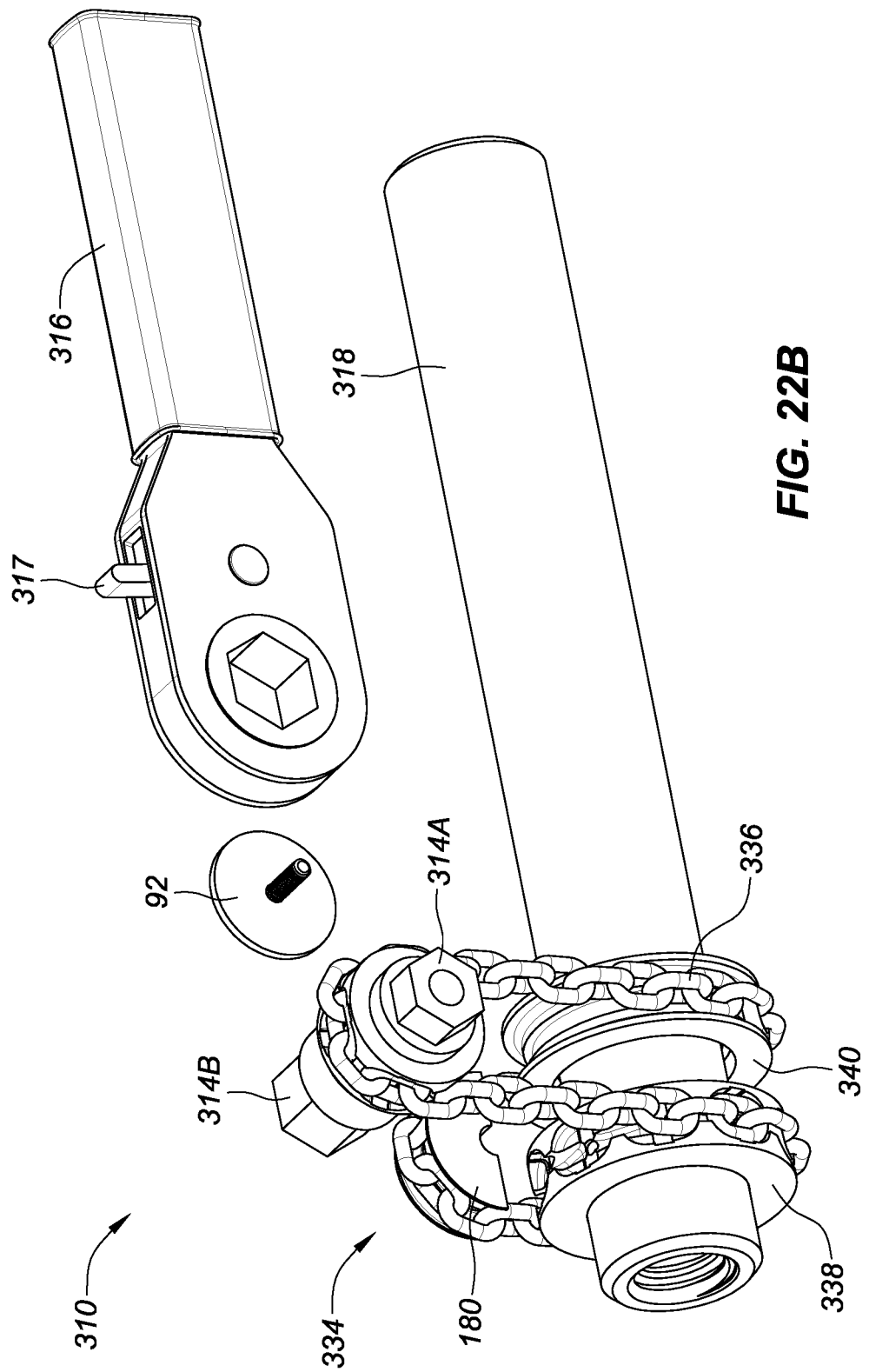
FIG. 22B is a perspective detail view of the load binder of FIGS. 21A-22A still further disassembled and omitting the frame body, consistent with other embodiments of the present invention.

FIG. 22B is a perspective detail view of the load binder of FIGS. 21A-22A omitting the frame body, consistent with embodiments of the present disclosure. FIG. 22B shows the load binder 310, the removable ratchet handle 316, the ratchet direction lever 117, a wrench fixing washer/bolt 92, and the internally threaded barrel 318, with the frame body 312 omitted (no outer access cover 330, no LHS frame body 326, no RHS frame body 328). As shown in FIG. 22B, the load binder 310 includes the driven link chain sheave 338, the internally threaded barrel idler sheave 340, and the primary link chain drive sheave 342, the drive chain 336, and an idler/slider 180. The wrench fixing washer/bolt 92 is optional, and can help keep (i.e., fix, lock, couple, engage, etc.) the removable ratchet handle 316 in contact with the external nut 314B. In some embodiments without the wrench fixing washer/bolt 92, the removable ratchet handle 316 (or other hand or power tool) can be engaged with the externa nut 314B as needed (e.g., during loosening or tightening of the load binder and not during transit or storage) and not fixed in place.

Figure 23A:
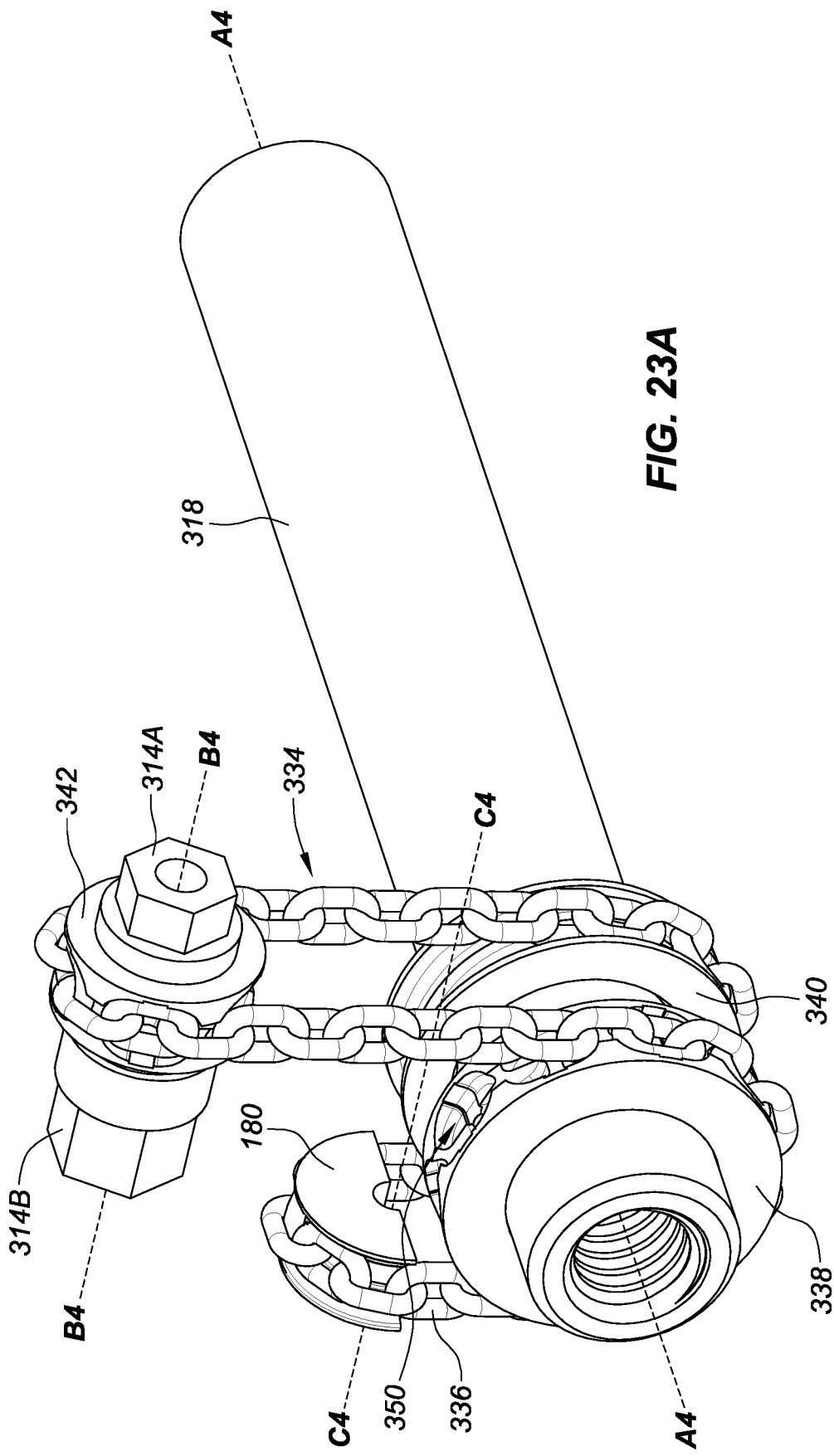
FIG. 23A is a perspective detail view of the drive mechanism and a threaded barrel of the load binder of FIGS. 21A-22B, consistent with other embodiments of the present invention.

FIG. 23A is a perspective detail view of the drive mechanism and the threaded barrel of the load binder of FIGS. 21A-22B, consistent with embodiments of the present disclosure. The load binder 310 includes the internally threaded barrel 318, and the drive mechanism 334 that includes the drive chain 336, the driven link chain sheave 338, the internally threaded barrel idler sheave 340, the primary link chain drive sheave 342, and the idler/slider 180. The primary link chain drive sheave 342, the secondary link idler sheave 344, and the external nuts 314A and 314B and can all be coaxially coupled with a drive shaft (hidden from view in FIG. 23A). FIG. 23A shows the removable ratchet handle 316 separated from the rest of the load binder 310 for viewing purposes. The removable ratchet handle 316 includes ratchet direction lever 317 and ratchet mechanism 58 (partially hidden from view; see FIGS. 6A-7D and related discussion for more information) where portions of the ratchet mechanism 58 couple (i.e., engage) with the external nut 314B.

The single action drive mechanism 334 utilizes a closed loop of a flexible coupler (i.e., the drive chain 336, a link chain, a belt, or other similar item) arranged in a double saddle, or U-configuration around portions of the internally threaded barrel 318 and a primary link drive sheave 342, a internally threaded barrel idler sheave 340, and the idler/slider 180. The internally threaded barrel 318 can be aligned with axis represented by the line A4-A4 and the primary link chain drive sheave can be aligned with an axis represented by the line B4-B4, and the idler/slider 180 can be aligned with an axis represented by the line C4-C4 where A4-A4 and B4-B4 are approximately perpendicular, A4-A4 and C4-C4 are also approximately perpendicular (e.g., approximately 90° off in alignment) and B4-B4 and C4-C4 are approximately parallel, but offset by a distance.

In some embodiments the internally threaded barrel idler sheave 340 could be replaced with a secondary drive sheave (not shown in FIG. 23A; similar to the primary drive sheave 338).

As shown in FIG. 23A, an external hex drive 314A can be coupled with the primary link drive sheave 342. As the external hex drives 314A or 314B is rotated clockwise or counterclockwise, the internally threaded barrel 318 can spin in a corresponding manner. The rotation of the threaded barrel can, in turn, cause the threaded eye bolts 322 coupled with the internally threaded barrel 318, to move into the internally threaded barrel 318 (e.g., tightening the load binder 310; the distance between the two threaded eye bolts 322 decreases) or out of the internally threaded barrel 318 (e.g., loosening the load binder 310; the distance between the two threaded eye bolts 322 increases).

FIG. 23A shows how the drive chain 336 couples with the various parts of the drive mechanism 334. Both the driven link chain sheave 338 and the primary link chain drive sheave 342 can include a plurality of sheave pockets 350 (i.e., recesses, openings, holes, etc.) that couples with (i.e., engages, contacts, etc.) an individual portion (e.g., one chain link) of the drive chain 336. Each of the pockets can contact an outer portion of one of the chain links to transfer force between the drive chain 336 and the pockets. The coupling of chain links and the plurality of sheave pockets can minimize slippage of the drive chain 336 when the load binder 310 is adjusted by a user via the handle (not shown in FIG. 23A) or the external hex drives 314A or 314B. The pockets 350 can be shaped to accommodate a weld joint or other feature of the chain links of the drive chain 336.

In contrast, the internally threaded barrel idler sheave 340 does not have a plurality of pockets to couple with individual chain links of the drive chain 336. Instead, internally threaded barrel idler sheave 340 can have a groove (i.e., channel, slot, etc.) configured to couple with portions of the drive chain 336, but not couple with individual chain links. The internally threaded barrel idler sheave 340 is driven by the drive chain 336.

Figure 23C:
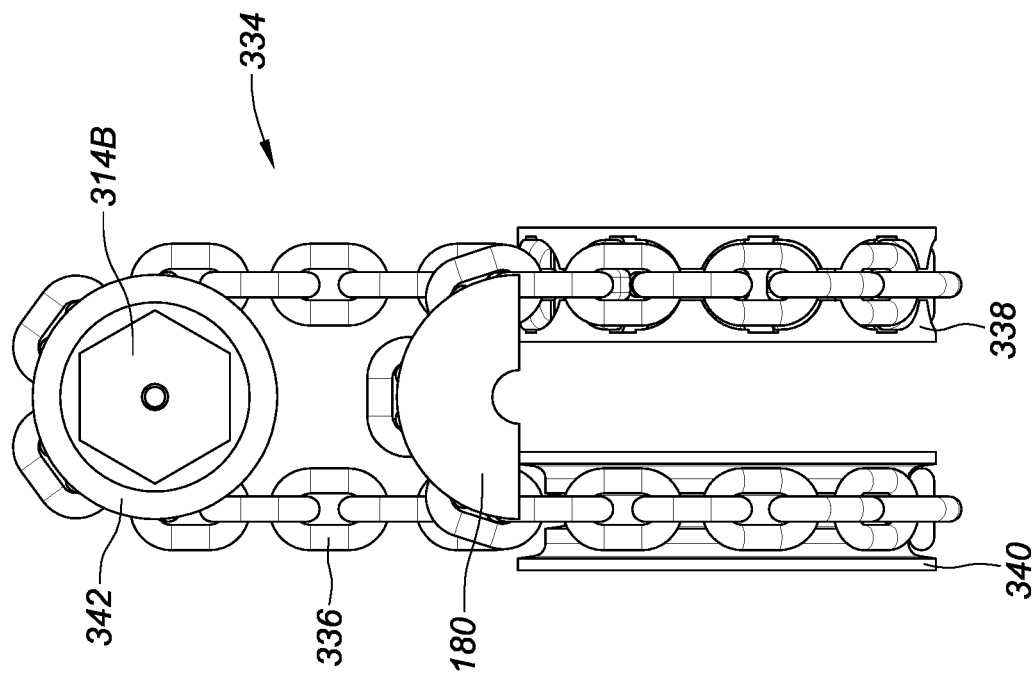
FIG. 23C is a side view of the drive mechanism of the load binder of FIGS. 21A-23A, consistent with other embodiments of the present invention.
Figure 23B:
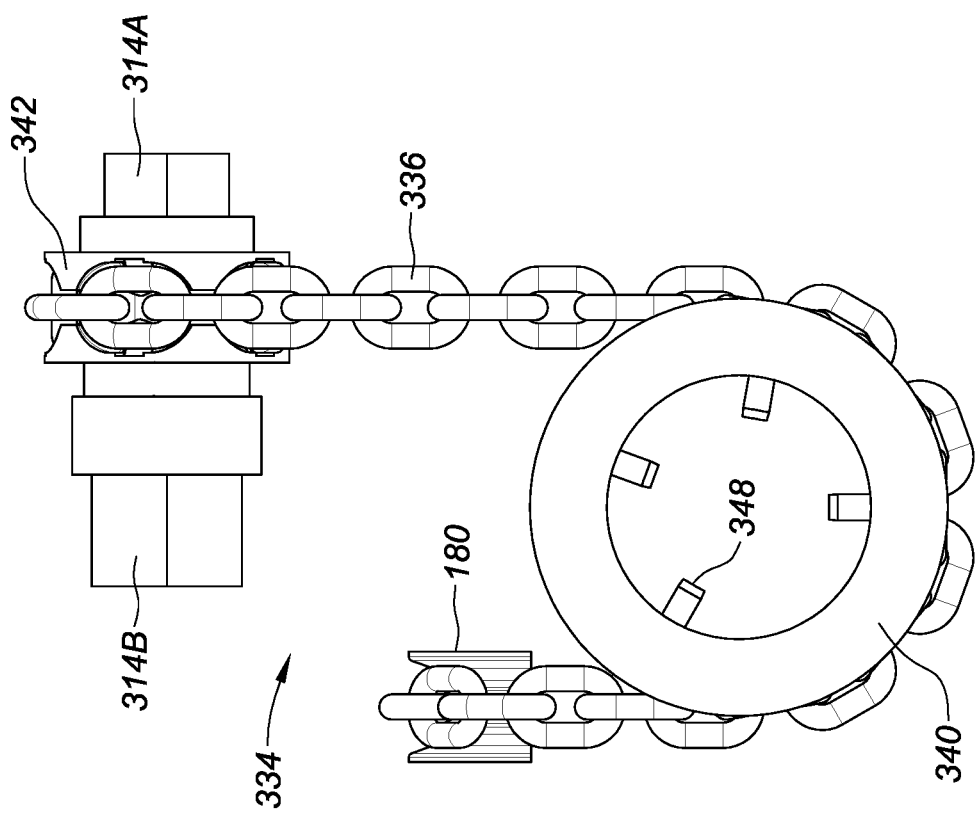
FIG. 23B is an end view of the drive mechanism of the load binder of FIGS. 21A-23A, consistent with other embodiments of the present invention.

FIG. 23B is an end view of the drive mechanism of the load binder of FIGS. 21A-23A, consistent with embodiments of the present disclosure. FIG. 23B shows the drive mechanism 334 of the load binder 3110 with the removable ratchet handle 316, the internally threaded barrel 318, and the frame body 312 omitted (no internally threaded barrel 318, no outer access cover 330, no LHS frame body 326, no RHS frame body 328).

As shown in FIG. 23B, the drive mechanism 334 includes the driven link chain sheave 338, the internally threaded barrel idler sheave 340, and the primary link chain drive sheave 342, the drive chain 136, and the idler/slider 180. The driven link chain sheave 338 can be coupled with the threaded barrel (omitted in FIG. 24B) using a pin 348 or other fastener (e.g., a screw, a bolt, a rivet, etc.). Multiple pins 348 can be used to ensure that the driven link chain sheave 338 does not slip on the internally threaded barrel 318 when the drive mechanism 334 is engaged by a user via the removable ratchet handle (not shown in FIG. 24B) or the external hex drives 314A or 314B (using another tool such as, for example, a power tool).

FIG. 23C is a side view of the drive mechanism of FIG. 23A-B, consistent with embodiments of the present disclosure. As seen in FIG. 23C, the drive mechanism 334 can include the driven link chain sheave 338, the internally threaded barrel idler sheave 340, and the primary link chain drive sheave 342, the drive chain 336, and the idler/slider 180. The driven link chain sheave 338 can be coupled with the threaded barrel (omitted in FIG. 23C) using a pin 348 or other fastener (e.g., a screw, a bolt, a rivet, etc.). Multiple pins 348 can be used to ensure that the driven link chain sheave 338 does not slip on the internally threaded barrel 318 when the drive mechanism 334 is engaged by a user via the removable ratchet handle (not shown in FIG. 23C) or the external hex drives 114A or 114B. The pin 348 can be placed at any suitable location of the driven link chain sheave 338/internally threaded barrel 318. Any suitable number of pins 348 can be used (e.g., 1 pin, 2 pins, 3 pins, 4 pins, 5 pins, etc.).

Figure 24:
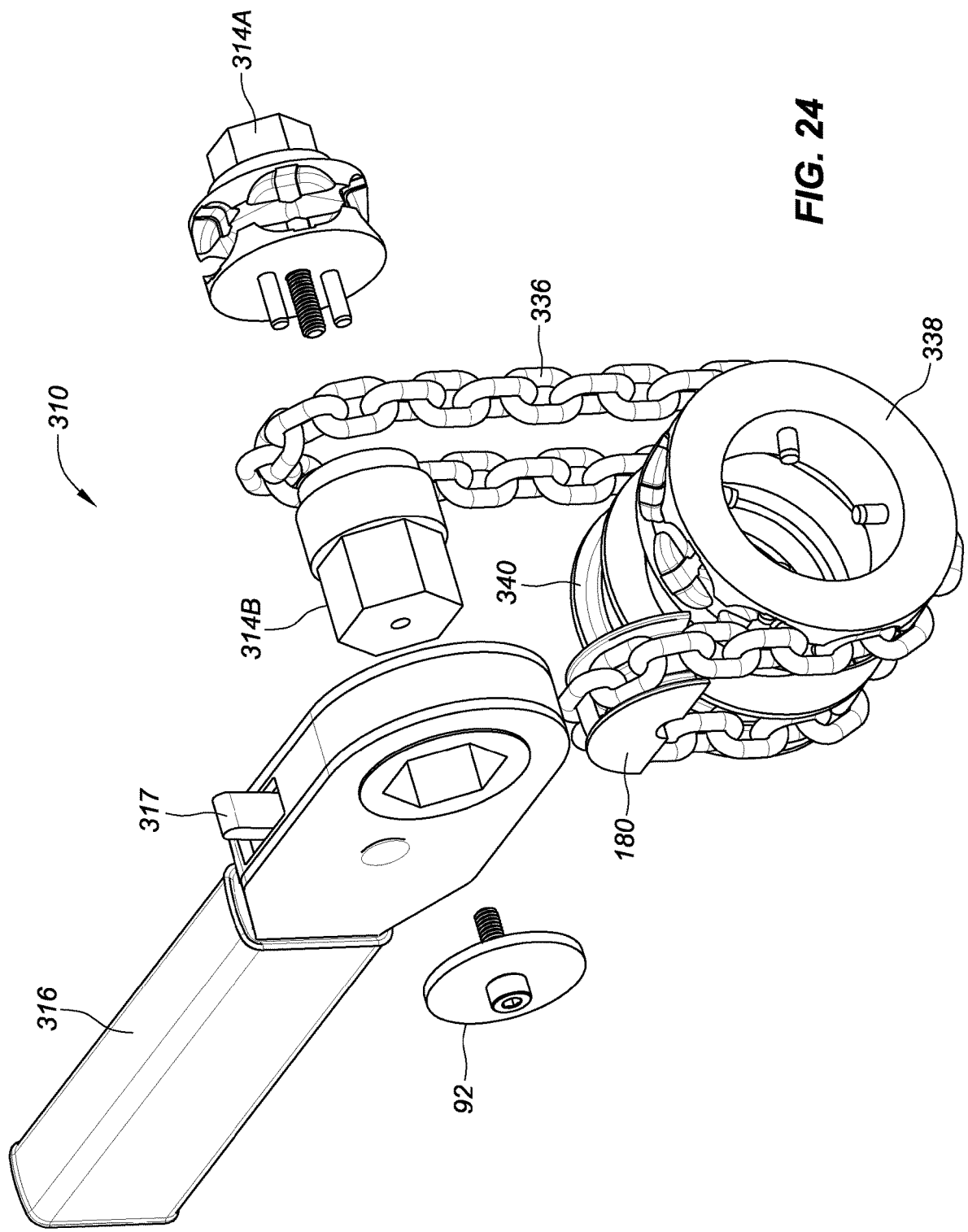
FIG. 24 is an exploded perspective view of the drive mechanism of FIGS. 23A-C and the removable ratchet handle, consistent with other embodiments of the present invention.

FIG. 24 is an exploded perspective view of the drive mechanism of FIGS. 23A-C and the removable ratchet handle, consistent with embodiments of the present disclosure. FIG. 24 shows additional views (see also, FIGS. 23A-B) of the drive chain 336 coupling with the various parts of the drive mechanism 334. As discussed above, the driven link chain sheave 338 and the primary link chain drive sheave 342 can each include a plurality of sheave pockets 350 (i.e., recesses, openings, holes, etc.) that each couple with an individual portion (e.g., one chain link) of the drive chain 336. The internally threaded barrel idler sheave 340 and the idler/slider 180 do not have a plurality of pockets (i.e., pocketless) to couple with individual chain links of the drive chain 136. Instead, internally threaded barrel idler sheave 340 and the idler/slider 180 can each have a groove (i.e., channel, slot, etc.) configured to couple with the drive chain 336, but not couple with individual chain links. The internally threaded barrel idler sheave 340 is driven by the drive chain 336.

Figure 25B:
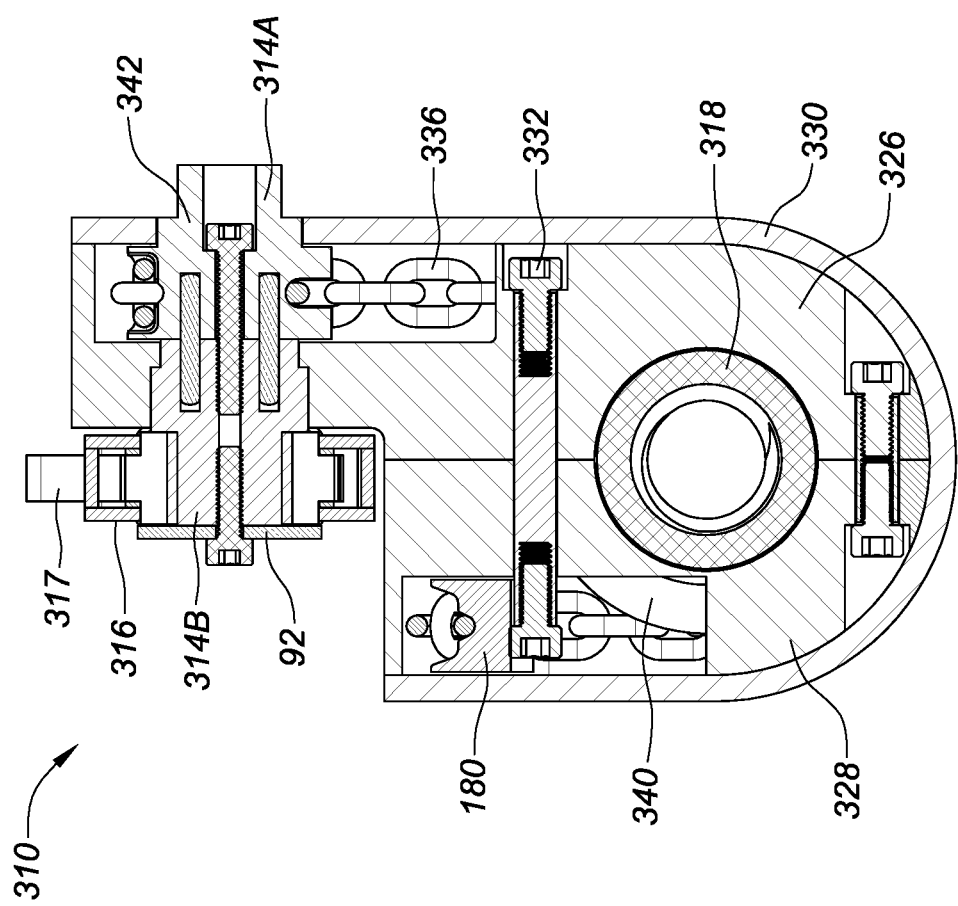
FIG. 25B is a cross-sectional view of the load binder of FIG. 20A along the line 25B-25B shown in FIG. 25A, consistent with other embodiments of the present invention.

FIG. 25A is a side view of the load binder of FIGS. 21A-22B without the eye bolts and hooks, consistent with embodiments of the present disclosure. The load binder 310 can include the frame body 312, the external hex drive 314A, the removable ratchet handle 316 with the ratchet direction lever 317, the internally threaded barrel 318 with the external frame grip 320 and the outer access cover 330. The LHS frame body 326 is hidden from view behind the outer access cover 330 in FIG. 25A, and the RHS frame body 328 is hidden from view behind LHS frame body 326 (see FIG. 25B). Line 25B-25B indicates a location of a cross-sectional view of the load binder 310 (see FIG. 25B and related discussion).

FIG. 25B is a cross-sectional view of the load binder of FIG. 20A along the line 25B-25B shown in FIG. 25A, consistent with embodiments of the present disclosure. The cross-sectional view of load binder 310 includes the external hex drives 314A and 314B, the removable ratchet handle 316 with the ratchet direction lever 317, the wrench fixing washer/bolt 92, the internally threaded barrel 318, the LHS frame body 326, the RHS frame body 328, the outer cover 330, frame fasteners 332, the link chain 336, the internally threaded barrel idler sheave 340, the idler/slider 180, the internal ratchet mechanism 82, ratchet switch 84, and the external hex nut 214.

Figure 26B:
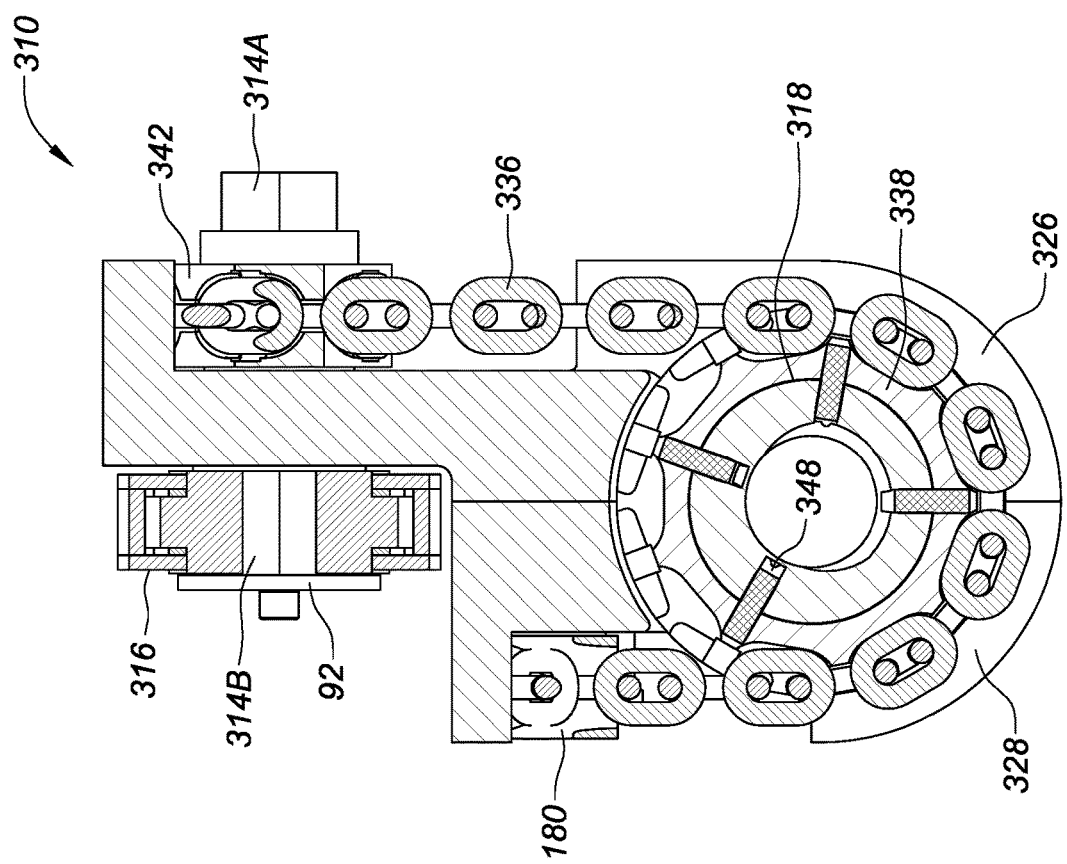
FIG. 26B is a cross-sectional view of the load binder of FIG. 25A along the line 26B-20B shown in FIG. 26A, consistent with other embodiments of the present invention.

FIG. 26A is a side view of the load binder of FIG. 25A partially disassembled, consistent with embodiments of the present disclosure. The load binder 310 can include the frame body 312, the external hex drive 314 (hidden from view in FIG. 26A; see FIG. 26B), the removable ratchet handle 316 with the ratchet direction lever 317, the internally threaded barrel 318 with the external frame grip 320, the outer access cover 330, the driven link chain sheave 338, the internally threaded barrel idler sheave 340. The LHS frame body 326 is hidden from view behind the outer access cover 330 in FIG. 26A, and the RHS frame body 328 is hidden from view behind the LHS frame body 326 (see FIG. 26B). Line 26B-26B indicates a location of a cross-sectional view of the load binder 310 (see FIG. 26B and related discussion).

FIG. 26B is a cross-sectional view of the load binder of FIG. 25A along the line 26B-20B shown in FIG. 26A, consistent with embodiments of the present disclosure. The cross-sectional view of load binder 310 includes the external hex drives 314A and 314B, the wrench fixing washer/bolt 92, the removable ratchet handle 316, the internally threaded barrel 318, the LHS frame body 326, the RHS frame body 328, the link chain 336, the driven link chain sheave 338, the primary link chain drive sheave 342, the idler/slider 180, and the pin 348.

FIGS. 27-33 illustrate a further preferred embodiment of the load binding tool or load binder 410 for securing an elongated binding member at least partially around a load; the load binding tool 410 preferably includes a dual threaded screw or shaft 423 having first and second opposing end portions 423A and 423B, respectively, and a central portion 423C, first and second internally threaded tubes or extension nuts 419A and 419B, respectively, screwed onto the opposing end portions 423A and 423B of the threaded shaft 423; wherein the threading on the shaft end portions 423A and 423B and the respective internal threading in the extension nuts 419A and 419B are configured to provide common contraction and extension of the extension nuts 419A and 419B relative to the shaft 423 when the extension nuts 419A and 419B are not turning and the threaded shaft 423 is turning. Preferably, the first end portion 423A includes right-handed thread and the second end portion 423B includes left-handed thread, and the internal threading on the first extension nut 419A includes right-handed thread and the internal threading on the second extension nut 419B includes left-handed thread. The load binding tool 410 preferably includes two bushings 425A and 425B, the bushing 425A being a right-handed thread bushing, the bushing 425B being a left-handed thread bushing, and an outer sleeve 427 disposed about the bushings 425A and 425B, and a plurality of pins 431 securing the outer sleeve 427 to the bushings 425A and 425B, a driven link chain sheave 438, and a secondary driven link chain sheave 440. The bushing 425A is threaded to match the thread on end portion 423A and can be threaded onto the shaft 423 from end portion 423A until it is in position at the central portion 423C; similarly, the bushing 425B is threaded to match the thread on end portion 423B and can be threaded onto the shaft 423 from end portion 423B until it is in position at the central portion 423C. The bushings 425A and 425B have differing threads, one being right-hand threaded, and the other being left-hand threaded, and when bushings 425A and 425B are both secured by the pins 431 to the outer sleeve 427, the bushings 425A and 425B are secured in place at the central portion 423C. The pins 431 extend to secure the driven link chain sheave 438. Thus, the outer sleeve 427, threaded shaft 423, and driven link chain sheave 438 are thereby secured together to rotate as a unit when driven by movement of a link chain 436. The load binding tool 410 preferably includes a drive shaft (hidden from view in FIGS. 27-33) proximate the threaded shaft 423 and perpendicular to the threaded shaft 423, a primary link chain drive sheave 442 coupled with the drive shaft, a handle attachment gear 446, a ratchet mechanism 458, wherein the ratchet mechanism 458 engages the handle 416 with the handle attachment gear 446; an external hex drive 414 coupled to the primary link chain drive sheave 442; a secondary link chain drive sheave 444 coupled with the drive shaft; a drive chain or link chain 436 movably engaged with the driven link chain sheave 438, the primary link chain drive sheave 442, the secondary driven link chain sheave 440, and the secondary link chain drive sheave 444; wherein the external hex drive 414 is preferably movably engaged with the primary link chain drive sheave 442; wherein the drive chain 436 is movably coupled with the driven link chain sheave 438, the primary link chain drive sheave 442, the secondary driven link chain sheave 440, and the secondary link chain drive sheave 444 in a closed loop configuration.

The load binder 410 preferably includes a frame body 412 which includes a left hand side (LHS) frame body 426 and a right hand side (RHS) frame body 428. The LHS frame body 426 can be secured to the RHS frame body 428 with one or more frame fasteners 432. Two opposing eye bolts 422A and 422B have threads that match the thread on extension nuts 419A and 419B, respectively, with eye bolt 422A and extension nut 419A having right-hand thread, while eye bolt 422B and extension nut 419B have left-hand thread. The eye bolts 422A and 422B are secured to the extension nuts 419A and 419B so that eye bolt 422A and extension nut 419A rotate together during operation of the load binder 410; similarly, eye bolt 422B and extension nut 4196 rotate together during use. A grab hook 424 is preferably secured to each eye bolt 422A and 422B by hook link 429. The grab hooks 424 can couple with a binding member (e.g., a chain, a rope, a cable, a strap, etc.; not shown in FIG. 27) for securing the load. The binding member can be one continuous element with each end coupling with one of the grab hooks 424, or each grab hook 424 can couple with a separate binding element. The load binder 410 preferably includes a ratchet mechanism 458 (see for example, ratchet mechanism 58 shown in FIGS. 6A-7D and related discussion) which allow the handle 416 to move the threaded shaft 423 via a drive mechanism 434. Other ratchet mechanisms such as those disclosed elsewhere in this application could be utilized. Alternatively, an external nut 414A or 414B can be rotated with a hex drive tool (e.g., using a hand tool (i.e., a socket wrench, etc.) or a power tool (e.g., a cordless drill, etc.)) to drive the threaded shaft 423 via the drive mechanism 434. The rotation of the threaded shaft 423 can, in turn, cause the eye bolts 422A and 422B which are secured to the extension nuts 419A and 419B, respectively, to move inwardly along the threaded shaft 423 (e.g., tightening the load binder 410; the distance between the two threaded eye bolts 422A and 422B decreases) or outwardly along the threaded shaft 423 (e.g., loosening the load binder 410; the distance between the two threaded eye bolts 422A and 422B increases).

The load binder 410 preferably includes an elongated threaded contraction expansion assembly 413B having an elongated threaded member 415B, preferably the dual threaded shaft 423 which has opposing ends 423A and 423B having opposite thread patterns. The elongated threaded contraction expansion assembly 413B also includes opposing extension nuts 419A and 419B that have opposite thread patterns and are threadably engaged with the opposing end portions 423A and 423B of the dual threaded shaft 423, and end screws which are preferably the eye bolts 422A and 422B. When the extension nuts 419A and 419B are threaded onto the respective end portions 423A and 423B of the dual threaded shaft 423, the preferably plastic torque tubes or external sleeves 421A and 421B will be secured over and around the respective extension nuts 419A and 419B to prevent the extension nuts 419A and 419B from rotating when the dual threaded screw or shaft 423 rotates, so that the respective extension nuts 419A and 419B with the eyebolts 422A and 422B, preferably engaged within the end of the respective extension nuts 419A and 419B, will either extend outwardly on each end or contract inwardly on each end when the dual threaded screw or shaft 423 rotates. It will be appreciated that the dual threaded screw or shaft 423 will either draw the extension nuts 419A and 419B inward or extend them outward within the external sleeves 421A and 421B when the elongated threaded member 415B is rotated. The external sleeves 421A and 421B are attached to the frame body 412 by sleeve fasteners 432A. The external sleeves 421A and 421B have internal profile which match the external profile of the extension nuts 419A and 419B. As shown in the embodiment illustrated in FIGS. 27-33, the external nuts 419A and 419B are preferably hex shaped, and the internal profile of the external sleeves 421A and 421B are also preferably hex shaped, so that the extension nuts 419A and 419B can slide inwardly and outwardly within the external sleeves 421A and 421B as drawn inward or extended outward along the threaded shaft 423 as the threaded shaft 423 is rotated via the drive mechanism 434. As will be appreciated, the hex shape of the respective extension nuts 419A and 419B is a design choice and modification of this shape can be made so as to have a square-shaped cross-section, a splined cross section, an oval-shaped cross-section and the like, so long as the external sleeves 421A and 421B have a corresponding opening for receiving the respective extension nuts 419A and 419B and hold the extension nuts 419A and 419B in their rotational position so that the respective extension nuts 419A and 419B cannot rotate when the dual threaded shaft 423 rotates. Preferably, the external sleeves 421A and 421B have low frictional resistance to sliding of the extension nuts 419A and 419B. For example, the external sleeves 421A and 421B can be fabricated from a plastic or polymeric material which has lubricious properties; alternatively, other low-friction materials can be utilized. With the external sleeves 421A and 421B attached to the frame body 412, any tendency of the extension nuts 419A and 419B to rotate and apply torque during operation of the load binder 410 is minimized, and the load binder can be used to tighten or loosen the binding member without unwanted twisting of the load binder 410 or the binding member.

The frame body 412 can include an outer access cover 430 that is removably coupled with a portion of the frame body 412. One or more frame fasteners 432 can couple the LHS frame body 426 with the RHS frame body 428 together as shown. This outer access cover 430 can allow a user to access the internal components of the drive mechanism 434 for maintenance and service (e.g., cleaning, lubrication inspection and/or repair of the drive mechanism). Removing the outer access cover 430 can provide access to the drive chain 436, for example.

Figure 27:
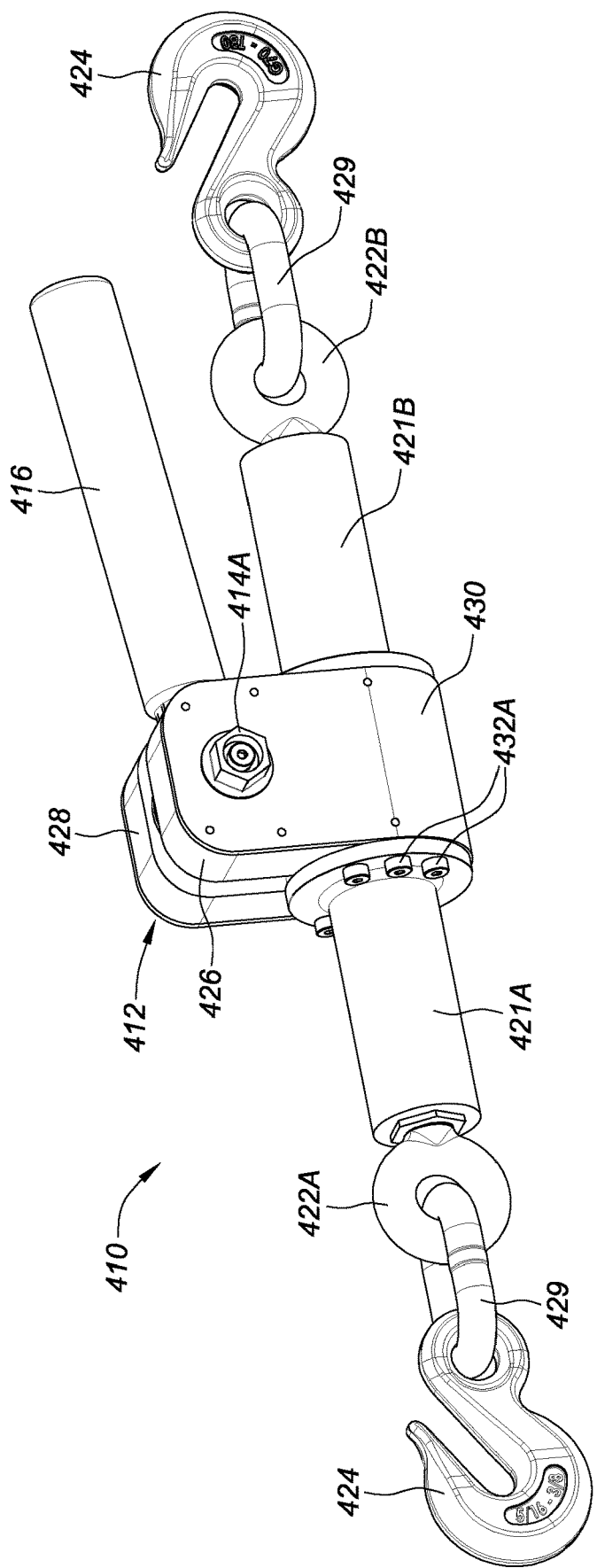
FIG. 27 is a perspective view of a load binder with an internal twin lead screw and hex shaped extension nuts with opposing thread orientation, consistent with other embodiments of the present invention, illustrated with the extension nuts retracted.
Figure 28:
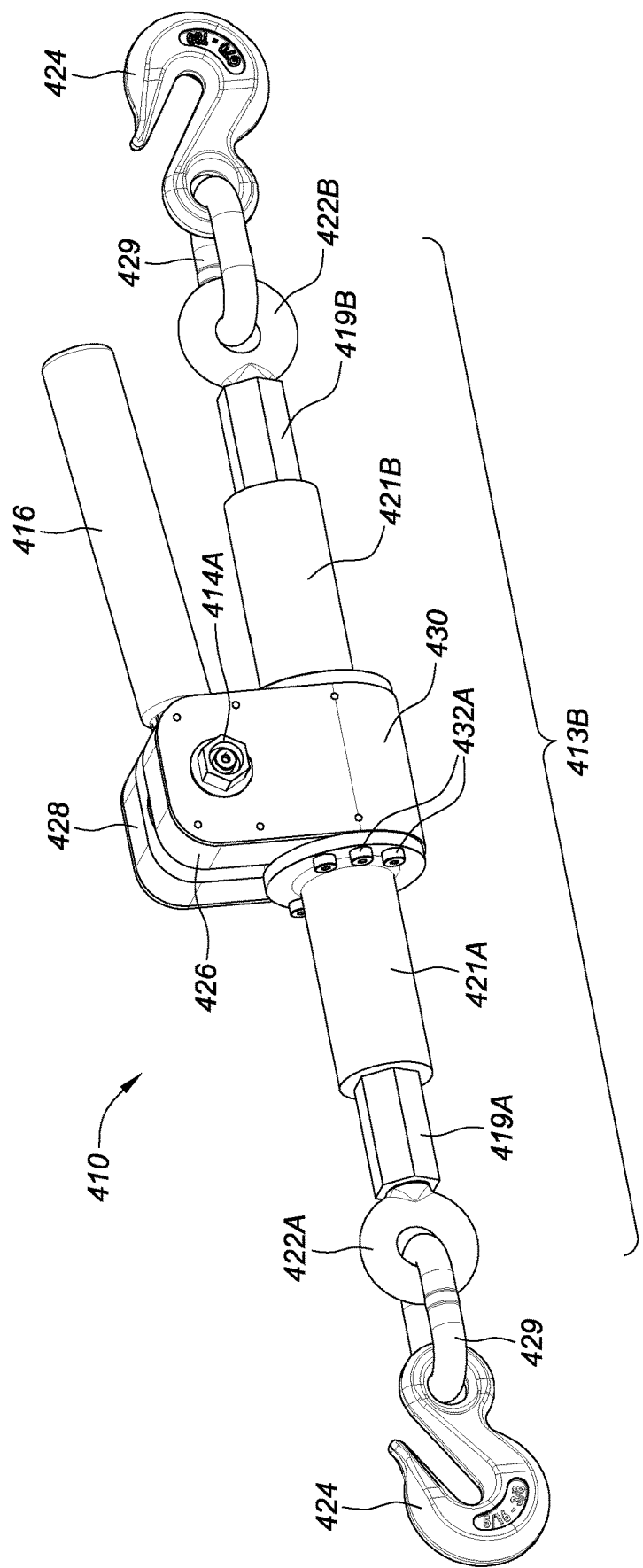
FIG. 28 is a perspective view of the load binder of FIG. 27, consistent with other embodiments of the present invention, illustrated with the extension nuts extended.
Figure 29:
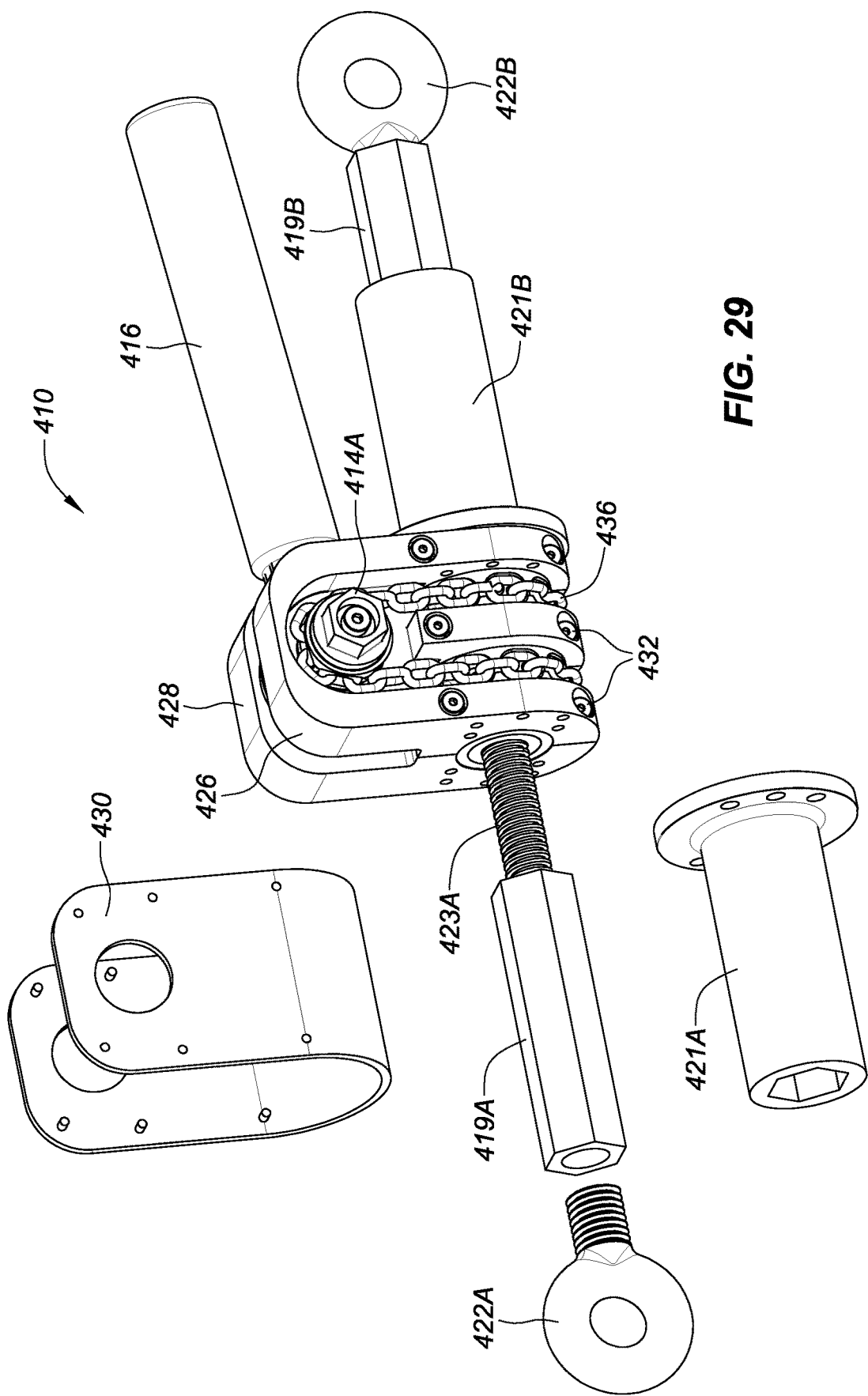
FIG. 29 is a partial perspective view showing elements of the load binder of FIG. 27, illustrated with the extension nuts extended as in FIG. 28, and partially disassembled, consistent with other embodiments of the present invention.
Figure 30:
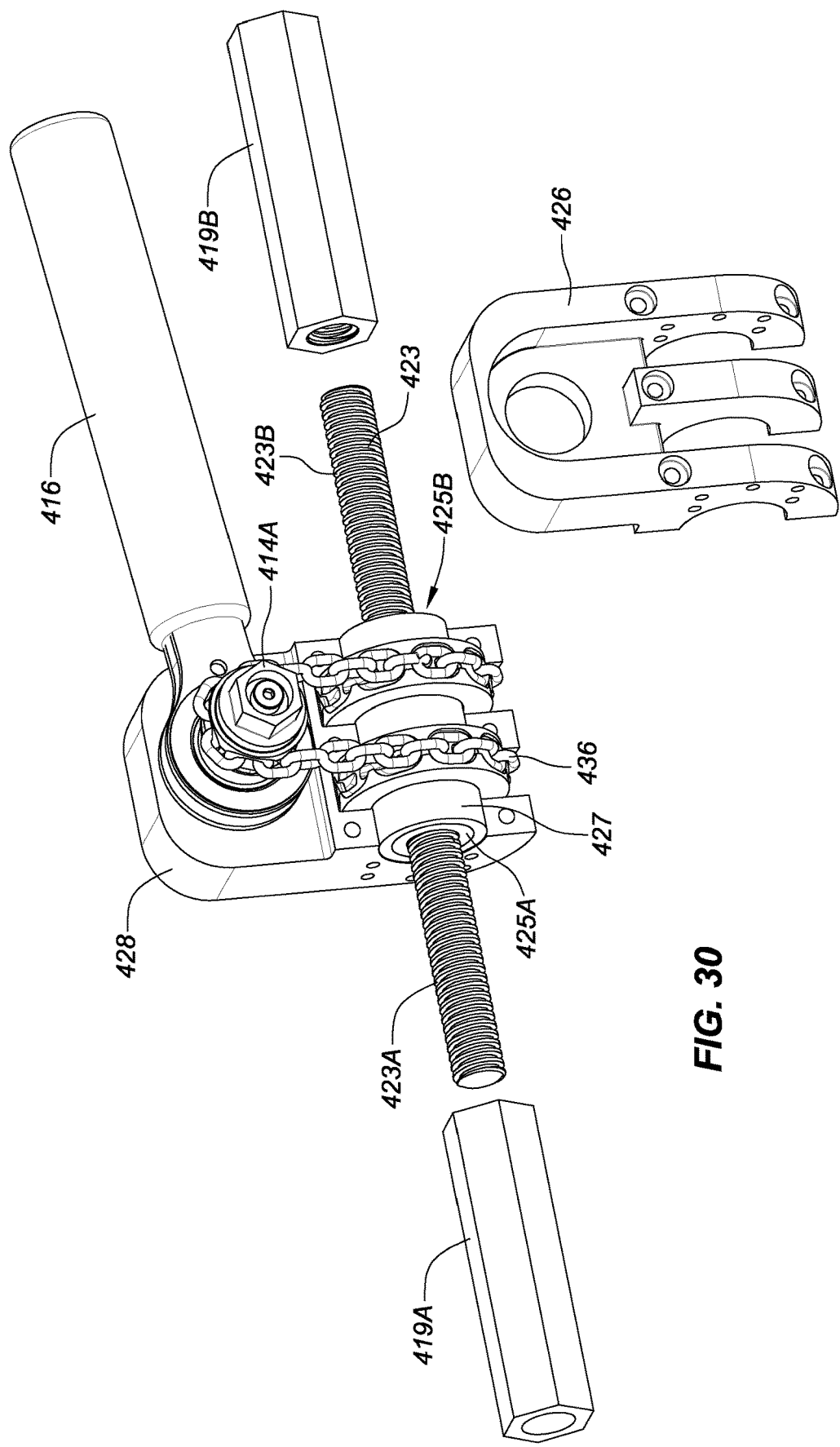
FIG. 30 is a partial perspective view showing elements of the load binder of FIG. 27 similar to that of FIG. 29 but further disassembled, consistent with other embodiments of the present invention.

FIG. 30 is a perspective view of the load binder of FIGS. 27-28 further disassembled, consistent with embodiments of the present disclosure. After removal of the outer access cover 430 shown in FIG. 29, the LHS frame body 426 can removed for additional access to portions of the load binder 410. With the LHS frame body 426 removed, there is additional access to portions of the drive chain 436, which is movably coupled with the driven link chain sheave 438, the primary link chain drive sheave 442, the secondary driven link chain sheave 440, and the secondary link chain drive sheave 444. Also illustrated on FIG. 30 are the external hex drive or nut 414A, the handle 416, the extension nuts 419A and 4196, the threaded shaft 423, the first end portion 423A, the second end portion 423B, the bushings 425A and 425B (not visible but location indicated by arrow), the outer sleeve 427, the left hand side frame body 426, the right hand side frame body 428, and the drive chain 436.

Figure 31:
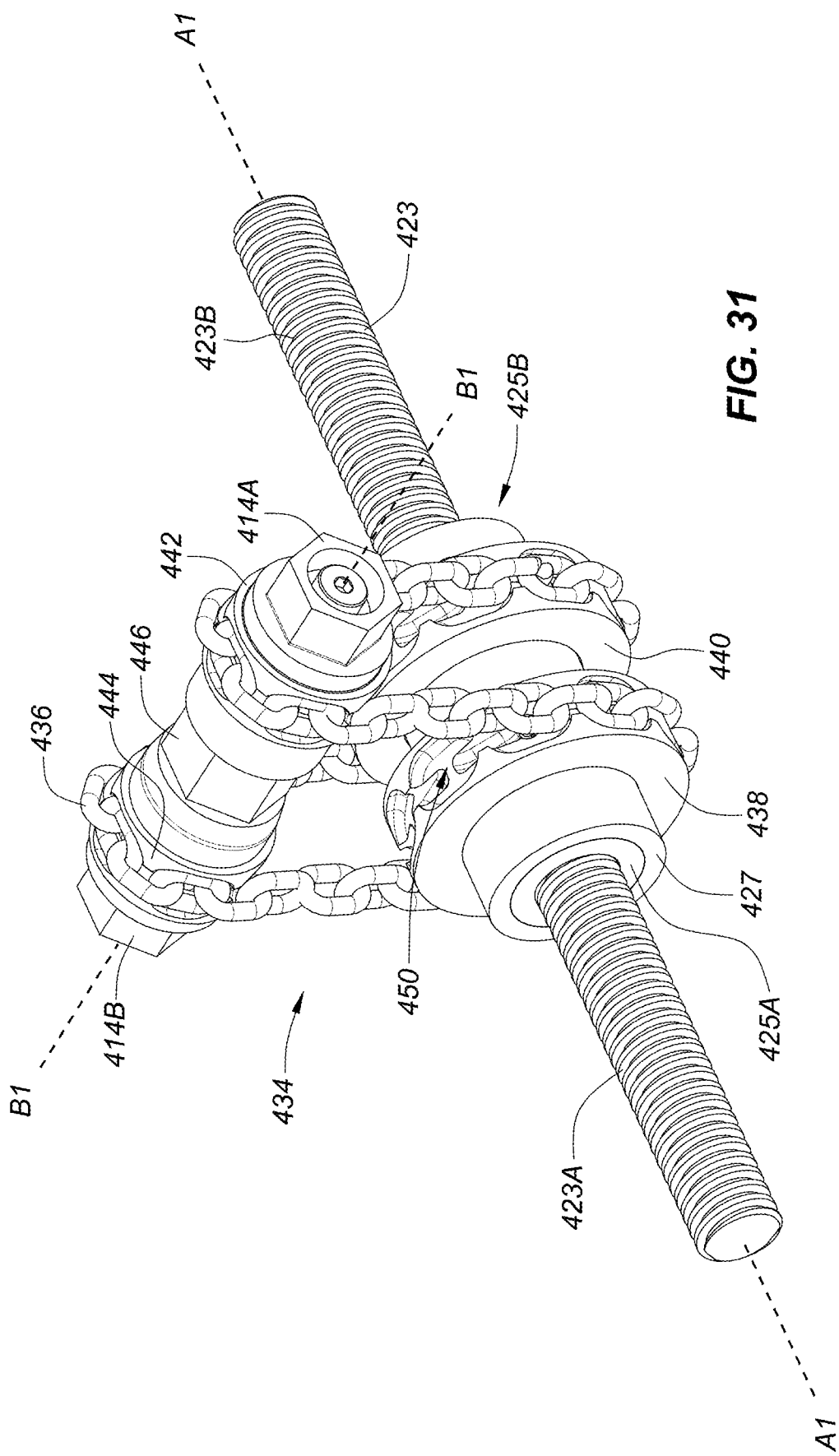
FIG. 31 is a perspective detail view showing elements of the load binder of FIG. 27 similar to that of FIG. 30 but still further disassembled, consistent with other embodiments of the present invention.

FIG. 31 is a perspective view of the load binder of FIGS. 27-28 omitting the frame body 412 to illustrate underlying structures, consistent with embodiments of the present disclosure. FIG. 31 shows the load binder 410, drive mechanism 434, including the link chain 436, the driven link chain sheave 438, the primary link chain drive sheave 442, the secondary driven link chain sheave 440, and the secondary link chain drive sheave 444, the threaded shaft 423, the first end portion 423A, the second end portion 423B. Preferably, the sheaves 438, 440, 442, and 444 include sheave pockets 450. In some embodiments, sheave pockets 450 can be omitted from the secondary driven link chain sheave 440 and the secondary link chain drive sheave 444, analogous to idler sheaves described elsewhere herein. We have discovered, however, that it is preferable that all the sheaves 438, 440, 442, and 444 include sheave pockets 450 to better distribute forces and slack along the link chain 436. As further illustrated in FIG. 31, the load binder 410 also includes external hex drive 414A, external hex drive 414B, threaded shaft 423, first end portion 423A, second end portion 423B, bushings 425A and 425B (not visible but location indicated by arrow), outer sleeve 427, handle attachment gear 446, and drive chain 436. Preferably, the external hex drive 414A, the external hex drive 414B, the handle attachment gear 446, the primary link chain drive sheave 442, and the secondary link chain drive sheave 444, are coaxially coupled with the drive shaft 437 (hidden from view).

The single action drive mechanism 434 utilizes a closed loop of a flexible coupler (i.e., the drive chain 436, a link chain, a belt, or other similar item) arranged in a double saddle, or U-configuration around portions of the threaded shaft 423, bushings 425A and 425B, and outer sleeve 427, and the driven link chain sheave 438, the primary link chain drive sheave 442, the secondary driven link chain sheave 440, and the secondary link chain drive sheave 444. The external hex drive or nut 414A and the external hex drive or nut 414B are preferably coupled with the primary link chain drive sheave 442; the external nut 414A or 4146 can be rotated with a hex drive tool (e.g., using a hand tool such as a socket wrench, etc. or using a power tool such as a cordless drill, etc.) to drive the threaded shaft 423 via the drive mechanism 434. As the external hex drive 414A or 414B is rotated clockwise or counterclockwise, the threaded shaft 423 spins in a corresponding manner. The driven link chain sheave 438 and the primary link chain drive sheave 442 preferably include a plurality of sheave pockets 450 (i.e., recesses, openings, holes, etc.) that couple with (i.e., engages, contacts, etc.) an individual portion (e.g., one chain link) of the drive chain 436. Each of the pockets can contact an outer portion of one of the chain links to transfer force between the drive chain 436 and the sheave pockets 450. The coupling of chain links of the drive chain 436 and the plurality of sheave pockets 450 can minimize slippage of the drive chain 436 when the load binder 410 is adjusted by a user via the handle (not shown in FIG. 31) or the external hex drives 414A or 414B. The sheave pockets 450 can be shaped to accommodate a weld joint or other feature of the chain links of the drive chain 436. Preferably, the secondary driven link chain sheave 440 and the secondary link chain drive sheave 444 also include sheave pockets 450 and provide additional coupling of the drive chain 436 with the secondary driven link chain sheave 440 and the secondary link chain drive sheave 444 for effective transfer of force while minimizing slippage of the drive chain 436 on the sheaves 440 and 444.

Figure 32:
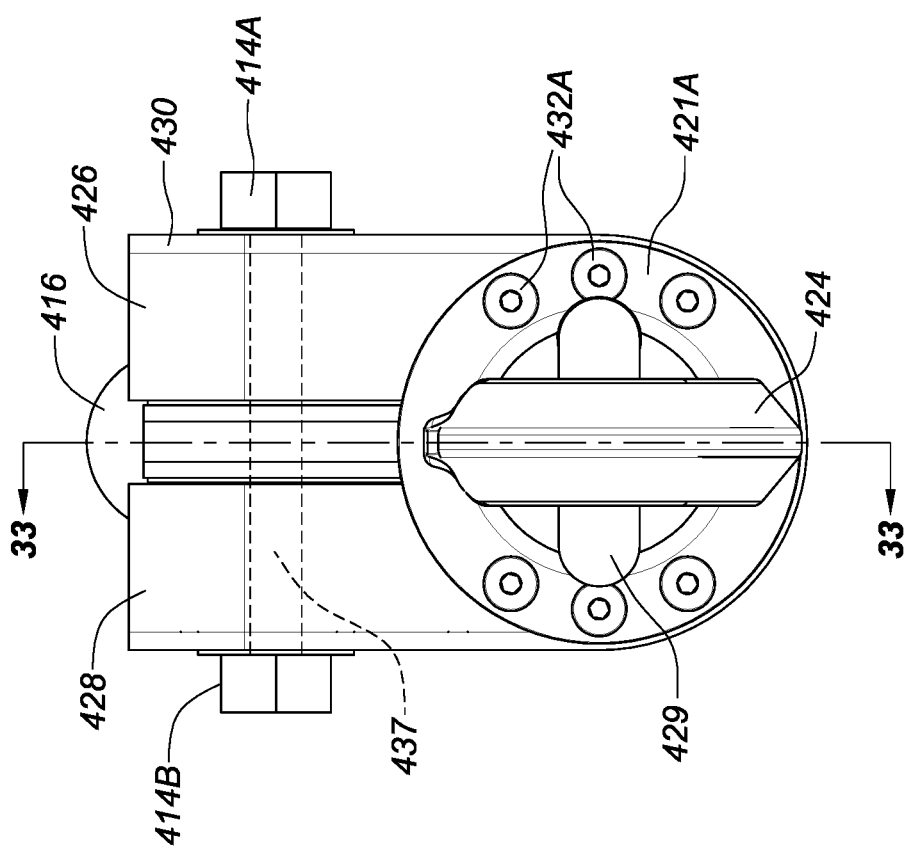
FIG. 32 is an end view of the load binder of FIG. 27, consistent with other embodiments of the present invention.

FIG. 32 is an end view of the load binder 410 of FIG. 27, consistent with embodiments of the present disclosure. FIG. 32 illustrates the handle 416 (mostly obscured in FIG. 31), the external hex drive or nut 414A, the external hex drive or nut 414B, the left hand side frame body 426, the right hand side frame body 428, the outer access cover 430, the sleeve fasteners 432A, the external sleeve 421A, the hook link 429, and the grab hook 424. The drive shaft 437 is not visible on FIG. 32 but is indicated by dashed lines.

Figure 33:
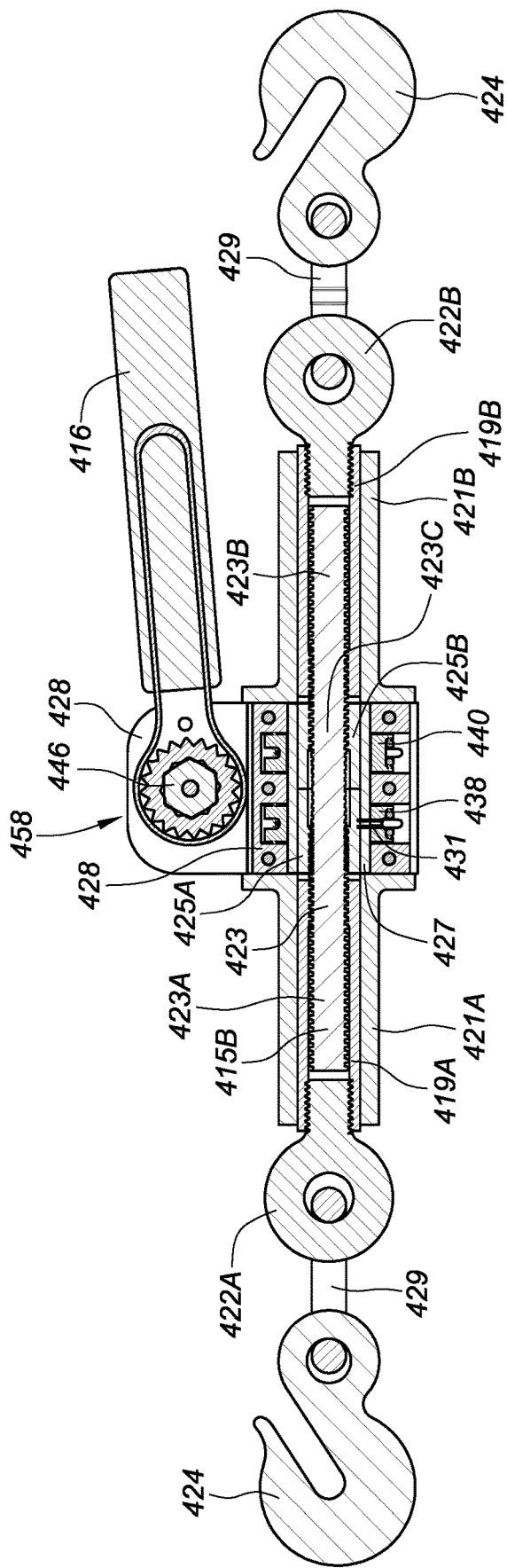
FIG. 33 is a section view of the load binder of FIG. 27 as indicated by the line 33-33 on FIG. 32, consistent with other embodiments of the present invention.

FIG. 33 is a section view of the load binder of FIG. 27 as indicated by the line 33-33 on FIG. 32, consistent with embodiments of the present disclosure. As illustrated in FIG. 33, the load binder 410 preferably includes the ratchet mechanism 458, the handle attachment gear 446, the handle 416, two grab hooks 424 which are each coupled by hook links 429 to eye bolts 424. Also illustrated is the drive shaft 437, the right hand side frame body 428, the bushings 425A and 425B, the outer sleeve 427, one of the plurality of pins 431 securing the outer sleeve 427 to the bushings 425A and 425B, the driven link chain sheave 438, the secondary driven link chain sheave 440, the threaded shaft 423, the end portions 423A and 423B and the central portion 423C, the extension nuts 419A and 419B, and the external sleeves 421A and 421B.

Preferably, a plurality of pins 431 are utilized to ensure that the driven link chain sheave 438, the bushings 425A and 425B, and the outer sleeve 427 are secured in place on the threaded shaft 423 and do not slip when the drive mechanism 434 is engaged by a user via the handle 416 or the external hex drives 414A or 414B. The pins 431 can be placed at any suitable location of the driven link chain sheave 438 and threaded shaft 423. Preferably, 4 pins 431 are used, but any suitable number of pins 431 can be used (e.g., 2 pins, 3 pins, 4 pins, 5 pins, etc.).

Figure 34:
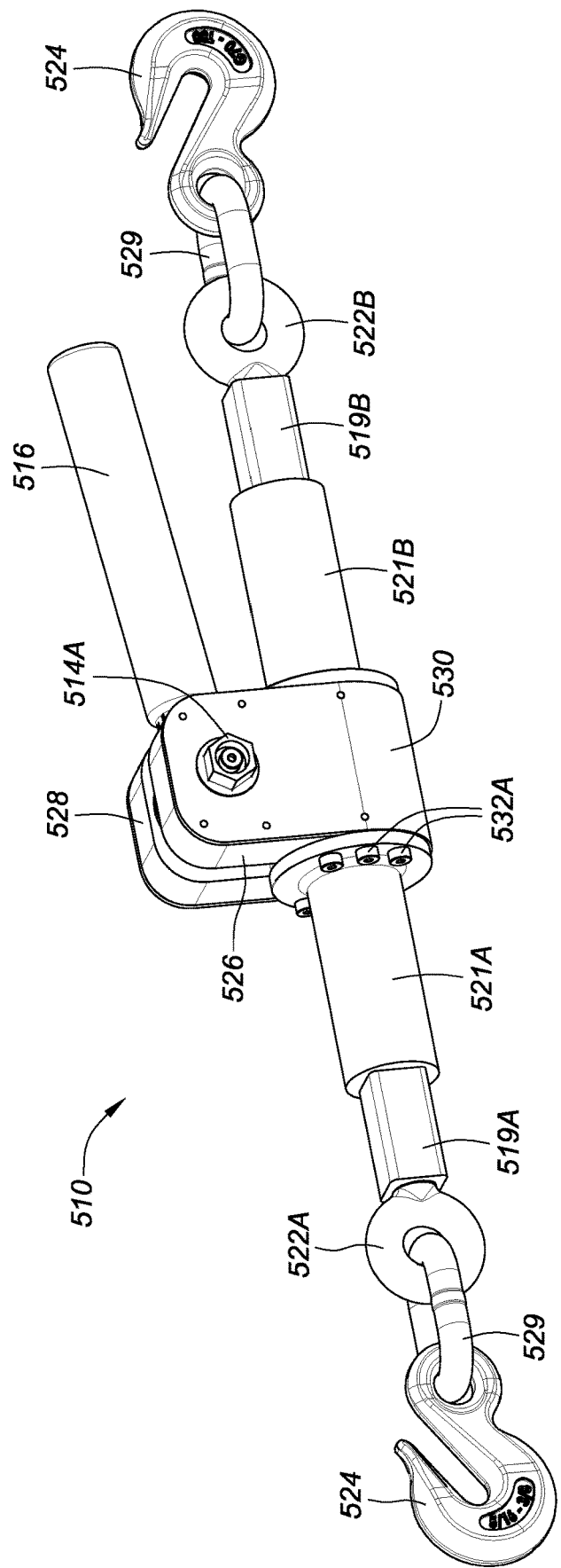
FIG. 34 is a perspective view a another load binder with an internal twin lead screw and square shaped extension nuts with opposing thread orientation, consistent with other embodiments of the present invention, illustrated with the extension nuts extended.

FIG. 34 is a perspective view of a further embodiment of the load binding tool 510 consistent with embodiments of the present disclosure. The load binding tool 510 is similar to the load binding tool 410 described above, but includes extension nuts 519A and 519B which are square shaped rather than the hex shaped extension nuts 419A and 419B described above with respect to the load binding tool 410. The load binding tool 510 includes external sleeves 521A and 521B that have internal profile which are square shaped to match the external profile of the extension nuts 519A and 519B. The external sleeves 521A and 521B are attached to the frame body 512 by sleeve fasteners 532A. Preferably, the external sleeves 521A and 521B have low frictional resistance to sliding of the extension nuts 519A and 519B. For example, the external sleeves 521A and 521B can be fabricated from a high-strength plastic or polymeric material which has lubricious properties; alternatively, other low-friction materials can be utilized. With the external sleeves 521A and 521B attached to the frame body 512, any tendency of the extension nuts 519A and 519B to rotate and apply torque during operation of the load binder 510 is minimized, and the load binder 510 can be used to tighten or loosen the binding member without unwanted twisting of the load binder 510 or the binding member. Other elements of load binder 510 illustrated on FIG. 34 are similar to corresponding elements of load binder 410, including the handle 516, the external nut 514A, the left hand side frame body 526, the right hand side frame body 528, the outer access cover 530, the sleeve fasteners 532A, eye bolts 522A and 522B, hook links 529, and grab hooks 524. Similarly, extension nuts with alternative external profile can be utilized as an alternative to extension nuts 419A, 419B, 519A, 519B, with external sleeves that have corresponding internal profile as an alternative to external sleeves 421A, 421B, 521A, 521B. Preferably, such alternative extension nuts and external sleeves have profiles that allow the external sleeves to slide along the extension nuts without unwanted twisting or torqueing of the corresponding alternative load binder tool. For example, extension nuts having orienting features such as slots, one or more flat sides, or splines, or other protrusions, or oval shaped extension nuts can be utilized, with external sleeves having corresponding internal profile.

In an additional embodiment of the load binding tool according to the present invention, a load binder (not shown) includes a first dual threaded shaft similar to that of the load binder 410, and an additional second dual threaded shaft parallel to the first dual threaded shaft, wherein the threading on the second dual threaded shaft is reversed from that of the first dual threaded shaft. In this additional embodiment, a gear set couples the rotation of the first and second dual threaded shafts in counter-rotating manner, so that by moving the handle (or rotating the external hex drive using a hand tool) the drive mechanism causes both dual threaded shafts to rotate but in opposite directions, moving 4 correspondingly threaded eye bolts inward or outward to tighten or loosen the load binder, respectively. In another additional embodiment of the load binding tool according to the present invention, a load binder (not shown) includes first and second dual threaded shafts similar to the embodiment just described, but configured horizontally adjacent rather than vertically adjacent as in the load binder 410. As an alternative to the gear set coupling the rotation of the first and second dual threaded shafts, the load binding tool can include two chain drive mechanisms as described above, each rotating one of the dual threaded shafts, in opposite directions.

Figure 35:
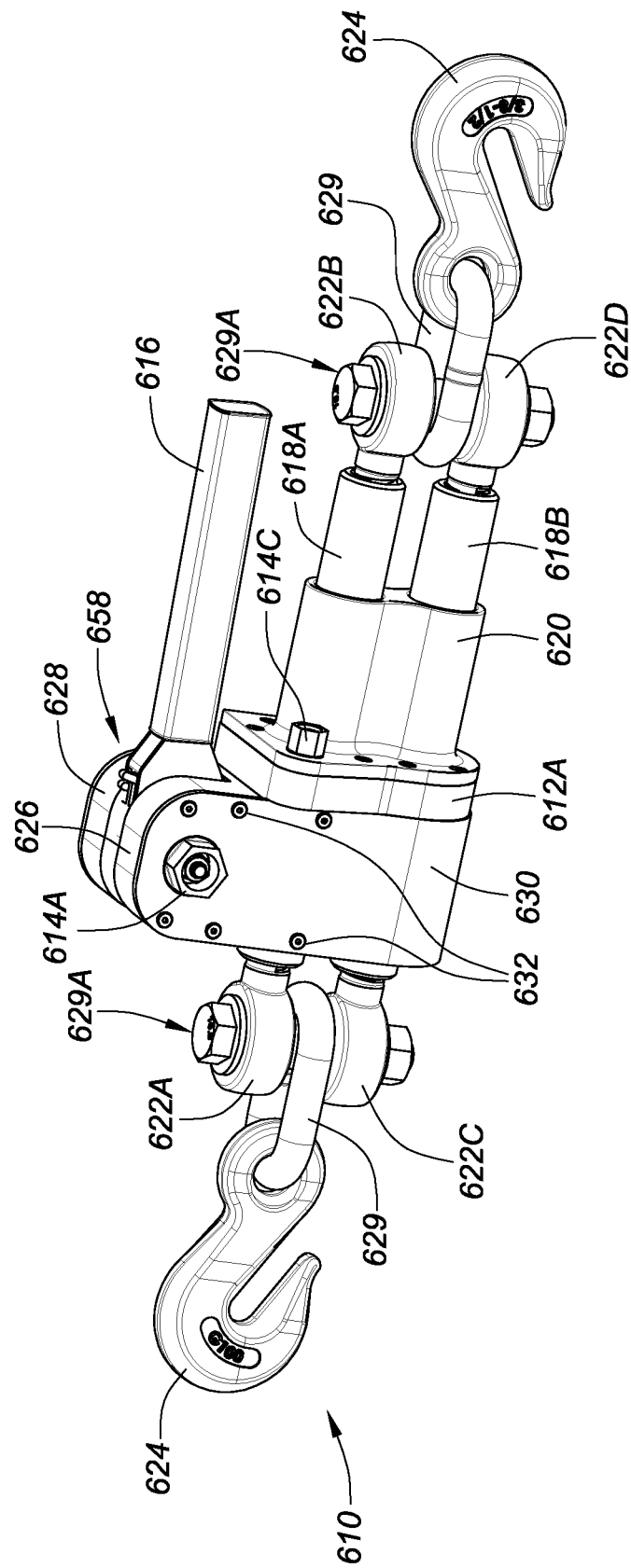
FIG. 35 is a perspective view of a further preferred embodiment of load binder including a pair of threaded barrels and 4 eye bolts, consistent with other embodiments of the present invention, illustrated with the eye bolts retracted.
Figure 36:
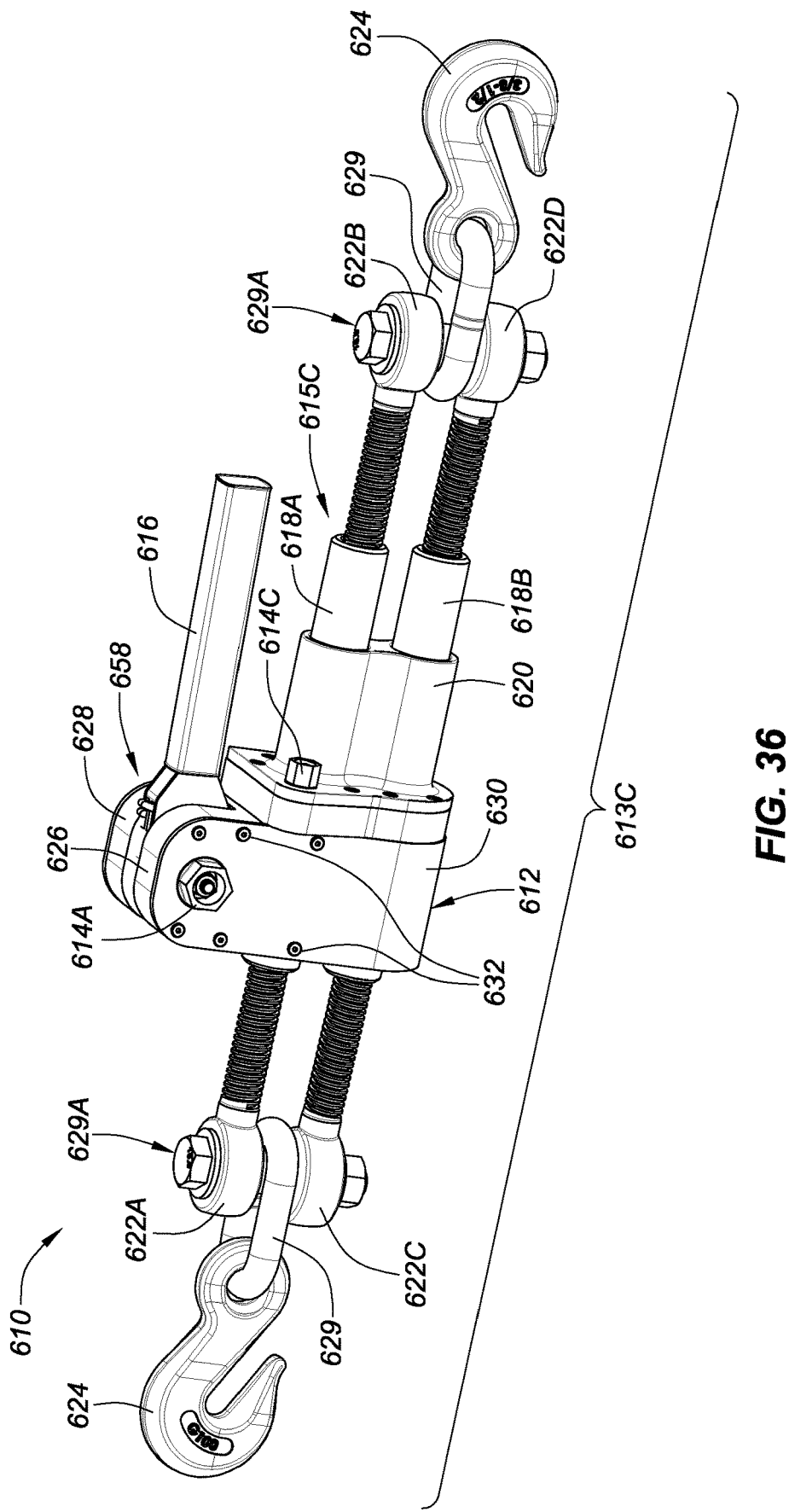
FIG. 36 is a perspective view of the load binder of FIG. 35, consistent with other embodiments of the present invention, illustrated with the eye bolts extended.

FIGS. 35-39 illustrate a further preferred embodiment of the load binding tool or load binder 610 for securing an elongated binding member at least partially around a load. The load binding tool or load binder 610 preferably includes an elongated threaded contraction expansion assembly 613C. The elongated threaded contraction expansion assembly 613C preferably includes an elongated threaded member 615C, which includes a first internally threaded tube 618A and a second internally threaded tube 618B. The elongated contraction expansion assembly 613B also preferably includes two opposing threaded shafts or eye bolts 622A and 622B having opposing screw threading (i.e., one having right-handed threading and the other having left-handed threading), with the internally threaded tube 618A having opposing open ends each of which is internally threaded for receiving one of the respective opposing threaded eye bolts 622A and 622B, wherein the threading in the internally threaded tube 618A and on the respective opposing threaded eye bolts 622A and 622B is constructed and arranged to provide common contraction or extension of the respective opposing threaded eye bolts 622A and 622B when the respective opposing threaded shafts are engaged within the respective opposing open ends of the internally threaded tube 618A and when the internally threaded tube 618A is rotated one direction or another and the opposing threaded eye bolts 622A and 622B are not rotated. The elongated contraction expansion assembly 613B also includes the second internally threaded tube 618B and two opposing threaded shafts or eye bolts 622C and 622D having opposing screw threading and oriented adjacent and parallel to the first internally threaded tube 618A, wherein the threading on the second internally threaded tube 6186 is end-for-end opposite that of the threading on the first internally threaded tube 618A; in other words, for example, where the "left" end of the first internally threaded tube 618A has right-handed thread, the left end of the adjacent second internally threaded tube 618B has left-handed thread, and the "right" end of the first internally threaded tube 618A has left-handed thread, the right end of the adjacent second internally threaded tube 618B has right-handed thread. The load binder 610 includes a driven link chain sheave 638 coupled with the first internally threaded tube 618A, wherein the driven link chain sheave 638 is secured to the first internally threaded tube 618A so that the first internally threaded tube 618A rotates when the driven link chain sheave 638 is rotated; a drive shaft (not visible on FIGS. 35-39 but similar to drive shaft 437 illustrated on FIGS. 32-33 and other drive shafts shown and described herein) proximate the internally threaded tube 618A and oriented in a generally perpendicular orientation to the internally threaded tube 618A; a primary link chain drive sheave 642 coupled with the drive shaft; an external hex drive 614A coupled to the primary link chain drive sheave 642; a secondary link chain drive sheave 644 coupled with the drive shaft; a secondary driven link chain sheave 640; a link chain 636 movably engaged with the driven link chain sheave 638 and the primary link chain drive sheave 642 and the secondary link chain drive sheave 644 and the secondary driven link chain sheave 640. The load binder preferably includes a coupling mechanism such as a gear set 695 coupling the first and second internally threaded tubes 618A and 618B so that when the first internally threaded tube 618A rotates, the second internally threaded tube 6186 rotates in the opposite direction; and an external gear hex drive 614C coupled to the gear set 695, wherein turning of the primary link chain drive sheave 642 in one direction or the other counter-rotates the two internally threaded tubes 618A and 618B to move the respective opposing threaded eye bolts 622A and 622B as well as the opposing threaded eye bolts 622C and 622D closer together or further apart. The load binder 610 preferably also include two link retainers 629A, one link retainer 629A coupling threaded eye bolts 622A and 622C and secures to a hook link 629 at one end of the load binder 610, and the second link retainer 629A coupling threaded eye bolts 622B and 622D and secures to a hook link 629 at one end of the load binder 610; grab hooks 624 are secured to each hook link 629. The grab hooks 624 can couple with a binding member (e.g., a chain, a rope, a cable, a strap, etc.; not shown) for securing the load. FIG. 35 illustrates the load binder 610 with the eye bolts retracted or tightening the load, and FIG. 36 illustrates the load binder of FIG. 35 with the eye bolts extended, or loosening the load.

The load binder 610 preferably includes a gear housing 612A and frame body 612 which includes a left hand side (LHS) frame body 626 and a right hand side (RHS) frame body 628. The LHS frame body 626 can be secured to the RHS frame body 628 with one or more frame fasteners 632. The load binder 610 preferably includes an outer access cover 630 that is secured to the LHS frame body 626 and RHS frame body 628 by frame fasteners 632. The load binder 610 preferably includes a handle 616 which can couple with a ratchet mechanism 658. Various handles and ratchet mechanisms such as those described herein can be used. A frame grip 620 is preferably attached to the frame body 612 using grip fasteners 632A and covers portions of the two internally threaded tubes 618A and 618B and gear set 695 and preferably aids in maintaining orientation of the internally threaded tubes 618A and 618B with respect to each other and to the frame body 612.

Figure 37:
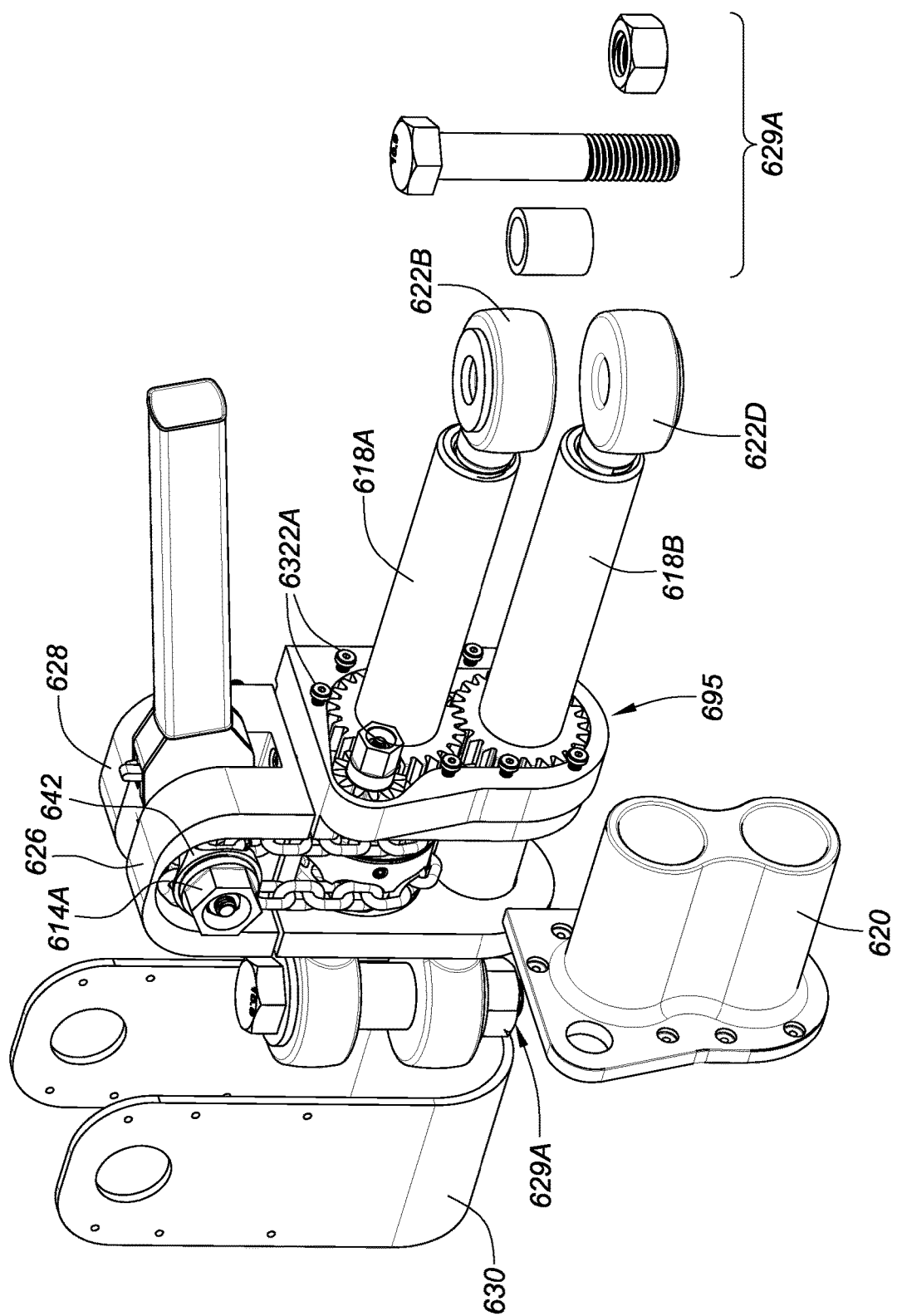
FIG. 37 is a partial perspective view showing elements of the load binder of FIG. 35, illustrated with the eye bolts retracted as in FIG. 35, and partially disassembled, consistent with other embodiments of the present invention.

FIG. 37 illustrates elements of the load binder 610 of FIGS. 35-36, shown with the eye bolts 618A, 618B, 618C, and 618D retracted as in FIG. 35, and partially disassembled. One of the link retainers 629A is illustrated in exploded view; the link retainers 629A can include bolts, nuts, sleeves, and other fastening elements as are known. One of the link retainers 629A provides for attachment of one of the hook links 629 to eye bolts 622B and 622D, and preferably helps to maintain appropriate spacing between the eye hooks 622B and 622D so that they are maintained in parallel orientation to each other. The other link retainer 629A provides for attachment of the other hook link 629 to eye bolts 622A and 622C in a similar manner.

Figure 38:
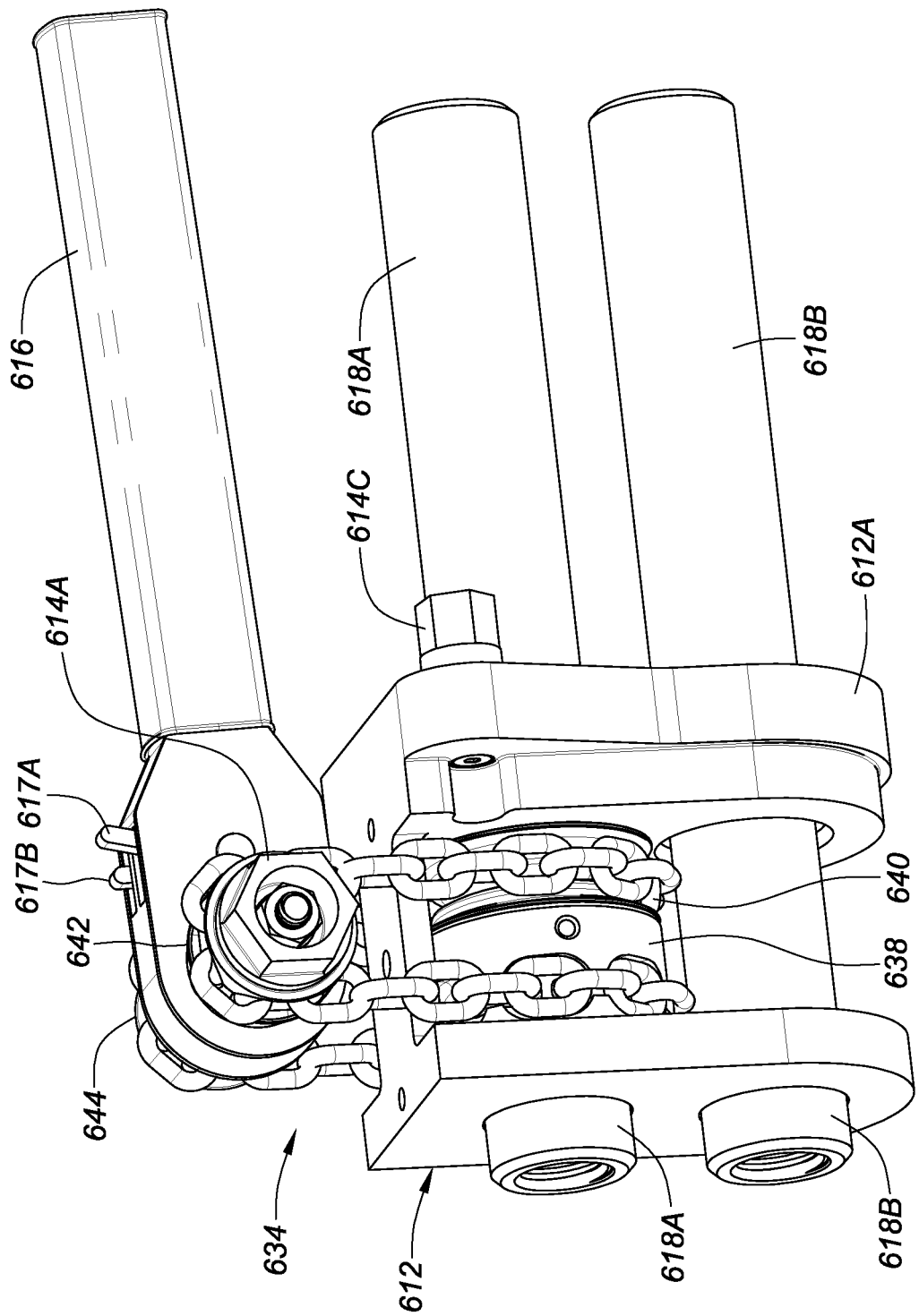
FIG. 38 is a partial perspective view showing elements of the load binder of FIG. 35 similar to that of FIG. 37 but further disassembled, consistent with other embodiments of the present invention.

FIG. 38 illustrates elements of the load binder 610 of FIG. 35 similar to FIG. 37 but further disassembled. Elements shown on FIG. 38 include a drive mechanism 634, the frame body 612, the external hex drive 614A, the external gear hex drive 614C, the driven link chain sheave 638, the primary link chain drive sheave 642, the secondary link chain drive sheave 644, the secondary driven link chain sheave 640, first and second internally threaded tubes 618A and 618B, handle 616, gear housing 612A, and ratchet direction levers 617A and 617B.

Figure 39:
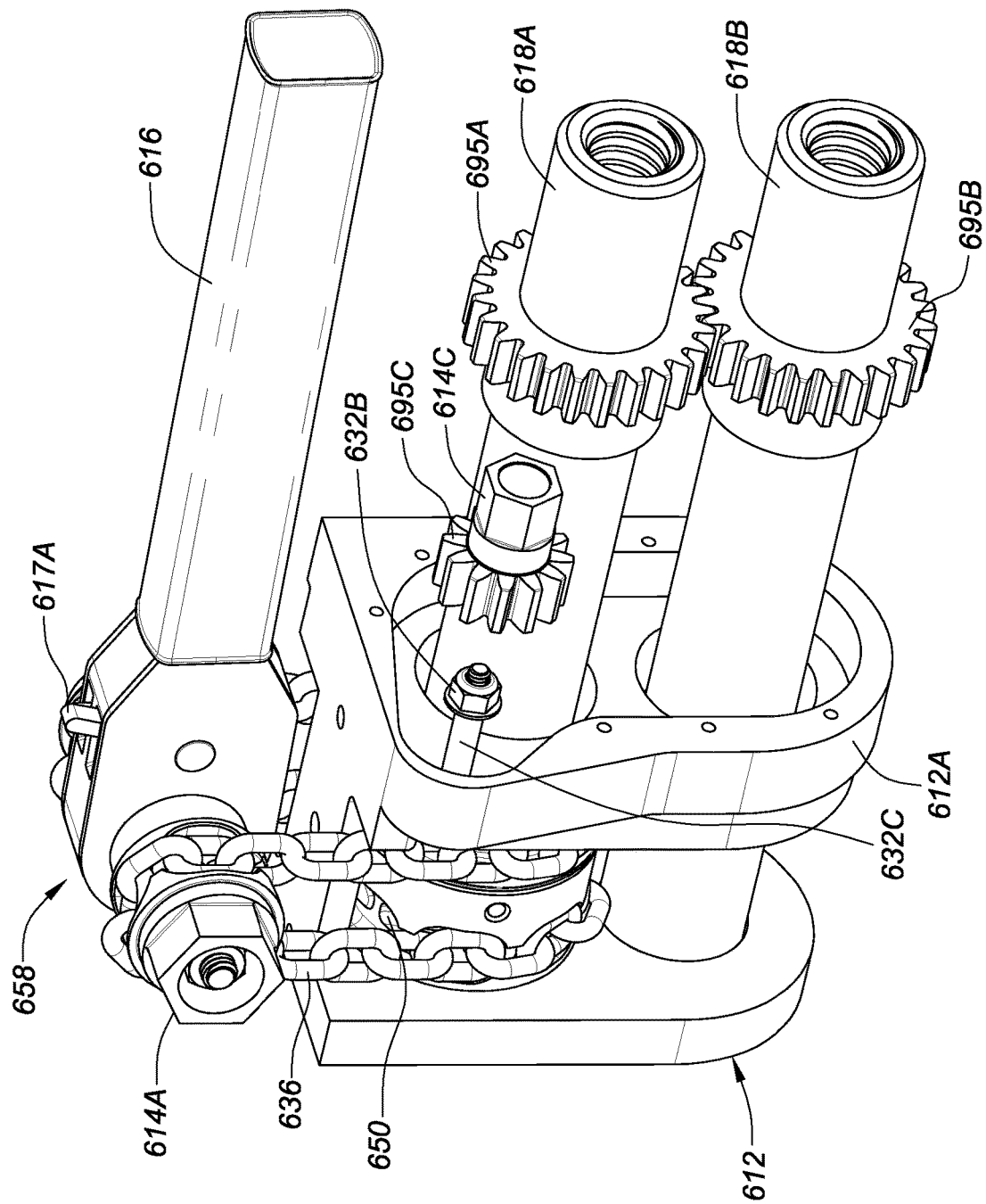
FIG. 39 is a partial perspective view showing elements of the load binder of FIG. 35 similar to that of FIG. 37 but further disassembled and partially exploded, consistent with other embodiments of the present invention.
Figure 40:
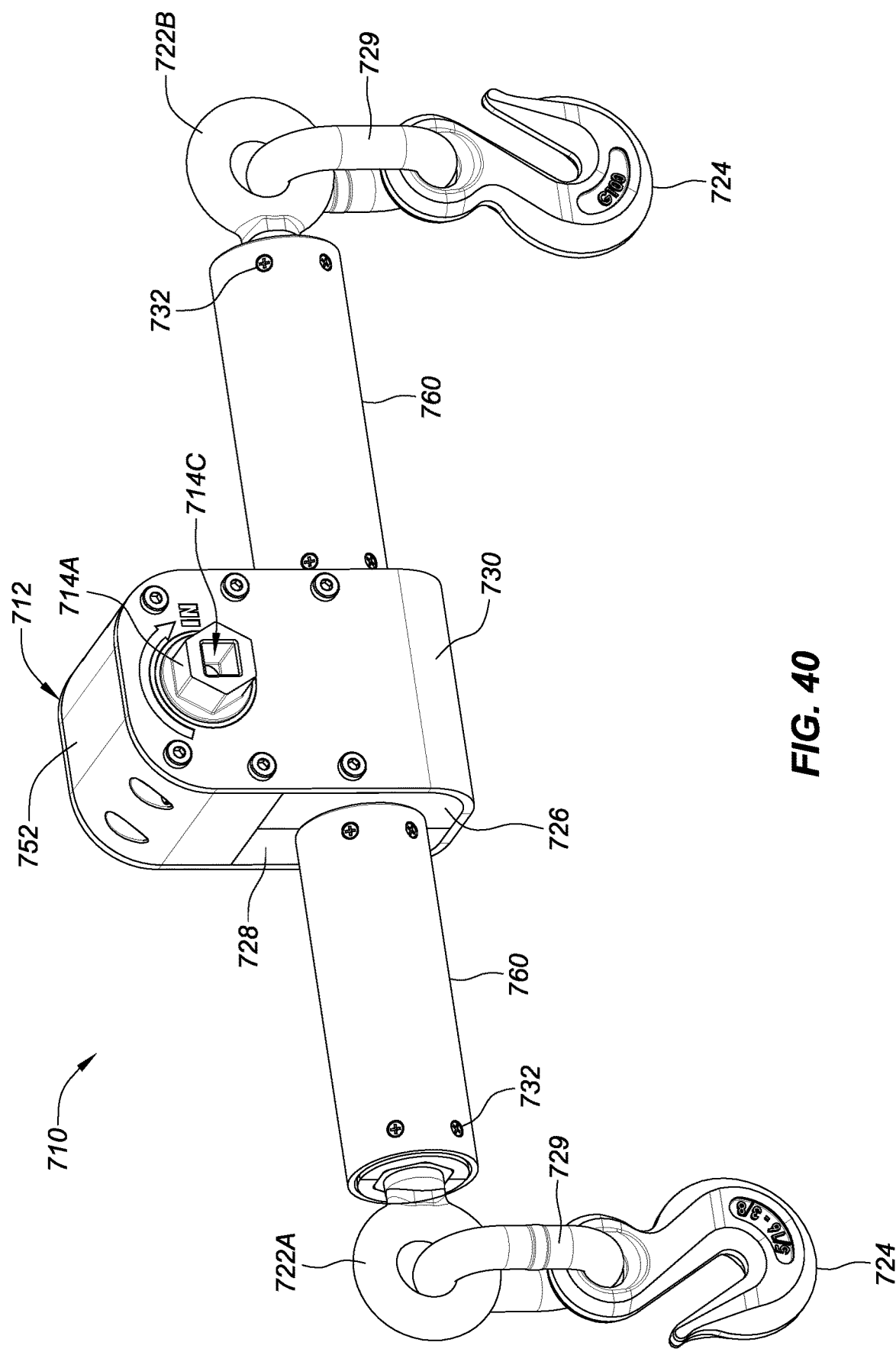
FIG. 40 is a perspective view of a preferred load binder with an internal twin lead screw and hex shaped extension nuts with opposing thread orientation, to be driven by a separate tool, consistent with other embodiments of the present invention, illustrated with the extension nuts retracted.
Figure 41:
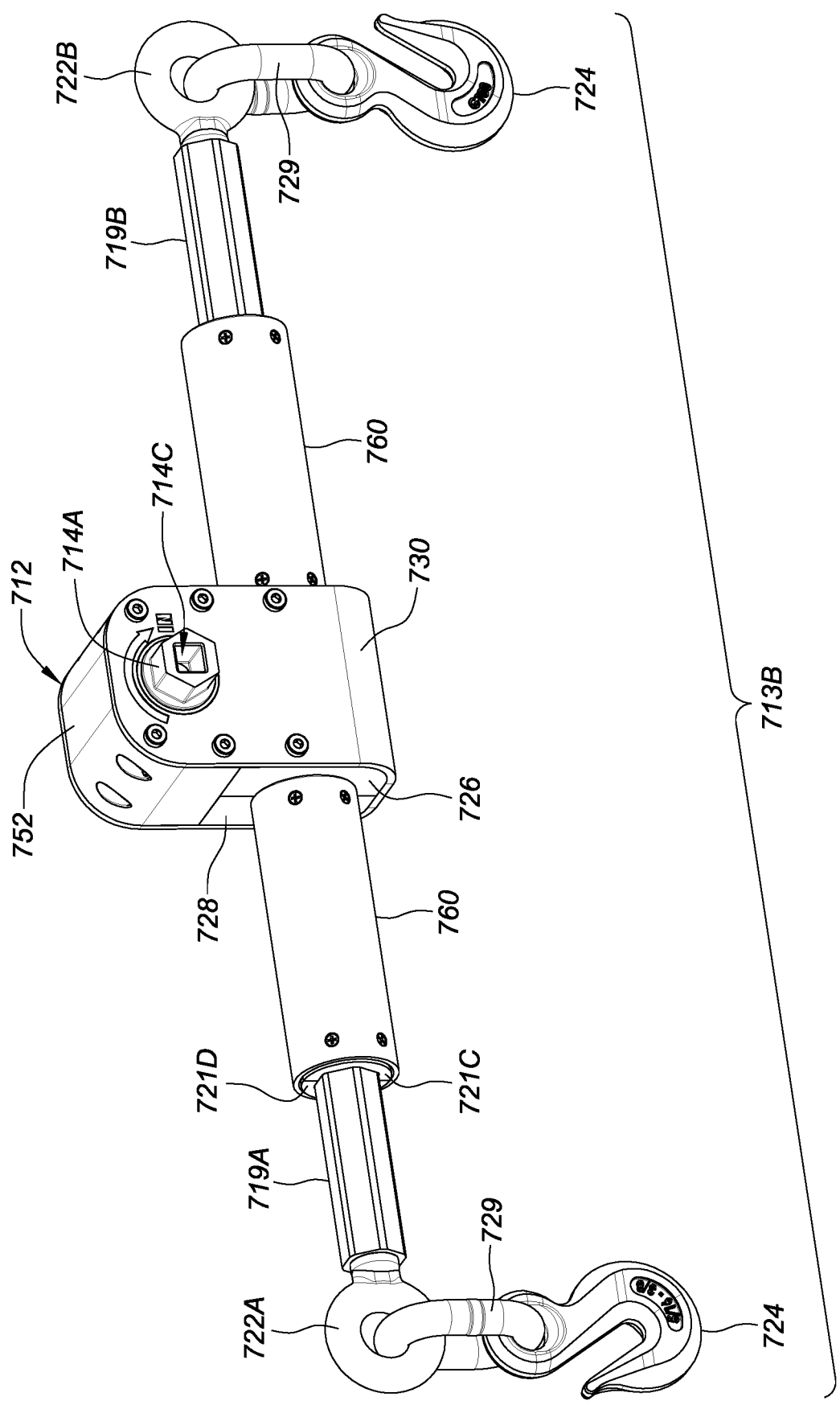
FIG. 41 is a perspective view of the load binder of FIG. 40, consistent with other embodiments of the present invention, illustrated with the extension nuts extended.
Figure 42:
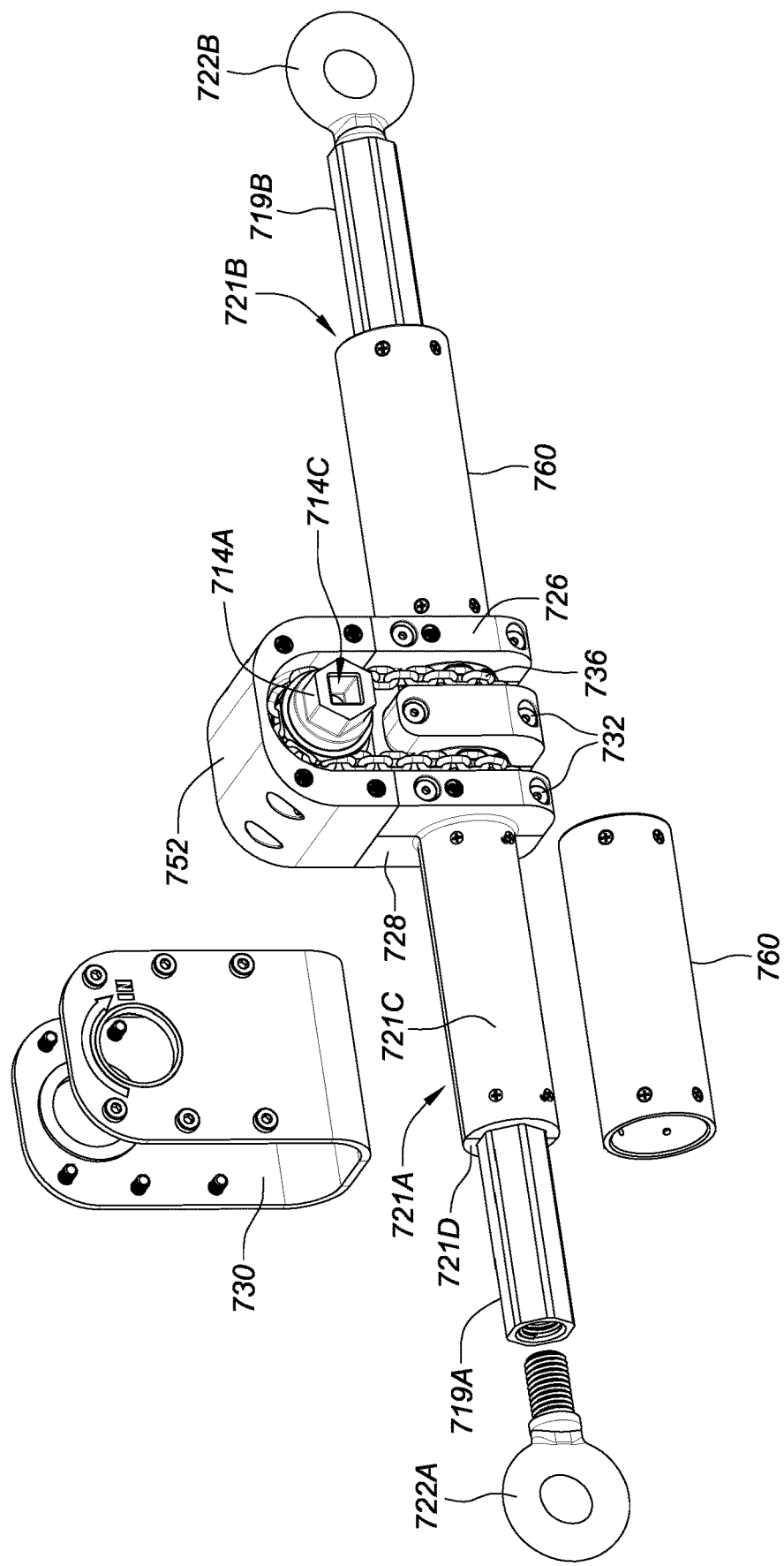
FIG. 42 is a partial perspective view showing elements of the load binder of FIG. 40, illustrated with the extension nuts extended as in FIG. 41, and partially disassembled, consistent with other embodiments of the present invention.
Figure 43:
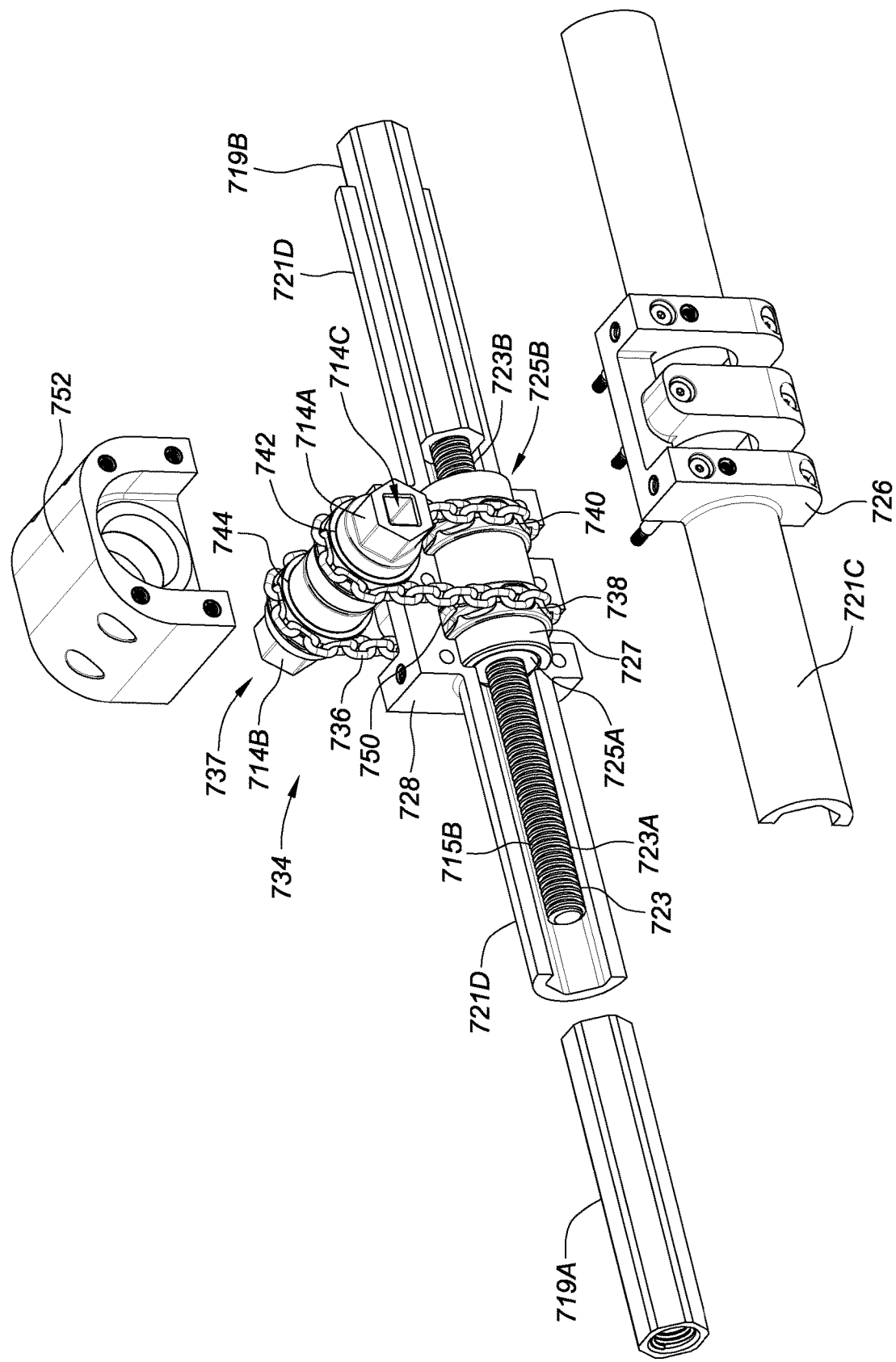
FIG. 43 is a partial perspective view showing elements of the load binder of FIG. 40 similar to that of FIG. 42 but further disassembled, consistent with other embodiments of the present invention.
Figure 44:
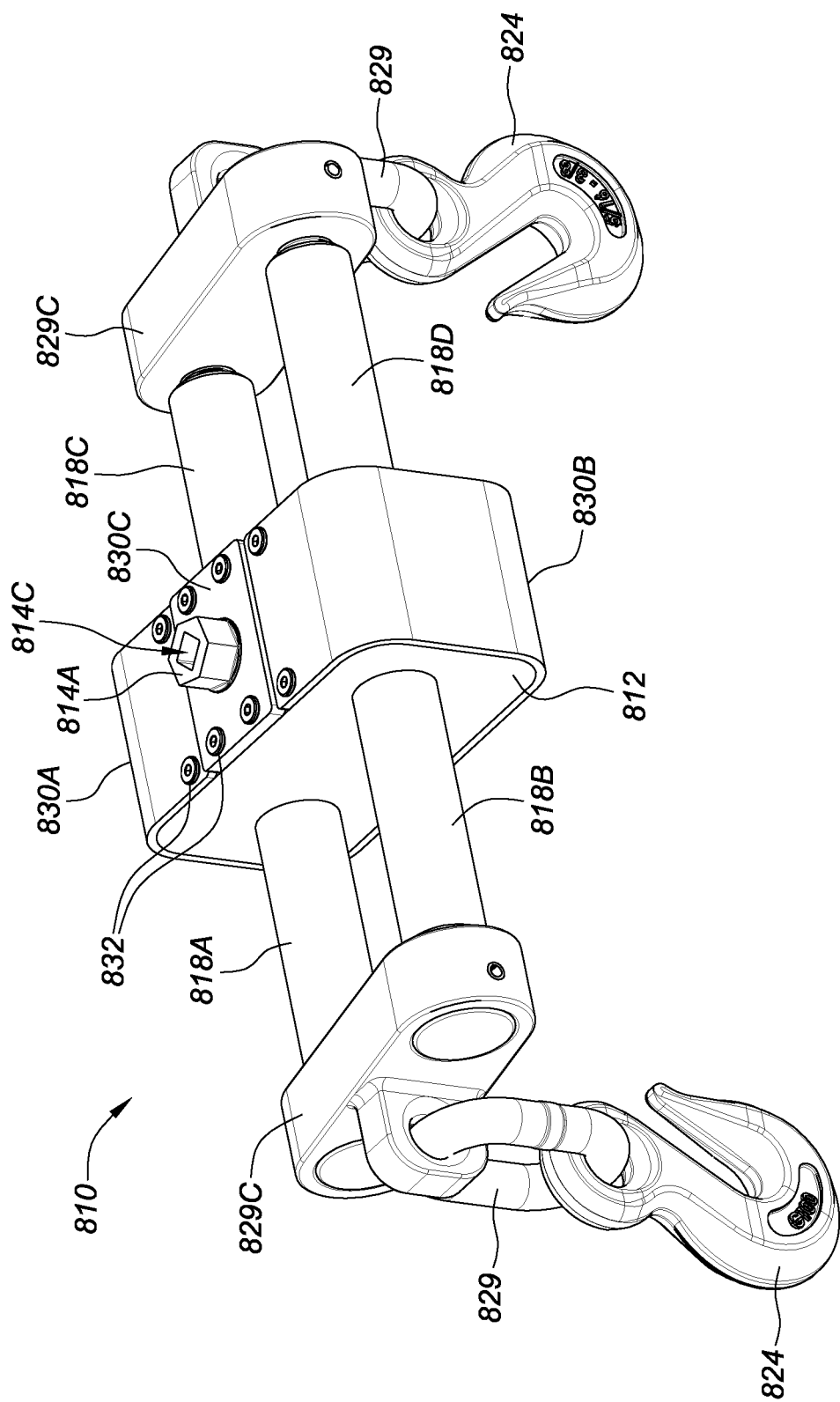
FIG. 44 is a perspective view of a further preferred embodiment of load binder including 4 threaded barrels and 4 threaded shafts, consistent with other embodiments of the present invention, illustrated with the threaded shafts retracted.
Figure 45:
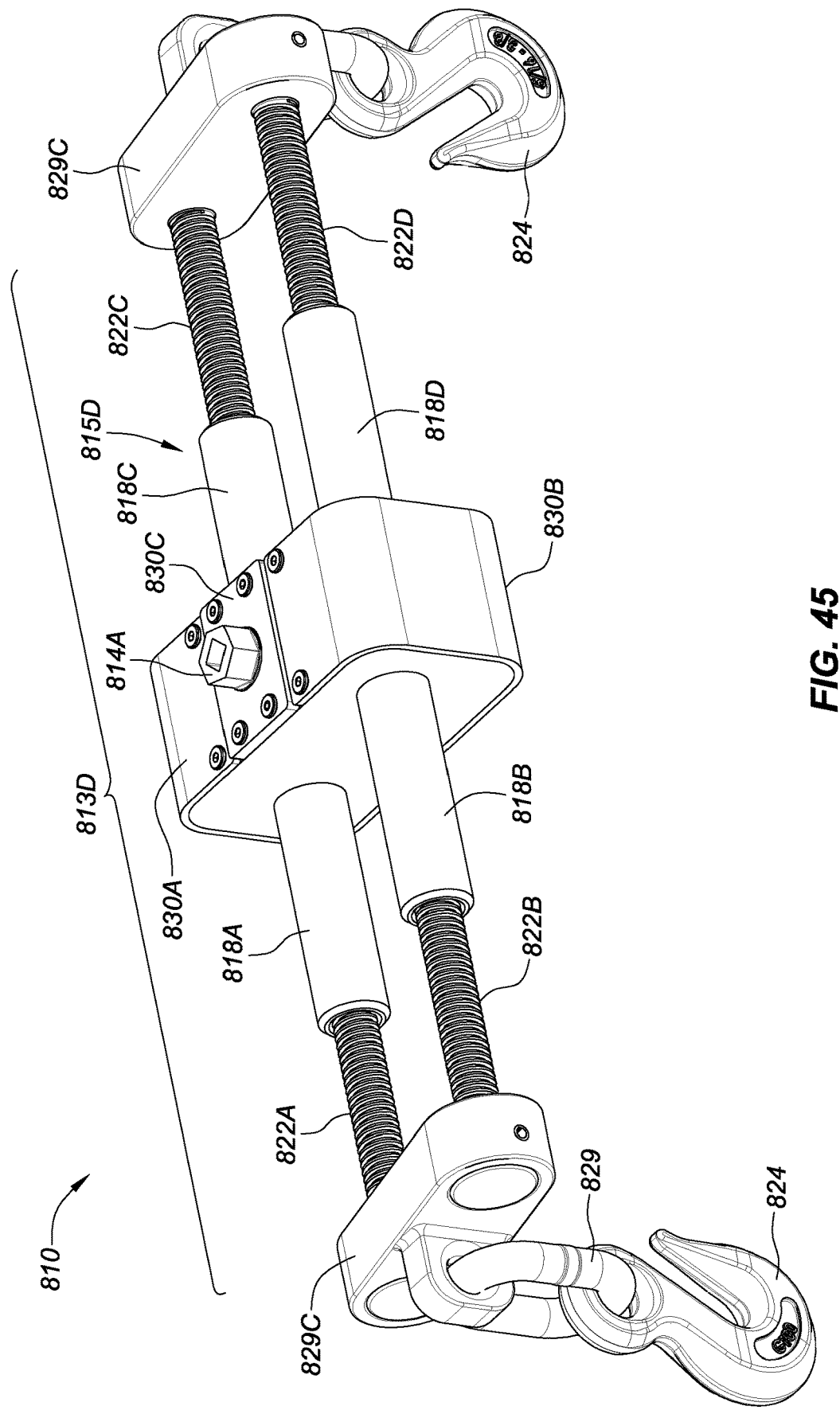
FIG. 45 is a perspective view of the load binder of FIG. 44, consistent with other embodiments of the present invention, illustrated with the threaded shafts extended.

FIG. 39 illustrates elements of the load binder 610 of FIG. 35 similar to FIG. 38 but with the gear set partially exploded. Elements shown on FIG. 39 include a drive mechanism 634, the frame body 612, the external hex drive 614A, the external gear hex drive 614C, the link chain 636, the driven link chain sheave 638, the primary link chain drive sheave 642, the secondary link chain drive sheave 644, the secondary driven link chain sheave 640, the first and second internally threaded tubes 618A and 618B, the handle 616, the gear housing 612A, the ratchet mechanism 658 and the ratchet direction lever 617A. The gear set 695 preferably includes a gear 695A which is secured to the internally threaded tube 618A, a gear 695B which is secured to the internally threaded tube 618B, and a gear 695C which is secured to the external hex drive 614A and attached to the gear housing 612A by a gear retainer post 632C and a gear retainer fastener 632B. Preferably, the load binder 610 includes sheave pockets 650.

In an additional embodiment of the load binding tool according to the present invention, a load binder (not shown) includes two internally threaded tubes similar to those of the load binder 610, but configured horizontally adjacent rather than vertically adjacent as in the load binder 610. As an alternative to the gear set coupling the rotation of the two internally threaded tubes, the load binding tool can include two chain drive mechanisms as described above, each rotating one of the dual threaded shafts, in opposite directions.

FIGS. 40-43 illustrate a further preferred embodiment of the load binding tool or load binder 710 for securing an elongated binding member at least partially around a load. This further embodiment is similar to the load binding tool 410 of FIG. 27. The load binding tool 710 preferably includes a dual threaded screw or shaft 723 similar to the threaded screw or shaft 423 of FIG. 33, and having first and second opposing end portions 723A and 723B, respectively, and first and second internally threaded tubes or extension nuts 719A and 719B, respectively, screwed onto the opposing end portions 723A and 723B of the threaded shaft 723; wherein the threading on the shaft end portions 723A and 723B and the respective internal threading in the extension nuts 719A and 719B are configured to provide common contraction and extension of the extension nuts 719A and 719B relative to the shaft 723 when the extension nuts 719A and 719B are not turning and the threaded shaft 723 is turning. Preferably, the first end portion 723A includes right-handed thread and the second end portion 723B includes left-handed thread, and the internal threading on the first extension nut 719A includes right-handed thread and the internal threading on the second extension nut 719B includes left-handed thread. Alternatively, these could be reversed, with the first end portion 723A and the internal threading on the first extension nut 719A including left-handed thread, and the second end portion 723B and the internal threading on the second extension nut 719B including right handed thread. The load binding tool 710 preferably includes two bushings 725A and 725B, the bushing 725A preferably being a right-handed thread bushing, the bushing 725B preferably being a left-handed thread bushing, and an outer sleeve 727 disposed about the bushings 725A and 725B, and a plurality of pins 731 (not visible, similar to pins 431 shown in FIG. 33) securing the outer sleeve 727 to the bushings 725A and 725B. The bushing 725A is preferably threaded to match the thread on end portion 723A and can be threaded onto the shaft 723 from end portion 723A until it is in position at a central portion 723C (not visible, similar to central portion 423C shown on FIG. 33). Similarly, the bushing 725B is preferably threaded to match the thread on end portion 723B and can be threaded onto the shaft 723 from end portion 723B until it is in position at the central portion 723C. The bushings 725A and 725B have differing threads, one being right-hand threaded, and the other being left-hand threaded, and when bushings 725A and 725B are both secured by the pins 731 to the outer sleeve 727, the bushings 725A and 725B are secured in place at the central portion 723C. The load binder 710 preferably includes a drive mechanism 734 similar to the drive mechanism 434 of FIG. 31. The pins 731 that are aligned with the driven link chain sheave 738 preferably extend to secure the driven link chain sheave 738. Thus, the outer sleeve 727, threaded shaft 723, the bushings 725A and 725B, and the driven link chain sheave 738 are thereby secured together to rotate as a unit when driven by movement of a link chain 736, similar to link chain 436.

The load binding tool 710 preferably includes a drive shaft (hidden from view in FIGS. 40-43) similar to that associated with the load binding tool 410 illustrated herein, proximate the threaded shaft 723 and perpendicular to the threaded shaft 723, and external hex drives or nuts 714A and 714B coupled with the drive shaft; the primary link chain drive sheave 742 is preferably coupled with the drive shaft, similar to that of the load binding tool 410. The drive chain or link chain 736 is movably engaged with the driven link chain sheave 738, the primary link chain drive sheave 742, the secondary driven link chain sheave 740, and the secondary link chain drive sheave 744 in a closed loop configuration.

The load binder 710 preferably includes a frame body 712 which includes a left hand side (LHS) frame body 726 and a right hand side (RHS) frame body 728 and an upper frame body 752. The LHS frame body 726 can be secured to the RHS frame body 728 with one or more frame fasteners 732. The LHS frame body 726 preferably includes LHS external sleeve portions 721C, which extend from the LHS frame body 726. Similarly, the RHS frame body 728 includes RHS external sleeve portions 721D, which extend from the RHS frame body 728. When the LHS frame body 726 is secured to the RHS frame body 728 with frame fasteners 732, the external sleeve portions 721C and 721D together form external sleeves similar to the external sleeves 421A and 421B of FIG. 28. Preferably, two outer sleeves 760 are secured to the external sleeve portions 721C and 721D by frame fasteners 732 and secure the sleeve portions 721C and 721D together. Two opposing eye bolts 722A and 722B have threads that match the thread on extension nuts 719A and 719B, respectively, with eye bolt 422A and extension nut 419A having right-hand thread, while eye bolt 422B and extension nut 419B have left-hand thread, for example. The eye bolts 722A and 722B are secured to the extension nuts 719A and 719B so that eye bolt 722A and extension nut 719A rotate together during operation of the load binder 710. Similarly, eye bolt 722B and extension nut 719B rotate together during use. A grab hook 724 is preferably secured to each eye bolt 722A and 722B by hook link 729. The grab hooks 724 can couple with a binding member (e.g., a chain, a rope, a cable, a strap, etc.; not shown in FIG. 40) for securing the load. The binding member can be one continuous element with each end coupling with one of the grab hooks 724, or each grab hook 724 can couple with a separate binding element.

External nuts 714A and 714B can be rotated with a hex drive tool (e.g., using a hand tool (i.e., a socket wrench, etc.) or a power tool (e.g., a cordless drill, etc.)) to drive the threaded shaft 723 via the drive mechanism 734. The rotation of the threaded shaft 723 can, in turn, cause the eye bolts 722A and 722B which are secured to the extension nuts 719A and 719B, respectively, to move inwardly along the threaded shaft 723 (e.g., tightening the load binder 710; wherein the distance between the two threaded eye bolts 722A and 722B decreases) or outwardly along the threaded shaft 723 (e.g., loosening the load binder 710; wherein the distance between the two threaded eye bolts 722A and 722B increases). The external nuts 714A and 714B each preferably include an engagement recess 714C such as a square recess for engagement with a square drive tool such as a half-inch square drive ratchet wrench, without the need for a socket to engage the external hex of the external nuts 714A or 714B.

Although the external hex drives and nuts are described herein using "hex" and illustrated as 6-sided structures similar to common bolts, nuts, and sockets, and the engagement recess illustrated as a 4-sided structure similar to square drives, a variety of engaging structure shapes can be used, including slots, cross, star, 3- to 12-sided shapes, oval, D-shapes or other engaging shape structures. The external hex drives and nuts and engagement recess preferably accommodate readily-available tools, such as square, hex, and star drives and sockets. The terminology used herein "hex" or "square" is not intended to be limiting in this regard, but a use of common terminology for ease of understanding.

The load binder 710 preferably includes an elongated threaded contraction expansion assembly 713B having an elongated threaded member 715B, preferably the dual threaded shaft 723 which has opposing ends 723A and 723B having opposite or opposing thread patterns. The elongated threaded contraction expansion assembly 713B also includes opposing extension nuts 719A and 719B that have opposite or opposing thread patterns and are threadedly engaged with the opposing end portions 723A and 723B of the dual threaded shaft 723, and end screws which are preferably the eye bolts 722A and 722B. When the extension nuts 719A and 719B are threaded onto the respective end portions 723A and 723B of the dual threaded shaft 723, the external sleeves 721A and 721B will be secured over and around the respective extension nuts 719A and 719B to prevent the extension nuts 719A and 719B from rotating when the dual threaded screw or shaft 723 rotates, so that the respective extension nuts 719A and 719B turn or rotate with the eyebolts 722A and 722B, preferably when engaged within the end of the respective extension nuts 719A and 719B, will either extend outwardly on each end or contract inwardly on each end when the dual threaded screw or shaft 723 rotates. It will be appreciated that the dual threaded screw or shaft 723 will either draw the extension nuts 719A and 719B inward or extend them outward within the external sleeves 721A and 721B when the elongated threaded member 715B is rotated.

The external sleeves 721A and 721B have internal profile which correspond to the external profile of the corresponding extension nuts 719A and 719B. As shown in the embodiment illustrated in FIGS. 40-43, the external nuts 719A and 719B are preferably hex shaped, and the internal profile of the external sleeves 721A and 721B are also preferably hex shaped, so that the extension nuts 719A and 719B can slide inwardly and outwardly within the external sleeves 721A and 721B as drawn inward or extended outward along the threaded shaft 723, as the threaded shaft 723 is rotated by the drive mechanism 734.

As will be appreciated, the hex shape of the respective extension nuts 719A and 719B is a design choice and modification of this shape can be made so as to have a square-shaped cross-section, a splined cross section, an oval-shaped cross-section and the like, so long as the external sleeves 721A and 721B have a corresponding opening for receiving the respective extension nuts 719A and 719B and hold the extension nuts 719A and 719B in their rotational position so that the respective extension nuts 719A and 719B cannot rotate when the dual threaded shaft 723 rotates. Preferably, the external sleeves 721A and 721B have low frictional resistance, which enables them to slide easily over the extension nuts 719A and 719B. For example, the external sleeves 721A and 721B can be fabricated from a plastic or polymeric material, which has lubricious properties; or, alternatively, other low-friction materials can be utilized. The external sleeves 721A and 721B preferably include the external sleeve portions 721C and 721D that are contiguous with the respective LHS frame body 726 and RHS frame body 728, respectively, and the assembly is preferably secured with frame fasteners 732 and outer sleeves 760, so that any tendency of the extension nuts 719A and 719B to rotate and apply torque during operation of the load binder 710 is minimized, and the load binder 710 can be used to tighten or loosen the binding member without unwanted twisting of the load binder 710 or the binding member.

In preferred embodiments, the frame body 712 can include an outer access cover 730 that is removably coupled with a portion of the frame body 712. One or more frame fasteners 432 can couple the LHS frame body 426 with the RHS frame body 428 and the upper frame body 752 together as shown. This outer access cover 730 can allow a user to access the internal components of the drive mechanism 734 for maintenance and service (e.g., cleaning, lubrication inspection and/or repair of the drive mechanism). Removing the outer access cover 730 can provide access to the drive chain 736, for example.

Preferably, the sheaves 738, 740, 742, and 744 include sheave pockets 750. In some embodiments, sheave pockets 750 can be omitted from the secondary driven link chain sheave 740 and the secondary link chain drive sheave 744, analogous to idler sheaves described with respect to other embodiments elsewhere herein. We have discovered, however, that it is preferable that all the sheaves 738, 740, 742, and 744 include sheave pockets 750 to better distribute forces and slack along the link chain 736. Preferably, the external hex drive 714A, the external hex drive 714B, the primary link chain drive sheave 742, and the secondary link chain drive sheave 744, are coaxially coupled with the drive shaft 737 (hidden from view, but similar to drive shaft 437 of the load binder 410, see FIG. 32).

Preferably, a plurality of pins 731 are utilized to ensure that the driven link chain sheave 738, the bushings 725A and 725B, and the outer sleeve 727 are secured in place on the threaded shaft 723 and do not slip when the drive mechanism 734 is engaged by a user by using the external hex drives 714A or 714B. The pins 731 can be placed at any suitable location of the driven link chain sheave 738 and threaded shaft 723. Preferably, 4 pins 731 are used, but any suitable number of pins 731 can be used (e.g., 2 pins, 3 pins, 4 pins, 5 pins, or more).

Figure 46:
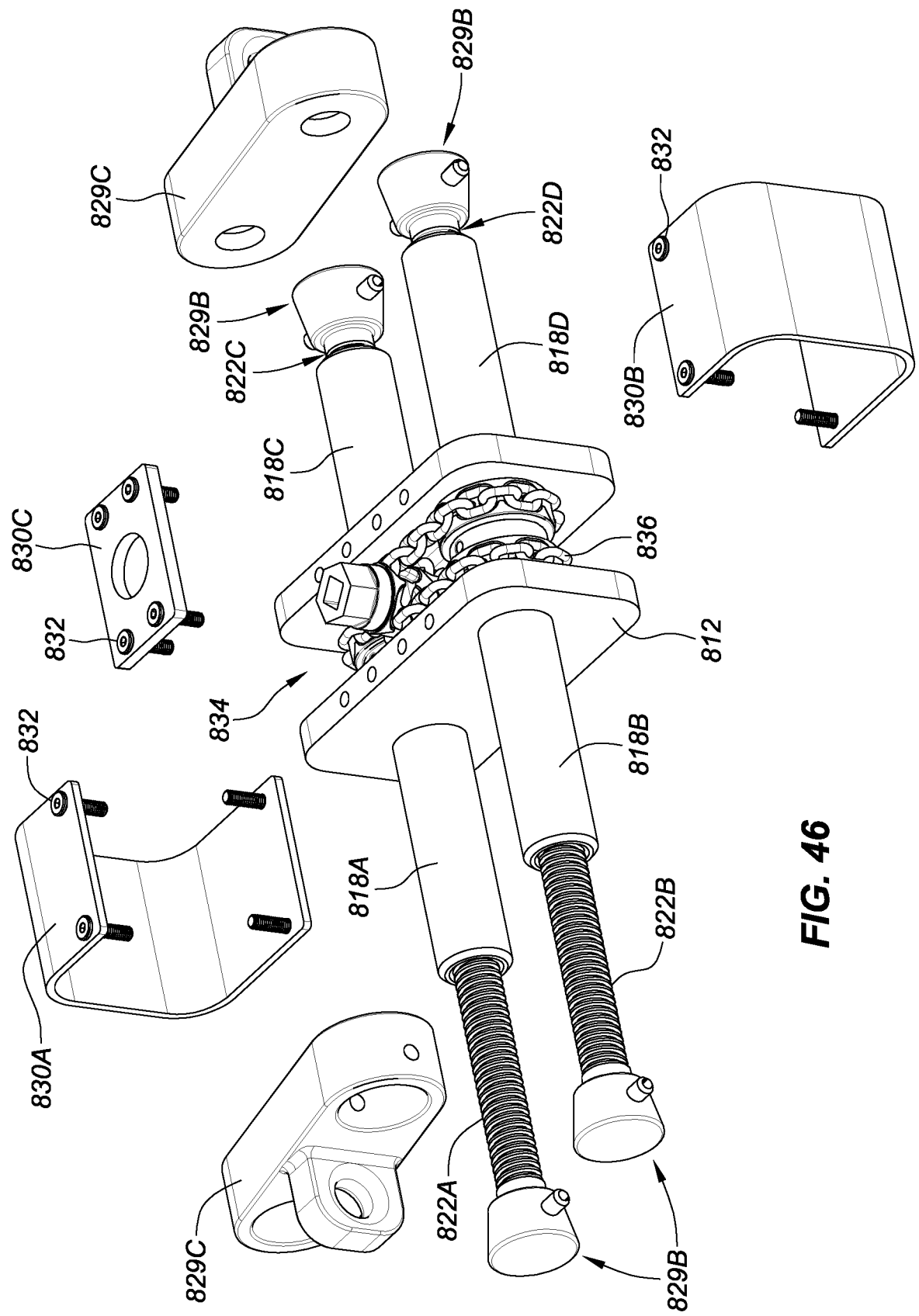
FIG. 46 is a partial perspective view showing elements of the load binder of FIG. 44, consistent with other embodiments of the present invention, illustrated with 2 threaded shafts retracted as in FIG. 44 and 2 threaded shafts extended as in FIG. 45 for illustration, and shown partially disassembled.
Figure 47:
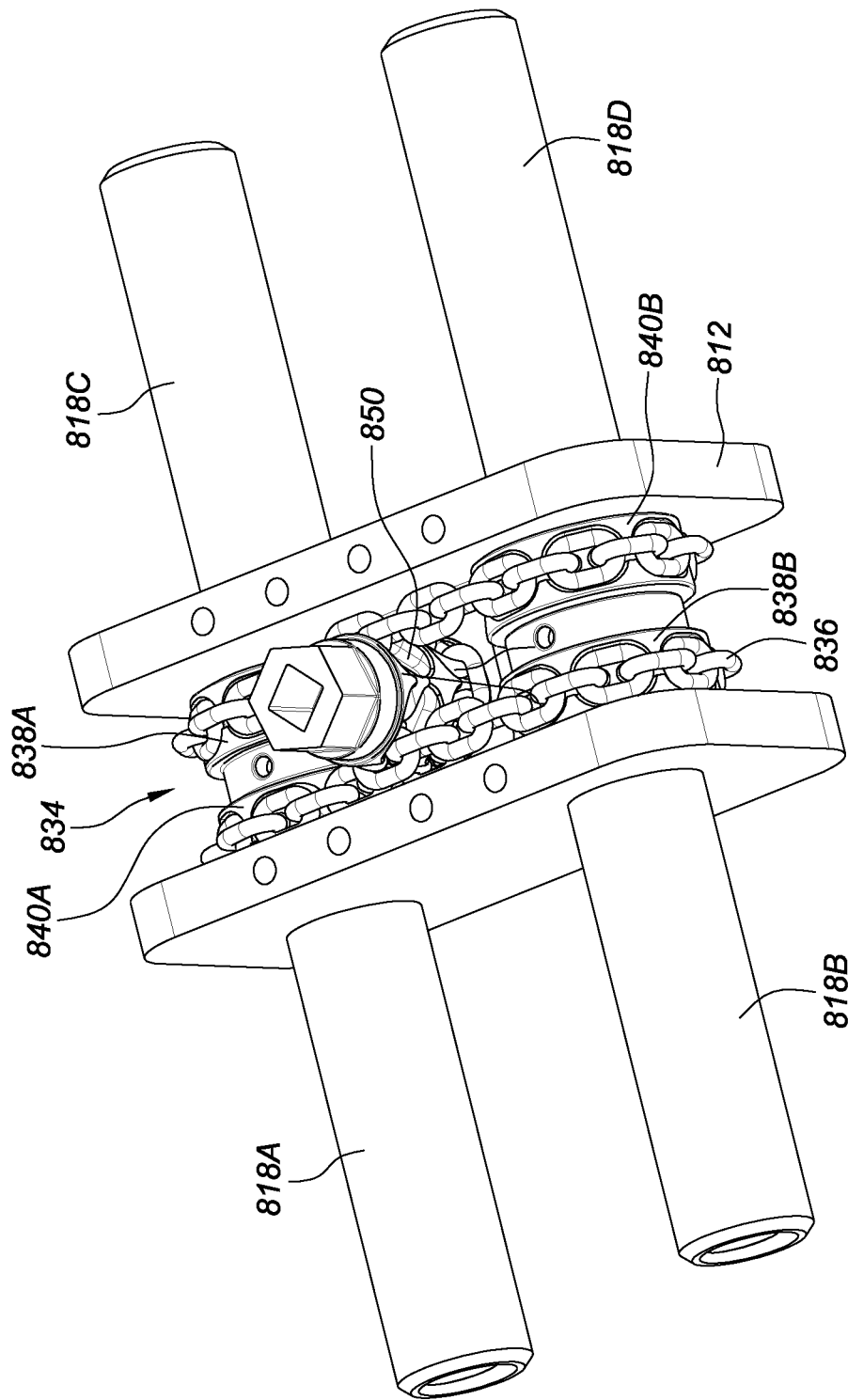
FIG. 47 is a partial perspective view showing elements of the load binder of FIG. similar to that of FIG. 46 but further disassembled, consistent with other embodiments of the present invention.

FIGS. 44-48C illustrate a further preferred embodiment of the load binding tool or load binder 810 for securing an elongated binding member at least partially around a load. The load binder 810 is shown with threaded shafts 822A, 822B, 822C and 822D retracted in a perspective view in FIG. 44. and with the threaded shafts 822A, 822B, 822C and 822D extended in a perspective view in FIG. 45. Portions of the load binder 810 are shown partially disassembled in a perspective view in FIG. 46. It will be appreciated that the load binder 810 is illustrated in FIG. 46 with portions retracted as in FIG. 44 and with portions extended as in FIG. 45, for the purpose of illustration. In FIG. 46, the right side of the elongated threaded contraction expansion assembly 813D is shown contracted, while the left side is shown expanded, for illustration purposes only. It will be understood that, in use, both ends of the elongated threaded contraction expansion assembly 813D would be contracted, or both ends of the elongated threaded contraction expansion assembly 813D would be expanded. An enlarged partial perspective view of elements of the load binder of 810 is shown in FIG. 47. Elements of the load binder 810 illustrating further details of the drive mechanism 834, are shown in a top view in FIG. 48A, end view in FIG. 48B, and perspective view in FIG. 48C.

The load binding tool or load binder 810 preferably includes an elongated threaded contraction expansion assembly 813D. The elongated threaded contraction expansion assembly 813D preferably includes an elongated threaded member 815D, which includes a first internally threaded tube portion 818A, a second internally threaded tube portion 818B, a third internally threaded tube portion 818C, and a fourth internally threaded tube portion 818D. The elongated contraction expansion assembly 813D also preferably includes four threaded shafts 822A, 822B, 822C, and 822D. The threaded shafts 822A and 822C preferably have opposing screw threading (i.e., one having right-handed threading and the other having left-handed threading), with the internally threaded tube portions 818A and 818C having corresponding internal threading for receiving the threaded shafts 822A and 822C, respectively, wherein the threading in the internally threaded tube portions 818A and 818C and on the respective opposing threaded shafts 822A and 822C is constructed and arranged to provide common contraction or extension of the respective opposing threaded shafts 822A and 822C when the respective opposing threaded shafts 822A and 822C are engaged within the respective internally threaded tube portions 818A and 818C. As such, when the internally threaded tube portions 818A and 818C are rotated together in one direction or another, the opposing threaded shafts 822A and 822C are not rotated.

Similarly, threaded shafts 822B and 822D preferably have opposing screw threading (i.e., one having right-handed threading and the other having left-handed threading), with the internally threaded tube portions 818B and 818D having corresponding internal threading for receiving the threaded shafts 822B and 822D, respectively, wherein the threading in the internally threaded tube portions 818B and 818D and on the respective opposing threaded shafts 822B and 822D is constructed and arranged to provide common contraction or extension of the respective opposing threaded shafts 822B and 822D when the respective opposing threaded shafts 822B and 822D are engaged within the respective internally threaded tube portions 818B and 818D and when the internally threaded tube portions 818B and 818B are rotated together in one direction or another and the opposing threaded shafts 822B and 822D are not rotated.

In preferred embodiments, threaded shafts 822A and 822B have opposing screw threading (i.e., one having right-handed threading and the other having left-handed threading), with the corresponding internally threaded tube portions 818A and 818B having corresponding internal threading for receiving the threaded shafts 822A and 822B, respectively, and the threaded shafts 822C and 822D have opposing screw threading (i.e., one having right-handed threading and the other having left-handed threading), with the corresponding internally threaded tube portions 818C and 818D having corresponding internal threading for receiving the threaded shafts 822C and 822D, respectively. For example, in one preferred embodiment, the threaded shafts 822A and 822D and the corresponding internally threaded tube portions 818A and 818D have right-handed threading, while the threaded shafts 822B and 822C and the corresponding internally threaded tube portions 818B and 818C have left-handed threading. This arrangement advantageously provides reduced tendency for the load binder 810 to rotate in response to torque when operated.

In this embodiment, the internally threaded tube portions 818A and 818C are preferably constructed as a single component (such as separate pieces attached or secured together, or fabricated from a single piece of material) that extends through a frame body 812, but that has opposing internal threading as described above. Preferably, the load binder 810 includes a driven link chain sheave 838A and an idler sheave 840A secured to the internally threaded tube portions 818A and 818C. Similarly, preferably, the internally threaded tube portions 818B and 818D are constructed as a single component that extends through a frame body 812, but that has opposing internal threading as described above. Preferably, the load binder 810 includes a driven link chain sheave 838B and an idler sheave 840B secured to the internally threaded tube portions 818B and 818D.

The load binder 810 preferably includes a drive mechanism 834, which utilizes a closed loop of a flexible coupler (i.e., a drive chain, a link chain, a belt, or other similar item) arranged in a looped configuration that engages elements as described herein. The drive mechanism 834 preferably includes a drive chain or link chain 836. The frame body 812 is preferably constructed and arranged to secure a drive shaft 837 and the internally threaded tube portions 818A, 818C, 818B, 818D in alignment to enable the link chain 836 to route in a closed loop as illustrated and described. The drive shaft 837 preferably includes drive sheaves 842A, 842B, which preferably include sheave pockets 850. The drive shaft 837 can be machined to include sheave pockets 850, or separate drive sheaves 842A, 842B can be secured to the drive shaft 837. The driven link chain sheaves 838A and 838B, and the idler sheaves 840A and 840B also preferably include a plurality of sheave pockets 850 (i.e., recesses, openings, holes, etc.) that couple with (i.e., engages, contacts, etc.) an individual portion (e.g., one chain link) of the drive chain 836. Each of the sheave pockets 850 can contact an outer portion of one of the chain links to transfer force between the link chain 836 and the respective sheave (drive sheave 842A, 842B, driven link chain sheave 838A, 838B, idler sheave 840A, 840B). The coupling of chain links of the link chain 836 and the plurality of sheave pockets 850 can minimize slippage of the link chain 836 when the load binder 810 is adjusted by a user. The sheave pockets 850 can be shaped to accommodate a weld joint or other feature of the chain links of the drive chain 836. The various sheaves (drive sheave 842A, 842B, driven link chain sheave 838A, 838B, idler sheave 840A, 840B) preferably include sheave pockets 850 and to provide additional coupling of the drive chain 836 for effective transfer of force while minimizing slippage of the drive chain 836 on the respective sheave(s). As shown in FIGS. 48B and 48C, the driven link chain sheave 838B and idler sheave 840B are preferably positioned higher than the driven link chain sheave 838A and idler sheave 840A so that the link chain 836 engages the drive sheaves 842A and 842B generally perpendicular to the drive shaft 837. This arrangement is preferred in order to align the link chain 836 with the sheave pockets 850 and may provide enhanced engagement of the link chain 836 with the drive sheaves 842A and 842B and may reduce slippage and wear.

The load binder 810 preferably includes an external hex drive or nut 814A and a drive recess 814C. The external hex drive or nut 814A and a drive recess 814C are preferably coupled by the drive shaft 837 with the drive sheaves 842A and 842B. The external hex drive 814A can be rotated with a hex drive tool such as by using a hand tool such as a socket wrench, etc. or by using a power tool such as a cordless drill, etc. and by engaging the hex drive tool to the external hex drive 814A or by engaging a similar hand tool or power tool to the drive recess 814C such as a square drive tool. By engaging the external hex drive or nut 814A or the drive recess 814C with a corresponding tool, the user can drive the internally threaded tube portions 818A, 818B, 818C, and 818D by way of the drive mechanism 834. As the external hex drive 814A is rotated clockwise or counterclockwise, the internally threaded tube portions 818A, 818B, 818C, and 818D rotate in a corresponding manner, which extends or retracts the four threaded shafts 822A, 822B, 822C, 822D in concert, thereby expanding or contracting the elongated contraction expansion assembly 813D and loosen or tighten a binding member (not shown) to release or secure a load (not shown) secured to a surface or the like (not shown).

The load binder 810 preferably includes four shaft retainers 829B which secure the threaded shafts 822A, 822B, 822C, 822D to two link retainer blocks 8290; preferably, the threaded shafts 822A and 822B are secured to one of the retainer blocks 829C, and the threaded shafts 822C and 822D are secured to the other of the retainer blocks 829C as illustrated. The load binder 810 preferably includes two grab hooks 824, each secured to one of the retainer blocks 829C by a hook link 829 as shown. The grab hooks 824 are configured and arranged to couple with a binding member (e.g., a chain, a rope, a cable, a strap, etc.) (not shown) for securing a load.

The load binder 810 preferably includes outer access covers 830A and 830B and hex drive cover 830C, which are secured to the frame body 812 by frame fasteners 832, to provide protection of the drive mechanism 834 while allowing access for any necessary maintenance or repair.

The drive mechanisms described herein offer advantages over the prior art load binder mechanisms. For example, the link chains offer a natural advantage for orienting the drive handle axis of rotation 90 degrees from the threaded rod or barrel axis of rotation. Utilizing such a chain drive mechanism offers high strength, high reliability, and efficient production cost. Such a chain drive mechanism is more tolerant of dirt and foreign debris, allow for simple adjustment for wear or slack, require little or no lubrication, and can tolerate looser tolerances than prior bevel gear mechanisms.

The embodiments described herein include various actuation features, such as attached single or dual ratchet mechanisms and handles, removable wrenches and handles, attachment gears, hex nuts, external drive coupling, external hex drive, and so forth. Additional drive coupling features such as incorporating square, slotted, star-shaped, sockets or external drive features, and so forth are contemplated and within the scope of the present disclosure, as are various combinations of one or more of these actuation features.

For any of the embodiments described herein, the sizes of the various sheaves/idlers can be varied to allow for different sizes of drive chains. By controlling the load binder's drive and driven (i.e., idler) sheave diameters, and thus number of link pockets, along with the length of the provided handle, a wide range of drive chain link wire diameters and heat treat grades can be accommodated while ensuring that the chain does not exceed its working load limit (WLL) in most instances. The chain drive sheave configuration is derived from well understood hoist and windless designs. This knowledge indicates that the minimum size would be a sheave that can accommodate six links around its entire periphery, that is three flat horizontal pockets and three adjacent and 90 degree rotated links in the sheave slots. For a given input torque, the 6 link sheave provides that greatest gear reduction and thus highest leverage and tensile force to the drive chain due to having the shortest effective moment arm length.

The load binder's size ranges are expected to accommodate tie down chain sizes up to Grade 100 5/8" or 16 mm wire diameters. For these larger load binder sizes, drive chain sizes up to 6 mm wire diameter with a strength rating of Grade 80 in conjunction with a six link sheave (three flat pockets) may be used along with longer drive handle lengths to allow the preloading of the tie down chain to near WLL levels using reasonable single handed pulling forces on the handle without the use of a "cheater" bar (the use of cheater bars is forbidden with all ratchet binders and would also be the case with the load binder). For smaller load binder sizes that can load tie down chain with a wire diameter of 5/16" or 8 mm, the drive chain loop can be reduced to a 2 mm wire diameter at Grade 80 strength levels (this is likely the limit of link producibility) by increasing the drive sheave diameter to a 12 link configuration, thus cutting the tensile load in half for a given input torque relative to a 6 link sheave. Drive chain strength levels can be reduced to lower grades for a given sheave size by increasing the link wire diameter—for the instance above, a 2.4 mm Grade 70 chain may be used. Input torques can also be limited by the handle length or a specified maximum torque for the occasions that a separate external socket head ratchet wrench or electric wrench drives are used.

The physical proportions of the drive chain links are dictated by those typically used for lifting hoist and tie down chain in the Grade 70 to Grade 120 strength ranges. For these chains, the internal link length (pitch) is typically shorter than lower grade chains with a ratio in the range of 2.5 to 3.0 times the wire diameter. The internal link widths are within the ranges of 1.2 to 1.6 times the wire diameter. Grade 120 chains are produced by drawing round wire into a D-shaped or square rod section profile that increases that amount of material and thus strength for a given link size. The load binder's drive and driven sheave pockets and slots can be made to accommodate any of these link cross-sectional shapes of external size proportions. The load binder drive chain idler sheaves can be produced with pockets and slots similar to the drive sheaves or in a polygon configuration with multiple flat surfaces that will provide improved load distributions relative to a circular pulley type of idler sheave configuration.

In summary, The following load binder attributes are some of the features that can be varied in combinations as required for product producibility and cost issues while ensuring sufficient strength and durability levels:

Drive sheave size can range from a minimum of six links to 18 or more—the larger sheave sizes result in a proportional decrease in the tensile loads input into the drive chain.

Drive chain sizes can be varied from 2 mm up to 6 mm+ as required to achieve tensile loads near the load binder WLL for a specified input torque or handle pull force.

Drive chain strengths can vary between G70 to G120, higher grade chains can utilize smaller link wire diameters for a given required tensile strength.

A variety of drive chain cross-section shapes can be accommodated by the pocket designs of the drive, driven and idler sheaves.

When a box end or ratchet handle is supplied, the amount of input torque can be limited by adjusting the length and specifying the maximum input force that can be applied.

For those instances wherein an external socket ratchet wrench or electric wrench are used to rotate the load binder's external hex drive input, a maximum torque level may be specified to ensure that the drive chain is not subjected to tensile forces beyond its WLL.

For the load binder embodiments that utilize an internal ratcheting system, a friction based torque limiting clutch system may be incorporated to ensure that the WLL is not exceeded. This torque limiting system or indicator is typically found on torque wrenches.

A preferred embodiment of the present invention includes a load binding tool for securing a load; the load binding tool including an internally threaded tube and two opposing threaded shafts having opposing screw threading; the internally threaded tube having opposing open ends each of which is internally threaded for receiving one of the respected opposing threaded shafts, wherein the threading in the internally threaded tube and on the respective opposing threaded shafts is constructed and arranged to provide common contraction or extension of the respective opposing threaded shafts when the respective opposing threaded shafts are engaged within the respective opposing open ends of the internally threaded tube and when the internally threaded tube is rotated one direction or another and the opposing threaded shafts are not rotated. The load bind tool preferably including a driven link chain sheave coupled with the internally threaded tube, wherein the driven link chain sheave is secured to the internally threaded tube so that the internally threaded tube rotated when the driven link chain sheave rotated; a drive shaft proximate the internally threaded tube oriented in a generally perpendicular orientation to the internally threaded tube; a primary link chain drive sheave coupled with the drive shaft; an external hex drive coupled to the primary link chain drive sheave; a shaft idler sheave coupled with the drive shaft; and a link chain movably engaged with the driven link chain sheave and the primary link chain drive sheave, wherein the external hex drive can be rotated to turn the primary link chain drive sheave in such a way so as to draw the ends of the respective opposing threaded shafts closer together or further apart.

In preferred embodiments, the load binding tool further includes a frame body, wherein the frame body includes a left hand side frame body and a right hand side frame body; the frame body preferably includes a frame grip and the external hex drive is accessible through an opening in the frame body, wherein the frame body further includes an outer access cover removably coupled with the frame body. The load binding tool preferably including a pair of elongated binding members for interconnection with respective opposing threaded shafts and to the at least partially engage the load and an internally threaded tube idler sheave coupled with the internally threaded tube, wherein the internally threaded tube idler sheave is proximate the driven link chain sheave and coaxial with the internally threaded tube; a handle; a shaft idler sheave coupled with the drive shaft; and a ratchet mechanism with the handle, wherein the ratchet mechanism engages the handle with the drive shaft. The external hex drive is preferably movably engaged with a drive mechanism, wherein the drive mechanism includes: a driven link chain sheave; a threaded barrel idler sheave; a primary link chain drive sheave; and a drive chain, wherein the drive chain is movably engaged with the driven link chain sheave, the threaded barrel idler sheave, the primary link chain drive sheave, and the secondary link idler sheave in a closed loop configuration.

A further embodiment load binding tool of the present invention includes an internally threaded tube and opposing open ends, threaded shafts threadably inserted into the opposing open ends and the threading in the internally threaded tube and on the threaded shafts adapted to provide common contraction and extension of the threaded shafts relative to the internally threaded tube interior with the shafts not turning and the internally threaded tube turning. This embodiment preferably further including a driven link chain sheave coupled with the internally threaded tube; an internally threaded tube idler sheave coupled with the internally threaded tube, wherein the internally threaded tube idler sheave is proximate the driven link chain sheave and coaxial with the internally threaded tube; a drive shaft proximate the internally threaded tube and perpendicular to the internally threaded tube; a primary link chain drive sheave coupled with the shaft, wherein the primary link chain drive sheave includes a primary ratchet handle attachment; a handle; and a ratchet mechanism, wherein the ratchet mechanism engages the handle with the drive shaft. The load binding tool preferably further including an external hex drive coupled to the primary link chain drive sheave; a shaft idler sheave coupled with the shaft; a link chain movably engaged with the driven link chain sheave, the primary link chain drive sheave, an internally threaded tube idler sheave, and the shaft idler sheave. the further embodiment preferably including a frame body, wherein the frame body includes a left hand side frame body and a right hand side frame body; and wherein the frame body further includes a frame grip. The load binding will preferably include a pair of elongated binding members for interconnection with respective opposing threaded shafts for at the least partially securing the load. The external hex drive is preferably movably engaged with a drive mechanism, wherein the drive mechanism preferably includes a driven link chain sheave; a threaded barrel idler sheave; a primary link chain drive sheave; a secondary link idler sheave; and a drive chain; wherein the drive chain is movably coupled with the driven link chain sheave, the threaded barrel idler sheave, the primary link chain drive sheave, and the secondary link idler sheave in a closed loop configuration.

A further embodiment of the load binding tool for securing an elongated binding member at least partially around a load will preferably include an internally threaded tube and opposing open ends, threaded shafts threadably inserted into the opposing open ends, wherein the threading in the tube and on the shafts are adapted to provide common contraction and extension of the shafts relative to the tube interior with the shafts not turning and the tube turning. the load binding tool preferably including a driven link chain sheave coupled with the internally threaded tube; a tube idler sheave coupled with the internally threaded tube, wherein the tube idler sheave is proximate the driven link chain sheave and coaxial with the internally threaded tube; a drive shaft proximate the internally threaded tube and perpendicular to the internally threaded tube; a primary link chain drive sheave coupled with the shaft, wherein the primary link chain drive sheave comprises a primary ratchet handle attachment; a handle; a ratchet mechanism coupled with the handle, wherein the ratchet mechanism engages the handle with the drive shaft; a first external hex drive coupled to the primary link chain drive sheave; a secondary link chain drive sheave coupled with the shaft, wherein the secondary link chain drive sheave; a second external hex drive coupled with the secondary link chain drive sheave; and a link chain movably engaged with the driven link chain sheave, the primary link chain drive sheave, the tube idler sheave, and the secondary link chain drive sheave. The preferred load binding tool further including a frame body, wherein the frame body includes a left hand side frame body and a right hand side frame body; and the frame body preferably includes a frame grip. In further embodiments, the load binding tool preferably includes a pair of elongated binding members for interconnection with respective opposing threaded shafts for at the least partially securing the load. In further embodiments, the external hex drive of the load binding tool is preferably movably engaged with a drive mechanism, and the drive mechanism preferable includes: a driven link chain sheave; a threaded barrel idler sheave; a primary link chain drive sheave; a secondary link idler sheave; and a drive chain; wherein the drive chain is movably coupled with the driven link chain sheave, the threaded barrel idler sheave, the primary link chain drive sheave, and the secondary link idler sheave in a closed loop configuration.

A further embodiment load binding tool preferably includes an internally threaded tube and opposing open ends, threaded shafts threadably inserted into the opposing open ends and the threading in the tube and on the shafts adapted to provide common contraction and extension of the shafts relative to the tube interior with the shafts not turning and the tube turning; a driven belt sheave coupled with the internally threaded tube; a tube idler sheave coupled with the internally threaded tube, wherein the tube idler sheave is proximate the driven belt sheave and coaxial with the internally threaded tube; a drive shaft proximate the internally threaded tube and perpendicular to the internally threaded tube; a primary belt drive sheave coupled with the drive shaft, wherein the primary belt drive sheave includes a primary ratchet handle attachment; a handle; a ratchet mechanism coupled with the handle; an external hex drive coupled to the primary belt drive sheave; a shaft idler sheave coupled with the shaft; and a belt movably engaged with the driven belt sheave, the primary belt drive sheave, the tube idler sheave, and the shaft idler sheave. In further preferred embodiments the belt of the load binding tool preferably includes a ribbed belt or a toothed belt. In further embodiments the load binding tool preferably includes a frame body, wherein the frame body includes a left hand side frame body and a right hand side frame body; and the frame body preferably includes a frame grip. A further preferred load binding tool includes a pair of elongated binding members for interconnection with respective opposing threaded shafts for at the least partially securing the load. In a further preferred load binding tool, the external hex drive is movably engaged with a drive mechanism, and the drive mechanism includes: a driven link chain sheave; a threaded barrel idler sheave; a primary link chain drive sheave; a secondary link idler sheave; and a drive chain; wherein the drive chain is movably coupled with the driven link chain sheave, the threaded barrel idler sheave, the primary link chain drive sheave, and the secondary link idler sheave in a closed loop configuration.

In yet another load binding tool for securing an elongated binding member at least partially around a load; the load binding tool preferably includes an internally threaded tube having opposing open ends, threaded shafts threadably inserted into the opposing open ends; wherein the internal threading in the tube and on the respective threaded shafts is adapted to provide common contraction and extension of the shafts relative to the tube when the threaded shafts are not turning and the internal tube is turning. The load binding tool preferably includes a driven link chain sheave coupled with the internally threaded tube; a tube idler sheave coupled with the internally threaded tube, wherein the tube idler sheave is proximate the driven link chain sheave and coaxial with the internally threaded tube; a drive shaft proximate the internally threaded tube and perpendicular to the internally threaded tube; a primary link chain drive sheave coupled with the drive shaft, wherein the primary link chain drive sheave comprises a primary ratchet attachment; a ratchet mechanism, wherein the ratchet mechanism engages the handle with the drive shaft; an external hex drive coupled to the primary link chain drive sheave; a shaft idler sheave coupled with the drive shaft; a link chain movably engaged with the driven link chain sheave, the primary link chain drive sheave, the tube idler sheave, and the shaft idler sheave, wherein the external hex drive is preferably movably engaged with a drive mechanism, and wherein the drive mechanism preferably includes a driven link chain sheave; a threaded barrel idler sheave; a primary link chain drive sheave; a secondary link idler sheave; and a drive chain; wherein the drive chain is movably coupled with the driven link chain sheave, the threaded barrel idler sheave, the primary link chain drive sheave, and the secondary link idler sheave in a closed loop configuration.

In a further preferred embodiment, a method of using a load binding tool for securing an elongated binding member at least partially around a load is provided, the method including: 1) providing a load binding tool for securing a load, the load binding tool including an internally threaded tube and two opposing threaded shafts having opposing screw threading; the internally threaded tube having opposing open ends each of which is internally threaded for receiving one of the respective opposing threaded shafts; wherein the threading in the internally threaded tube and on the respective opposing threaded shafts is constructed and arranged to provide common contraction or common extension of the respective opposing threaded shafts when the respective opposing threaded shafts are engaged within the respective opposing open ends of the internally threaded tube and when the internally threaded tube is rotated in one direction or another and the opposing threaded shafts are not rotated; the load binding tool further including a driven link chain sheave coupled with the internally threaded tube; a drive shaft proximate the internally threaded tube and oriented in a generally perpendicular orientation to the internally threaded tube; a primary link chain drive sheave coupled with the drive shaft; and an external hex drive coupled to the primary link chain drive sheave; and a link chain movably engaged with the driven link chain sheave and the primary link chain drive sheave; wherein the driven link chain sheave is secured to the internally threaded tube so that the internally threaded tube rotates when the driven link chain sheave rotates; and wherein the external hex drive can be rotated to rotate the primary link chain drive sheave and move the link chain in such a way so as to rotate the internally threaded tube and draw ends of the respective opposing threaded shafts closer together; 2) providing a hex drive tool; 3) engaging the hex drive tool with the external hex drive on the load binding tool; and 4) rotating the external hex drive, wherein the step of rotating the external hex drive preferably includes rotating the primary link chain drive sheave in one of two directions and moving the link chain in one of two ways that rotate the internally threaded tube in one of two directions having an effect on the load binding tool selected from the group consisting of drawing respective ends of the respective opposing threaded shafts closer together and extending the respective ends of the respective opposing threaded shafts further apart. In a further embodiment, a preferred method includes providing a flatbed trailer, a load and two elongated binding members; and the further step of securing each of the respective elongated binding members to a portion of the trailer and an end of one of the respective opposing threaded shafts, when the respective shafts are engaged within opposing open ends of the internally threaded tube; wherein said step of securing includes at least partially surrounding a portion of the load; and wherein the step of rotating the external hex drive further includes drawing the respective ends of the respective opposing threaded shafts closer together in order to increase tension on the respective elongated binding members to further secure the load.

The present invention provides a load binder for securing a load to a surface by drawing respective portions of an elongated binding member closer together around the load when the load is proximate the surface so as to secure the load to the surface. The load binder preferably includes a primary link chain drive sheave coupled with a drive shaft; an external drive coupling securely engaged with the drive shaft and the primary link chain drive sheave; a driven link chain sheave; an elongated threaded contraction expansion assembly including an elongated threaded member; wherein the driven link chain sheave is secured to the elongated threaded member so that the elongated threaded member rotates with the driven link chain sheave when the driven link chain sheave rotates; and a link chain moveably engaged with the driven link chain sheave and the primary link chain drive sheave such that the driven link chain sheave rotates when the primary link chain drive sheave rotates. In further preferred embodiments the drive shaft is oriented in a generally perpendicular orientation to the elongated threaded member when the link chain is engaged with the primary link chain drive sheave and the driven link chain sheave; and the elongated threaded contraction expansion assembly includes first and second opposing end screws positioned at opposite ends of the elongated threaded contraction expansion assembly; wherein each of the end screws have a threaded end and an engaging end; and wherein the elongated threaded contraction expansion assembly is constructed and arranged to provide common contraction or extension of the engaging ends of the opposing end screws such that when the respective engaging ends of the end screws are interconnected with separate portions of the elongated binding member, the separate portions of the elongated binding member can be drawn closer together when the elongated threaded member is rotated.

In further preferred embodiments, the elongated threaded contraction expansion assembly includes an elongated threaded member selected from the group consisting essentially of: 1) an internally threaded tube having open ends and opposing internal threading on an inner surface of the internally threaded tube proximate the respective open ends; and 2) a dual threaded screw shaft having a threaded outer surface and first and second opposing end portions, the threading on the threaded outer surface of the first opposing end portion being the opposite of the threading on the second opposing end portion. The elongated threaded member is alternately an internally threaded tube having open ends and opposing internal threading proximate the respective opposing open ends; wherein the first and second end screws also have opposite threading such that the respective opposing end screws will screw outwardly or inwardly depending upon the direction of the rotation of the internally threaded tube or a dual threaded screw shaft having a threaded outer surface and first and second opposing end portions, the threading on the outer surface of the respective first and second opposing end portions being the opposite of the threading on the other opposing end portion.

When the elongated threaded member is a dual threaded screw shaft having a threaded outer surface and first and second opposing end portions, the threading on the outer surface of each of the respective first and second opposing end portions being the opposite of the threading on the other opposing end portion; and wherein the elongated threaded contraction expansion assembly further includes first and second extension nuts having opposite threading so that one of first and second extension nuts can receive and screw onto one of the opposing end portions and the other extension nut can receive and screw onto the other opposing end portion; wherein the respective extension nuts each have two open ends, one of which receives a portion of the dual threaded screw shaft and the other of which contains a portion of the threaded end of the respective end screw; wherein when the dual threaded screw shaft rotates the respective extension nuts and the end screws engaged in opposing ends of the respective extension nuts are either drawn closer together or extended further way from one another.

The load binder of the present invention preferably includes an internally threaded tube idler sheave coupled with the internally threaded tube, wherein the internally threaded tube idler sheave is proximate the driven link chain sheave and coaxial with the internally threaded tube; a handle; a shaft idler sheave coupled with the drive shaft; and a ratchet mechanism coupled with the handle, wherein the ratchet mechanism engages the handle with the drive shaft; wherein the handle can be used to rotate the drive shaft. The external drive coupling is preferably a hex drive which is moveably engaged with a drive mechanism, wherein the drive mechanism further includes a driven link chain sheave; a threaded barrel idler sheave; a primary link chain drive sheave; and a drive chain, wherein the drive chain is movably engaged with the driven link chain sheave, the threaded barrel idler sheave, the primary link chain drive sheave, and the secondary link idler sheave in a closed loop configuration.

In a further embodiment of the present invention the load binder for securing a load to a surface by drawing respective portions of an elongated binding member closer together around the load when the load is proximate the surface so as to secure the load to the surface, preferably includes a primary link chain drive sheave coupled with a drive shaft; an external drive coupling securely engaged with the drive shaft and the primary link chain drive sheave; a driven link chain sheave; an elongated threaded contraction expansion assembly including an elongated threaded member; wherein the driven link chain sheave is secured to the elongated threaded member so that the elongated threaded member rotates with the driven link chain sheave when the driven link chain sheave rotates; and a link chain moveably engaged with the driven link chain sheave and the primary link chain drive sheave such that the driven link chain sheave rotates when the primary link chain drive sheave rotates; wherein the drive shaft is oriented in a generally perpendicular orientation to the elongated threaded member when the link chain is engaged with the primary link chain drive sheave and the driven link chain sheave; and wherein the elongated threaded contraction expansion assembly includes first and second opposing end screws positioned at opposite ends of the elongated threaded contraction expansion assembly; wherein each of the end screws have a threaded end and an engaging end; and wherein the elongated threaded contraction expansion assembly is constructed and arranged to provide common contraction or extension of the engaging ends of the opposing end screws such that when the respective engaging ends of the end screws are interconnected with separate portions of the elongated binding member, the separate portions of the elongated binding member can be drawn closer together when the elongated threaded member is rotated; wherein the elongated threaded member is a dual threaded screw shaft having a threaded outer surface and first and second opposing end portions, the threading on the outer surface of the respective first and second opposing end portions being the opposite of the threading on the other opposing end portion; wherein the elongated threaded member is a dual threaded screw shaft having a threaded outer surface and first and second opposing end portions, the threading on the outer surface of each of the respective first and second opposing end portions being the opposite of the threading on the other opposing end portion; and wherein the elongated threaded contraction expansion assembly further includes first and second extension nuts having opposite threading so that one of first and second extension nuts can receive and screw onto one of the opposing end portions and the other extension nut can receive and screw onto the other opposing end portion; wherein the respective extension nuts each have two open ends, one of which receives a portion of the dual threaded screw shaft and the other of which contains a portion of the threaded end of the respective end screw; wherein when the dual threaded screw shaft rotates the respective extension nuts and the end screws engaged in opposing ends of the respective extension nuts are either drawn closer together or extended further way from one another; wherein the load binder further includes an internally threaded tube idler sheave coupled with the internally threaded tube, wherein the internally threaded tube idler sheave is proximate the driven link chain sheave and coaxial with the internally threaded tube; a handle; a shaft idler sheave coupled with the drive shaft; and a ratchet mechanism coupled with the handle, wherein the ratchet mechanism engages the handle with the drive shaft; and wherein the handle can be used to rotate the drive shaft.

In a further embodiment, the load binder preferably includes an internally threaded tube and opposing open ends, threaded shafts threadably inserted into the opposing open ends and the threading in the tube and on the shafts adapted to provide common contraction and extension of the shafts relative to the tube interior with the shafts not turning and the tube turning; a driven belt sheave coupled with the internally threaded tube; a tube idler sheave coupled with the internally threaded tube, wherein the tube idler sheave is proximate the driven belt sheave and coaxial with the internally threaded tube; a drive shaft proximate the internally threaded tube and perpendicular to the internally threaded tube; a primary belt drive sheave coupled with the drive shaft, wherein the primary belt drive sheave includes a primary ratchet handle attachment; a handle; a ratchet mechanism coupled with the handle; an external drive coupling engaged with the primary belt drive sheave; a shaft idler sheave coupled with the shaft; and a belt movably engaged with the driven belt sheave, the primary belt drive sheave, the tube idler sheave, and the shaft idler sheave; wherein the external drive coupling is movably engaged with a drive mechanism, wherein the drive mechanism preferably includes a driven link chain sheave; a threaded barrel idler sheave; a primary link chain drive sheave; a secondary link chain idler sheave; and a drive chain; wherein the drive chain is movably coupled with the driven link chain sheave, the threaded barrel idler sheave, the primary link chain drive sheave, and the secondary link chain idler sheave in a closed loop configuration.

Although several embodiments have been described above with a certain degree of particularity, those skilled in the art could make numerous alterations to the disclosed embodiments without departing from the spirit of the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

It will be appreciated that for conciseness and clarity, spatial terms such as "vertical," "horizontal," "up," and "down" may be used herein with respect to the illustrated embodiments. However, the load binding tool may be used in many orientations and positions, and these terms are not intended to be limiting and absolute.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A load binder for securing an elongated binding member at least partially around a load; the load binder comprising:
an elongated threaded contraction expansion assembly including an elongated threaded member and first and second engaging ends engageable with separate portions of the elongated binding member;
a driven sheave coupled with the elongated threaded member so that the elongated threaded member rotates with the driven sheave when the driven sheave rotates;
a primary drive sheave coupled with a drive shaft, wherein the drive shaft is rotatable; wherein the drive shaft is perpendicular to the elongated threaded member;
an elongated threaded member idler sheave coupled with the elongated threaded member, wherein the elongated threaded member idler sheave is proximate the driven sheave;
a shaft idler sheave;
a closed loop of a flexible coupler movably engaged with the driven sheave, the primary drive sheave, the elongated threaded member idler sheave, and the shaft idler sheave;
wherein when the drive shaft rotates, the primary drive sheave rotates and the closed loop of the flexible coupler engaged with the primary drive sheave moves, and the driven sheave, the elongated threaded member idler sheave, the shaft idler sheave, and the elongated threaded member rotate, and the first and second engaging ends are either drawn closer together or extended further away from one another;
an external drive coupling securely engaged with the drive shaft;
wherein the external drive coupling includes an actuation feature selected from a group consisting of an external hex drive feature, an external square drive feature, an internal hex socket, an internal square socket, an internal slot socket, an internal star-shaped socket, and combinations thereof; and
wherein the external drive coupling is rotatable in a first direction to draw the engaging ends closer together, and wherein the external drive coupling is rotatable in a second direction to extend the engaging ends further from one another.

2. The load binder of claim 1, wherein the elongated threaded contraction expansion assembly includes the elongated threaded member selected from a group consisting of: 1) an internally threaded tube having open ends and opposing internal threading on an inner surface of the internally threaded tube proximate the respective open ends; and 2) a dual threaded screw shaft having a threaded outer surface and first and second opposing end portions, threading on the threaded outer surface of the first opposing end portion being opposite of threading on the second opposing end portion.

3. The load binder of claim 1, wherein the elongated threaded member is an internally threaded tube having opposing open ends and opposing internal threading proximate the respective opposing open ends; and further including first and second opposing end screws that also have opposite threading such that the respective opposing end screws will both screw outwardly or inwardly depending upon direction of rotation of the internally threaded tube.

4. The load binder of claim 1, wherein the elongated threaded member is a dual threaded screw shaft having a threaded outer surface and first and second opposing end portions, threading on the outer surface of the respective first and second opposing end portions being opposite of threading on the other opposing end portion.

5. The load binder of claim 1, wherein the elongated threaded member is a dual threaded screw shaft having a threaded outer surface and first and second opposing end portions, threading on the outer surface of each of the respective first and second opposing end portions being opposite of threading on the other opposing end portion; and wherein the elongated threaded contraction expansion assembly further includes first and second extension nuts having opposite threading so that one of the first and second extension nuts are configured to receive and screw onto one of the opposing end portions and the other extension nut are configured to receive and screw onto the other opposing end portion; wherein the respective extension nuts each have an open end that receives a portion of the dual threaded screw shaft; wherein when the dual threaded screw shaft rotates the respective extension nuts and the engaging ends are either drawn closer together or extended further away from one another.

6. The load binder of claim 1, further including
a handle; and
a ratchet mechanism coupled with the handle, wherein the ratchet mechanism engages the handle with the drive shaft; wherein the handle is configured and arranged to rotate the drive shaft.

7. The load binder of claim 1, wherein the closed loop of the flexible coupler is selected from a group consisting of a link chain, a ball chain, a cable with swaged balls, a u-joint chain, a continuous bushing chain, and a belt.

8. The load binder of claim 1, wherein the closed loop of the flexible coupler is a chain having a plurality of chain links.

9. The load binder of claim 1, wherein the external drive coupling includes the external hex drive feature and the internal square socket.

10. The load binder of claim 1, wherein at least one of the driven sheave, primary drive sheave, elongated threaded member idler sheave, and shaft idler sheave includes sheave pockets that couple with a portion of the closed loop of a flexible coupler to reduce slippage.

11. The load binder of claim 1, wherein the elongated threaded member idler sheave is coaxial with the elongated threaded member.

12. A load binder for securing an elongated binding member at least partially around a load; the load binder comprising:
an elongated threaded contraction expansion assembly including an elongated threaded member and first and second engaging ends engageable with separate portions of the elongated binding member;
wherein the elongated threaded member is a dual threaded screw shaft having a threaded outer surface and first and second opposing end portions, threading on the outer surface of the respective first and second opposing end portions being opposite of threading on the other opposing end portion;
wherein the elongated threaded contraction expansion assembly further includes first and second extension nuts having opposite threading so that one of the first and second extension nuts are configured to receive and screw onto one of the opposing end portions and the other extension nut are configured to receive and screw onto the other opposing end portion;

wherein the respective extension nuts each have a first nut end and a second nut end, the first nut end being an open end that receives one of the first and second opposing end portions of the dual threaded screw shaft, and wherein one of the first and second engaging ends is coupled with the second nut end;

a driven sheave coupled with the elongated threaded member so that the elongated threaded member rotates with the driven sheave when the driven sheave rotates;

a primary drive sheave coupled with a drive shaft, wherein the drive shaft is rotatable; wherein the drive shaft is perpendicular to the elongated threaded member;

an elongated threaded member idler sheave coupled with the elongated threaded member, wherein the elongated threaded member idler sheave is proximate the driven sheave;

a shaft idler sheave;

a closed loop of a flexible coupler movably engaged with the driven sheave, the primary drive sheave, the elongated threaded member idler sheave, and the shaft idler sheave, wherein the closed loop of the flexible coupler is a chain having a plurality of chain links;

wherein when the drive shaft rotates, the primary drive sheave rotates and the closed loop of the flexible coupler engaged with the drive sheave moves, and the driven sheave, the elongated threaded member idler sheave, the shaft idler sheave, and the elongated threaded member rotate, and the first and second engaging ends are either drawn closer together or extended further away from one another;

an external drive coupling securely engaged with the drive shaft, wherein rotation of the external drive coupling rotates the drive shaft;

wherein the external drive coupling includes an actuation feature selected from a group consisting of an external hex drive feature, an external square drive feature, an internal hex socket, an internal square socket, an internal slot socket, an internal star-shaped socket, and combinations thereof; and wherein the external drive coupling is rotatable in a first direction to draw the engaging ends closer together, and wherein the external drive coupling is rotatable in a second direction to extend the engaging ends further from one another.

13. The load binder of claim 12, wherein the external drive coupling includes the external hex drive feature and the internal square socket.

14. The load binder of claim 12, wherein the elongated threaded member idler sheave is coaxial with the elongated threaded member.

15. A method of securing an elongated binding member at least partially around a load with a load binder, comprising the steps of:

engaging first and second engaging ends of the load binder with separate portions of the elongated binding member, the load binder having a drive mechanism including:
a rotatable drive shaft;
a rotatable elongated threaded member oriented perpendicular to the drive shaft;
a driven sheave secured to the elongated threaded member;
an elongated threaded member idler sheave proximate the driven sheave;
a primary drive sheave secured to the drive shaft;
a shaft idler sheave; and
a closed loop of a flexible coupler movably engaged with the driven sheave, the elongated threaded member idler sheave, the primary drive sheave, and the shaft idler sheave;

the load binder having an external drive coupling securely engaged with the drive shaft, wherein the external drive coupling includes an actuation feature selected from a group consisting of an external hex drive feature, an external square drive feature, an internal hex socket, an internal square socket, an internal slot socket, an internal star-shaped socket, and combinations thereof; and rotating the external drive coupling in a first direction to draw the first and second engaging ends closer together to tighten the elongated binding member around the load.

16. The method of claim 15, wherein the closed loop of the flexible coupler is a chain having a plurality of chain links.

17. The method of claim 15, further comprising the step of rotating the external drive coupling in a second direction to loosen the elongated binding member around the load.

18. The method of claim 15, further comprising the steps of:
engaging a drive tool with the external drive coupling; and
using the drive tool to rotate the external drive coupling in the first direction to draw the engaging ends closer together to tighten the elongated binding member around the load or to rotate the external drive coupling in a second direction to loosen the elongated binding member around the load.

19. The method of claim 15, wherein the elongated threaded member idler sheave is coaxial with the elongated threaded member.

20. A load binder for securing an elongated binding member at least partially around a load, the load binder comprising:
a drive mechanism, wherein the drive mechanism includes:
a rotatable drive shaft;
a rotatable elongated threaded member oriented perpendicular to the drive shaft;
a driven sheave secured to the rotatable elongated threaded member;
an elongated threaded member idler sheave proximate the driven sheave;
a primary drive sheave secured to the drive shaft, wherein the primary drive sheave is configured and arranged to rotate around a first axis;
a shaft idler sheave configured and arranged to rotate around a second axis, wherein the second axis is parallel to the first axis; and
a closed loop of a flexible coupler movably engaged with the driven sheave, the elongated threaded member idler sheave, the primary drive sheave, and the shaft idler sheave.

21. The load binder of claim 20, further comprising an external drive coupling securely engaged with the drive shaft.

22. The load binder of claim 21, wherein the external drive coupling includes an actuation feature selected from a group consisting of an external hex drive feature, an external square drive feature, an internal hex socket, an internal square socket, an internal slot socket, an internal star-shaped socket, and combinations thereof.

23. The load binder of claim 20, wherein the second axis is coincident with the first axis.

24. The load binder of claim 20, further comprising a handle, wherein the handle is configured and arranged to rotate the drive shaft.

25. The load binder of claim 20, wherein the elongated threaded member idler sheave is coaxial with the elongated threaded member.

* * * * *